US012690656B2

(12) United States Patent
     Conrad

(10) Patent No.: US 12,690,656 B2
(45) Date of Patent: Jul. 28, 2026

(54) HAIR TREATMENT APPLIANCE WITH ACCESSORY TOOL

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 199 days.

(21) Appl. No.: 18/509,160

(22) Filed: Nov. 14, 2023

(65) Prior Publication Data

US 2024/0148122 A1      May 9, 2024

Related U.S. Application Data

(63) Continuation of application No. 17/175,533, filed on Feb. 12, 2021, now Pat. No. 11,857,052, which is a continuation-in-part of application No. 17/094,330, filed on Nov. 10, 2020, now Pat. No. 11,517,091, which is a continuation-in-part of application No. 16/944,388, filed on Jul. 31, 2020, now Pat. No. 11,457,713, which is a continuation-in-part of
(Continued)

(51) Int. Cl.
     *A45D 20/12*      (2006.01)
     *B01D 45/08*      (2006.01)
     *B01D 45/14*      (2006.01)
     *B01D 45/16*      (2006.01)
     *B01D 50/20*      (2022.01)

(52) U.S. Cl.
     CPC ............. *A45D 20/12* (2013.01); *B01D 45/08* (2013.01); *B01D 45/14* (2013.01); *B01D 45/16* (2013.01); *B01D 50/20* (2022.01)

(58) Field of Classification Search
     CPC ........ A45D 20/12; A45D 20/10; B01D 45/08; B01D 45/14; B01D 45/16; B01D 50/20
     USPC ................................................ 34/91, 96, 283
     See application file for complete search history.

(56) References Cited

U.S. PATENT DOCUMENTS 2,503,113 A      4/1950   Hribar
3,972,126 A      8/1976   DeMuro et al.
                    (Continued)

FOREIGN PATENT DOCUMENTS

CN       105686300 A      6/2016
EP        0064405 A1     11/1982
                    (Continued)

OTHER PUBLICATIONS

English machine translation of JP2008148848, published on Jul. 3, 2008.
                    (Continued)

*Primary Examiner* — John P McCormack
(74) *Attorney, Agent, or Firm* — Ryan De Vries; SMART & BIGGAR LP

(57)                ABSTRACT

A hair dryer has a body having a hair dryer electrical contact. An accessory tool, which has an accessory tool having an accessory electrical contact, is removably mountable to the body. An electrically operable heating element provided in the accessory tool, whereby, when the accessory tool is mounted to the body and the hair dryer is actuated, the electrically operable heating element is energized using power provided by the hair dryer electrical contact.

19 Claims, 87 Drawing Sheets

Related U.S. Application Data application No. 16/938,057, filed on Jul. 24, 2020, now Pat. No. 11,425,979, which is a continuation-in-part of application No. 16/837,996, filed on Apr. 1, 2020, now Pat. No. 11,425,980.

(60) Provisional application No. 63/044,788, filed on Jun. 26, 2020, provisional application No. 63/035,282, filed on Jun. 5, 2020, provisional application No. 63/027,006, filed on May 19, 2020.

(56) References Cited

U.S. PATENT DOCUMENTS

| | | | |
|---|---|---|---|
| 4,210,162 A | | 7/1980 | Dreyer et al. |
| 4,419,835 A | | 12/1983 | Strain |
| 5,261,427 A | | 11/1993 | Dolev |
| 5,327,919 A | | 7/1994 | Hanlon |
| 6,009,883 A | * | 1/2000 | Morrow ................ A45D 2/001 |
| | | | 132/211 |
| 6,925,728 B2 | | 8/2005 | Busa et al. |
| 6,959,501 B1 | | 11/2005 | Melzer |
| 7,984,567 B2 | | 7/2011 | Bertakis |
| 9,144,286 B2 | | 9/2015 | Courtney et al. |
| 9,173,468 B2 | | 11/2015 | Moloney et al. |
| 9,185,958 B2 | | 11/2015 | Torres et al. |
| 9,282,799 B2 | | 3/2016 | Courtney et al. |
| 9,282,800 B2 | | 3/2016 | Courtney et al. |
| 9,414,662 B2 | | 8/2016 | Moloney et al. |
| 9,420,864 B2 | | 8/2016 | Gammack et al. |
| 9,420,865 B2 | | 8/2016 | Gammack et al. |
| 9,526,310 B2 | | 12/2016 | Courtney et al. |
| 9,675,157 B2 | | 6/2017 | Courtney et al. |
| 9,681,726 B2 | | 6/2017 | Moloney et al. |
| 9,687,058 B2 | | 6/2017 | Atkinson |
| 9,808,065 B2 | | 11/2017 | Moloney et al. |
| 9,808,066 B2 | | 11/2017 | Moloney et al. |
| 9,808,067 B2 | | 11/2017 | Sutter et al. |
| 9,936,788 B2 | | 4/2018 | Stephens et al. |
| 9,936,789 B2 | | 4/2018 | Stephens et al. |
| 10,010,150 B2 | | 7/2018 | Courtney et al. |
| 10,016,040 B2 | | 7/2018 | Courtney et al. |
| 10,021,951 B2 | | 7/2018 | Bobillier et al. |
| 10,064,470 B2 | | 9/2018 | Warne |
| 10,076,172 B2 | | 9/2018 | Stephens et al. |
| 10,085,537 B2 | | 10/2018 | Maclaine |
| 10,117,491 B2 | | 11/2018 | Moloney et al. |
| 10,165,843 B2 | | 1/2019 | Hedges |
| 10,165,844 B2 | | 1/2019 | Stephens et al. |
| 10,194,728 B2 | | 2/2019 | Stephens et al. |
| 10,213,001 B2 | | 2/2019 | Stephens et al. |
| 10,226,112 B2 | | 3/2019 | Kerr et al. |
| 11,044,979 B2 | | 6/2021 | Maclaine |
| 11,071,365 B2 | | 7/2021 | Maclaine |
| 2003/0172543 A1 | | 9/2003 | Busa et al. |
| 2011/0197466 A1 | * | 8/2011 | Shami .................. A61N 5/0617 |
| | | | 34/283 |
| 2013/0133218 A1 | * | 5/2013 | Hadden .................. A45D 20/10 |
| | | | 34/97 |
| 2013/0269205 A1 | | 10/2013 | Hada |
| 2016/0150864 A1 | | 6/2016 | Thomason et al. |
| 2016/0242524 A1 | * | 8/2016 | Floessholzer ........ A45D 20/122 |
| 2017/0170709 A1 | | 6/2017 | Barnes et al. |
| 2017/0273428 A1 | | 9/2017 | Nicolson et al. |
| 2019/0380468 A1 | | 12/2019 | Sumerville et al. |

FOREIGN PATENT DOCUMENTS

| | | |
|---|---|---|
| EP | 907633 A1 | 4/1999 |
| FR | 2504250 A1 | 10/1982 |
| FR | 2778823 A1 | 11/1999 |
| GB | 2548616 B | 2/2020 |
| GB | 2598924 A | 3/2022 |
| GB | 2601723 A | 6/2022 |
| JP | 2001190324 A | 7/2001 |
| JP | 2006130181 A | 5/2006 |
| JP | 2008148848 A | 7/2008 |
| KR | 200399142 Y1 | 10/2005 |
| KR | 1020150135001 A | 12/2015 |
| WO | 2019/053703 A1 | 3/2019 |

OTHER PUBLICATIONS

English machine translation of FR2778823, published on Oct. 12, 2001.

English machine translation of KR10-2015-0135001 published on Dec. 2, 2015.

English machine translation of JP2001190324, published on Jul. 17, 2001.

English machine translation of FR2504250, published on Oct. 22, 1982.

English machine translation of CN105686300A, published on Jun. 22, 2016.

International Search Report and Written Opinion, received in connection to co-pending PCT application No. PCT/CA2021/050420, mailed on Jun. 3, 2021.

English machine translation of KR200399142, published on Oct. 19, 2005.

English machine translation of JP2006130181A, published on May 25, 2006.

* cited by examiner

<u>FIG. 6</u>

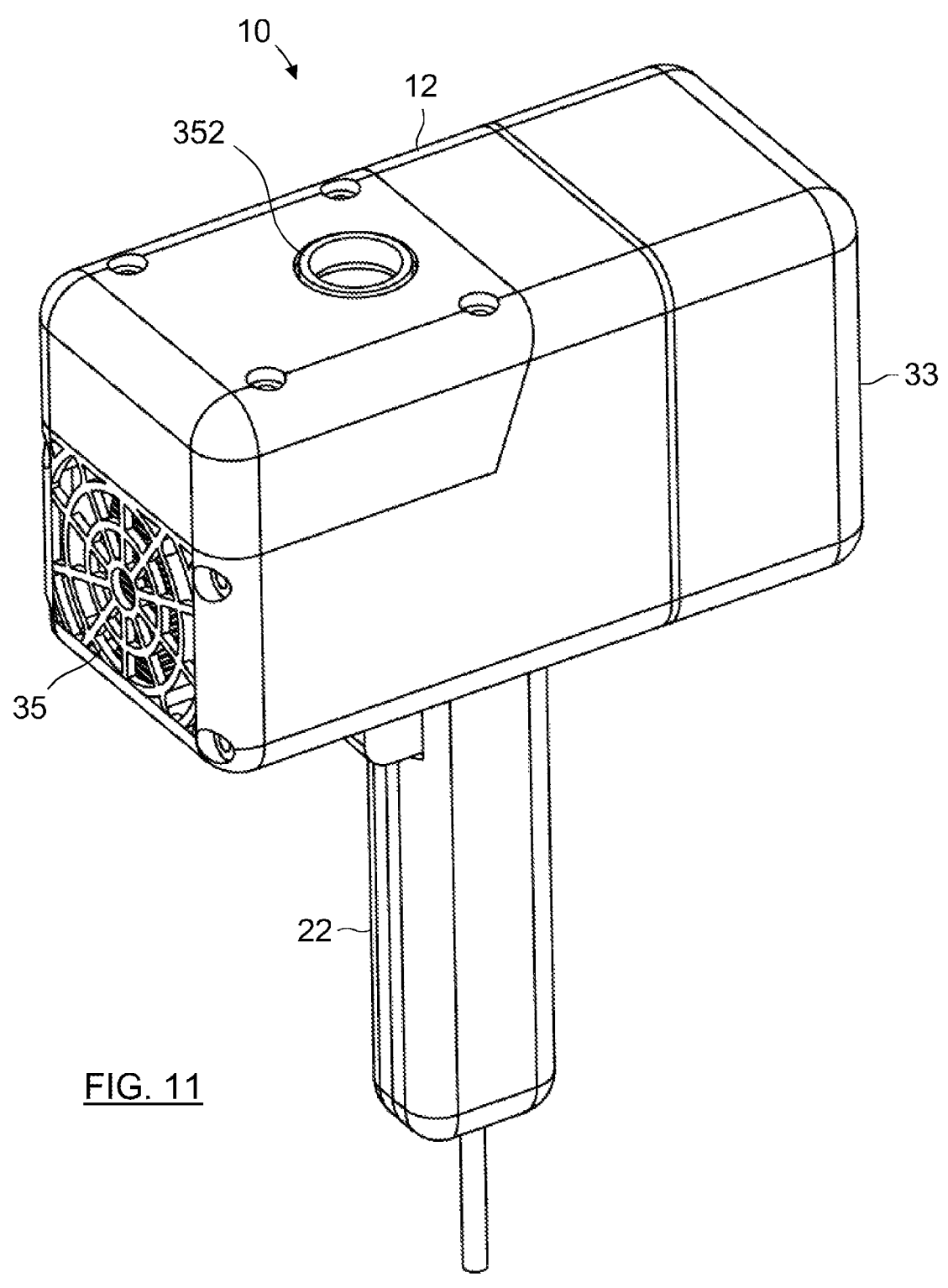
<u>FIG. 11</u>

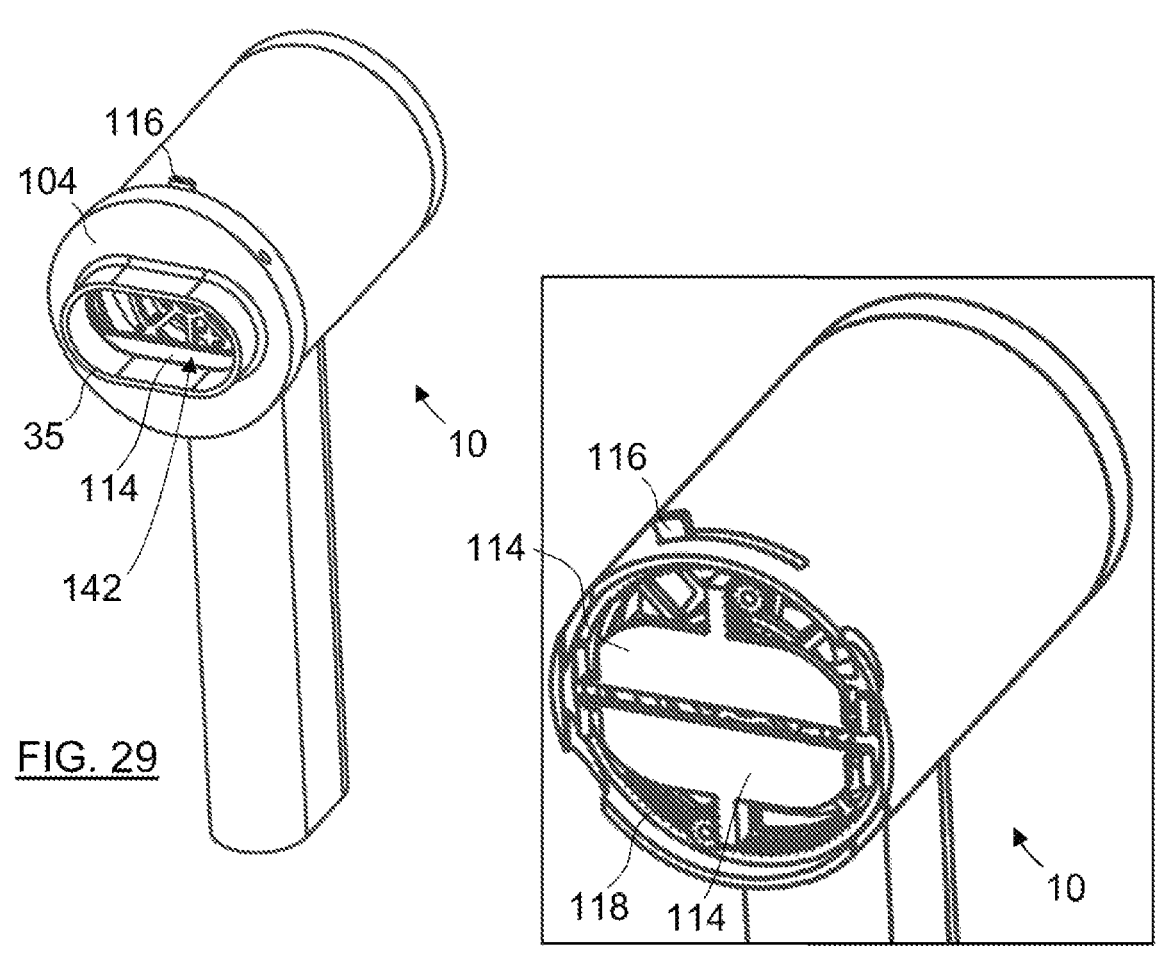
FIG. 29
FIG. 30
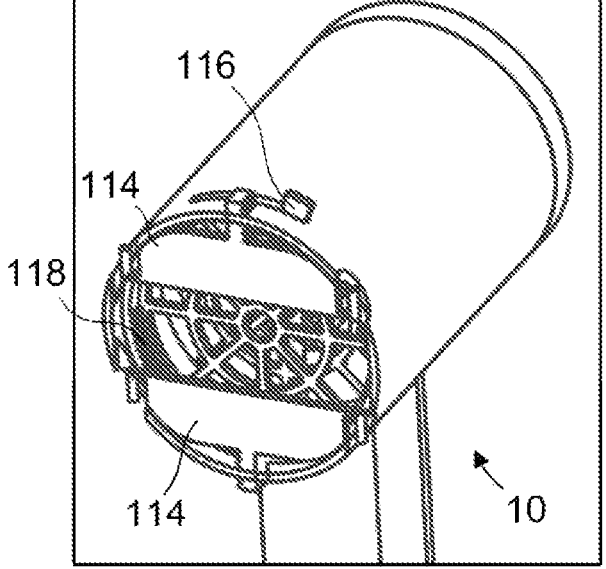
FIG. 31

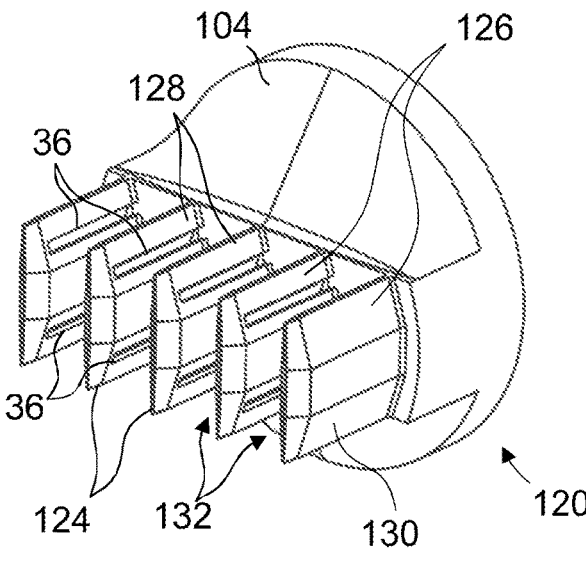
FIG. 38
FIG. 39
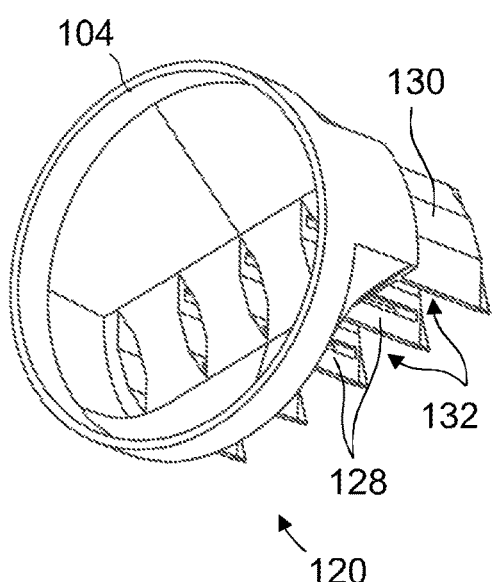
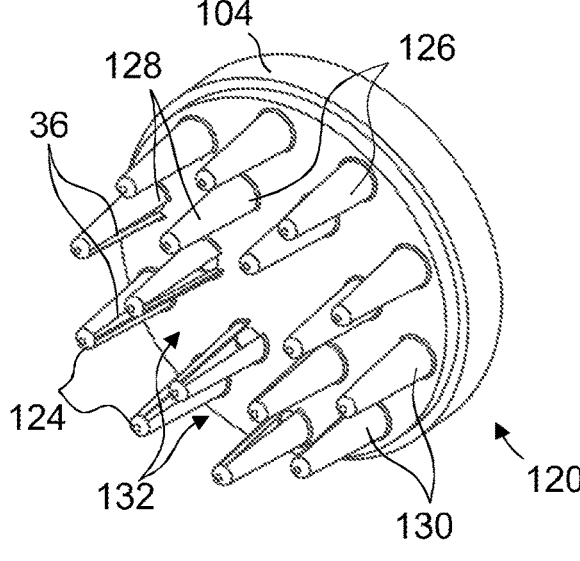
FIG. 40

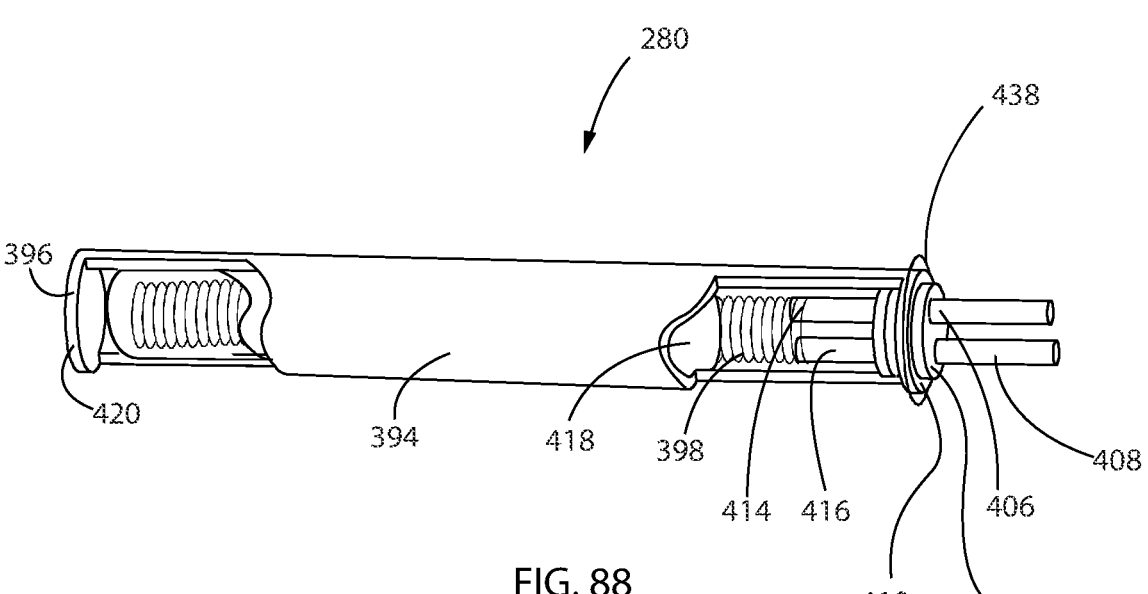
FIG. 88
FIG. 89
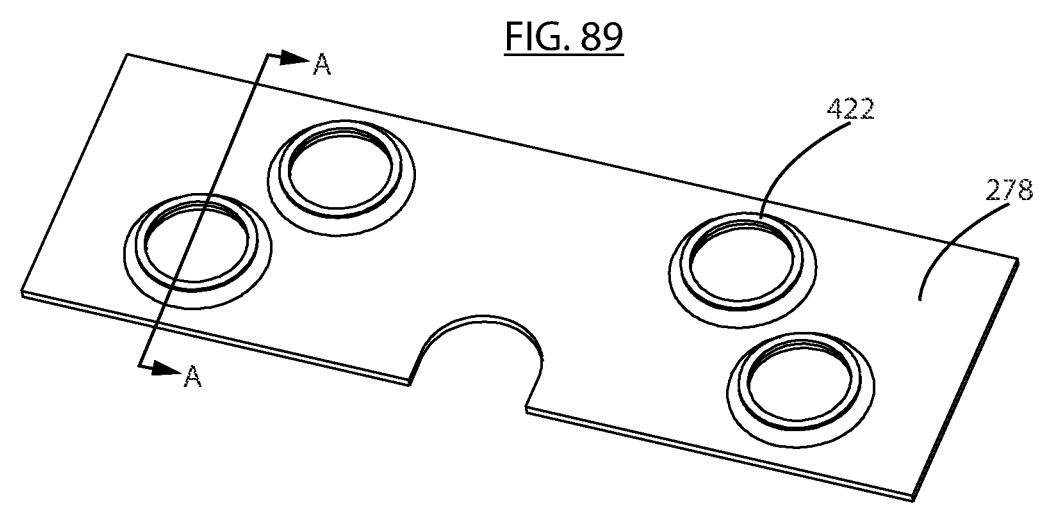

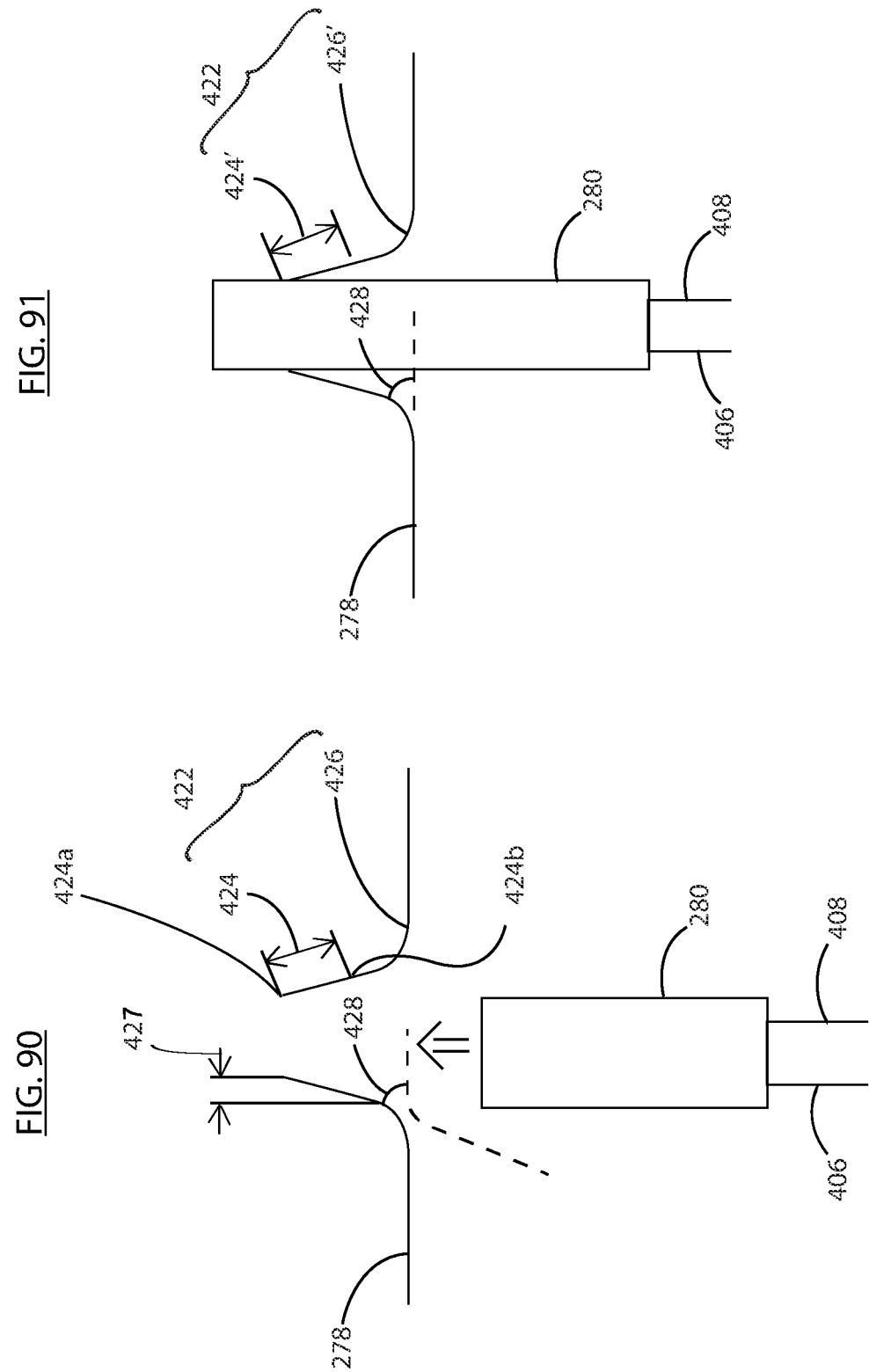

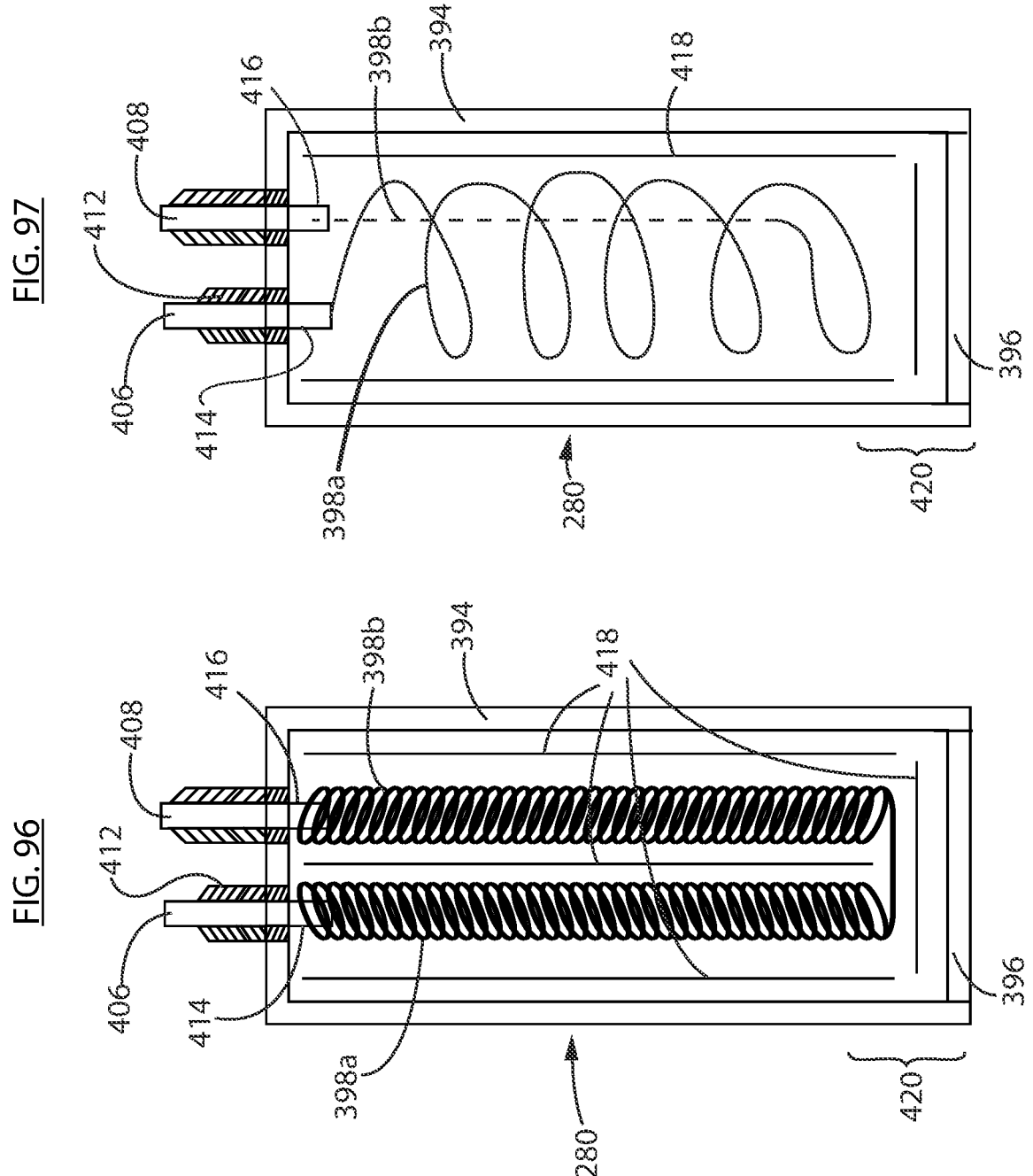

HAIR TREATMENT APPLIANCE WITH ACCESSORY TOOL

CROSS-REFERENCE TO RELATED APPLICATIONS

This application is a continuation of U.S. patent application Ser. No. 17/175,533, which was filed on Feb. 12, 2021, which is a:

(1) is a continuation-in-part of U.S. patent application Ser. No. 17/094,330, filed on Nov. 10, 2020 and issued as U.S. Pat. No. 11,517,091 on Dec. 6, 2022; which itself is a continuation-in-part of U.S. patent application Ser. No. 16/944,388, filed on Jul. 31, 2020 and issued as U.S. Pat. No. 11,457,713 on Oct. 4, 2022; which itself is a continuation-in-part of U.S. patent application Ser. No. 16/938,057, filed on Jul. 24, 2020 and issued as U.S. Pat. No. 11,425,979 on Aug. 30, 2022; which itself is a continuation-in-part of U.S. patent application Ser. No. 16/837,996, filed on Apr. 1, 2020 and issued as U.S. Pat. No. 11,425,980 on Aug. 30, 2022; and said U.S. patent application Ser. Nos. 17/094,330, 16/944,388 and 16/938,057 each also claim the benefit of U.S. Provisional Patent Application No. 63/027,006, filed on May 19, 2020; U.S. Provisional Patent Application No. 63/035,282, filed on Jun. 5, 2020; and U.S. Provisional Patent Application No. 63/044,788, filed on Jun. 26, 2020 entitled HAIR DRYER; and, (2) claims the benefit of United States Provisional Patent Application No. 63/027,006, filed on May 19, 2020; U.S. Provisional Patent Application No. 63/035,282, filed on Jun. 5, 2020; and U.S. Provisional Patent Application No. 63/044,788, filed on Jun. 26, 2020 entitled HAIR DRYER, the contents of each of which are incorporated herein by reference.

FIELD

This disclosure relates generally to hair dryers used for drying and styling hair.

Introduction

The following is not an admission that anything discussed below is part of the prior art or part of the common general knowledge of a person skilled in the art.

Conventional hair dryers employ a flow of room air that is directed towards the hair of a person to dry the hair. The room air may optionally be heated so as to accelerate the drying process. This process relies primarily upon the evaporation of water from the hair as the mechanism of drying. Tools, such as combs, brushes, curlers, or straightening plates may be used in conjunction with a conventional hair dryer, or may optionally be permanently or replaceably affixed to a conventional hair dryer to enable the hair to be styled while it is dried.

Conventional hair dryers primarily rely upon the evaporation of water from the hair as the mechanism of drying. Accordingly, air is heated to reduce the relative humidity of the air, and allow the heated air to absorb more moisture per unit weight of air. Hair dryers use various designs to blow a large volume of heated air towards the hair to be dried, but only a small portion of the energy input into the dryer may actually contact wet hair and remove moisture from the hair. As such, this is a very energy inefficient process. For example, dry human hair which weighs 0.2 to 0.6 pounds may absorb 0.1 to 0.3 pounds of water. The specific heat capacity of hair is about 0.4 btu/lb/° F., and the specific heat capacity of water is 1 btu/lb/° F. It takes about 974 btu per pound to evaporate water. Therefore, evaporating 0.1 to 0.3 pounds of water only requires about 109 btu (32 Whrs) to 325 btu (95 Whrs).

Healthy hair will typically absorb about 30% to 35% of its own weight of water causing a change of about a 15% to 20% in the diameter of the hair and about a 2% change in the length of the hair. Damaged hair will typically absorb about 42% to 48% of its own weight of water causing a change of about 18% to 23% in diameter and about 2% in length. Different types of hair do exhibit different levels of water absorption.

Hair loses about 20% to 50% of its tensile strength when wet with curly hair losing the most and thereby becoming the weakest. These properties depend on cuticle and sebum of the particular hair. A consequence of hair losing its tensile strength when saturated with water is that it may break when combed or brushed, as well as being more prone to tangling due to the slightly raised cuticle surface that is typical for wet hair.

The regular expansion and contraction that occurs when hair is wetted and dried, such as when being washed, causes regular damage due to uneven shrinking which occurs during the drying process under normal conditions and especially when a conventional hair dryer is used as the mechanical stress on the surface of and inside the cortex of hair strands results in gradual fatigue of the fiber, which can lead to fatigue failure (breakage). Hair damage and breakage is often characterized as cuticle breakage, mid-strand fracture, and splitting.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

Accordingly, a hair dryer may have at least two operating modes. In a first mode, hair may be dried by using suction to draw air through the hair and into the hair dryer. Alternatively, or additionally, in the first operating mode, hair may be dried by directing air, which may be a jet of high-velocity air, at the hair. The jet of high-velocity air may have a velocity of 70 mph or more, 80 mph or more, 90 mph or more, 100 mph or more, 110 mph or more. For example, in the first mode of operating, hair may be dried by directing air at the hair wherein the air has a velocity of 80-120 mph, 85-120 mph, 90-120 mph or 90-110 mph. The first mode of operation may be referred to as the suction or suction dry mode of operation.

This first operating mode may be used to remove, e.g., 40-80 wt. %, 50-75 wt. % or 60-70 wt. % of the water in the hair, based on the weight of water in the hair prior to drying commencing. The first operating mode may be conducted without actuating a heater which directs heat at the hair. Optionally, waste heat produced by the motor may be directed at the hair, such as by heating the high velocity air directed at the hair to be dried (e.g., the air passes over the motor to absorb heat prior to being exiting the hair dryer and being directed at the hair to be dried). Alternately, or in addition, a heater may be used to provide heated air that is used in addition to suction in the first operating mode. Optionally, if the first operating mode uses suction, some air may be directed over the motor and then at the hair being dried so as to use the waste heat of the motor to assist in drying hair during the first operating mode. Accordingly, hair may be dried during the first mode without a phase change or, optionally, substantially without a phase change. It will be appreciated that, during the first operating mode, heat may also be applied to the hair (e.g., by an infrared (IR) emitter).

Subsequently, in a second operating mode, heat (e.g., heated air and/or infrared radiation (i.e., infrared heat) and/or heat provided by conduction a heated member (e.g., a resistively heated member such as by a straightening iron) is provided to further dry the hair, such as to blow dry the hair or spot dry the hair. The heat may remove from the hair 20-60 wt. %, 25-50 wt. % or 30-40 wt. % of the initial water present in the hair when wet. In this mode, the temperature of the air exiting the hair dryer, and/or the temperature of the air when it reaches the hair to be dried may be kept sufficiently low (e.g., less than 75° C., less than 70° C., less than 60° C. or less than 50° C.), to reduce or substantially prevent or prevent heat damage to the hair. Accordingly, the hair may be kept below, e.g., less than 75° C., less than 70° C., less than 60° C. or less than 50° C. during the second mode of operation, as well as during the first mode of operation. The second mode of operation may be referred to as the blow dry mode of operation.

One advantage of this embodiment is that a substantial portion or a majority of the water may be removed without the application of heat or a substantial amount of heat. For example, a heating element such as a resistive heater or infrared heater used to heat air for the second operating mode may be deactivated in the first operating mode. Accordingly, in the first operating mode, the air may be heated by waste heat produced by the motor, but not by a heating element (e.g., a resistively heatable element or an infrared heating element). Alternately, a resistively heatable element having a low air flow thereover (e.g., 10-20 CFM) may therefore be operated at partial power (e.g., the energy provided to a resistively heatable element may be adjusted such that the air flow that is used to supplement the suction drying may be at a temperature that is sufficiently low (e.g., less than 75° C., less than 70° C., less than 60° C. or less than 50° C.), to reduce or substantially prevent or prevent heat damage to the hair. Accordingly, the hair dryer may be more energy efficient as compared to a conventional hair dryer since less heated air is used.

A further advantage is that the time required to dry hair may be reduced as compared to a conventional hair dryer, since some of the water is removed by drawing ambient air through the hair (essentially sucking some of the water from the hair) and/or by directing a jet of air at the hair and driving some of the water from the hair. A further advantage is that, as less heat is applied, and as the heat may be applied after a substantial amount of water is removed from the hair, less hair damage may occur.

Accordingly, as discussed, a hair dryer may employ different modes of water removal when the hair is fully saturated versus when it less saturated or almost dry. After a user has washed their hair, and optionally partially dried it with a towel, the user may employ the first mode of the hair dryer, such as by positioning the suction intake side of the hair dryer to the hair and/or directing a jet nozzle of the hair dryer at the hair.

In the first mode, water may be removed from the hair, optionally substantially without a phase change of the removed water. For example, at least 40 wt. %, 50 wt. %, 60 wt. %, 75 wt. % or at least 90 wt. % of water that is removed from the hair may be removed as liquid water.

In the first mode, a jet of high-velocity air and/or suction may be used, and may be used in combination with moving the hair dryer relative to the hair. For example, the hair dryer may be moved to direct the jet from a first position nearer the roots of the hair to a second position near the ends of the hair. Moving the hair dryer may assist in driving moisture down the hair towards the ends of the hair or sucking moisture from the hair.

When using a jet of high-velocity air, the jet of high-velocity air may have a velocity of at least 70, 80, 90 or 100 mph when the air contacts the hair. The velocity of the air may facilitate driving a substantial amount of liquid water from the hair quickly. The outlet port of the hair dryer may be held adjacent the hair, such as within 3 inches, 2 inches, 1 inch of the hair, or directly against the hair to further facilitate driving liquid water from the hair quickly. Holding the outlet port adjacent the hair may also reduce the amount of hair dryer output that bypasses the hair.

The jet of high-velocity air may be shaped to facilitate driving moisture in a chosen direction. Accordingly, the jet of air may be planar and have a width and a depth, with the width greater than the depth. For example, an outlet port or nozzle of the hair dryer may have a slot-shaped opening with a width that is greater than its height to produce the planar jet of air.

A restraint member may be used to hold the hair adjacent the outlet port of the hair dryer when the jet is applied. For example, the person may hold the hair in position by placing their hand behind a rearward side of the hair and applying the jet to a forward side of the hair. The restraint member may be moved along with the hair dryer, mirroring the movements of the hair dryer along the hair to maintain the hair adjacent the outlet port of the hair dryer. For example, a user may apply an air jet to the hair at a position just below their head, with the hair supported by their hand, and may then move the air jet and their hand concurrently downwards to drive liquid water down the hair towards the ends of the hair.

The restraint member may also be a brush or comb, and the brush or comb may be attached to the hair dryer or separate from the hair dryer. For example, the teeth of a brush or comb attachment may be hollow, and the jet of air may exit through the teeth of the brush or comb, such as exiting out of a lateral side of the teeth. A brush or comb with multiple teeth may include lateral openings directing lateral jets of air into spaces between the teeth.

During the first mode of operation, heated air may optionally be provided to the hair being dried. Accordingly, sub-atmospheric pressure may be used by itself or in combination with heated air that may be directed at a location in front of the inlet port that provides the sub-atmospheric pressure. For example, the jet of air having a velocity of at least 60, 70, 80, 90, 100 or 110 mph may include heated air. The heated air may be applied concurrently all of the time during the provision of the sub-atmospheric pressure and/or the jet of air having a velocity of at least 60, 70, 80, 90, 100 or 110 mph or only part of the time. For example, the heated air may be applied after the sub-atmospheric pressure has been provided for a first period of time. The air may be heated by passing the air across the motor of a motor and fan assembly (the air moving member) so as to cool the motor. Alternately, or in addition, a heating element (e.g., a resistively heated member) may be provided, such as downstream of the motor and upstream of an air outlet port.

The jet of air may have a temperature that is up to 75° C., up to 70° C., up to 60° C., up to 50° C., or up to 40° C. For example, the jet of air may be unheated or heated only by waste heat from a motor. Optionally, or in addition, a heating member may be used to provide heat to the jet of air. Optionally, or in addition, an IR source may be used to direct heat at the hair during a portion or all of the first mode of operation. The temperature may also be controlled and kept below a threshold temperature, such as by increasing air flow to reduce the temperature to which the air and/or the hair is heated.

In embodiments wherein suction is used, the intake side of the hair dryer may be held adjacent the hair, such as within 3 inches, 2 inches, 1 inch of the hair, or directly against the hair to facilitate drawing liquid water from the hair quickly. The intake side of the hair dry may comprise a porous member such as a porous screen, fine woven mesh, or an open cell foam such as open cell polyurethane or any combination thereof. The porous member enables sub-atmospheric pressure to be applied over a wide area of the hair yet inhibit or prevent individual hairs or groups of hairs from being drawn into the hair dryer as the hair is drawn against the porous member, but permit water from the hair to be drawn into the hair dryer.

The water drawn into the hair dryer may be in the form of small droplets. Optionally, the water drawn into the hair dryer is collected in the hair dryer. Accordingly, the hair dryer may have a water separator and a water collection member. The water separator may be any member that separates some or all of the liquid water from the air drawn into the hair dryer and the water collection member may be any member which retains water that is separated from the air drawn into the hair dryer. The water separator and the water collection member may be placed, e.g., in the intake air stream adjacent to the inlet port, adjacent to an upstream side of the air moving member, in the exhaust airstream downstream of the air moving member, or at an air outlet port of the hair dryer, or a combination thereof. Optionally, the water collection member collects water in its liquid form and sequesters the water so as to reduce, inhibit or substantially prevent the sequestered water being evaporated thereby removing the requirement to provide sufficient latent heat of evaporation to the captured and segregated water to evaporate the water. Alternately, or in addition, the collected water may also be sequestered to reduce, inhibit or substantially prevent the sequestered water being re-entrained in the air flowing through the hair dryer.

The water separator and the water collection member may be the same element. For example, the water separator and the water collection member may be an open cell foam or a cyclone wherein separated water is retained in the bottom of the cyclone chamber. Open cell foam may be a compact and/or quiet water collection member as compared to other water separators, such as a baffled chamber or a Prandtl separator. In such a case, water absorbed by the open cell foam may be removed by compressing the open cell foam, withdrawing the open cell foam for drying or replacement with a drier open cell foam, or enabling air to flow through the open cell foam to evaporate water retained therein. Such air flow may occur during the drying of hair and/or subsequently when the hair is dried and, e.g., the hair dryer is placed in a stand or the like.

The water separator may alternately be a member that separates water from an air stream but does not collect the water. Examples include a baffled chamber, a cyclone or a Prandtl separator. In such a case, the water collection member may be a container in communication with the water separator and in which water is sequestered. The container may be emptied by removing the container or opening a drainage port when the container is on board the hair dryer or has been removed from the hair dryer.

Moisture separation efficiency may be promoted in various ways. For example, optionally the volume of air per unit time (the volumetric air flow rate) and/or velocity of air through the water separator may be limited and/or stabilized (e.g., the volume of air per unit of time through the water separator may be limited to 15 cfm or less, 10 cfm or less or 6 cfm or less) to reduce re-entrainment of water in the air flow or otherwise improve separation efficiency of water from the incoming air stream. Accordingly, the air flow volume per unit time through the water separator may be kept from becoming large enough to re-entrain water that is in the water separator.

The air flow rate or the velocity of the air flow through the water separator may be adjusted, for example, by one or more of the following options.

The air flow path may be varied to thereby vary the back pressure through the air flow path in the hair dryer. For example, a restriction may be provided upstream and/or downstream of the water separator to limit the air flow through the water separator when hair is not placed against the suction air inlet port. A restrictor (such as a variable orifice or an opening in a diaphragm) may be manually or automatically partially closed when hair is removed from the inlet port to limit air flow through the air flow path.

Alternately, or in addition, the cross-sectional flow area in a portion of the air flow path upstream and/or downstream of the water separator that is less than the cross-sectional flow area of the suction inlet port may be provided to constrict the air flow and thereby produce back pressure that limits the air flow through the water separator when hair is not abutting the inlet port, Alternately, or in addition, some or all of the air flow path may selectively bypass the water separator, when hair is removed from the inlet port to limit air flow through the water separator. For example, at least one bypass opening, and bypass valve may be provided to enable air to bypass or partially bypass the water separator to limit the air flow through the water separator when hair is removed from the inlet port.

Alternately or in addition to varying the air flow path, the hair dryer may use a first air moving member (e.g., an impeller) for use in the suction portion of the air flow path and a second air moving member (e.g., a propeller) for use in the blow dry portion of the air flow path. Alternately, or in addition, one motor and fan assembly may be used to produce air flow in the first (sub-atmospheric) mode of operation and a second motor and fan assembly may be used in the blow dry mode of operation. In the blow dry mode of operation, the motor operating the second air moving member (e.g., a propeller) may be de-energized or the second air moving member (e.g., a propeller) may be rotationally detached from the motor.

The use of sub-atmospheric pressure (suction) to withdraw water from hair and/or a jet of air at the hair with a velocity of 60 mph or more, 70 mph or more, 80 mph or more, 90 mph or more, 100 mph or more, 110 mph or more to drive water from the hair requires less energy than the latent heat of evaporation required to evaporate all of the water in the hair. The reduced energy requirement of the hair dryer may enable the hair dryer to operate part time or full time using one or more on board portable energy storage members such as primary batteries, rechargeable batteries, super-capacitors, fuel cells or hydrogen combustion engines or turbines to power the device. Accordingly, the hair dryer may be cordless. An optional cord may be provided to enable the hair dryer to also or alternately operate using household current. An advantage in using a cord is that the portable energy storage members may be recharged on board.

It will be appreciated that an air flow multiplier may be used to provide increased air flow to the hair being dried. The air flow multiplier may be any design that induces air to flow along a surface or through a channel, and may employ the Coanda effect and/or may use an air foil. The increased air flow may be merged with an air flow stream travelling in a passage that is downstream from an air moving member (a motor and fan assembly), e.g., the merged stream exits the hair dryer through a common outlet port or ports, and/or the increased air flow may be separately directed at the hair being dried. It will be appreciated that the increased air flow may be heated by a heating element as discussed previously. If the increased air flow is separately directed at the hair being dried, such as by passing through its own channel, the increased air flow may be heated by a separate heating element.

Once the sub-atmospheric pressure and/or a jet of air has been used to remove as much water as desired, the user may then employ the second mode of the hair dryer disclosed herein by directing the air, optionally heated air, over the hair to enable evaporative drying of the hair.

In the second mode of operation, heat may be applied to the hair by heating the air (e.g., the air may be heated by using waste heat from the motor whereby the air stream is used to cool the motor before the air is directed at the hair of a user, energizing a heating element in the air flow path from the air moving member to the outlet port and/or energizing a heating element in or directed into an air flow path of an air flow multiplier), or energizing an IR heating element, which may be exterior to the air flow path, directed at the hair or a combination thereof. It will be appreciated that the heating element may be heated so as to heat the air flowing past the heating element or a heat exchanger thermally connected to the heating element or the heating element may be heated to emit IR radiation. In some examples, waste heat from a motor and fan blade assembly may provide at least 50%, at least 60% or at least 75% of the heat used to heat air. For example, waste heat from a motor and fan blade assembly may provide at least 50%, at least 60% or at least 75% of the heat used to heat air during a second mode of operation, such as to blow dry hair.

Optionally, a heating element may be automatically engaged when a sensor sends a signal indicative that the user has completed the first mode of operation. The sensor may be a pressure sensor. Accordingly, the sub-atmospheric pressure rising above a particular level for a period of time may be used to indicate that the user no longer has the hair dryer in contact with the hair. Alternately or in addition, the sensor may be a proximity sensor. The proximity sensor may be used to sense the position of the hair dryer relative to the user and send a signal that energizes the heating element or causes the heating element to be energized. Accordingly, for example, the user may move the hair dryer away from the hair once some of the water has be removed thereby increasing the air flow through the air moving member due to the reduced restriction on the system and changing the use of the hair drying device to the second mode of operation pursuant to which heated air may then be automatically produced by the hair dryer.

It will be appreciated that the heated air may be emitted from the same side of the hair dryer that provides the sub-atmospheric pressure and/or jet of high-velocity air, or an alternate (e.g., axially opposed) side of the hair dryer.

It will be appreciated that if air is directed at the hair during the first mode of operation of the hair dryer, that the same air stream may be heated or automatically heated by moving the hair dryer sufficiently away from the head of a user to cause the sensor to emit a signal that energizes the heating element. Accordingly, the second mode of operation may be achieved by moving the hair dryer away from the head of a person.

Optionally, the outlet temperature of air at an outlet of the hair dryer and/or the temperature of a portion of hair at which the hair dryer is directed may be controlled.

Optionally, a sensor and a feedback control system for the heating element or heating elements may be used to control the exit temperature of air from the hair dryer and/or the temperature of a portion of hair at which the hair dryer is directed. The sensor may be a temperature sensor that senses the temperature of the heated air stream and/or the temperature of the hair of a person whose hair is being dried. For example, a thermal sensor and/or thermal camera may be employed to reset the set-point of the control system for the heating element or heating elements to ensure that the hair being dried is not overheated.

Alternately, or in addition, a distance sensor such as a small Lidar or ultrasonic sensor may optionally be used to determine the distance of the hair dryer to the hair of the user so as to reset the set-point of the temperature sensor and feedback control system for the heating element or heating elements to ensure that the hair being dried is not overheated.

Optionally, in one or both modes of operation, the air passing through the hair dryer may be heated by waste heat generated by the operation of the motor and/or another operating component of the hair dryer, such as the batteries. For example, a relationship between the rate at which air flows through hair dryer and the amount of heat generated by the motor may be used to control the temperature of air from the hair dryer. It will be appreciated that the temperature of air after it has passed over a motor will depend upon the temperature of the motor and the amount of air passing over the motor. In particular, the motor may have an operational range of rates of rotation and differing amounts of waste heat may be generated at different rates of rotation. Further, differing amounts of air flow may be produced at different rates of rotation of the motor. While less heat may be produced at a lower rate of rotation, the lower rate of rotation may produce a lower amount of air flow. As a result, by matching a fan blade air flow profile (air flow v. rate of rotation) with a motor temperature profile (temperature v. rate of rotation) the temperature of the air after it passes over the motor may be maintained relatively constant over most, if not essentially all, of the operating range of the rate of rotation of a motor in a hair dryer. Alternately, or in addition, the air flow passage may be opened or constricted to adjust the air flow over the motor.

Optionally one or more supplemental heating sources may be used to supplement heat generated by the motor. The supplemental heating sources may have a variable output, such as to be adjusted to facilitate maintaining a constant outlet temperature. The supplemental heating sources may have a fixed output to be used to add a fixed heat increase to the constant temperature, such as if the motor heat generates a constant low temperature and the user requests a constant high temperature.

An advantage of using heat from a motor is that the motor is needed to generate air flow, and the motor generates heat as a byproduct. Less power may be needed to heat air when making use of the heat generated by a motor than if all heat used in heating air came from a heating element. Reducing the amount of power may also facilitate using a cordless device. Selecting the motor and fan blade to provide a generally constant temperature of the air that has passed over the motor (e.g., within ±5%, within ±10%, within ±15%, or within ±20%), thereby balancing the heat produced by the motor and air flow produced by the motor over the operating range of the hair dryer during use, may reduce the need for control circuitry.

The hair dryer disclosed may require less heat energy than conventional hair dryers and allows a person's hair to be dried or styled by blowing less hot air onto the hair than a conventional hair dryer and/or cooler air, and may dry hair in a shorter amount of time than required with conventional dryers. Therefore, the hair and the scalp are not damaged or the damage may be reduced, and blood circulation in the capillary vessels of the scalp may be promoted. Accordingly, hair may be kept healthy and shiny.

A further advantage is that, since the heating element may be designed to produce less heat, the heating element may be smaller and therefore the hair dryer may be more compact.

Another advantage of a hair dryer having a reduced power requirement is that it enables cordless operation and/or the use of a higher gauge electric cord, with the option of a swivel power connection, to improve the ease of use of the product.

Another advantage of the hair dryer disclosed is that if curlers, hair flattening devices, or other styling aide is applied to the hair after the first mode of drying, and before the second mode of use employing evaporative drying, the time required to dry and style hair is significantly reduced because the amount of energy transfer required is reduced.

Optionally, an advice or recommendation system may recommend one or more settings of the hair dryer based on user information. An advantage of this aspect is that the user may be provided with information regarding which settings of the hair dryer are considered optimal based on characteristics of the user's hair, without removing control from the user.

The recommendations may be provided to the user without the recommendation system making any adjustment to the settings of the hair dryer directly and therefore, no control circuitry is required between the recommendation system and the settings control system. The user may adjust the settings of the hair dryer to the recommended settings or to other settings to provide a more effective or more desirable hair dryer experience. Alternately, it will be appreciated that the recommendation system may automatically adjust the settings of the hair dryer directly in which case control circuitry may be provided between the recommendation system and the settings control system.

A recommendation system may be communicatively coupled to the hair dryer whereby a user is able to provide at least one personal item of hair information. The user may also be able to receive, based on the at least one personal item of hair information, at least one hair dryer setting recommendation of a plurality of hair dryer settings, and provide at least one setting selection of the plurality of hair dryer settings to the hair dryer to adjust an operating parameter of the hair dryer. The setting selection may be the at least one hair dryer setting recommendation, or may be or include user-selected alternatives.

In some embodiments, a thermomechanical member may be used to control, e.g., a valve, which may thereby adjust the air flow through the hair dryer. For example, a metal strip (e.g., a bimetal strip such as a Nichrome strip) may be secured at one end to a valve and may automatically selectively open or close the valve when current is applied to or removed from the metal strip and the temperature of the bimetal strip is accordingly increased or decreased, respectively.

Optionally, the hair dryer may be operated to limit the temperature of air used to dry hair and/or the temperature of hair dried by the hair dryer. For example, once hair has been partially dried by using suction and/or a jet of high-velocity air (the first drying mode), heated air, which may be at a lower temperature than conventional hair dryers, may be used to blow dry the partially dried hair. Accordingly, the temperature of the heated air may be adjusted to prevent hair being heated to more than 75° C. and optionally, more than 70° C., more than 60° C. or more than 50° C.

A hair dryer may include a sensor operable to monitor at a location (e.g., at the air outlet port) a temperature of the air that is produced by the hair dryer and/or a temperature of a portion of the hair of the person at which the air and/or heat are directed. A controller may be operable to adjust an operating parameter of the hair dryer when the sensor issues a signal indicative of the temperature of the air at the location and/or the temperature of the portion of the hair being outside a predetermined temperature range. After issuance of the signal, the fan and motor assembly may continue to operate, and the operation of the hair dryer adjusted such that the temperature of the air at the location may be within the predetermined range.

Adjusting the operating parameter may include one or more of reducing power provided to the heater, increasing the air flow exiting the air outlet port, increasing a velocity of the air flow exiting the air outlet port, increasing a speed of rotation of the fan, increasing a volume of the air flow exiting the air outlet port per second, increasing a cross-sectional flow area of at least one adjustable aperture in the air flow path, or opening a bleed air flow path. In some examples, a temperature of air at an outlet of the hair dryer may be adjusted by adjusting the velocity of the air at the outlet of the hair dryer.

In some embodiments, air may be recirculated within the hair dryer. An advantage of this aspect is that one or more of the temperature, velocity, or volume of air used and/or produced at an outlet of the hair dryer may be adjusted without adjusting the number or configuration of air inlets and/or air outlets.

In the first operating mode, the predetermined temperature range may have a maximum temperature of 75° C., 70° C., 60° C. or 50° C. In a second operating mode, the hair dryer may be operable to increase the temperature of the air and/or the temperature of the portion of the hair up to 120° C., which may be used if a user wants to, e.g., set a curl in their hair.

Optionally, the hair dryer may also include a signaling member (e.g., a light or speaker or vibration member). The signaling member may issue a signal (e.g., the light turns on or the speaker generates a noise or the hair dryer may vibrate) to a user when the temperature of the air at the location in the airflow path and/or the temperature of the portion of the hair exceeds the predetermined temperature.

Optionally, a heating element, such as an infrared heating element, is positioned on an accessory tool. An advantage of this aspect is that an accessory tool may be provided with a heater to provide an amount of radiation and/or a pattern of radiation that complements the air flow pattern produced by the accessory tool.

For example, if the accessory tool is a diffuser, a heating element or elements may be shaped to direct infrared radiation over a large area. Alternately, if the accessory tool is a concentrator, then a heating element or elements may be shaped to provide a column of infrared radiation having a narrow width. Accordingly, a heating element or elements may direct radiation, in a plane transverse to the direction of air flow, that is the same or essentially the same are the cross-sectional flow area of the air emitted by the accessory tool, in the plane transverse to the direction of air flow.

Further, the hair dryer to which the accessory tool with the integrated heating element is to be mounted may not include a heater and/or may include a simplified heater, such as a heater that is not adjustable. Alternatively, any heating element included in the hair dryer to which the accessory tool is to be mounted may be deactivated when the accessory tool is mounted to the hair dryer.

The hair dryer may include teeth, e.g., of a brush or comb member, that vibrates. An advantage of this aspect is that the movement of the teeth may cause movement of the hair of a user if the hair is in contact with the teeth. Movement of the hair may facilitate water removal from the hair. The hair dryer and/or accessory tool may have retractable teeth, e.g., of a brush or comb member.

The hair dryer may include a diverting member to selectively limit the direction in which air can be blown out of the hair dryer outlet.

A user may switch between operating modes using a toggle. A toggle may be, e.g., a manual toggle on the hair dryer, a soft toggle on a touchscreen of the hair dryer, or a toggle presented by a mobile application running on a mobile device communicatively coupled to the hair dryer. Alternately or in addition, a user may switch between operating modes by adding and/or removing an accessory tool. Alternately or in addition, a user may switch between operating modes by adding and/or removing the water collection member.

The hair dryer may include one or more waterproof cartridge heaters. Waterproof cartridge heaters may facilitate a waterproof heating element. Accordingly, the hair dryer may be safer for use in a wet environment, e.g., a damp bathroom. The cartridge heaters may be part of a heat sink (heat exchanger), and the heat sink may also comprise a plurality of fins. The fins may include at least one louvre to enable air to flow through the material of which the fin is made.

Optionally, high-voltage current may be kept remote from the hair dryer. High voltage current may be transformed at a location remote from the hair dryer, such as on the power cord more than 4 feet from the hair dryer. Accordingly, a power supply may be provided at the wall outlet or in a middle portion of an electric cord that is remote, e.g., 4 ft, 6 ft., etc., from the hair dryer.

In accordance with one aspect of this disclosure, there is provided a hair dryer comprising:

(a) a primary air flow path extending from an inlet port provided on a first side of the hair dryer and extending to an outlet port;

(b) an air moving member provided in the primary air flow path;

(c) the inlet port comprises a screen, whereby ingress of hair into the interior of the primary air flow path is inhibited; and, (d) a water collection member located inward of the inlet port.

In any embodiment, the water collection member may comprise a water absorbing member.

In any embodiment, the water absorbing member may be removably mounted in the hair dryer.

In any embodiment, the water absorbing member may comprise a sponge.

In any embodiment, the water collection member may comprise a collection container with an openable outlet port.

In any embodiment, outlet port may be provided on a second side of the hair dryer and the second side may be axially opposed to the first side.

In any embodiment, the air moving member may comprise a motor and fan assembly that is operable in a high suction mode and in a high air flow mode.

In any embodiment, in the high suction mode, a fan blade of the motor and fan assembly may be in a high suction mode position in which the fan blade is positioned a first distance downstream from a fan blade cowling and, in the high air flow mode, the fan blade may be in a high air flow mode position in which the fan blade is positioned a second distance downstream from a fan blade cowling wherein the second distance is greater than the first distance.

In any embodiment, the hair dryer may further comprise a handle that is movingly mounted to the body, the handle may be moveable from a high suction mode position to a high air flow mode position, the handle is drivingly connected to the fan and motor assembly whereby, as the handle is moved from the high suction mode position to the high air flow mode position, the fan blade is moved from the high suction mode position to the high air flow mode position.

In any embodiment, the hair dryer may further comprise a water discharge port, the water discharge port may be positioned downstream from the water collection member and the air moving member.

In any embodiment, the hair dryer may further comprise a redirecting member operable between a first position in which a first volume of air travels from the primary inlet port to the primary outlet port and a second position in which at least some of the first volume of air is redirected to travel through a secondary air flow path having a secondary outlet port provided at the first side of the hair dryer.

In any embodiment, the secondary outlet port may comprise a plurality of secondary air outlets positioned around the inlet port. The plurality of secondary air outlets may direct air inwardly towards a center of the inlet port.

In any embodiment, the hair dryer may further comprise a heating element in the secondary air flow path.

In any embodiment, the hair dryer may further comprise an infrared heating element that, in operation, directs infrared heat to a location forward of the inlet port.

In any embodiment, the hair dryer may further comprise a lighting member providing a first illumination effect when the air moving member is actuated and air is drawn in through the inlet port and a second illumination effect when the air moving member is actuated and air is drawn in through the inlet port and when the heating element is actuated.

In any embodiment, the hair dryer may further comprise a lighting member providing a first illumination effect when the air moving member is actuated and air is drawn in through the inlet port, a second illumination effect when the air moving member is actuated and air is drawn in through the inlet port and when the heating element in the secondary air flow path is actuated, and a third illumination effect when the air moving member is actuated and air is drawn in through the inlet port and when the infrared heating element is actuated.

In any embodiment, the hair dryer may further comprise a secondary air flow path having a secondary inlet port downstream from the air moving member and secondary outlet port provided at the first side of the hair dryer.

In accordance with another aspect of this disclosure, there is provided a hair dryer comprising:

(a) a primary air flow path extending from an inlet port provided on a first side of the hair dryer and extending to an outlet port provided on a second side of the hair dryer;

(b) an air moving member provided in the primary air flow path;

(c) the inlet port comprises a screen, whereby ingress of hair into the interior of the primary air flow path is inhibited; and, (d) a heating element positioned in the primary air flow path between the air moving member and the outlet port.

In any embodiment, the hair dryer may further comprise a sensor operably connected to the heating element wherein the heating element may be deactivated when the sensor detects hair proximate the first side and the heating element may be activated when the sensor does not detect hair proximate the first side.

In any embodiment, the sensor may comprise a proximity sensor.

In any embodiment, the sensor may comprise a pressure sensor.

In any embodiment, the hair dryer may further comprise a lighting member providing a first illumination effect when the air moving member is actuated and the heating element is off and a second illumination effect when the air moving member is actuated and the heating element is actuated.

In any embodiment, the hair dryer may further comprise a temperature sensor operably connected to the heating element to maintain a temperature of hair being dried to less than 75° C., 70° C. or 60° C.

In any embodiment, the temperature sensor may be operably connected to the heating element to maintain a temperature of air exiting the outlet port to less than 75° C., 70° C. or 60° C.

In any embodiment, the hair dryer may further comprise a water collection member located inward of the inlet port.

In any embodiment, the water collection member may comprise a water absorbing member.

In any embodiment, the water absorbing member may be removably mounted in the hair dryer.

In any embodiment, the water absorbing member may comprise a sponge.

In any embodiment, the water collection member may comprise a collection container with an openable outlet port.

In any embodiment, the second side may be an axially opposed to the first side.

In any embodiment, the hair dryer may further comprise an air flow multiplier provided on the second side of the hair dryer.

In any embodiment, the air flow multiplier may comprise an air foil having a downstream side proximate the outlet port.

In any embodiment, the air flow multiplier may comprise a surface that induces a Coanda effect flow along the surface.

In accordance with another aspect of this disclosure, there is provided a hair dryer comprising:

(a) a primary air flow path extending from a primary inlet port provided on a first side of the hair dryer and extending to a primary outlet port provided on a second side of the hair dryer;

(b) an air moving member provided in the primary air flow path;

(c) the primary inlet port comprises a screen, whereby ingress of hair into the interior of the primary air flow path is inhibited;

(d) a secondary air flow path extending from a location in the primary air flow path to a secondary outlet port provided on the first side of the hair dryer; and, (e) a redirecting member operable between a first position in which a first volume of air travels from the primary inlet port to the primary outlet port and a second position in which at least some of the first volume of air is redirected to travel through the secondary air flow path.

In any embodiment, the secondary outlet port may comprise a plurality of secondary air outlets positioned around the inlet port.

In any embodiment, the plurality of secondary air outlets may direct air inwardly towards a center of the inlet port.

In any embodiment, the hair dryer may further comprise a heating element in the secondary air flow path. Optionally, a lighting member may provide a first illumination effect when the air moving member is actuated and air is drawn in through the inlet port and a second illumination effect when the air moving member is actuated and air is drawn in through the inlet port, the air directing member is in the second position and the heating element is actuated. The first illumination effect may comprise a first color light being emitted, and the second illumination effect may comprise a second color light being emitted wherein the second color differs to the first color.

In any embodiment, the hair dryer may further comprise a heating element in the secondary air flow path and an infrared heating element that, in operation, directs infrared heat to a location forward of the inlet port. Optionally, a lighting member may provide a first illumination effect when the air moving member is actuated and air is drawn in through the inlet port, a second illumination effect when the air moving member is actuated and air is drawn in through the inlet port, the air directing member is in the second position and the heating element in the secondary air flow path is actuated, and a third illumination effect when the air moving member is actuated and air is drawn in through the inlet port and the infrared heating element is actuated. The first illumination effect may comprise a first color light being emitted, and the second illumination effect may comprise a second color light being emitted wherein the second color differs to the first color and the third illumination effect may comprise a third color light being emitted wherein the third color differs to the first color and the second color.

In any embodiment, the hair dryer may further comprise an infrared heating element that, in operation, directs infrared heat to a location forward of the inlet port. Optionally, a lighting member may provide a first illumination effect when the air moving member is actuated and air is drawn in through the inlet port and a second illumination effect when the air moving member is actuated and air is drawn in through the inlet port and when the infrared heating element is actuated. The first illumination effect may comprise a first color light being emitted, and the second illumination effect may comprise a second color light being emitted wherein the second color differs to the first color.

In any embodiment, the air moving member may comprise a motor and fan assembly that may be operable in a high suction mode and in a high air flow mode. Optionally, in the high suction mode, a fan blade of the motor and fan assembly is in a high suction mode position in which the fan blade is positioned a first distance downstream from a fan blade cowling and, in the high air flow mode, the fan blade is in a high air flow mode position in which the fan blade is positioned a second distance downstream from a fan blade cowling wherein the second distance is greater than the first distance.

In such an embodiment, that hair dryer may further comprise a handle that is movingly mounted to the body, the handle may be moveable from a high suction mode position to a high air flow mode position, the handle is drivingly connected to the fan and motor assembly whereby, as the handle is moved from the high suction mode position to the high air flow mode position, the fan blade is moved from the high suction mode position to the high air flow mode position.

In any embodiment, the air moving member may comprise a motor and fan assembly having a motor, a first fan blade assembly and a second fan blade assembly, the first fan blade assembly may be positioned between the inlet port and the motor and produces a first level of suction and the second fan blade assembly may be positioned between the motor and the primary outlet port and produces a second level of suction wherein the second level of suction may be less than the first level of suction.

In any embodiment, the air moving member may comprise a motor and fan assembly having a motor, a first fan blade assembly and a second fan blade assembly, the first fan blade assembly may be positioned between the inlet port and the motor and produces a first volume of air flow and the second fan blade assembly may be positioned between the motor and the primary outlet port and produces a second volume of air flow, wherein the second volume of air flow may be higher than the first volume of air flow.

In any embodiment, the air moving member may comprise a motor and fan assembly having a motor, a first fan blade assembly and a second fan blade assembly, the first fan blade assembly may be a high suction fan blade assembly and the second fan blade assembly may be a high volume fan blade assembly.

In any embodiment, the hair dryer may further comprise a heating element upstream of the primary outlet port and a temperature sensor operably connected to the heating element to maintain a temperature of hair being dried to less than 75° C., 70° C. or 60° C.

In accordance with another aspect of this disclosure, there is provided a hair dryer comprising:

(a) a primary air flow path extending from an inlet port provided on a first side of the hair dryer and extending to an outlet passage terminating at an outlet port;

(b) an air moving member provided in the primary air flow path;

(c) the inlet port comprises a screen, whereby ingress of hair into the interior of the primary air flow path is inhibited; and, (d) an air flow multiplier provided adjacent the outlet passage.

In any embodiment, the air flow multiplier may comprise an air foil having a downstream side proximate the outlet port.

In any embodiment, the air flow multiplier may comprise a surface that induces a Coanda effect flow along the surface.

In any embodiment, the hair dryer may further comprise a supplemental air flow passage extending to a position proximate the outlet port wherein at least one sidewall of the supplemental passage may comprise an air foil. Optionally, a heating element may be positioned in the supplemental air flow passage.

In any embodiment, the hair dryer may further comprise a supplemental air flow passage extending to a position proximate the outlet port wherein a portion of air flow induced by the air moving member is directed through the supplemental air flow passage. Optionally, a heating element may be positioned in the supplemental air flow passage.

In any embodiment, the hair dryer may further comprise a heating element positioned in the primary air flow path between the air moving member and the outlet port. Optionally a sensor may be operably connected to the heating element wherein the heating element may be deactivated when the sensor detects hair proximate the first side and the heating element may be activated when the sensor does not detect hair proximate the first side. The sensor may comprise a proximity sensor and/or a pressure sensor.

In any embodiment, the heating element may be powered by an onboard energy storage member.

In any embodiment, the hair dryer may further comprise a temperature sensor operably connected to the heating element to maintain a temperature of hair being dried to less than 75° C., 70° C. or 60° C.

In any embodiment, the temperature sensor may be operably connected to the heating element to maintain a temperature of air exiting the outlet port to less than 75° C., 70° C. or 60° C.

In any embodiment, the hair dryer may further comprise a water collection member located inward of the inlet port.

In any embodiment, the water collection member may comprise a water absorbing member.

In any embodiment, the water absorbing member may be removably mounted in the hair dryer.

In any embodiment, the outlet port may be provided on a second side of the hair dryer that is axially opposed to the first side.

In accordance with another aspect of this disclosure, there is provided a method comprising:

(a) drawing air through the hair of the user and into an inlet port of a hair dryer; and, (b) subsequently directing air from the hair dryer to the hair of the user.

In any embodiment, the air that is drawn into the hair dryer may comprise ambient air.

In any embodiment, the air that is drawn into the hair dryer may be ambient air.

In any embodiment, the method may further comprise producing a redirected air stream by directing at least some of the air drawn into the air dryer in step (a) to a location in front of the inlet port.

In any embodiment, the method may further comprise heating the redirected air stream.

In any embodiment, the method may further comprise inhibiting hair from entering into the hair dryer.

In any embodiment, from 50-80 wt. % or 60-70 wt. % of water in the hair may be removed in step (a) and/or from 20-50 wt. % or 30-40 wt. % of water in the hair may be removed in step (b).

In any embodiment, the air directed at the hair in step (b) may be heated.

In any embodiment, a temperature of the air that is directed at the hair may be adjusted to maintain a temperature of the hair below 75° C., 70° C. or 60° C.

In any embodiment, the temperature of the hair may be monitored, and heat emitted by the heating element may be reduced if the temperature of the hair increases above 75° C., 70° C. or 60° C.

In any embodiment, a temperature of the air directed at the hair in step (b) may be monitored and heat emitted by the heating element may be reduced if the temperature of the air increases above 75° C., 70° C. or 60° C.

In any embodiment, the method may further comprise monitoring when the hair is not positioned in front of the inlet port and actuating a heating element to heat the air directed at the hair in step (b) when the hair is not positioned in front of the inlet port and the hair dryer is actuated.

In any embodiment, the method may further comprise monitoring the pressure in the hair dryer upstream of the inlet port and actuating a heating element to heat the air directed at the hair in step (b) when the pressure drops below a predetermined level and the hair dryer is actuated.

In any embodiment, the method may further comprise using a proximity sensor to sense a person in front of the inlet port and actuating a heating element to heat the air directed at the hair in step (b) when the proximity sensor detects a person is not in front of the inlet port and the hair dryer is actuated.

In accordance with another aspect of this disclosure, there is provided a method comprising:

(a) drawing air through the hair of the user and into a first inlet port provided on a first side of a hair dryer;

(b) withdrawing moisture from the air entering the first inlet port; and, (c) directing an air stream through a first outlet port of the hair dryer to the hair of the user.

In any embodiment, the method may further comprise inhibiting hair from entering into the hair dryer.

In any embodiment, at least some of the air that is drawn into the first inlet port in step (a) may be redirected to produce the air stream of step (c).

In any embodiment, the method may further comprise heating the air stream whereby step (c) may comprise directing a heated air stream from the hair dryer to the hair of the user.

In any embodiment, step (c) may occur subsequent to step (a).

In any embodiment, step (a) may be conducted for a first period of time and the heated air stream may be directed to the hair of the user for a second period of time wherein the second period of time may differ to the first period of time. Optionally, the second period of time may be shorter than the first period of time.

In any embodiment, the hair dryer may further comprise an energizable heating element, steps (a) and (c) may commence concurrently, and subsequently the energizable heating element may be energized whereby step (c) further comprises directing a heated air stream from the hair dryer to the hair of the user.

In any embodiment, the temperature of the hair may be monitored, and heat emitted by the heating element may be reduced if the temperature of the hair increases above 75° C., 70° C. or 60° C.

In any embodiment, a temperature of the air directed at the hair in step (c) may be monitored and heat emitted by the heating element may be reduced if the temperature of the air increases above 75° C., 70° C. or 60° C.

In any embodiment, from 50-80 wt. % of water in the hair may be removed prior to the energizable heating element being energized.

In any embodiment, the first inlet port and the first outlet port may be on one side of the hair dryer and the method may further comprise redirecting at least some of the air drawn into the first inlet port in step (a) to exit the first outlet port in step (c).

In any embodiment, the first inlet port and the first outlet port may be on one side of the hair dryer, a second inlet port that is upstream of the first outlet port may be provided on a second side of the hair dryer and the method may further comprise drawing from the second inlet port to exit the first outlet port in step (c).

In any embodiment, the method may further comprise heating air entering the second inlet port whereby step (c) may comprise directing a heated air stream from the hair dryer to the hair of the user.

In any embodiment, the method may further comprise directing air entering the first inlet port to a second outlet port that is downstream from the first inlet port. Optionally, the air exiting the second outlet port is directed away from the first side of the hair dryer.

In accordance with another aspect of this disclosure, there is provided a hair dryer comprising:

(a) a primary air flow path extending from a primary inlet port provided on a first side of the hair dryer and extending to a primary outlet port provided on a first outer portion of the hair dryer;

(b) an air moving member provided in the primary air flow path;

(c) the primary inlet port comprises a screen, whereby ingress of hair into the interior of the primary air flow path is inhibited; and, (d) a secondary air flow path extending from a secondary inlet port provided on a second outer portion of the hair dryer to a secondary outlet port provided on the first side of the hair dryer.

In any embodiment, the secondary outlet port may comprise a plurality of secondary air outlets positioned around the primary inlet port.

In any embodiment, the plurality of secondary air outlets may direct air inwardly towards a center of the primary inlet port.

In any embodiment, the hair dryer may further comprise a heating element in the secondary air flow path.

In any embodiment, the heating element may be an energizable heating element.

In any embodiment, the energizable heating element may be manually actuatable.

In any embodiment, the hair dryer may further comprise a sensor and the energizable heating element may be energized upon issuance of a signal from the sensor. Optionally, the sensor may be a moisture sensor.

In any embodiment, the air moving member may comprise a motor and fan assembly having a motor, a first fan blade assembly and a second fan blade assembly, the first fan blade assembly is positioned in the primary air flow path and the second fan blade assembly is positioned in the secondary air flow path.

In any embodiment, the first fan blade assembly may produce a first level of suction and the second fan blade assembly may produce a second level of suction wherein the second level of suction may be less than the first level of suction.

In any embodiment, the first fan blade assembly may produce a first volume of air flow and the second fan blade assembly may produce a second volume of air flow, wherein the second volume of air flow may be higher than the first volume of air flow.

In any embodiment, the first fan blade assembly may be a high suction fan blade assembly, such as an impeller, and the second fan blade assembly may be a high volume fan blade assembly, such as a propeller.

In any embodiment, the hair dryer may further comprise an infrared heating element that, in operation, may direct infrared heat to a location forward of the primary inlet port.

In any embodiment, the hair dryer may further comprise a heating element in the secondary air flow path. Optionally, the heating element may be an energizable heating element.

In any embodiment, the primary outlet port may direct air away from the first end of the hair dryer.

In any embodiment, the secondary outlet port may be provided on a second side of the hair dryer and the second side may be axially opposed to the first side.

In any embodiment, the hair dryer may further comprise a heating element in the secondary air flow path and a temperature sensor operably connected to the heating element to maintain a temperature of air exiting the secondary outlet port less than 75° C., 70° C. or 60° C.

In any embodiment, the hair dryer may further comprise a heating element in the secondary air flow path and a temperature sensor operably connected to the heating element to maintain a temperature of hair being dried to less than 75° C., 70° C. or 60° C.

In accordance with another aspect of this disclosure, there is provided a method of drying hair of a person using a portable hand held hair dryer comprising (a) using suction to draw the hair against an inlet port of the hair dryer and moving the hair dryer relative to the hair to partially dry the hair, wherein the hair is inhibited from entering the inlet port; and, (b) subsequently using the hair dryer to direct at least one of heated air or infrared radiation at the hair of the person to further dry the hair.

In any embodiment, during step (a), water may be removed from the hair essentially in the absence of a phase change of the water.

In any embodiment, during step (a), at least 50 wt. %, 60 wt. %, 75 wt. % or 90 wt. % of water that is removed from the hair in step (a) may be removed as liquid water.

In any embodiment, the hair dryer may have a heating element and the heating element may be deactivated during step (a).

In any embodiment, the method may further comprise using step (a) to remove from 20-50 wt. % of water from a portion of hair that is being dried.

In any embodiment, step (a) may be conducted for up to 2 minutes and step (b) may be conducted for 3 to 8 minutes.

In any embodiment, step (b) may include using the hair dryer to direct heated air at the hair of the person and the heated air at the outlet port may have a temperature up to 75° C., 70° C., 50 or 50° C.

In any embodiment, the method may further comprise using waste heat from a motor and fan blade assembly of the hair dryer to provide at least 50%, 60%, 70% or 75% of heat used in the method.

In any embodiment, step (b) may include using the hair dryer to direct heated air at the hair of the person, and the method may further comprise using waste heat from a motor and fan blade assembly of the hair dryer to provide at least 50%, 60%, 70% or 75% of heat used in step (b).

In any embodiment, the method may further comprise maintaining a temperature of the hair 75° C., 70° C., 60° C. or 50° C. during the method.

In any embodiment, the inlet port may be provided on a first side of the hair dryer and the hair dryer may have an outlet port for the heated air on a second side of the hair dryer and the method may further comprise using the first side of the hair dryer during step (a) and turning the hair dryer and using the second side of the hair dryer during step (b).

In any embodiment, the hair dryer may have a water retaining member downstream from the inlet port and the method may further comprise periodically removing water retained in the water retaining member.

In any embodiment, the water retaining member may comprise a water reservoir and the method may further comprise draining the reservoir.

In any embodiment, the water retaining member may comprise an absorbent member and the method may further comprise drawing air through the hair dryer and drying the absorbent member when the hair dryer is stored between uses of the hair dryer to dry hair.

In any embodiment, the water retaining member may comprise an absorbent member and the method may further comprise removing the absorbent member from the hair dryer and discharging water from the absorbent member.

In accordance with another aspect of this disclosure, there is provided a method of drying hair of a person using a portable hand held hair dryer wherein the hair has a length from a root of the hair to a tip of the hair, the method comprising (a) directing a jet of air from an outlet port of the hair dryer to the hair of the person to partially dry the hair wherein the air has a velocity of at least 70 mph at the outlet port of the hair dryer; and, (b) subsequently using the hair dryer to direct at least one of heated air or infrared radiation at the hair of the person to further dry the hair.

In any embodiment, during step (a), water may be removed from the hair essentially in the absence of a phase change of the water.

In any embodiment, during step (a), at least 50%, 60%, 70% or 75% of water that is removed from the hair in step (a) may be removed as liquid water.

In any embodiment, the hair dryer may have a resistively heatable element and the resistively heatable element may be deactivated during step (a).

In any embodiment, the method may further comprise positioning the outlet port of the hair dryer within 3 inches of the hair of the person.

In any embodiment, the method may further comprise positioning the outlet port of the hair dryer adjacent the hair of the person.

In any embodiment, during step (a), a restraint member may be positioned to maintain the hair adjacent the outlet port of the hair dryer.

In any embodiment, during step (a), a hand may be positioned as the restraint member to maintain the hair adjacent the outlet port of the hair dryer.

In any embodiment, the method may further comprise using step (a) to remove from 20-50 wt. % of water from a portion of hair that is being dried.

In any embodiment, the jet of air at the outlet port may have a temperature up to 40° C., 50° C., 60° C., 70° C. or 75° C.

In any embodiment, the heated air at the outlet port may have a temperature up to 40° C., 50° C., 60° C., 70° C. or 75° C.

In any embodiment, step (a) may be conducted for up to 2 minutes and step (b) may be conducted for 3 to 8 minutes.

In any embodiment, the method may further comprise using waste heat from a motor and fan blade assembly of the hair dryer to provide at least 50%, 60%, 70% or 75% of heat used in the method.

In any embodiment, the method may further comprise maintaining a temperature of the hair 75° C., 70° C., 60 or 50° C. during the method.

In accordance with another aspect of this disclosure, there is provided a method of drying hair of a person using a portable hand held hair dryer, wherein the hair dryer has a first operating mode that produces a jet of air and a second operating mode that produces heated air, the method comprising (a) in the first operating mode using an air jet having a velocity of at least 70 mph when the air contacts the hair of the person to dry the hair of the person; and, (b) subsequently in the second operating mode using heated air to further dry the hair.

In any embodiment, during step (a), a restraint member may be positioned to maintain the hair adjacent the outlet port of the hair dryer.

In any embodiment, the jet of air at the outlet port may have a temperature up to 40° C.

In accordance with another aspect of this disclosure, there is provided a hair dryer comprising:

(a) an air flow path extending from an inlet port to an outlet port; and, (b) a motor and fan blade assembly provided in the air flow path, the motor and fan blade assembly comprising a motor and a fan blade driven by the motor, the motor produces an amount of heat per second of operation of the hair dryer and the amount of heat produced varies based on a rate of rotation of the motor, and the fan blade produces an air flow through the air flow path, wherein air passing through the air flow path is heated by the heat produced by the motor, the air has an outlet temperature at the outlet port and the air flow through the air flow path is adjusted such that the outlet temperature varies by up to 20% over an operating range of the motor.

In any embodiment, the air flow produced may vary based on a rate of rotation of the fan blade, and the fan blade and the motor may be selected whereby the outlet temperature varies by up to 20% over an operating range of the motor.

In any embodiment, the air flow through the air flow path may be adjusted by pulse width modulation of power provided to the motor.

In any embodiment, the air flow through the air flow path may be adjusted by constricting a cross-sectional flow area of a portion of the air flow path. Optionally, the air flow through the cross-sectional flow area may be constricted by an adjustable iris.

In any embodiment, the air flow through the air flow path may be adjusted by adjusting a voltage provided to the motor.

In any embodiment, the hair dryer may have an absence of a resistive heating member In any embodiment, the motor may provide at least 50%, 60% 70% or 75% of the heat.

In any embodiment, a maximum outlet temperature may be 75° C., 70° C., 60 or 50° C.

In accordance with another aspect of this disclosure, there is provided a method of drying hair of a user comprising using a hair dryer to direct heated air at the hair of the user, wherein the heated air has an outlet temperature at an outlet port of the hair dryer and wherein at least 50%, 60%, 70% or 75% of heat used to produce the heated air is provided by waste heat produced by operation of a motor and fan blade assembly of the hair dryer.

In any embodiment, the method may further comprise adjusting an air flow through the hair dryer such that the outlet temperature varies by up to 20% over an operating range of the motor.

In any embodiment, the air flow through the air flow path may be adjusted by pulse width modulation of power provided to the motor.

In any embodiment, the air flow through the air flow path may be adjusted by constricting a cross-sectional flow area of a portion of the air flow path. Optionally, the air flow through the cross-sectional flow area is constricted by an adjustable iris.

In any embodiment, the air flow through the air flow path may be adjusted by adjusting a voltage provided to the motor.

In any embodiment, the method may further comprise selecting the fan blade and the motor such that the outlet temperature varies by up to 20% over an operating range of the motor.

In any embodiment, the method may further comprise selecting the fan blade and the motor such that the waste heat produced by the motor and an air flow rate produced by the fan blade result in the outlet temperature varying by up to 20% over an operating range of the motor.

In any embodiment, the outlet temperature may have a maximum outlet temperature and the maximum outlet temperature is 40° C., 50° C., 60° C., 70° C. or 75° C.

In accordance with another aspect of this disclosure, there is provided a method of drying hair of a person using a portable hand held hair dryer, wherein the hair dryer has a first operating mode in which water is removed from hair by mechanical action of air passing over the hair without any substantial phase change of the water and a second subsequent operating mode in which water is removed from the hair by evaporative drying.

In accordance with another aspect of this disclosure, there is provided a hair drying system, comprising a hair dryer, including an air flow path extending from an inlet port provided on a first side of the hair dryer and extending to an outlet port, and an air moving member provided in the air flow path; and a recommendation system communicatively coupled to the hair dryer whereby a user is able to provide at least one personal item of hair information, receive, based on the at least one personal item of hair information, at least one hair dryer setting recommendation of a plurality of hair dryer settings, and provide a setting selection of the plurality of hair dryer settings to the hair dryer to adjust an operating parameter of the hair dryer.

In any embodiment, the recommendation system may be operable to save a profile of the user, the profile including the setting selection, whereby the user is able to use the recommendation system to select the profile to provide the setting selection to the hair dryer.

In any embodiment, the operating parameter may be an outlet temperature of air exiting the outlet port.

In any embodiment, the operating parameter may be an air flow volume per unit of time generated by the hair dryer.

In any embodiment, the operating parameter may include an outlet temperature of air exiting the outlet port and an air flow volume per unit of time generated by the hair dryer.

In any embodiment, the outlet temperature and the air flow volume per unit of time may be selected whereby a hair temperature of hair held adjacent the outlet port is kept below a predetermined maximum temperature.

In any embodiment, the setting selection may inform a hair durability level setting of a set of hair durability level settings, the set of hair durability level settings may include a durable setting and a fragile setting, and the predetermined maximum temperature for the durable setting is 60° C., 70° C. or 75° C. and the predetermined maximum temperature for the fragile setting is 40° C., 50° C. or 60° C.

In any embodiment, the recommendations system may include a touchscreen mounted to the hair dryer.

In any embodiment, the at least one personal item of hair information may be part of a predetermined set of available items of hair information, and the touchscreen may be operable to display each available item of hair information of the predetermined set of available items of hair information; and receive a selection indicating the at least one personal item of hair information.

In any embodiment, displaying each available item of hair information of the predetermined set of available items of hair information may include displaying an associated picture.

In any embodiment, the predetermined set of available items of hair information may include a plurality of hair types.

In any embodiment, the predetermined set of available items of hair information may include a plurality of hair colors.

In any embodiment, the predetermined set of available items of hair information may include a plurality of hair coloring status options.

In any embodiment, the recommendations system may include a plurality of manual toggles mounted to the hair dryer.

In any embodiment, the plurality of manual toggles may include a plurality of buttons.

In any embodiment, the plurality of manual toggles may include a set of setting toggles each corresponding to a hair dryer setting of the plurality of hair dryer settings, whereby the user can provide the setting selection by activating an associated setting toggle.

In any embodiment, the recommendations system may include a plurality of markers, a marker of the plurality of markers associated with each setting toggle, whereby the setting toggle corresponding to the at least one hair dryer setting recommendation can be indicated.

In any embodiment, the plurality of markers may include a plurality of lights.

In any embodiment, the plurality of lights may each be arranged adjacent a manual toggle of the plurality of manual toggles.

In any embodiment, the plurality of lights may be arranged to illuminate the plurality of manual toggles when turned on.

In any embodiment, the at least one personal item of hair information may be part of a predetermined set of available items of hair information, and the plurality of manual toggles may include an information toggle for each available item of hair information of the predetermined set of available items of hair information whereby a user may provide the at least one personal item of hair information by activating an associated information toggle.

In any embodiment, the predetermined set of available items of hair information may include a plurality of hair types and/or a plurality of hair colors and/or a plurality of hair coloring status options.

In accordance with another aspect of this disclosure, there is provided a hair dryer comprising an air flow path having an air outlet port; a fan and motor assembly provided in the air flow path wherein, during operation of the hair dryer, heated air is exhausted from the air outlet port; a sensor operable to monitor at a location a temperature of the air that is produced by the hair dryer; and, a controller, which in a first operating mode, is operable to adjust an operating parameter of the hair dryer when the sensor issues a signal indicative of the temperature of the air at the location being outside a predetermined temperature range, whereby, after issuance of the signal, the fan and motor assembly continue to operate and the temperature of the air at the location is within the predetermined range.

In any embodiment, the predetermined range may be 60° C., 70° C. or 75° C.±5° C.

In any embodiment, the controller may be operable to adjust the operating parameter of the hair dryer when the sensor issues a signal indicative of the temperature of the air at the location exceeding a predetermined temperature, whereby, after issuance of the signal, the fan and motor assembly continue to operate and the temperature of the air at the location is reduced.

In any embodiment, the predetermined temperature may be greater than 60° C., 70° C. or 75° C.

In any embodiment, the location that the sensor monitors may be the air outlet port.

In any embodiment, the hair dryer may comprise a heater and adjusting the operating parameter may comprise reducing power provided to the heater.

In any embodiment, adjusting the operating parameter may comprise increasing the air flow exiting the air outlet port.

In any embodiment, adjusting the operating parameter may comprise increasing a velocity of the air flow exiting the air outlet port.

In any embodiment, adjusting the operating parameter may comprise increasing a speed of rotation of the fan.

In any embodiment, adjusting the operating parameter may comprise increasing a volume of the air flow exiting the air outlet port per second.

In any embodiment, the air flow path may comprise an adjustable aperture and adjusting the operating parameter may comprise increasing a cross-sectional flow area of the aperture.

In any embodiment, adjusting the operating parameter may comprise opening a bleed air flow path.

In any embodiment, the hair dryer may further comprise a signaling member wherein the signaling member may issue a signal to a user when the temperature of the air at the location in the airflow path exceeds the predetermined temperature.

In any embodiment, in a second operating mode, the hair dryer may be operable to increase the temperature of the air at the location up to 120° C.

In accordance with another aspect of this disclosure, there is provided a hair dryer for drying hair of a person comprising an air flow path having an air outlet port; a fan and motor assembly provided in the air flow path wherein, during operation of the hair dryer, air and heat are directed at the hair of the person; a sensor operable to monitor a temperature of a portion of the hair of the person at which the air and heat are directed; and, a controller, which in a first operating mode, is operable to adjust an operating parameter of the hair dryer when the sensor issues a signal indicative of the temperature of the portion of the hair being outside a predetermined temperature range, whereby, after issuance of the signal, the fan and motor assembly continue to operate and the temperature of the portion of the hair is within the predetermined range.

In any embodiment, the controller may be operable to adjust the operating parameter of the hair dryer when the sensor issues a signal indicative of the temperature of the portion of the hair exceeding a predetermined temperature, whereby, after issuance of the signal, the fan and motor assembly continue to operate and the temperature of the portion of the hair is reduced In any embodiment, the hair dryer may comprise a heater and adjusting the operating parameter may comprise reducing power provided to the heater.

In any embodiment, the hair dryer may comprise an infrared heater and adjusting the operating parameter may comprise increasing airflow over the infrared heater whereby a temperature of the infrared heater is reduced.

In any embodiment, adjusting the operating parameter may comprise increasing the air flow exiting the air outlet port of the hair dryer.

In any embodiment, adjusting the operating parameter may comprise increasing a velocity of the air flow exiting the air outlet port.

In any embodiment, adjusting the operating parameter may comprise increasing a speed of rotation of the fan.

In any embodiment, adjusting the operating parameter may comprise increasing a volume of the air flow exiting the air outlet port per second.

In any embodiment, in a second operating mode, the hair dryer may be operable to increase the temperature of the portion of the hair up to 120° C.

In accordance with another aspect of this disclosure, there is provided an accessory tool for mounting to a hair dryer, comprising an air flow path extending through an accessory body from an inlet port provided on a first side of the accessory body and extending to at least one outlet port; a heating element secured to the accessory body and operable to be electrically connected to a power supply of the hair dryer when the accessory tool is mounted to the hair dryer.

In any embodiment, the heating element may be operable to be electrically connected to the power supply of the hair dryer automatically as the accessory tool is mounted to the hair dryer.

In any embodiment, the accessory tool may further comprise at least one accessory electrical contact to mate with a hair dryer electrical contact of the hair dryer whereby an electrical connection from the heating element to the power supply of the hair dryer is provided automatically as the accessory tool is mounted to the hair dryer.

In any embodiment, the heating element may be provided in the air flow path.

In any embodiment, the heating element may be a resistively heatable element.

In any embodiment, the heating element may be an infrared heating element operable to generate infrared radiation and operable in a low temperature mode to heat air flowing through the air flow path.

In any embodiment, the heating element may be an infrared heating element operable to generate infrared radiation.

In any embodiment, the infrared heating element may be operable in a high temperature mode to direct infrared heat to a location off of the hair dryer and adjacent the outlet port.

In any embodiment, the infrared heating element may be provided in the air flow path and may be operable to direct infrared heat through the outlet port.

In any embodiment, the infrared heating element may be secured to the accessory body outside the air flow path.

In any embodiment, the infrared heating element may be operable to generate a radiation pattern corresponding to an air flow pattern of air generated by the air flow path.

In any embodiment, the infrared heating element may be operable to generate radiation having a radiation area in a plane transverse to a direction of air flow through the accessory tool that is the same as an air flow area of the air flow in the plane.

In any embodiment, the accessory tool may be a diffuser tool to broaden an air flow received at the inlet port, and may include a plurality of outlet ports, and the heating element may be arranged to heat air flowing out of each of the plurality of outlet ports.

In any embodiment, the accessory tool may have a single outlet port and may be a concentrator tool to narrow an air flow received at the inlet port to produce an air flow having a concentrated width at the single outlet port, and the heating element may be shaped to provide a column of radiation having a column width equal to or less than the concentrated width.

In any embodiment, the heating element may be an infrared heating element received in the air flow path, and the column of radiation may be directed towards the single outlet port.

In any embodiment, the single outlet port may be a slot-shaped port, and the heating element may be an elongated heating element.

In accordance with another aspect of this disclosure, there is provided a hair drying system comprising an accessory tool for mounting to a hair dryer, comprising an air flow path extending through an accessory body from an inlet port provided on a first side of the accessory body and extending to at least one outlet port, and a heating element secured to the accessory body and operable to be electrically connected to a power supply of the hair dryer when the accessory tool is mounted to the hair dryer; and the hair dryer to which the accessory tool is to be mounted, wherein (1) the hair dryer does not include a hair dryer heating element or (2) wherein a hair dryer heating element on the hair dryer is a non-adjustable heating element or (3) wherein a hair dryer heating element on the hair dryer is deactivated when the accessory tool is mounted to the hair dryer.

In any embodiment, the hair dryer heating element on the hair dryer may be deactivated when the accessory tool is mounted to the hair dryer.

In accordance with another aspect of this disclosure, there is provided a hair dryer comprising an inlet port provided on a first side of the hair dryer, the inlet port having an inlet port cross-section flow area in a direction transverse to a direction of flow of air through the inlet port; a water separator located inward of the inlet port; an air moving unit; a primary air flow path extending from the inlet port wherein at least a portion of the air moving unit is positioned in the primary air flow path; and, a secondary air flow path extending to an outlet port wherein at least a portion of the air moving unit is positioned in the secondary air flow path, wherein the air flow rate in the primary air flow path is less than the air flow rate in the secondary air flow path.

In any embodiment, at least a portion of the primary air flow path downstream of the water separator may have a first portion which has a first portion cross-section flow area in a direction transverse to a direction of flow of air through the portion that is less than the inlet port cross-section flow area.

In any embodiment, the first portion cross-section flow area may be less than half the inlet port cross-section flow area.

In any embodiment, the first portion cross-section flow area may be fixed or variable.

In any embodiment, at least a portion of the primary air flow path downstream of the water separator may have a first portion which has a first portion cross-section flow area in a direction transverse to a direction of flow of air through the portion, the first portion may comprise an adjustable member having an opening through which air flows, the adjustable member may be moveable between a first configuration in which the first portion cross-section flow area has a first cross-sectional flow area and a second configuration in which the first portion cross-section flow area has a second cross-sectional flow area that is greater than the first cross-sectional flow area, whereby the first portion cross-section flow area is variable.

In any embodiment, the adjustable member may be deformable.

In any embodiment, the adjustable member may comprise an elastomeric member which has an opening and an associated flow restrictor and the opening may be moveable with respect to the flow restrictor.

In any embodiment, in the first configuration, the opening may be in a first high flow position and, in the second configuration, the opening may be in a high suction position that is located inwardly in the flow direction from the first high flow position, and the opening may be biased to the first high flow position.

In any embodiment, the adjustable member may comprise a diaphragm and the diaphragm may move from the first configuration to the second configuration in response to a pressure downstream of the diaphragm that is less than a pressure upstream of the diaphragm.

In any embodiment, the adjustable member may be an openable iris wherein, in the first configuration, the iris is in a first high flow configuration and has an opening having a first diameter and, in the second configuration, the iris is in a high suction configuration and has an opening having a second diameter wherein the second diameter is larger than the first diameter and the iris moves between the first high flow configuration and the high suction configuration based on a characteristic of air flow through the primary air flow path.

In any embodiment, at least a portion of the primary air flow path downstream of the water separator may have a first portion which has a first portion cross-section flow area in a direction transverse to a direction of flow of air through the portion, the first portion may comprise a member having an opening through which air flows and an associated flow restrictor and the flow restrictor is moveable with respect to the opening between a first position in which the first portion cross-section flow area has a first cross-sectional flow area and a second position in which the first portion cross-section flow area has a second cross-sectional flow area that is greater than the first cross-sectional flow area based on a characteristic of air flow through the primary air flow path.

In any embodiment, the flow restrictor may be moveable inwardly in the direction of flow from the second position to the first position based on air flow impinging upon the flow restrictor.

In any embodiment, the flow restrictor may be biased to the second position.

In any embodiment, in a first operating mode, hair may be dried by air being drawn into the inlet port through the hair, in a second operating mode, the hair may be dried by air being directed towards the hair from the outlet port, in the first operating mode the air moving unit may draw air into the air inlet port at a rate of 5-15 CFM or 5-10 CFM and, in the second operating mode, the air moving unit may produce an air flow through the outlet port at a rate of 20, 25, 30 or 35 CFM or more.

In any embodiment, the secondary air flow path may extend from the primary air flow path and a supplementary inlet may introduce supplementary air into the secondary air flow path at a location downstream of the first portion.

In any embodiment, the air moving unit may be a single suction motor and a single impeller driven by the single motor.

In any embodiment, the air moving unit may be a single suction motor, a first air moving member may be rotatably driven by the single motor and provided in the primary air flow path and a second air moving member may be rotatably driven by the single motor provided in the secondary air flow path.

In any embodiment, the secondary airflow path may be fluidically separate from the primary air flow path, and the air moving unit may comprise a first air moving member rotatably driven by a first motor and provided in the primary air flow path and a second air moving member rotatably driven by the first motor provided in the secondary air flow path.

In any embodiment, the secondary airflow path may be fluidically separate from the primary air flow path, and the air moving unit may comprise a first air moving member provided in the primary air flow path and rotatably driven by a first motor, and a second air moving member provided in the secondary air flow path and rotatably driven by a second motor.

In any embodiment, the second air-moving member may comprise a propeller.

In accordance with another aspect of this disclosure, there is provided a hair dryer having a front air inlet end and a rearwardly positioned opposed second end, the hair dryer comprising an air flow path extending through the hair dryer; a fan and motor assembly provided in the air flow path; and, a water separator provided in the air flow path upstream of the fan and motor assembly, the water separator comprising a water separator volume positioned between a water separator air inlet end and a water separator air outlet end that is positioned rearwardly from the water separator air inlet end, a water separator air inlet comprising a water separator inlet port defining an entrance to the water separator volume, an air outlet conduit extending forwardly into the water separator volume from the water separator air outlet end, a screen provided in the water separator volume in a water separator air flow path between the water separator inlet port and an inlet end of the outlet conduit, wherein the inlet end of the outlet conduit is located forward of the water separator inlet port.

In any embodiment, the screen may comprise an inlet port screen that is provided on the water separator inlet port.

In any embodiment, the screen may further comprise a first interior screen provided in the water separator air flow path between the water separator inlet port and an inlet end of the outlet conduit wherein the first interior screen is spaced from the inlet port screen.

In any embodiment, the first interior screen may be provided intermediate the water separator air inlet end and the water separator air outlet end.

In any embodiment, the screen may further comprise a second interior screen provided in the water separator air flow path between the water separator inlet port and an inlet end of the outlet conduit wherein the second interior screen is spaced from the first interior screen.

In any embodiment, the second interior screen may be provided intermediate the water separator air inlet end and the water separator air outlet end.

In any embodiment, the outlet conduit may extend through the first interior screen.

In any embodiment, the screen may comprise a first interior screen that is provided intermediate the water separator air inlet end and the water separator air outlet end.

In any embodiment, the hair dryer may further comprise a plurality of water separator inlet ports, wherein the water separator air inlet comprises a plurality of air inlet conduits, each of the air inlet conduits extending from a hair dryer air inlet port to one of the water separator inlet ports, wherein the water separator inlet ports are spaced from each other.

In any embodiment, the plurality of water separator inlet ports may be arranged in an annular pattern.

In any embodiment, the hair dryer may further comprise a foam filter positioned downstream of the inlet end of the outlet conduit and upstream of the fan and motor assembly.

In accordance with another aspect of this disclosure, there is also provided a hair dryer having a front air inlet end and a rearwardly positioned opposed second end, the hair dryer comprising an air flow path extending through the hair dryer; a fan and motor assembly provided in the air flow path; and, a water separator provided in the air flow path upstream of the fan and motor assembly, the water separator comprising a water separator volume positioned between a water separator air inlet end and a water separator air outlet end that is positioned rearwardly from the water separator air inlet end, a water separator air inlet comprising a water separator inlet port defining an entrance to the water separator volume, an air outlet at least one screen provided in the water separator volume in a water separator air flow path between the water separator inlet port and the air outlet, wherein as air travels in the air flow path, the air travels in a rearward direction towards the water separator air outlet end and subsequently in a second direction that includes a forward directional component to the air outlet.

In any embodiment, the second direction may be a generally forward direction.

In any embodiment, the at least one screen may comprise at least two spaced apart screens each of which is positioned in the water separator air flow path.

In any embodiment, the air outlet may comprise an outlet conduit and the at least one screen may comprise a first interior screen provided in the water separator air flow path between the water separator inlet port and an inlet of the outlet conduit wherein the first interior screen is spaced from the water separator inlet port.

In any embodiment, the at least one screen may further comprise a second interior screen provided in the water separator air flow path between the water separator inlet port and the inlet of the outlet conduit wherein the second interior screen is spaced from the first interior screen.

In any embodiment, the inlet end of the outlet conduit may be located forward of the water separator inlet port.

It will be appreciated by a person skilled in the art that an apparatus or method disclosed herein may embody any one or more of the features contained herein and that the features may be used in any particular combination or sub-combination. These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 11 is a rear perspective view of a further alternate embodiment of the hair dryer having a supplemental inlet;

FIG. 29 is a rear perspective view of a further alternate embodiment of the hair dryer having an adjustable iris in a first position;

FIG. 30 a rear perspective view of the hair dryer of FIG. 29 with the adjustable iris in a second position;

FIG. 31 a rear perspective view of the hair dryer of FIG. 29 with the adjustable iris in a third position;

FIG. 38 is a rear perspective view of a nozzle attachment;

FIG. 39 is a front perspective view of the nozzle attachment of FIG. 38;

FIG. 40 is a rear perspective view of an alternate embodiment nozzle attachment;

FIG. 88 is a partially cut away perspective view of a cartridge heater;

FIG. 89 is a perspective view of a collared fin;

FIG. 90 is an exploded sectional view along the line A-A of FIG. 89 prior to a cartridge heater being inserted into the fin;

FIG. 91 is an exploded sectional view along the line A-A of FIG. 89 after the insertion of a cartridge heater into the fin showing the resulting collar;

FIG. 96 is a sectional view along the line B-B of FIG. 93 of the elongate oval cartridge heater of FIG. 93;

FIG. 97 is a sectional view along the line B-B of FIG. 93 of an alternative construction of the elongate oval heating element of FIG. 93;

FIG. 119 is a cross sectional view of a further alternate embodiment of the hair dryer;

FIG. 120 is a cross sectional view of a further alternate embodiment of the hair dryer in a first mode of operation;

FIG. 121 is a cross sectional view of the alternate embodiment of the hair dryer of FIG. 120 in a second mode of operation;

FIG. 122 is a cross sectional view of the alternate embodiment of the hair dryer wherein part of the water separator extends around a suction motor and fan assembly; and, FIG. 123 is a front perspective view of a front end of a hair dryer according to a further alternate embodiment wherein the front end comprises a water separator and a motor and fan assembly;

FIG. 124 is a cross sectional view of the alternate embodiment of the hair dryer of FIG. 123 showing the suction motor and impeller recessed into a rear end of the water separator;

FIG. 125 is a rear perspective view of the alternate embodiment of FIG. 123 with the suction motor and impeller withdrawn from the rear end of the water separator;

FIG. 126 is a front perspective view of a hair dryer including the front end of FIGS. 123-125;

FIG. 127 is a cross-sectional view of the alternate embodiment of FIG. 126;

FIG. 128 is a front perspective exploded view of the front end of FIGS. 123-125;

FIG. 129 is a rear perspective exploded view of the front end of FIGS. 123-125;

FIG. 130 is a front perspective cross-sectional view of a further alternate embodiment of the hair dryer;

FIG. 131 is a first rear perspective cross-sectional view of the hair dryer of FIG. 130;

Figure 130:
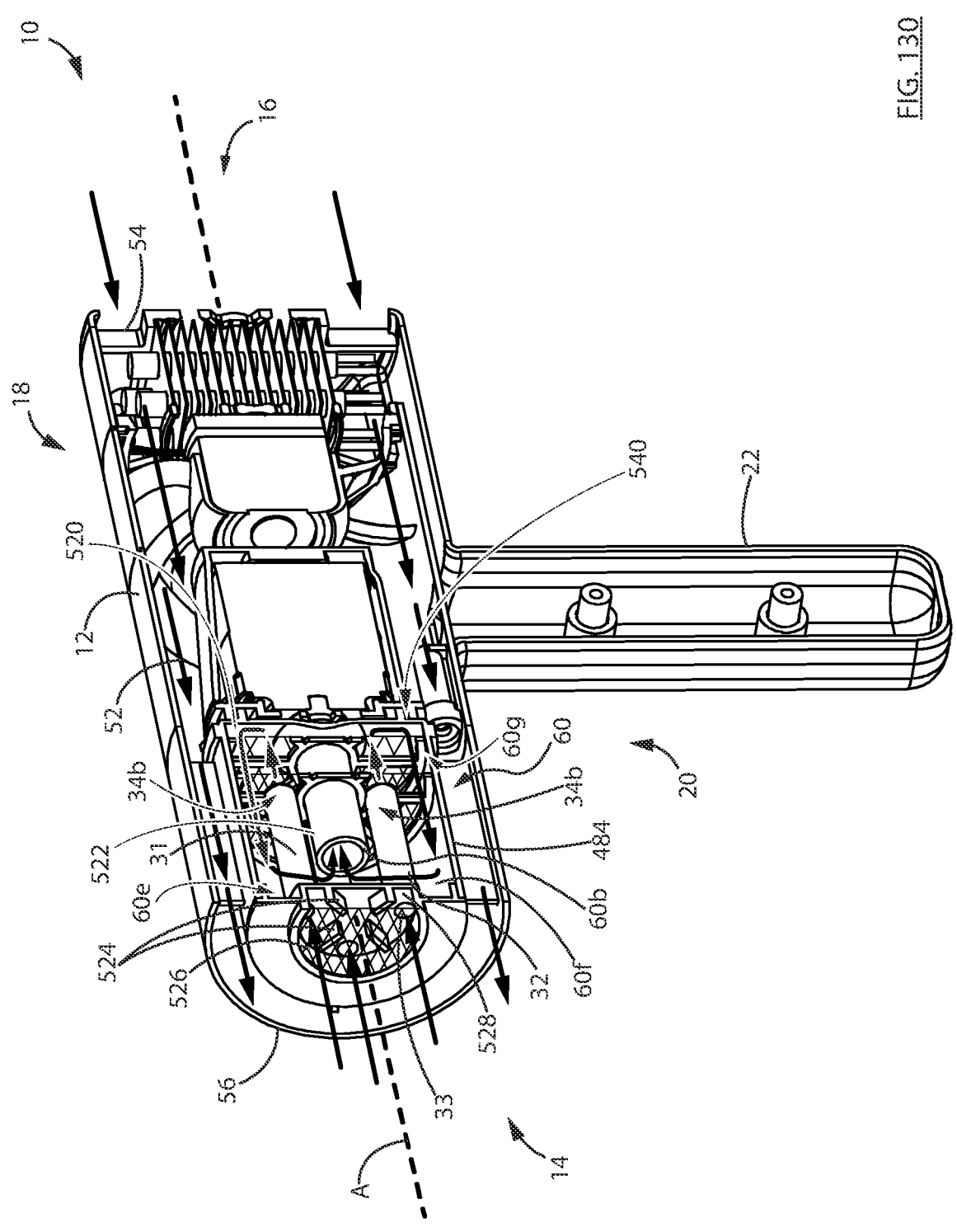
Figure 132:
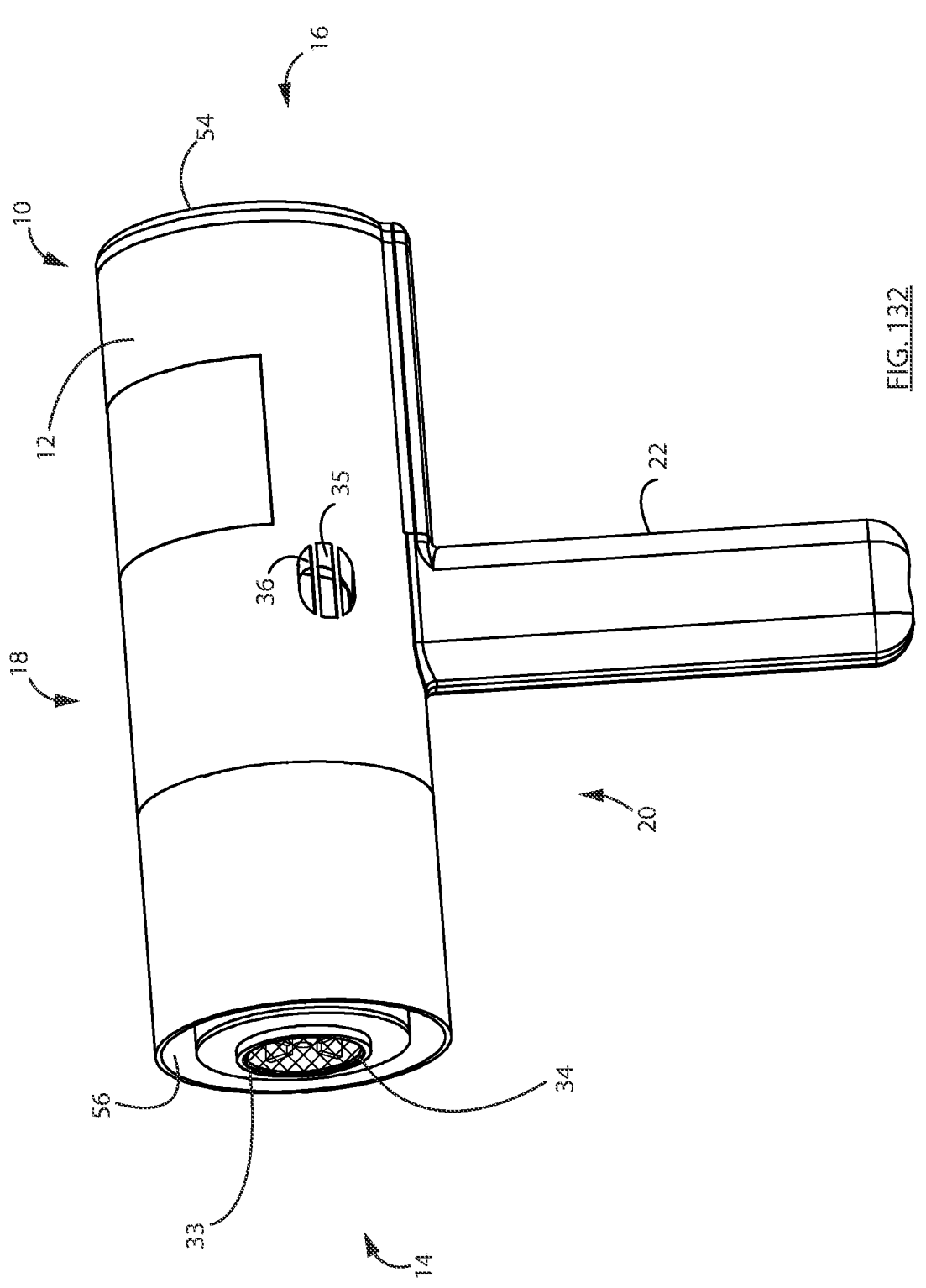
Figure 133:
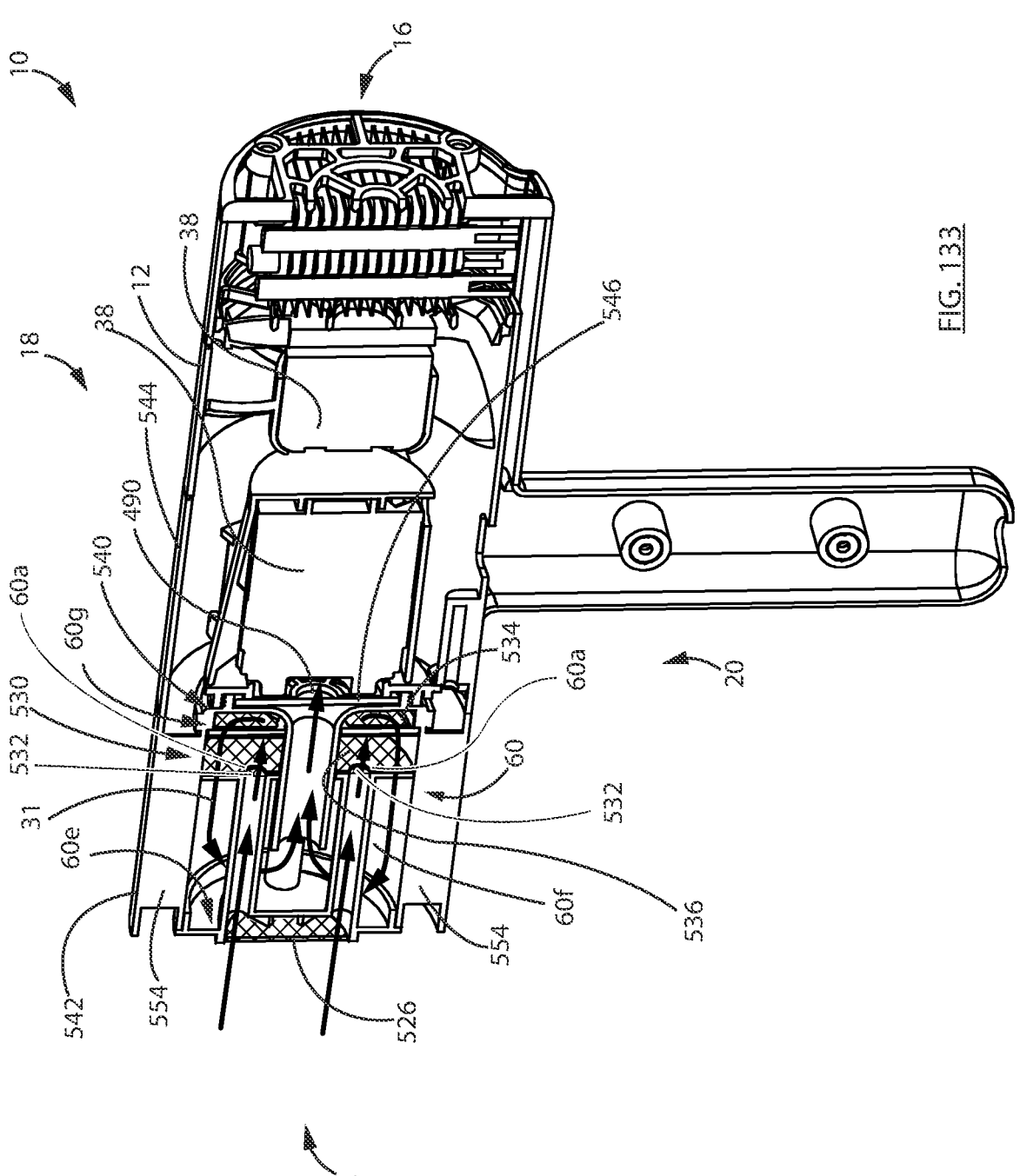
Figure 134:
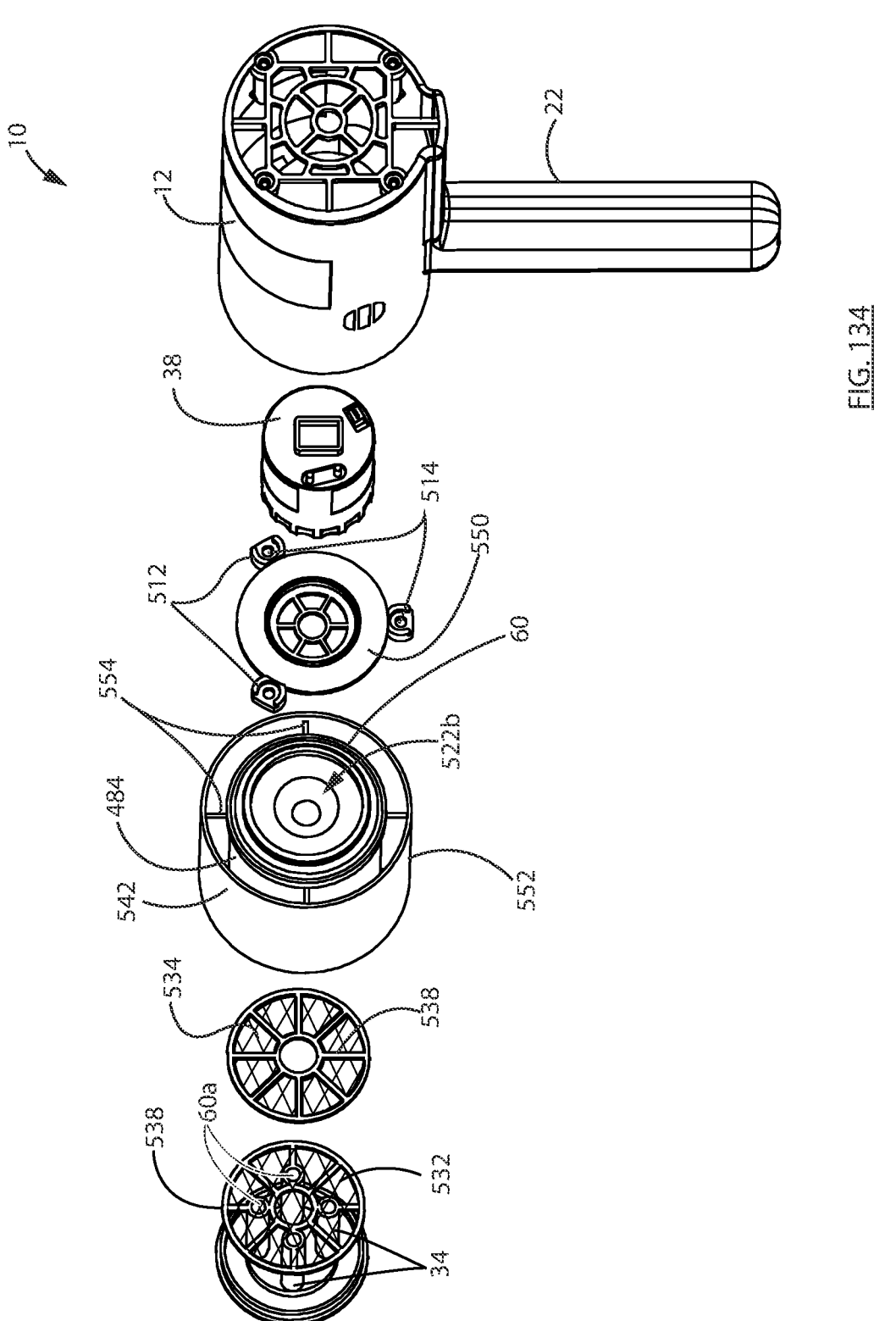
Figure 135:
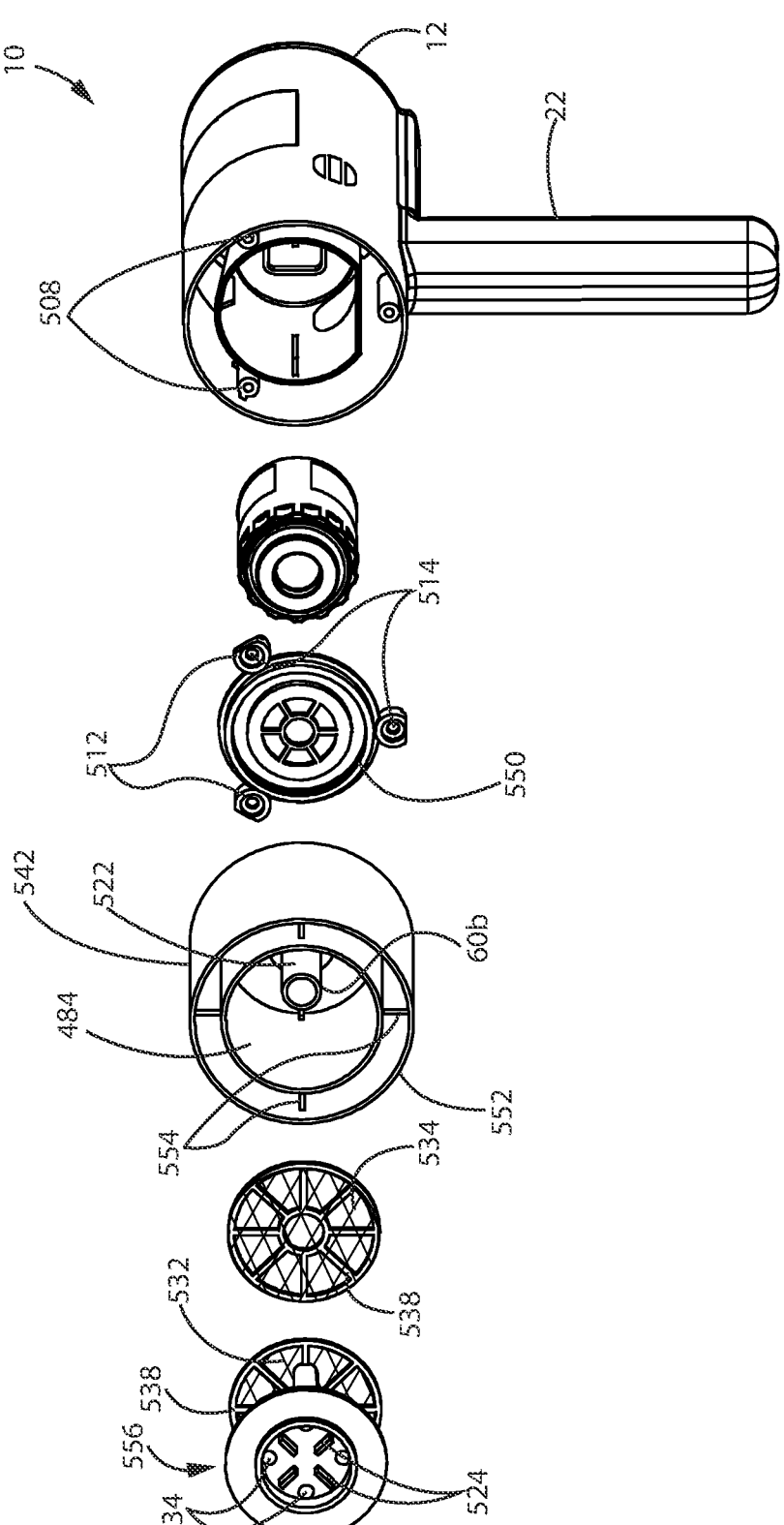
Figure 136:
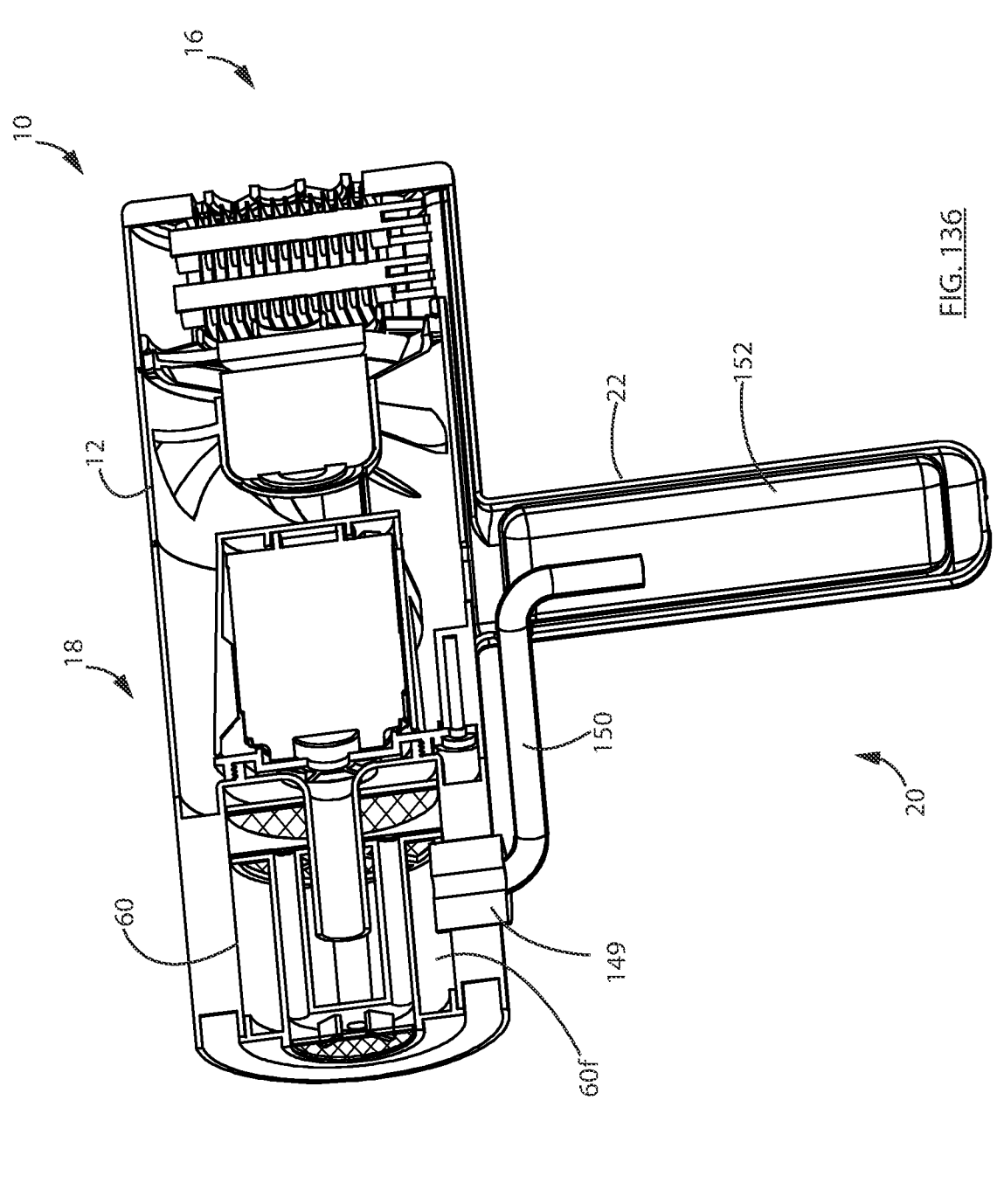
Figure 137:
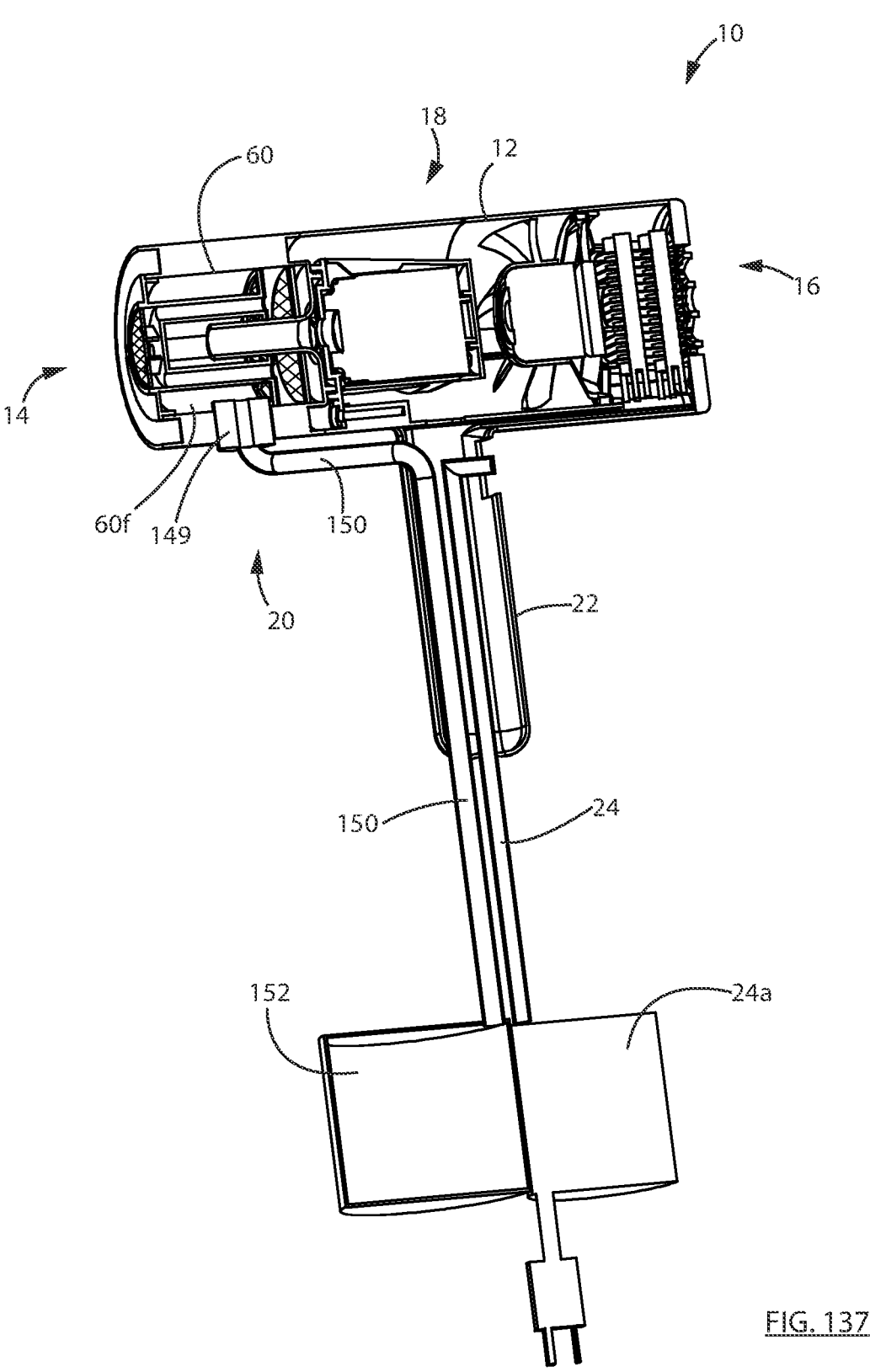

FIG. 132 is a side perspective view of the hair dryer of FIG. 130;

FIG. 133 is a second rear perspective cross-sectional view of the hair dryer of FIG. 130;

FIG. 134 is a rear perspective exploded view of the hair dryer of FIG. 130;

FIG. 135 is a front perspective exploded view of the hair dryer of FIG. 130;

FIG. 136 is a perspective cross-sectional view of a further alternate embodiment of the hair dryer; and, FIG. 137 is a perspective cross-sectional view of a further alternate embodiment of the hair dryer.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

General Description of a Hair Dryer

As exemplified in FIGS. 1-4 a hair dryer 10 has a main body 12 having a front end 14, a rear end 16, a top end 18, a bottom end 20 and a handle 22. It will be appreciated that main body 12 may be of any shape.

As exemplified, handle 22 is provided on the bottom end 20 of the hair dryer 10 and is in the form of a pistol grip handle. A handle 22 on the bottom end 20 of the hair dryer 10 may position weight of the hair dryer 10 above the handle 22, which may improve the ergonomics of the hair dryer 10. A pistol grip handle may also improve the ergonomics of the hair dryer 10. It will be appreciated that handle 22 may be of any shape and may be provided at any location of the hair dryer 10. As exemplified in FIGS. 120, 121, the handle may be provided at about a longitudinal midpoint of the hair drier. This embodiment may be particularly used if the hair dryer uses both longitudinal opposed ends for different drying operations as discussed subsequently and/or if two motor and fan blade assemblies 38 are utilized.

Hair dryer 10 may be powered using household current. Accordingly, a power cord 24 may be provided. Optionally, power cord 24 may be removably mounted to the hair dryer. Power cord 24 may be provided at any location on the hair dryer 10. As exemplified, power cord 24 is provided at the lower end of handle 22 which may facilitate, for example, repositioning the main body 12 without tangling the power cord 24, but it may be placed elsewhere.

Alternately, or in addition, hair dryer 10 may be powered by one or more on board energy storage members. The on board portable energy storage members may be one or more primary batteries, rechargeable batteries, super-capacitors, fuel cells or hydrogen combustion engines or turbines and may be provided at any location in the hair dryer 10. As exemplified in FIGS. 4 and 8, handle 22 houses a plurality of batteries 26. As exemplified in FIG. 9, the batteries may be provided in a battery pack 28, which may be removably mounted (e.g., slideably mounted) in the hair dryer, such as in handle 22. As exemplified in FIGS. 5-8 and 80-85, hair dryer 10 may be powered only by one or more on board energy storage members.

The on board energy storage members may be rechargeable in situ (e.g., they may be recharged when power cord 24 is plugged into a household power outlet) or they may be removed from hair dryer 10 for recharging. It will be appreciated that hair dryer 10 may be provided with two or more battery packs 28. Accordingly, a first battery pack 28 may be inserted, e.g., into handle 22, and used to operate hair dryer 10 while a second battery pack 28 is held in reserve (e.g., it may be recharged in a recharging station). When the first battery pack is discharged or is replaced, the first battery pack 28 may be removed (and optionally placed in a charging station to be recharged) and the second battery pack 28 may be installed in hair dryer 10. Accordingly, a self-powered hair dryer may be continuously operated by using different battery packs 28.

Power button 30 is provided to actuate hair dryer 10. Power button 30 may be provided at any location. As exemplified in FIG. 1, power button 30 is provided on handle 22. Power button 30 may be of any type. As exemplified, power button 30 is a member that is pressed inwardly into handle 22 to actuate hair dryer. Power button 30 may be a rocker switch or a slidable switch. Power button 30 may have only on and off positions. Alternately, it may have different positions for different fan speeds (e.g., low and high or low, medium and high).

Hair dryer 10 is provided with an air moving member. The air moving member may be any member that may be provided in a hair dryer to move air through the hair dryer. As exemplified herein the air moving member comprises a motor and fan assembly 38. As exemplified in FIG. 4, motor and fan assembly 38 comprises a motor 40, and at least one air moving member or fan blade 42, 44. In some examples, the motor and fan assembly 38 includes a motor 40 and a first fan blade 42 (which is driven by a first axle 46) and a second fan blade 44 (which is driven by an axle 48). Alternately, as exemplified in FIG. 8, motor and fan assembly 38 comprises a motor 40 and a first fan blade 42 (which is driven by a first axle 46). As discussed subsequently, the fan blade 42, 44 may be selected to provide suction, in which case it may be an impeller (e.g., first fan blade 42), or the fan blade may be selected to provide air flow, in which case the fan blade may be a propeller (e.g., second fan blade 44).

Hair dryer 10 is provided with at least one air flow path 31 (see for example FIGS. 11-15, 21, 22A, 28, 41-50 and 81) extending from an inlet port 33 to an outlet port 35. It will be appreciated that the inlet port 33 and the outlet port 35 may be provided at any location and may direct air in and/or receive air from any direction.

As discussed herein, in some embodiments, a hair dryer may be operational in at least two operating modes, a first mode wherein hair is dried by withdrawing liquid water from the hair (a first operating mode) and a subsequent mode wherein hair is dried using heat (a second operating mode). In such cases, two air flow paths may be provided, a primary air flow path and a secondary air flow path. For convenience, the primary air flow path is referred to by reference numeral 32 and has an air inlet 34 and an air outlet 36 and the secondary air flow path is referred to by reference numeral 52 and has an air inlet 54 and an air outlet 56. It will be appreciated that any air inlet may have any feature discussed herein with respect to inlet 33, 34 or 54 and that any air outlet may have any feature discussed herein with respect to air outlets 35, 36 or 56.

Figure 109:
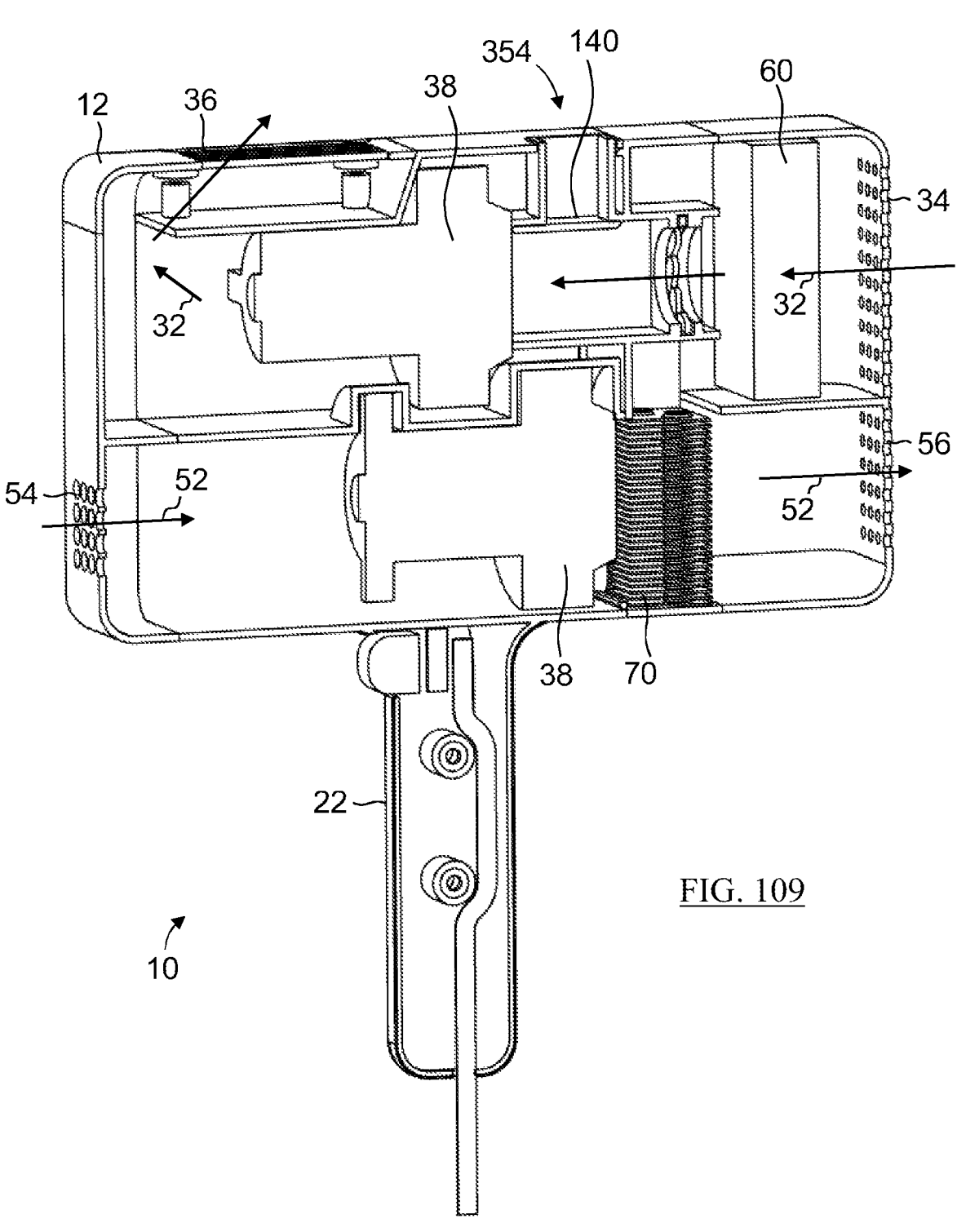
FIG. 109 is a cross sectional view of a further alternate embodiment of the hair dryer having separate primary and secondary air flow paths, each with a separate motor and fan assembly.

As exemplified in FIGS. 109, 110 and as discussed subsequently, in a first operating mode, front end 14 may be placed proximate or against the hair to draw water out of the hair and the rear end 16 may subsequently be directed at the hair to direct heated air at the hair. Accordingly, the front end 14 may be referred to as the suction inlet end and the rear end 16 may be referred to as the blow dry end. In this embodiment, the primary air flow path 32 essentially extends from the suction inlet end to the motor and fan assembly 38 (which can be considered the end or outlet of the primary air flow path 32) and the secondary air flow path 52 essentially extends from the motor and fan assembly 38 (which can be considered the start or inlet of the secondary air flow path 52) to the outlet at the blow dry end. Therefore, in this embodiment, the primary and secondary air flow paths are essentially a joined air flow path and can be considered a single air flow path 31 with a motor and fan assembly 38 provided in the air flow path 31 to drive air flow through the air flow path 31. Similarly, as exemplified in FIGS. 9 and 10, a redirecting member 62 may be used to convert the front end 14 from the suction inlet end to a blow dry end and, in the configuration of FIG. 10, the primary and secondary air flow paths 32, 52 are essentially a single joined air flow path 31.

Figures 9, 10:
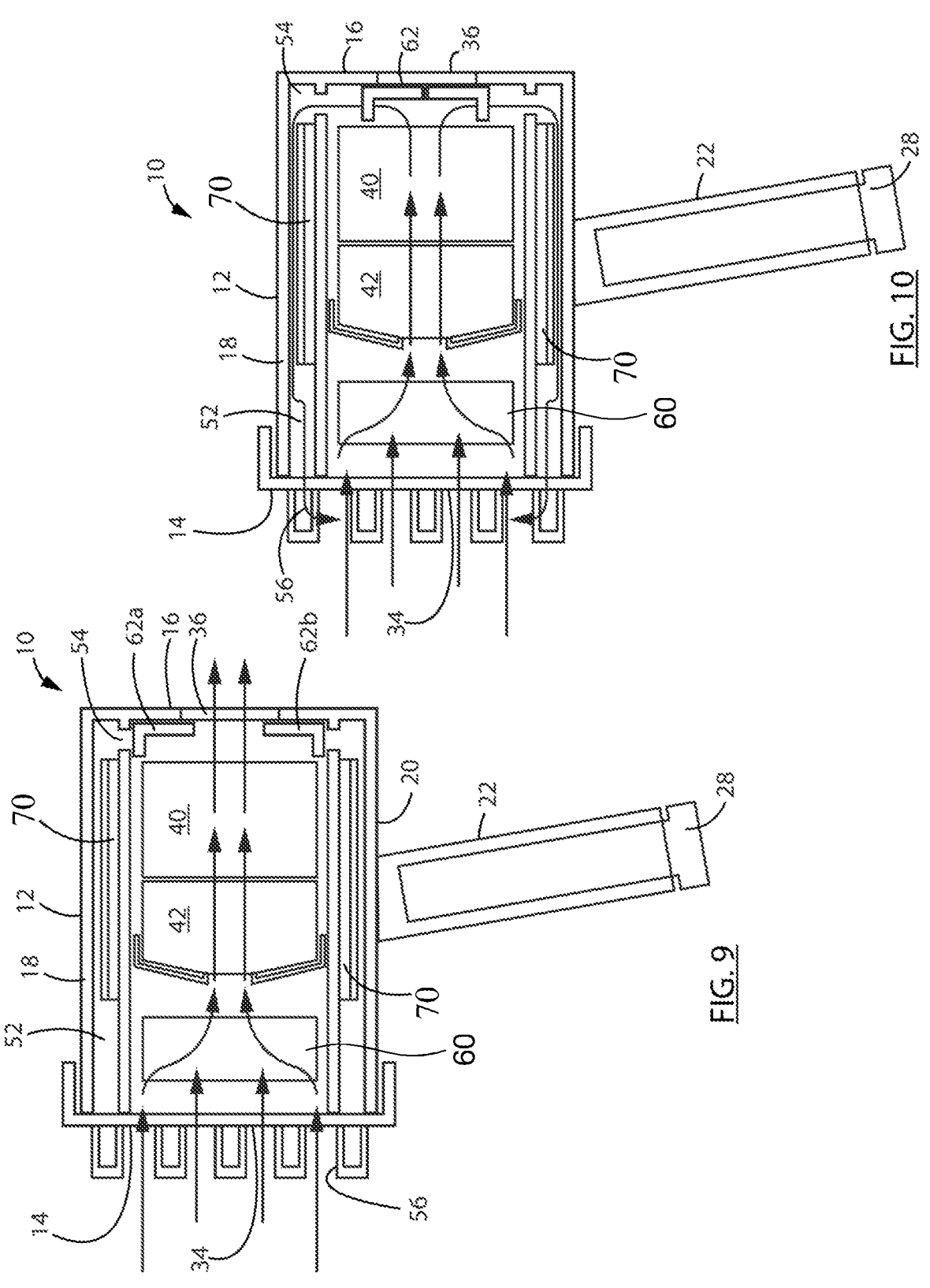
FIG. 9 is a cross-sectional view of a further alternate embodiment of the hair dryer configured in a first mode of operation.
FIG. 10 is a cross-sectional view of the further alternate embodiment of the hair dryer of FIG. 9 configured in a second mode of operation.
Figure 99:
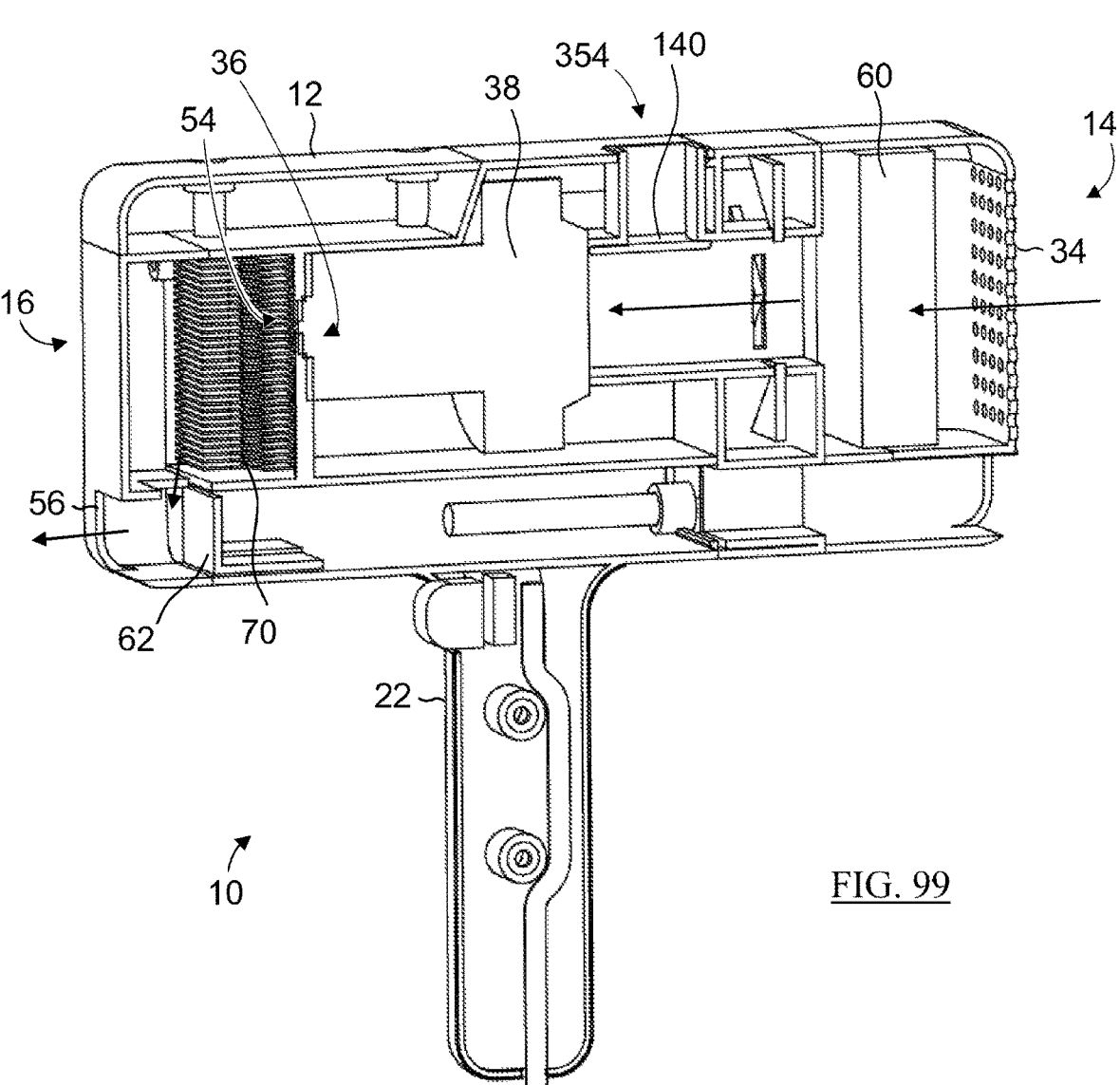
FIG. 99 is a cross sectional view of a further alternate embodiment of the hair dryer having a directing member in a first position.
Figure 100:
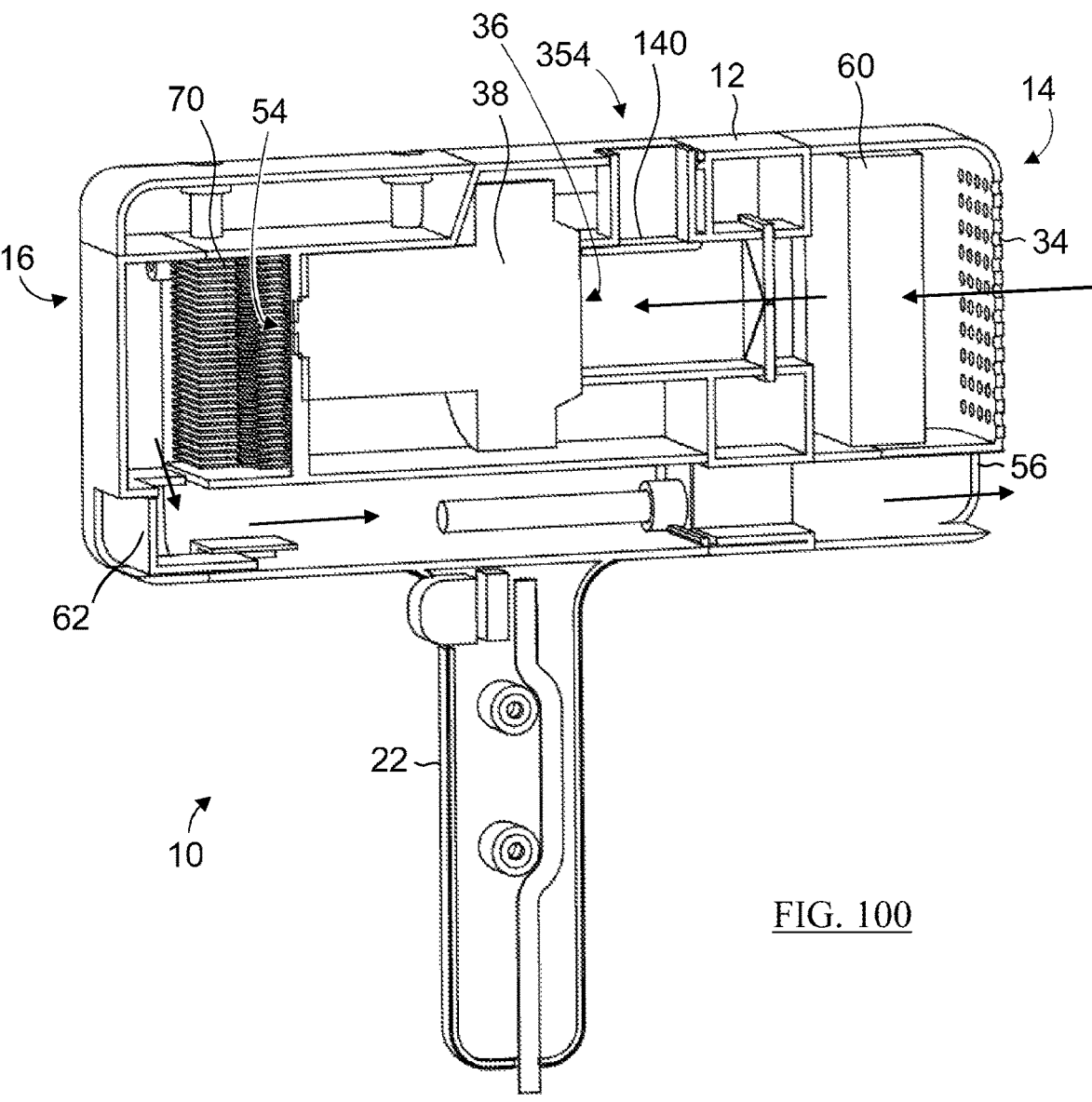
FIG. 100 is a cross sectional view of the hair dryer of FIG. 99 with the directing member in a second position.

Similar to the embodiment of FIGS. 9 and 10, in the embodiment of FIGS. 99 and 100, the redirecting member 62 may be used to permit air to exit the rear end 16 of the hair dryer 10 in the first operating mode (FIG. 99) and to direct heated air out the front end 14 of the hair dryer 10 in the second operating mode (FIG. 100).

Figure 120:
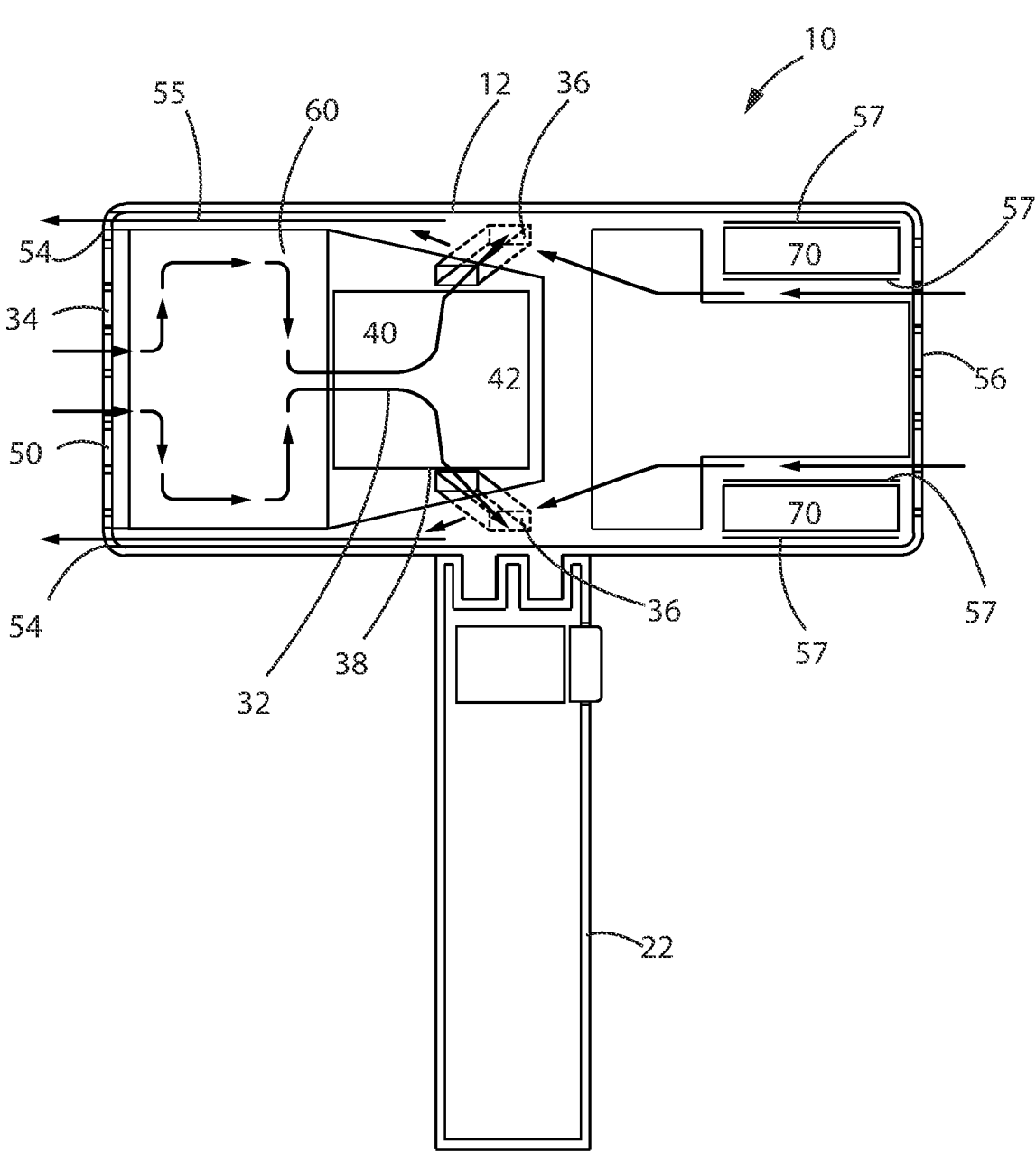

In some embodiments, the primary and secondary air flow paths 32, 52 may be separate and the inlet of the primary air flow path 32 may be at the same end of the hair dryer as the outlet of the secondary air flow path 52 (see for example FIG. 110) or the inlet of the primary air flow path 32 may be at the longitudinally opposed end of the hair dryer as the outlet of the secondary air flow path 52 (see for example FIG. 120).

Air containing water that passes over a motor may damage the motor over time. Accordingly, when the air entering the air flow path has water in it (from drying hair), optionally some or all of the water may be removed as discussed subsequently. Alternately, or in addition, the air moving member and/or the air flow path may be configured to inhibit or prevent water passing over the motor.

In some examples, water can pass through the hair dryer 10 (e.g., when motor 40 is not receiving a current) to clean the hair dryer 10. Accordingly, a fluid pathway may extend through the hair dryer 10 from the inlet 33 to the outlet 35. Cleaning the hair dryer 10 may reduce the buildup of debris (e.g., hair color products, shampoo, etc.). This may be used in particular in an embodiment exemplified in FIG. 4 wherein the motor 40 is exterior to the primary air flow path 32.

In some embodiments, a constant air flow volume per unit time through the hair dryer 10 is maintained for one or all modes of drying. The minimum cross-sectional area of a portion of the air flow path, optionally the primary air flow path 32 or the outlet 35, may be adjusted so that the velocity of the air flow changes. Accordingly, the rate of drying at all air flow velocities may be the same.

Dual Mode Hair Dryer

In accordance with this aspect, hair dryer 10 may be operable in a first operating mode wherein water is removed from hair without or substantially without a phase change. For example, 50-80 wt. % or 60-70 wt. % of the water of the water in wet hair that is to be dried may be removed in the first operating mode. Subsequently, in a second operating mode, heat without suction may be used to further dry the hair. This aspect may be used by itself or in combination with one or more of the other aspects set out herein.

An advantage of this aspect is that less power is required to remove water using sub-atmospheric pressure than to remove water by using heat to produce a phase change (from liquid water to gaseous water) in the water retained in hair. Further, the use of less heat or a lower temperature heat may reduce the damage to hair that occurs during the use of a conventional hair dryer.

In the first operating mode, water may be removed by suction and/or high velocity air, which air may be at ambient temperature. Optionally, heat may be provided during the first mode, such as using waste heat produced by the motor and fan assembly and/or a supplemental heating element. In the second operating mode, heat may be applied to maintain the temperature of the hair below 75° C., 70° C., 60° C. or 50° C. The heat may remove 20-50 wt. % or 30-40 wt. % of the initial water present in the hair when wet from the hair.

Drying Hair Using Suction

In accordance with this aspect, hair dryer 10 may be operable in a first mode wherein water is removed from hair by using sub-atmospheric pressure (suction) alone or in combination with the application of heat and/or high velocity air. The heat may be provided at all times that suction is applied to the hair or only part of the time (e.g., suction may be provided for a first period of time and, subsequently, heat may be provided while suction is applied). After suction has removed the desired amount of water, the user may then blow dry the hair the rest of the way, using a lower velocity air flow that is optionally heated. This aspect may be used by itself or in combination with one or more of the other aspects set out herein.

In accordance with this aspect, hair dryer 10 may be provided with a primary air flow path 32 extending from an inlet port 34 to an outlet port 36.

If this aspect is to be used by itself, and optionally in any embodiment using any combination of aspects, hair being dried is inhibited and optionally prevented, from entering into primary air flow path 32. Accordingly, inlet port 34 may comprise a screen 50. Screen 50 may be any porous member such as a stamped or molded screen, fine woven mesh, an open cell foam such as open cell polyurethane or any combination thereof. The openings of screen 50 may be any size that inhibits or prevents hair entering primary air flow path 32. Accordingly, in a first mode of operation, motor and fan assembly 38 is actuated and draws air into inlet port 34 thereby creating sub-atmospheric pressure in front of inlet port 34.

When hair is placed in the proximity of inlet port 34, the hair is drawn against screen 50 and air is drawn through the hair into primary air flow path 32. This action draws (sucks) moisture from the hair and into primary air flow path 32. Hair may be drawn against an inlet port to facilitate sucking moisture from the hair, and may substantially cover the inlet port to prevent the air from bypassing the hair. Optionally, the user may move the hair dryer 10 and/or the hair as the hair is drawn against the inlet port, and the hair dryer 10 may include one or more protrusions (e.g., a mechanical ridge) at the inlet port over which the hair passes. Protrusions at the inlet port may facilitate removing water from the hair.

Figure 4:
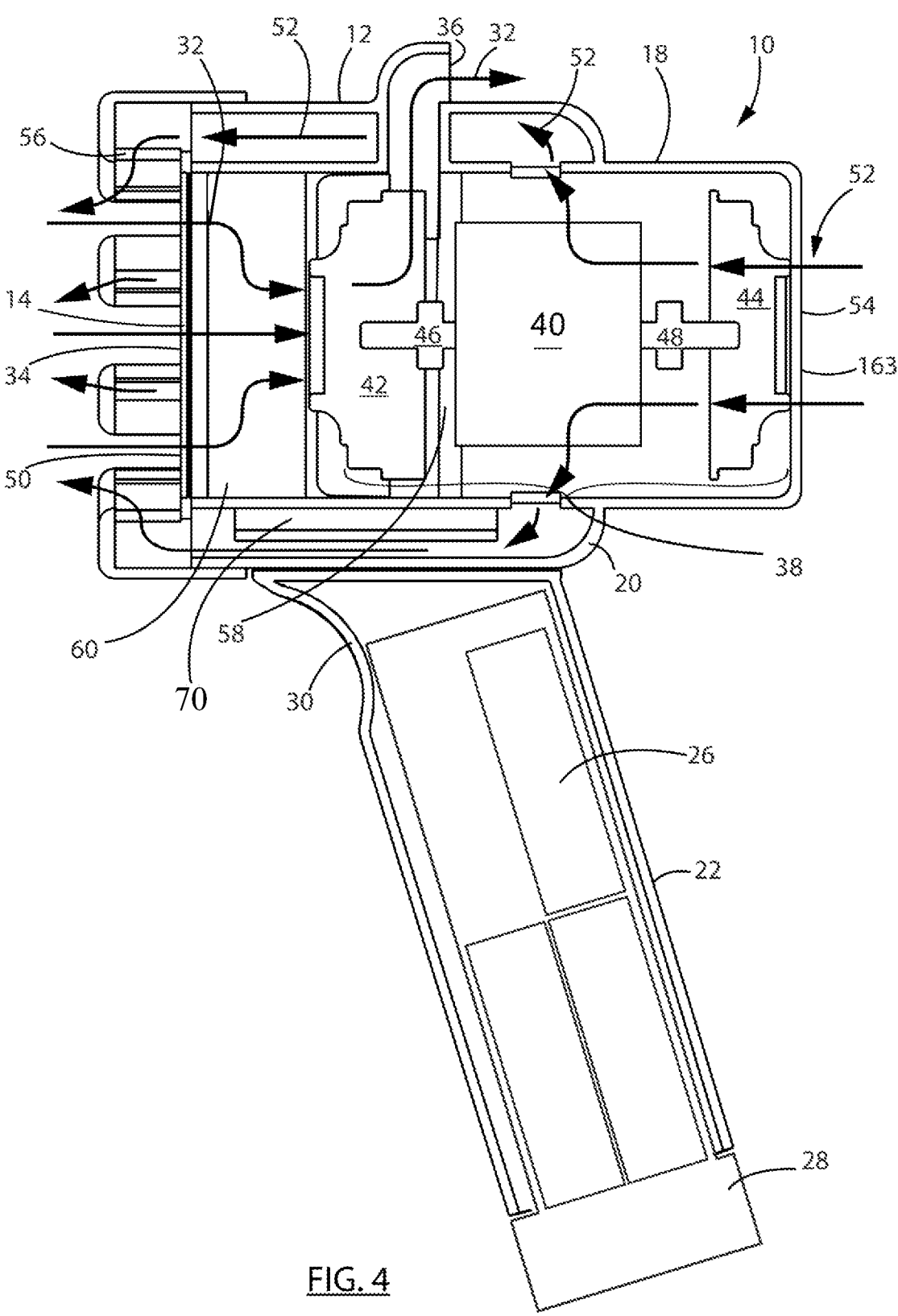
FIG. 4 is a cross-sectional view along the line 4-4 in FIG. 1.
Figure 5:
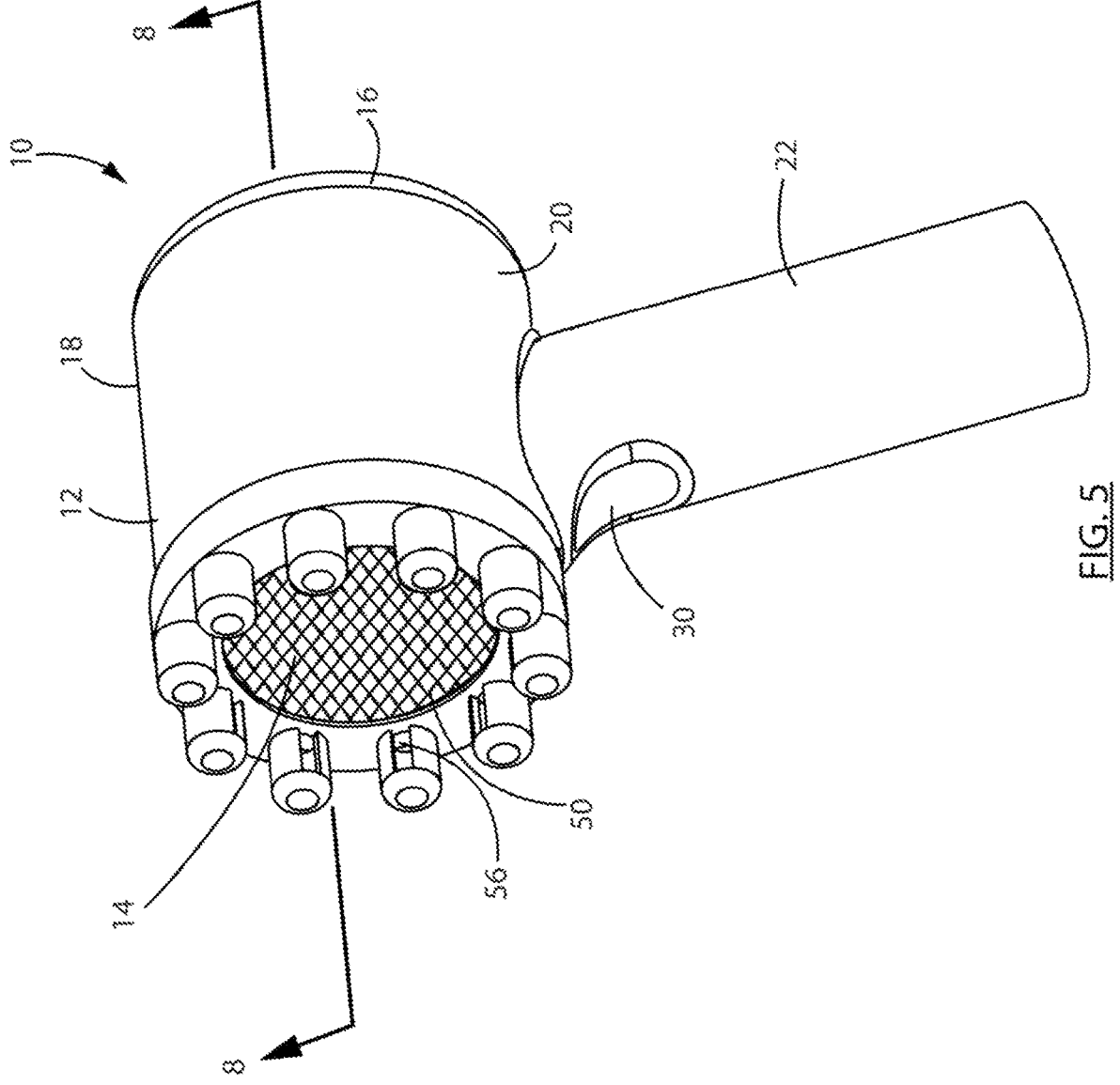
FIG. 5 is a side front perspective view of a hair dryer according to another embodiment.
Figure 6:
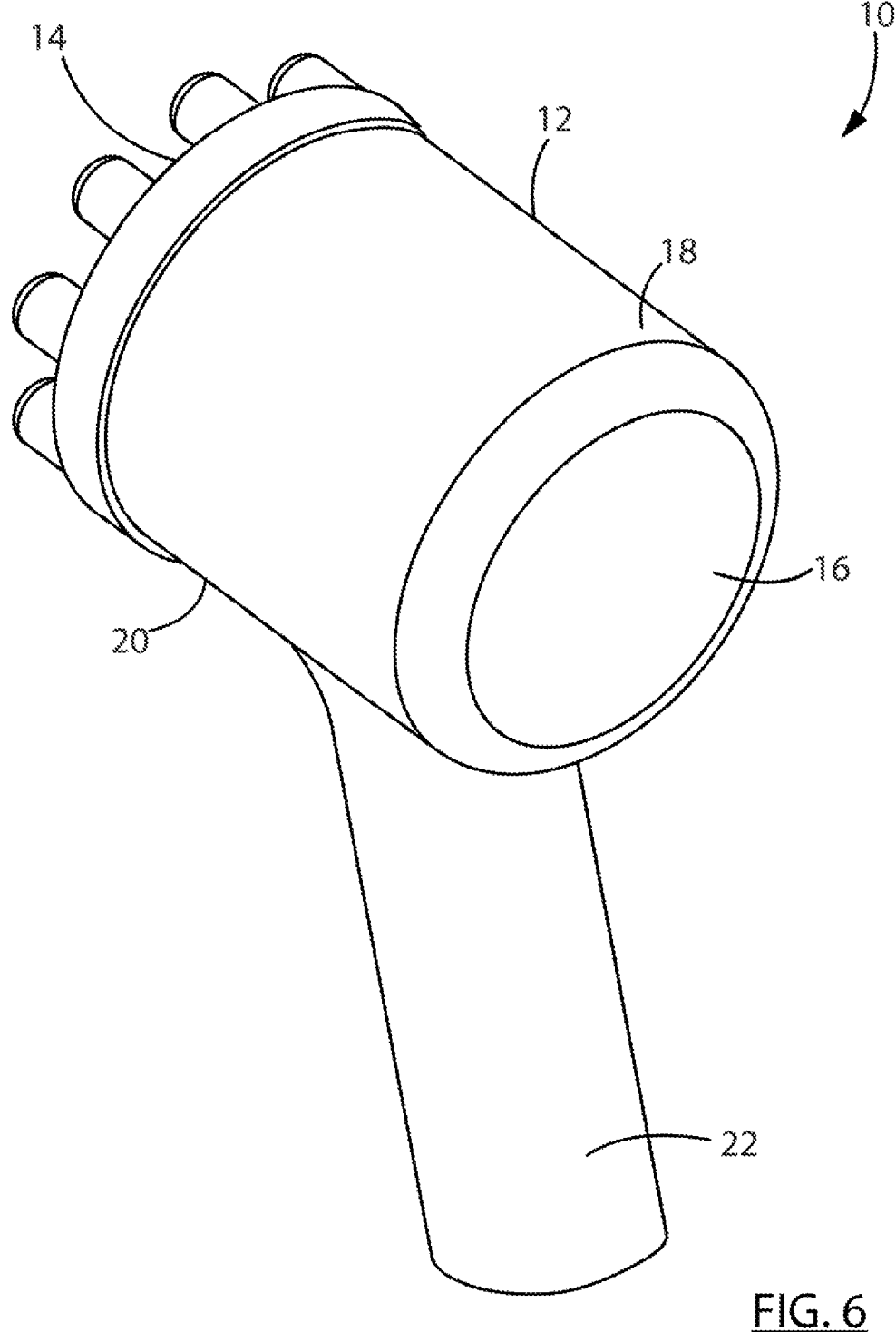
FIG. 6 is a rear perspective view of the hair dryer of FIG. 5.
Figure 7:
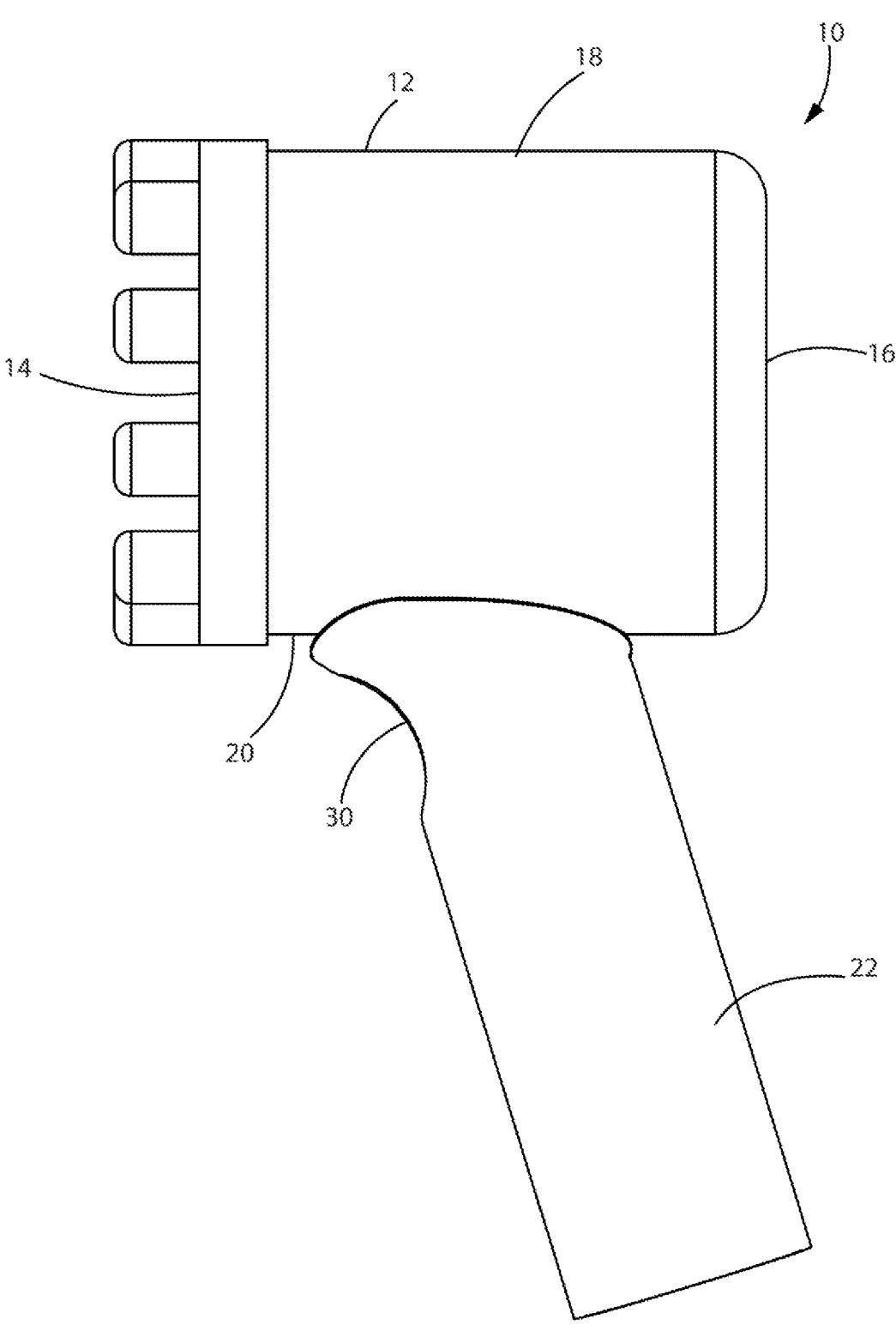
FIG. 7 is a side plan view of the hair dryer of FIG. 5.

Once the air with entrained water enters primary air flow path 32, the air may be exhausted to the ambient via an outlet port 36 (see for example FIG. 4). In such a case, as discussed herein, first fan blade 42 may be a by-pass fan blade.

Figures 18, 19:
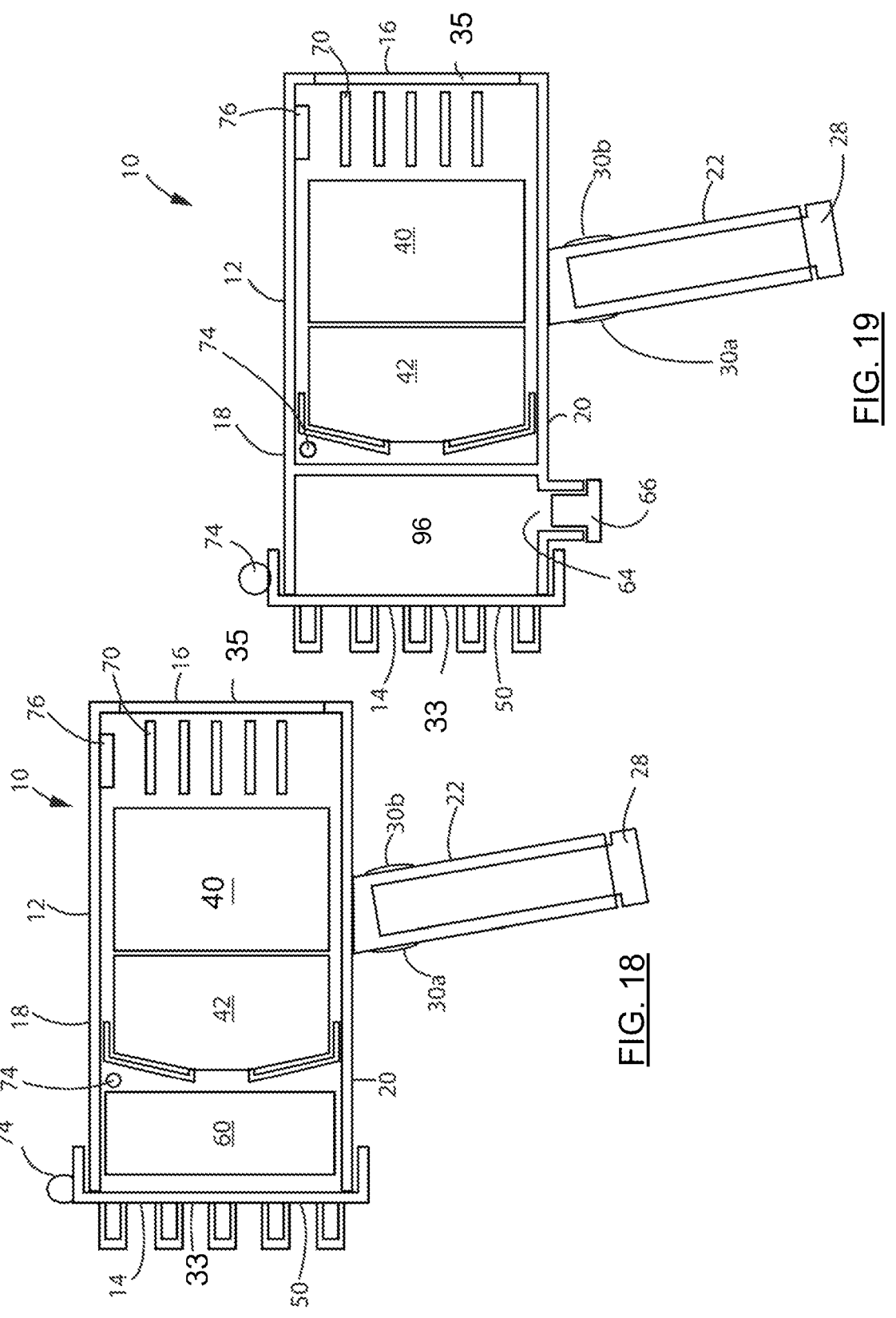
FIG. 18 is a cross-sectional view of a further alternate embodiment of the hair dryer having a removable porous water absorbent member.
FIG. 19 is a cross-sectional view of a further alternate embodiment of the hair dryer having an openable water storage container.

Optionally, as exemplified in FIGS. 18 and 19, a water separator 60 may be provided downstream and optionally immediately downstream or proximate inlet port 34 (e.g., adjacent screen 50). It will be appreciated that, if a by-pass fan blade 42 is used, then water collection member 60 need not be provided. For example, once the air with entrained water enters primary air flow path 32, it may be directed to secondary air flow path. In such a case, a water collection member 60 is optionally provided.

It will be appreciated that, in any embodiment, screen 50 may be heated. As hair may be drawn against screen 50 during at use (e.g., by suction and/or by jets as discussed subsequently), heating screen 50 may assist is contact drying hair that is drawn along screen 50 during use of hair dryer 10. For example, it may include a heating element, or a heating element may be placed proximate thereto so as to heat screen 50. For example, as discussed herein, infrared heating element 92 may be used to heat screen 50.

It will be appreciated that, prior to the first mode of operation, a person may first towel dry their hair.

Drying Hair Using a Jet of High-Velocity Air or Heated Air in Combination with Suction Drying In accordance with this aspect, instead of or in addition to using suction in the first mode of operation, the hair dryer 10 may be operable in a first mode wherein air water is removed from hair by a jet of high-velocity air. Accordingly, the hair dryer 10 may be used to direct a jet of air from an outlet port 35, 36, 56 of the hair dryer 10 to the hair. The jet of air may have a velocity of at least 70, 80, 90, 100 or 110 mph. Alternately, lower velocity air (e.g., having a velocity of 10-25 mph or 15-20 mph), which may be heated, may be used in combination with suction to assist in drying hair in the first mode of operation. This aspect may be used by itself or in combination with one or more of the other aspects set out herein.

An advantage of this aspect is that air having a high velocity may be directed to or through the hair being dried. After the jet of air 102, with or without suction, has removed the desired amount of water, the user may then blow dry the hair the rest of the way, using a lower velocity air flow that is optionally heated. If lower velocity air is used, some heated air may be provided during suction drying to enhance the rate of drying.

Figures 26, 27:
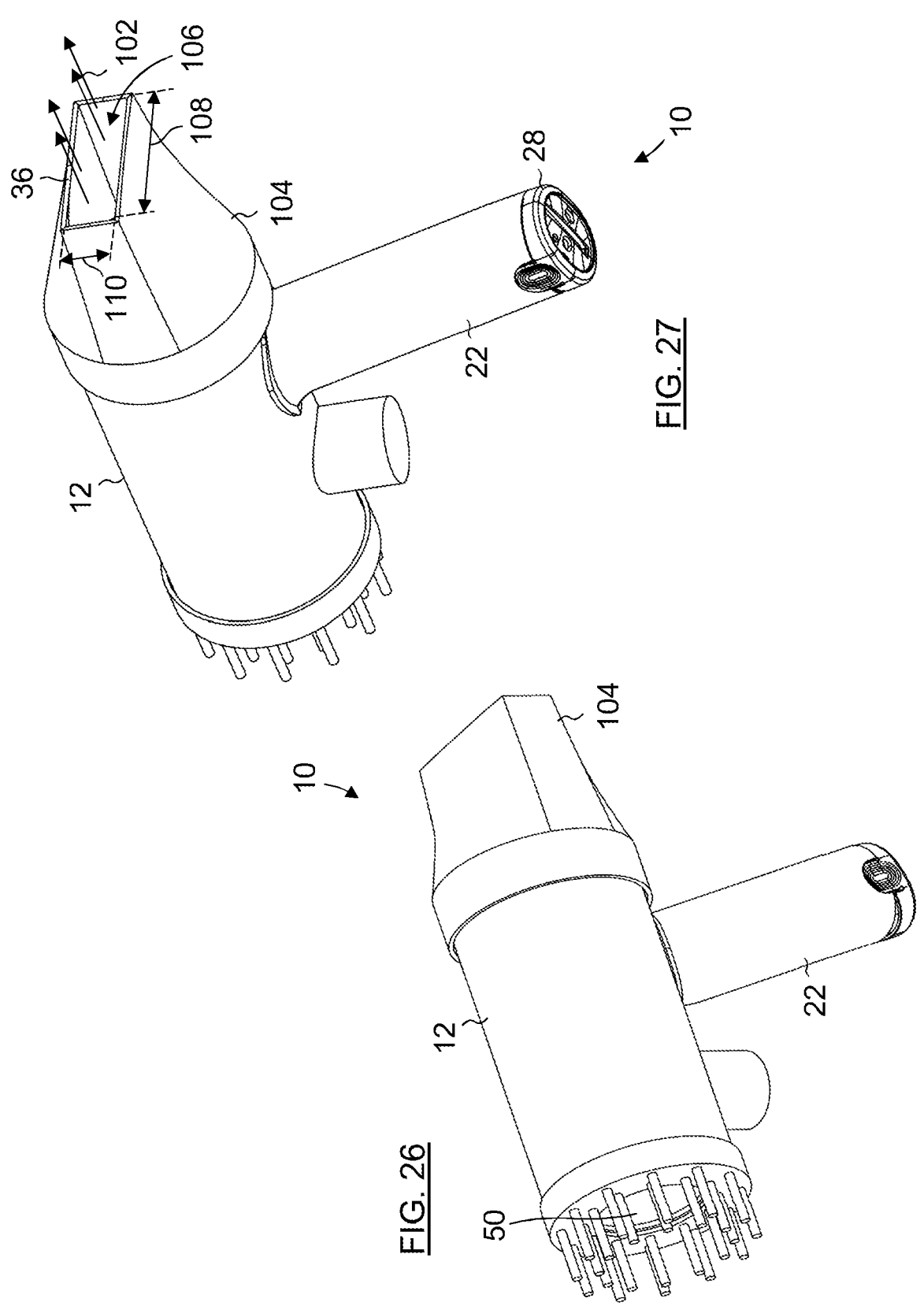
FIG. 26 is a rear perspective view of a further alternate embodiment of the hair dryer having an outlet for a jet of air.
FIG. 27 a rear perspective view of the hair dryer of FIG. 26.
Figure 28:
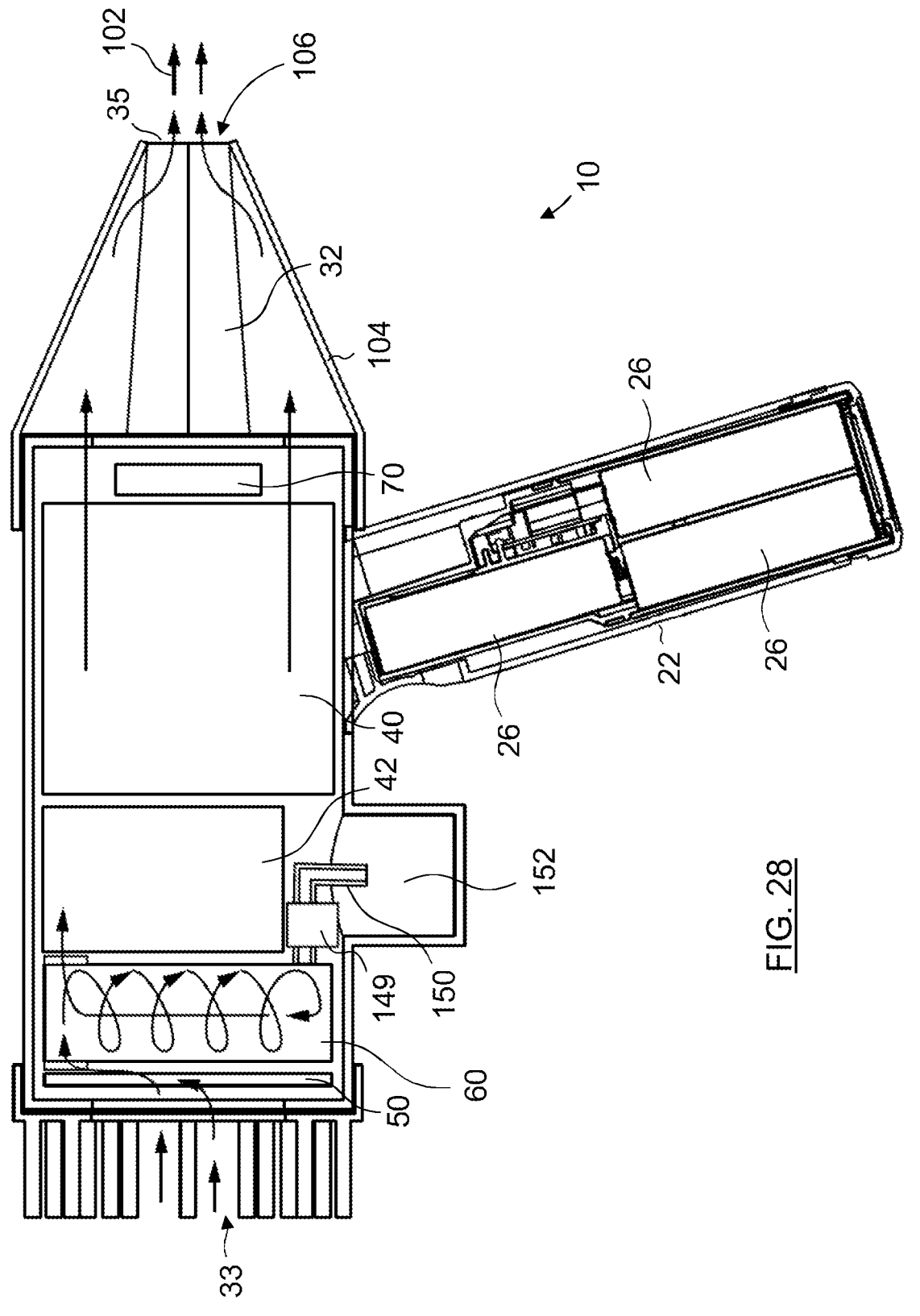
FIG. 28 is a cross-sectional view of the hair dryer of FIG. 26.
Figures 32, 33, 34:
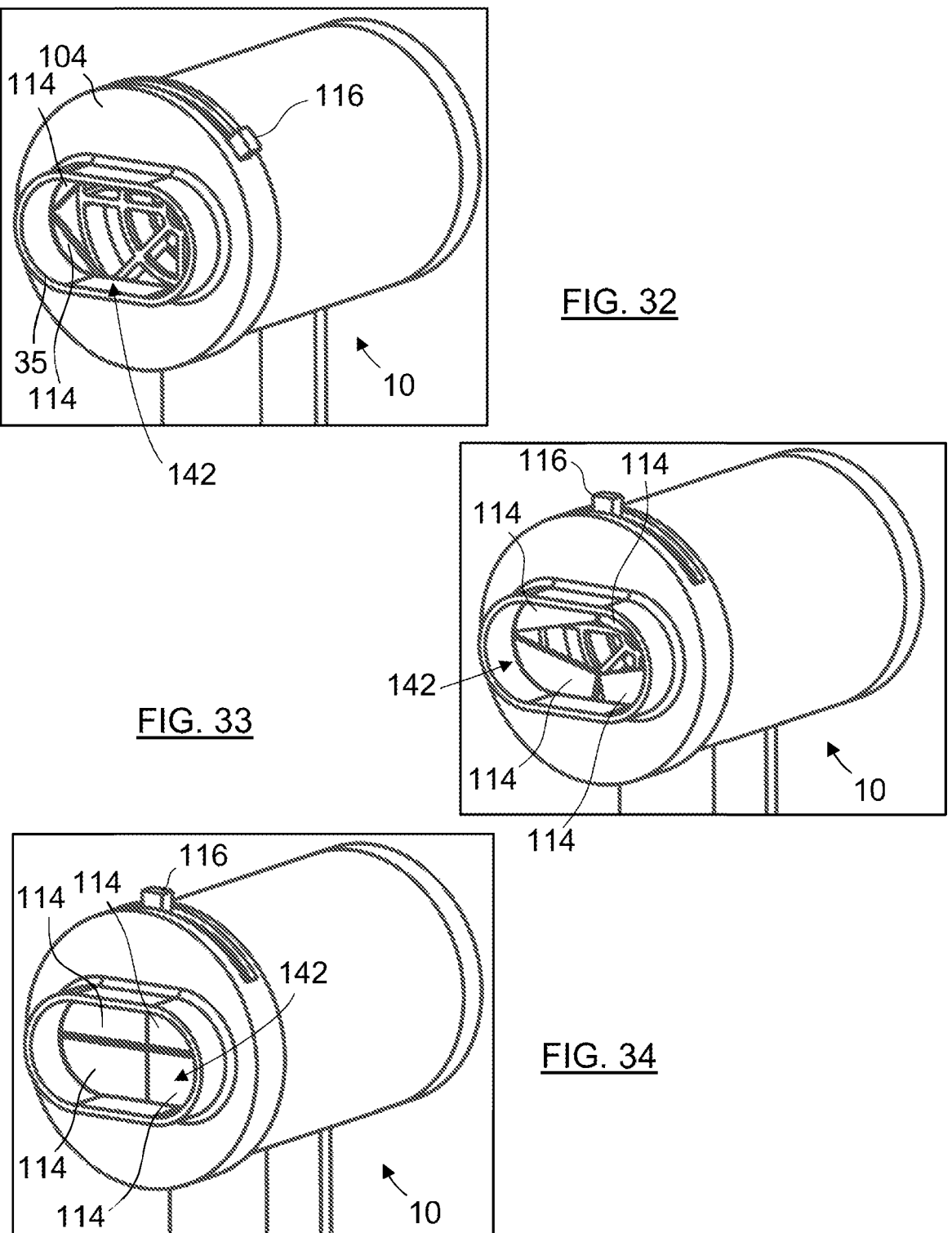
FIG. 32 is a rear perspective view of a further alternate embodiment of the hair dryer having the adjustable iris in a first position.
FIG. 33 a rear perspective view of the hair dryer of FIG. 32 with the adjustable iris in a second position.
FIG. 34 a rear perspective view of the hair dryer of FIG. 32 with the adjustable iris in a third position.

A jet of air 102 may be directed from a hair dryer 10 towards the hair to drive water from the hair. In the example of FIGS. 26 to 28, the jet of air 102 is directed from outlet port 36 of hair dryer 10.

The jet of air 102 may have a velocity of 70 mph or more, 80 mph or more, 90 mph or more, 100 mph or more or 110 mph or more. For example, in the first mode of operating, hair may be dried by directing air at the hair wherein the air has a velocity of 80-120 mph, 85-120 mph, 90-120 mph or 90-110 mph.

The jet of air 102 may carry sufficient kinetic energy to drive the water from the hair. The jet of air 102 may be generated, for example, by increasing the volumetric air flow through the hair dryer 10 compared to a blow drying mode and/or forcing the air flow through an opening having a small cross-sectional area to increase the velocity of the air.

For example, the outlet port 36 may be constricted to increase the velocity of the air. The constriction in the outlet port 36 may be gradual to reduce back pressure within hair dryer 10. The jet of air 102 may have a volumetric flow rate between 20 cfm and 80 cfm, and optionally a volumetric flow between 25 to 65 cfm or between 35 cfm and 55 cfm. In some embodiments, the volumetric flow rate may depend on hair type. For example, for fragile hair a volumetric flow rate of less than 20 cfm may be used, such as a volumetric flow rate of between 10 cfm and 20 cfm or between 14 cfm and 18 cfm.

In use, the jet of air 102 may be moved along and/or across hair to direct the water in a preferred direction. For example, hair has a length from a root of the hair to a tip of the hair, and the jet of air 102 may be applied to the hair at a position adjacent the root, and then moved along the length of the hair towards the tip to drive the water along the length of the hair towards the tip.

As discussed elsewhere herein, the hair dryer 10 may have an airflow with an output temperature that is kept constant or nearly constant. The jet of air 102 may have a temperature that is up to 75° C., 70° C., 60° C., 50° C. or 40° C. For example, the jet of air 102 may be unheated or heated only by waste heat from the motor 40. Optionally, or in addition, a resistive heating member may be used to provide heat to the jet of air. Alternately, or in addition, an IR source may be used to direct heat at the hair during a portion or all of the first mode of operation. The temperature to which the air is heated may be controlled and kept below a threshold temperature, such as by increasing the volumetric air flow rate without providing additional energy to the heater, thereby reducing the amount of heat transferred to each portion of the air that flows over the heater and/or by adding bleed air that does not pass over the heater.

A low and/or constant output temperature may facilitate holding the outlet port very close to hair. Advantageously, the jet of air 102 may be applied by holding the hair dryer 10 with the outlet port 36 adjacent the hair, such as within 3 inches of the hair, within 2 inches of the hair, within 1 inch of the hair, or against the hair. Often, when a hair dryer is held adjacent the hair, the hair quickly becomes very warm, such as more than 70° C. or 80° C. Accordingly, many hair dryers are directed towards hair from a distance, such as from 15 inches away from the hair. However, holding the hair dryer at a distance may be inefficient since much of the heated air flow may bypass the hair without being used to dry the hair.

A jet of high-velocity air 102 may be applied at any point along the length of the hair. For example, the jet of air may be applied at or near the root of the hair. However, applying the jet of air to a portion of the hair that lies against the user's head may be uncomfortable. Accordingly, for example, the jet of air may be applied only on a free hanging portion of the hair that is not against the user's head. For example, the jet of air 102 may be applied to the portion of the hair that hangs below the user's chin. Free hanging hair may also be hair that the user has moved away from the user's head, such as by drawing the hair away from the head or by tilting their head or hanging their head upside down.

The jet of high-velocity air 102 may be a concentrated flow of air. The jet of air 102 may be shaped to facilitate driving moisture in a chosen direction. For example, the jet may be a blade-shaped jet (see for example the concentrator attachment 104 of FIG. 27) to be passed over the hair with the long edge of the blade shape perpendicular to the direction of motion to limit the lateral movement of the water. Accordingly, the jet of air 102 may have a jet width and a jet depth, with the jet width greater than the jet depth. In the illustrated example of FIGS. 26 to 28, the outlet opening 106 is rectangular, however oval or other openings may also be used.

The outlet port 36 may be formed in the body 12 or in a nozzle attachment 104 of the hair dryer 10. In the illustrated example of FIGS. 26 to 28, the outlet port 36 is formed in the nozzle attachment 104. Accordingly, when the nozzle attachment 104 is removed and optionally replaced with another nozzle attachment 104, or to use the hair dryer 10 without a nozzle attachment 104, a port on the replacement nozzle attachment or the body 12 may become the outlet port 36. Accordingly, different shaped outlets may be provided by using an attachment or using an alternate attachment. Accordingly, the speed of the jet of air may be changed by using a different attachment.

The outlet opening 106 used to produce a jet of high-velocity air 102 may have an opening width 108 between 1 inch and 6 inches, or between 2 inches and 5 inches or between 3 inches and 4 inches. The outlet opening 106 used to produce a jet of air 102 may have an opening height 110 of between 0.05 inches and 0.45 inches, or between 0.15 inches and 0.3 inches or between 0.2 inches and 0.25 inches. For example, a volumetric flow of 45 cfm to 50 cfm through an outlet opening 106 of 3 inches in width 108 and 0.2 inches in height 110 has been found by the inventors to be effective.

Figure 1:
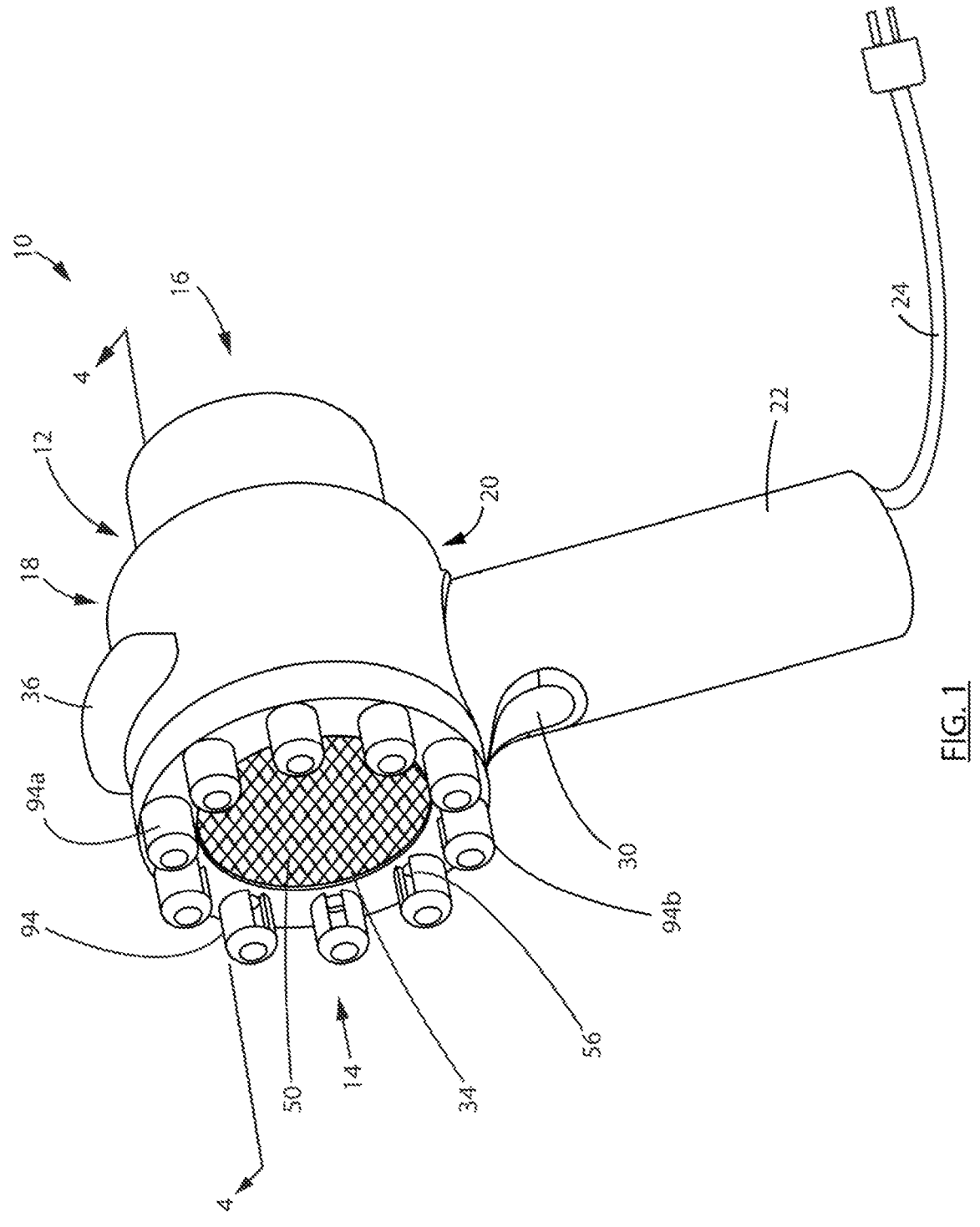
FIG. 1 is a side front perspective view of a hair dryer according to a first embodiment.
Figure 2:
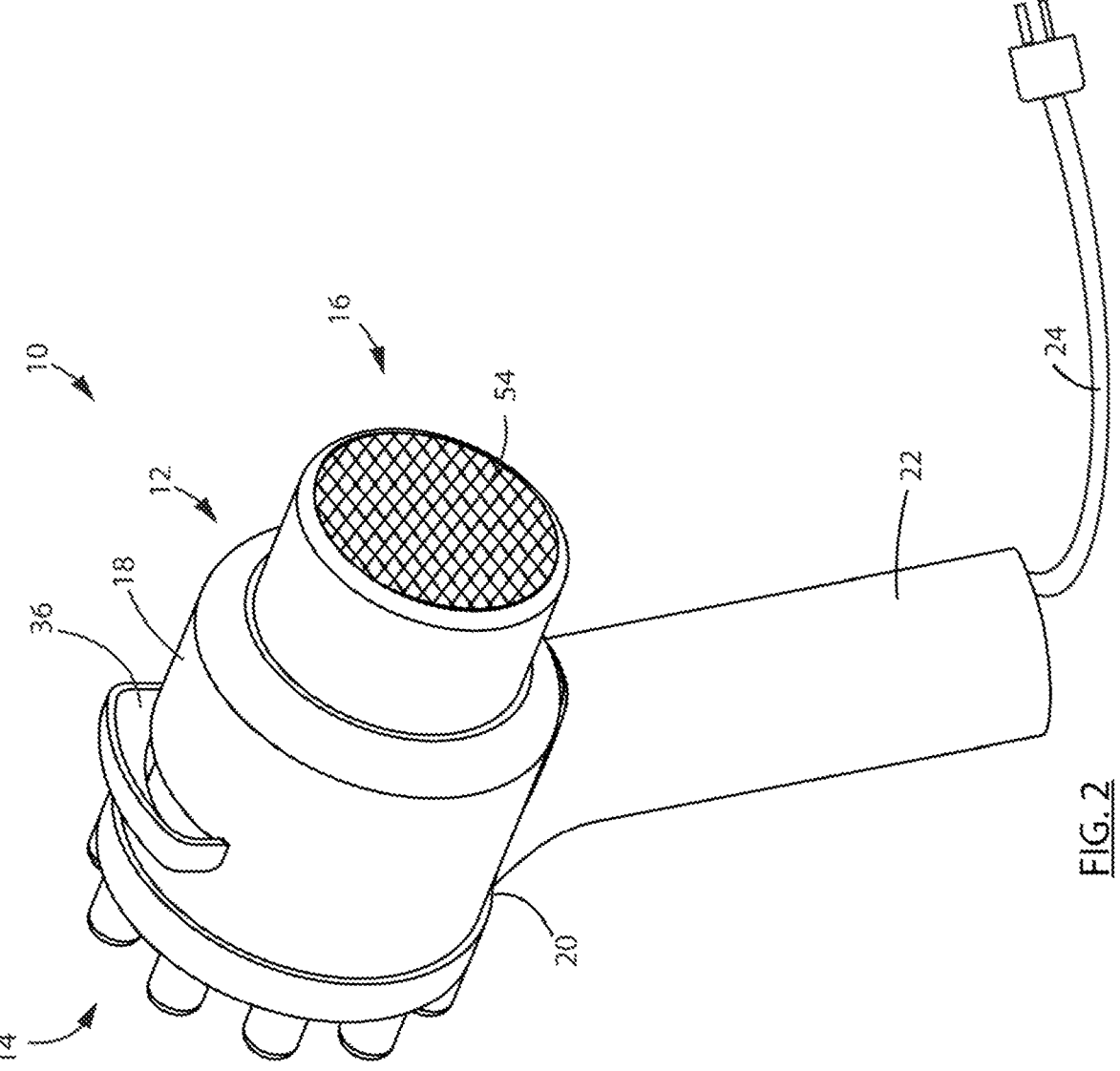
FIG. 2 is a rear perspective view of the hair dryer of FIG. 1.
Figure 3:
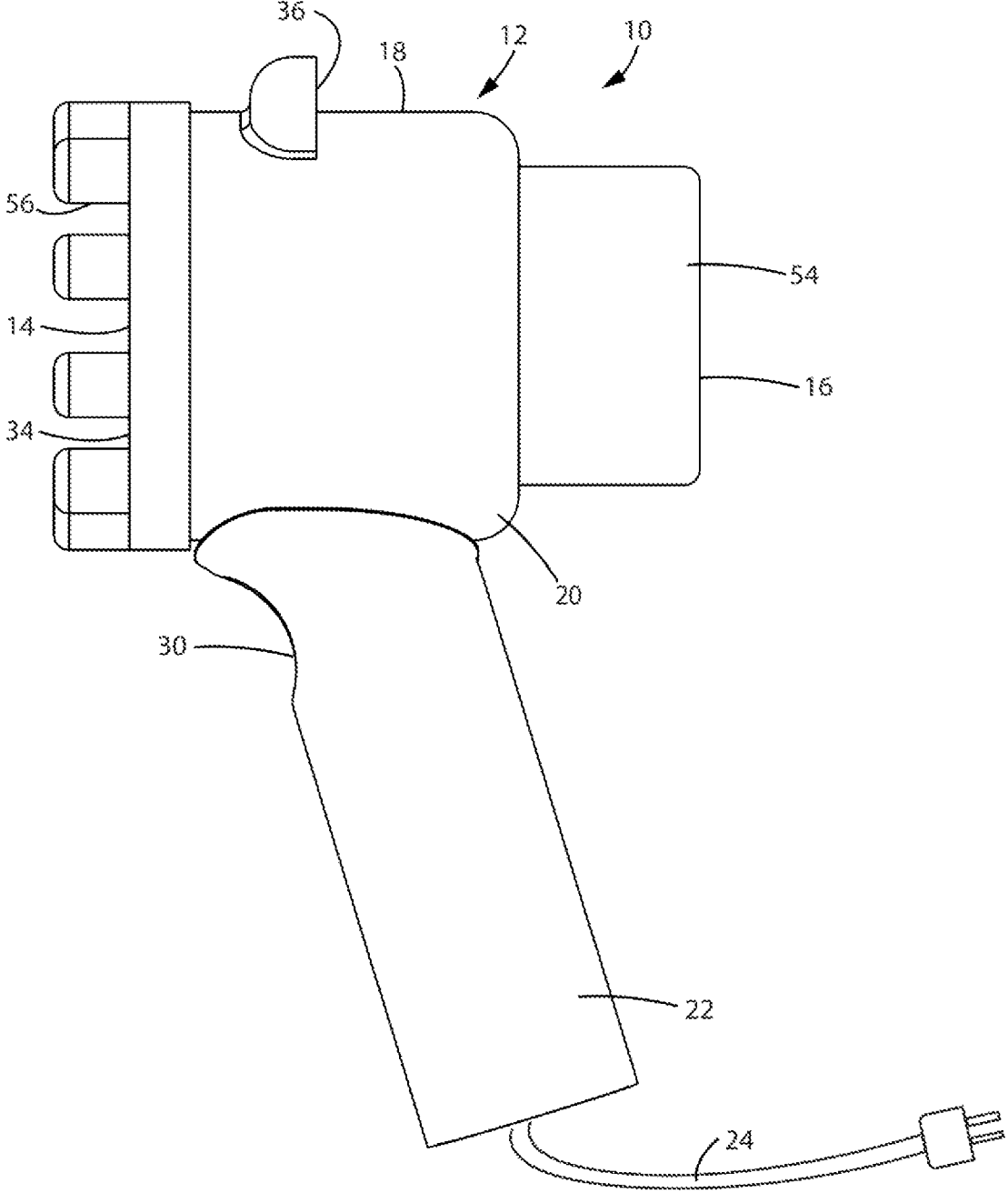
FIG. 3 is a side plan view of the hair dryer of FIG. 1.

Alternately, as exemplified in FIG. 1, the jets may be part of the main body of the hair dryer, e.g., they may be integrally formed as part of the body 12. As exemplified in FIG. 1, the air outlet 56 comprises a plurality of outlets each of which may produce a jet of air. As shown therein, the outlet 56 comprises a plurality of narrow slots. Forming a narrow slot will produce an increase in the air flow velocity.

As exemplified in FIG. 1, the jets may be the outlet of the secondary air flow path 52. Therefore, the secondary air flow path 52 may be used in the first mode of operation as a high velocity jet (which may be heated) and in the second mode of operation as heated air at a lower velocity that is suitable for blow drying, e.g., a velocity of up to 40 or 50 mph, such as to a velocity of 4 to 35 mph.

To switch between blow drying and producing a jet of air 102 having a velocity of at least 70, 80, 90, 100 or 110 mph, a user may reconfigure the hair dryer 10. For example, the user may change the rate of rotation of the motor 40, such as to increase the rate of rotation of the motor to increase the velocity of the air generated. Alternately or in addition, the user may also change the size and/or shape and/or number of the outlet openings 106 thereby adjusting the cross-sectional flow area of the outlet 56.

To change the size and/or shape of the outlet opening 106, the user may add and/or exchange a nozzle attachment 104. For example, the user may replace a nozzle attachment 104 having a narrow outlet opening 106 with one having a larger, wider outlet opening 106 to decrease the velocity of the air.

A hair dryer 10 may also have an outlet opening 106 of adjustable size. A user may change the area of the outlet opening 106 without replacing or adding a nozzle attachment 104 by changing the size of the outlet aperture, such as by using an adjustable iris. For example, hair dryer 10 of FIGS. 29 to 34 has an outlet opening 106 that may be narrowed by moving blades 114 or an adjustable iris across the outlet opening 106 and widened by retracting the blades 114 from the outlet opening 106. A handle or slider 116 and gear assembly 118 guides the movement of the blades and allows the user to adjust the positions of the blades 114.

Similarly, a user may adjust the position of a first plate having one or more apertures relative to a second plate to adjust the minimum cross-sectional area. As in the example of FIGS. 35 to 37, a user may position a first plate 340 with apertures 342 of the first plate 340 substantially aligned with apertures 344 of an adjacent second plate 346 (FIG. 36) to maximize a cross sectional area of the air flow path 31 through the adjacent plates 240, 246 (e.g., to maximize the cross-sectional area through the outlet opening 106). Alternatively, a user may position the first plate 340 with apertures 242 substantially dis-aligned with the apertures 344 of the adjacent second plate 246 (FIG. 37) to minimize the cross-sectional area of the air flow path 31 through the adjacent plates 240, 246 (e.g., to minimize the cross-sectional area through the outlet opening 106). The user may be prevented from fully closing the air flow path 31, e.g., if each plate 240, 246 has limited rotational movement within a corresponding track of the hair dryer 10.

An optional heating element, such as heating element 70, which may be referred to as a heater and is exemplified as a cartridge heater 280 subsequently, may be positioned adjacent the outlet opening 106 used to produce a jet of air 102. Accordingly, the jet of air 102 may optionally be heated. As exemplified in FIG. 28, a heating element 70 may be provided upstream of an outlet port, such as outlet port 36 of primary air flow path 32. Accordingly, heating element 70 may be used to heat air as it exits the outlet port 36 to provide heated air to hair.

Optionally, if the hair dryer is a one sided hair dryer as exemplified in FIG. 1, the outlets 56 may extend forwardly from an inlet 34 of the primary air flow path 32 of hair dryer 10. Accordingly, outlets 56 may be provided on fingers 94. Fingers 94 extend outwardly from inlet 34 of hair dryer 10 and may penetrate the hair of a person that is being dried, similar to the tines of a comb or the bristles of a brush.

While the embodiment of FIG. 27 exemplifies a jet of air that is directed away from the hair drier in an axial direction (in the direction of the axis of rotation of motor 40), alternately, or in addition, one or more air jets may be directed laterally towards one or more laterally opposed air jets. As exemplified in FIG. 1, outlets 56 are arranged in an annular band around inlet 34. Accordingly, outlets 56 face inwardly towards opposed outlets 56. For example, outlet 56 on finger 94a faces directly towards outlet 56 on opposed finger 94b. It will be appreciated that, in an alternate embodiment, two or more pairs of opposed jets may be provided. For example, two opposed rows of outlets may be provided wherein at least some, and optionally each, outlet in one row faces an outlet of the other row so as to form a plurality of pairs of opposed outlets. Each outlet of a pair of opposed outlets produces a jet that is directed at the opposed outlet.

As exemplified in FIGS. 38-40, teeth 124 are hollow, and the outlet ports of the hair dryer 10 are provided on the teeth 124. The outlet ports 36 of the primary airflow path 32 are provided on the teeth 124, and each outlet port 36 directs a jet of air 102 laterally. The air of the 102 may each have a velocity of at least 70, 80, 90, 100 or 110 mph when the air contacts the hair and may be directed at hair adjacent an opposed outlet port 36. As such, the outlet ports 36 may be provided in lateral walls 126 of the hollow projections 124 and may direct the jets of air 102 laterally. The hollow projections 124 may have inner lateral walls 128 that face adjacent hollow projections 124 and outer lateral walls 130 that do not face adjacent hollow projections 124. The outlet ports 36 may also be in the inner lateral walls 128. Accordingly, the jets of air 102 may be directed into the spaces 132 between the hollow projections 124, such as to reduce the chance of hair being blown away from the restraint member 120.

It will be appreciated that, alternately, or in addition, the jets of air may be provided during the first mode of operation. Accordingly, the jets of air may be directed laterally or towards the inlet of the dryer 10. For example, in one embodiment, one or more air jets may be directed from outlet 56 towards inlet 34 (e.g., towards the suction source). Accordingly, for example, the outlets in FIG. 8 may face inwardly at an angle to the vertical so as to direct the jets laterally at an angle towards inlet 34 or directly towards inlet 34.

It will be appreciated that if the jets are sufficiently strong, the jets may drive the hair being dried against the screen 50. In such a case, an air moving member that produces suction may not be required or such an air moving member (e.g., motor and fan blade assembly 38) may act with the jets to draw the hair being dried against screen 50. According to this embodiment, a combination of hair being drawn against screen 50 by suction and air, optionally hot air, being blown into the hair may enhance the rate of hair drying without having to excessively heat the hair.

FIG. 120 exemplifies the use of lower velocity air that is used in combination with suction. As exemplified therein, an annular inlet port 54 is used in the first mode of operation to direct air, which may be heated by heating elements 70, towards the hair being dried. The air may be heated to a temperature of up to 40° C., 50° C., 60° C., 70° C. or 75° C. It will be appreciated that inlet port 54 need not be annular but may be a one or a plurality of ports, which may be positioned around air inlet 34. As exemplified, inlet port 54 is vertically aligned with the inlet port 54. However, the inlet port 54 may be positioned longitudinally forward of the inlet port 34 as exemplified in FIG. 4, or longitudinally rearward of the inlet port 34.

Figures 126, 127:
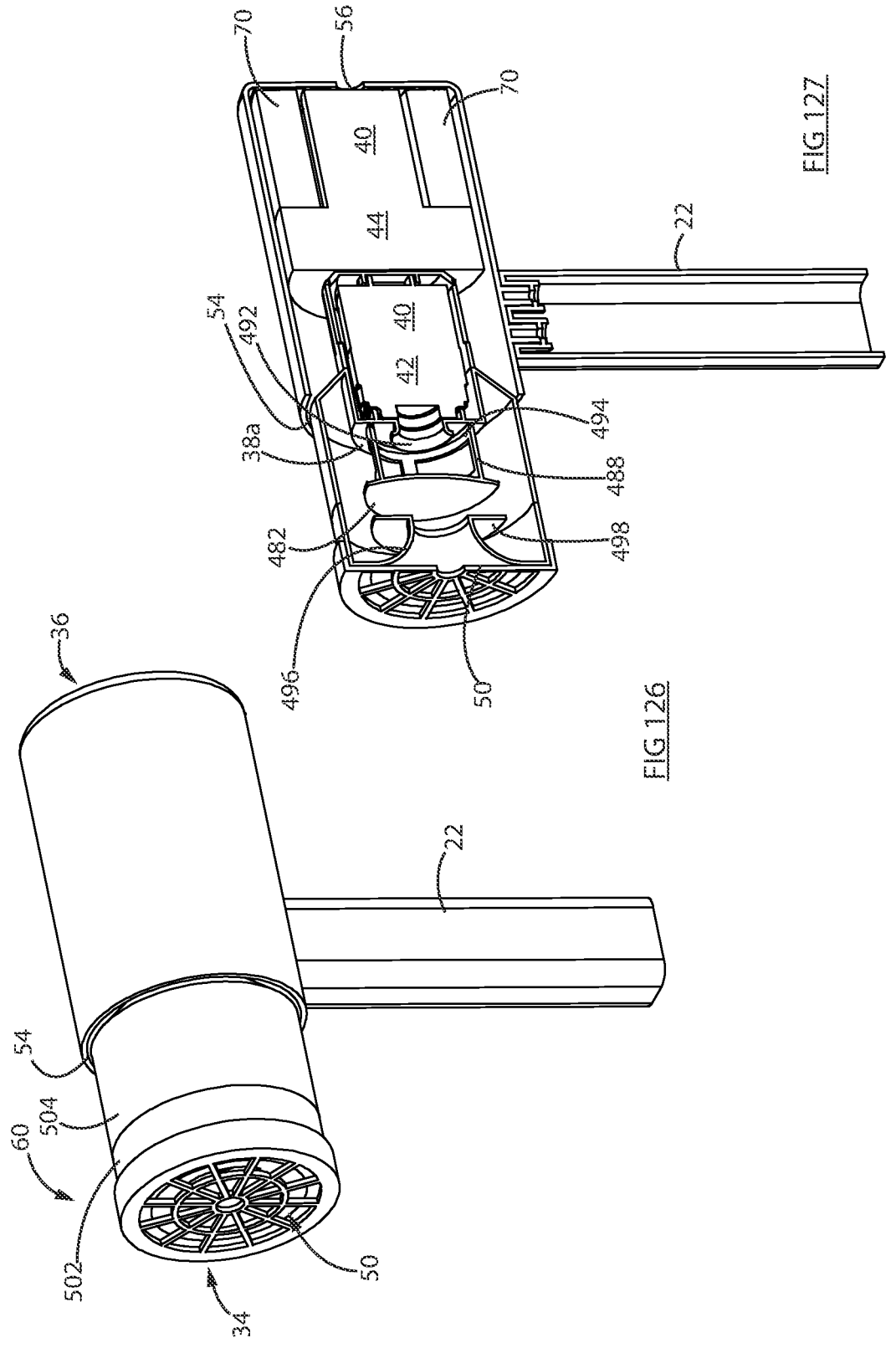
Figures 128, 129:
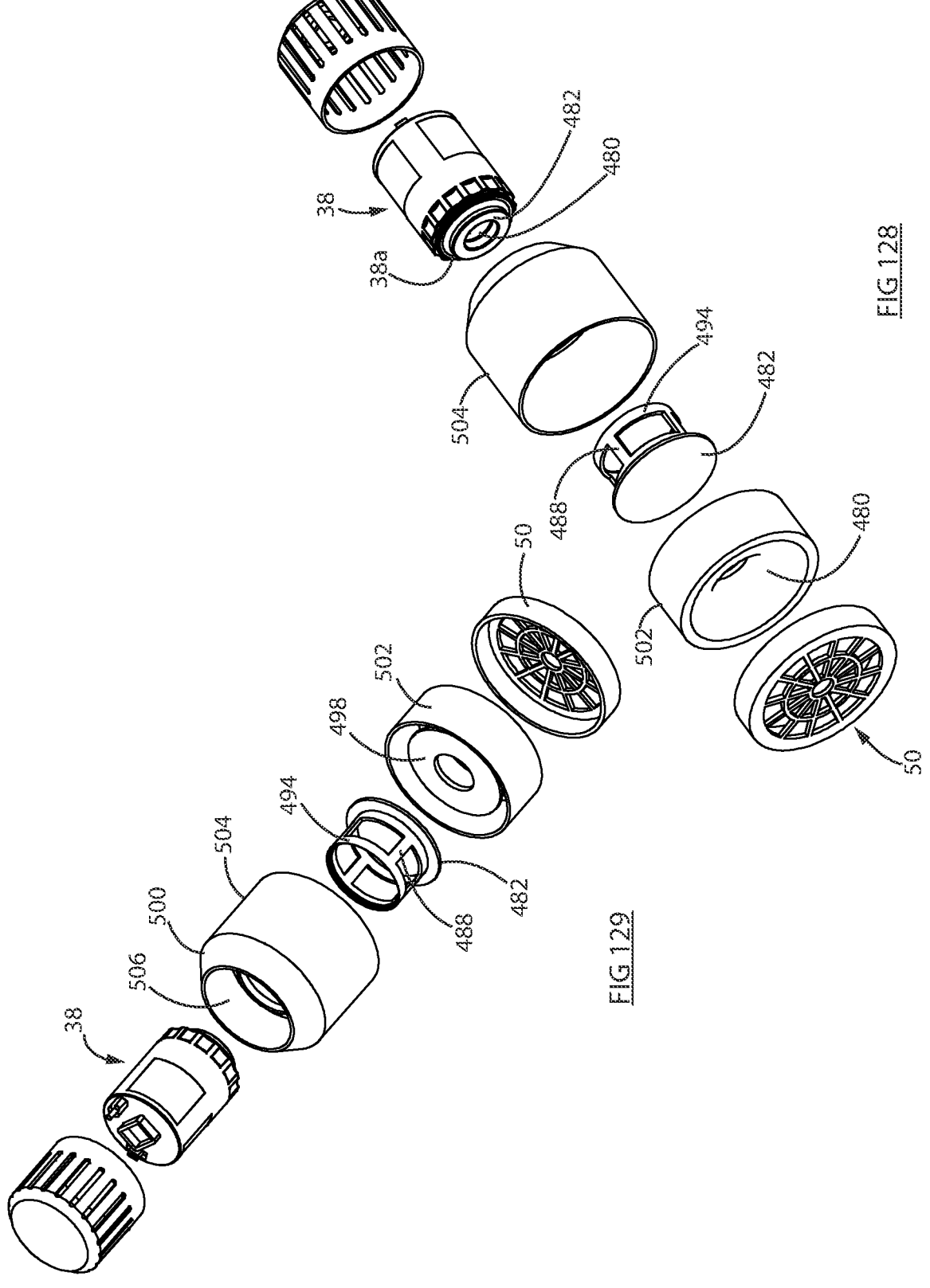

It will be appreciated that the inlet port may be at the front end of the hair dryer as exemplified in FIG. 120. Alternately, as exemplified in FIG. 126, the inlet port 54 may be recessed rearwardly from the front end. As discussed subsequently, in the embodiment of FIG. 126, the front end of the hair dryer may have a removable module that comprises or consists of a water separator 60. The inlet port 54 may be located rearward of some or all of the water separator 60 as exemplified in FIGS. 126, 127. This is advantageous, as an outer annular passage is not required around some or all of the water separator 60. Accordingly, in the first mode of operation, air may exit the inlet port 54 and travel forwardly to assist in drying hair that is adjacent the screen 50 of the inlet port 34.

Figure 121:
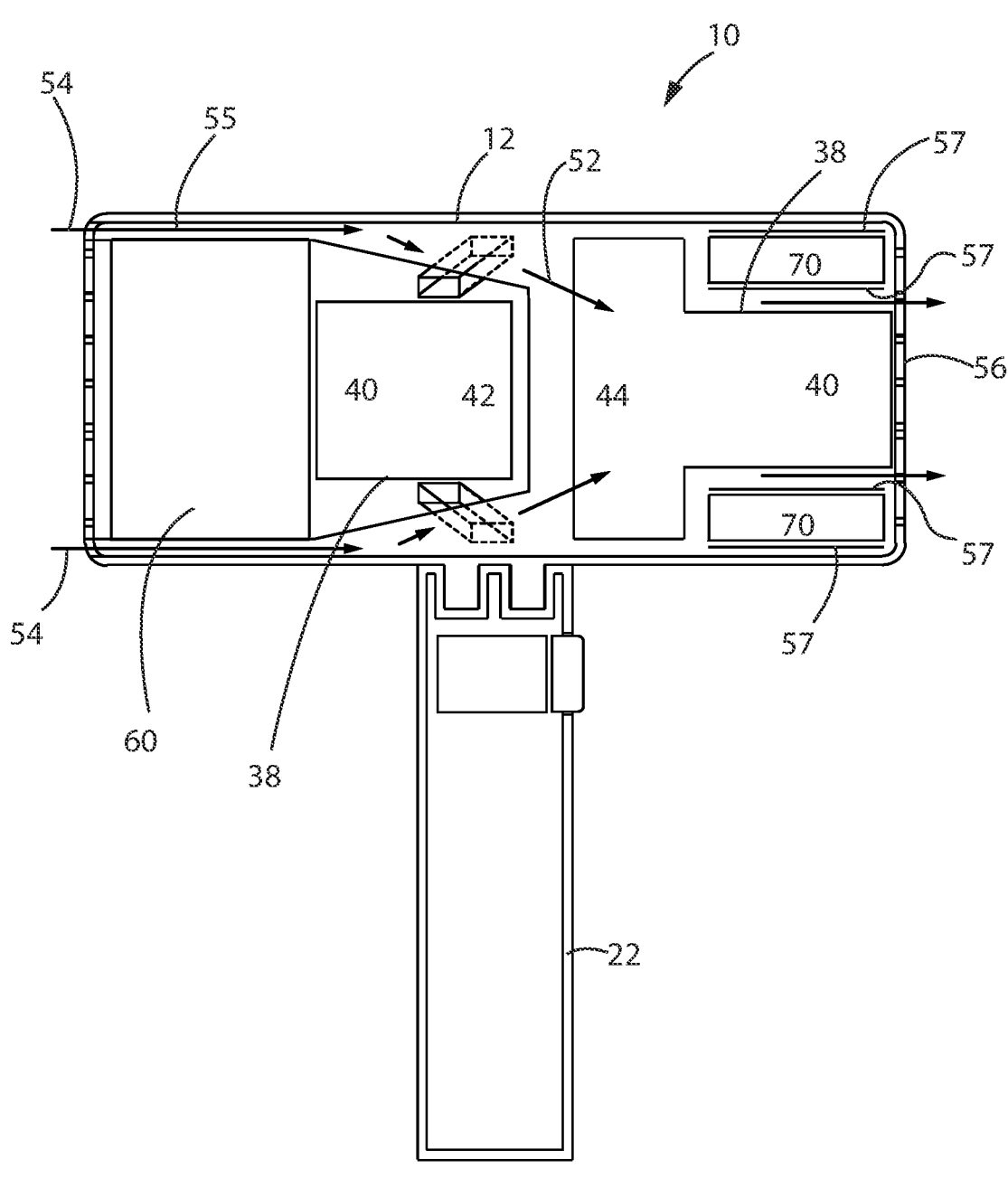

As shown in FIG. 121, in the second mode of operation a motor 40 and fan blade 44 is used to move air through the secondary air flow path 52. As discussed subsequently, in order to direct air out of inlet port 54 in the first mode of operation, fan blade 44 may be operated in reverse.

It will be appreciated therefore that heat may also be provided at all times that suction is applied to the hair and/or that a jet of air is applied to the hair or only part of the time (e.g., suction may be provided for a first period of time and, subsequently, heat may be provided while suction is applied).

Restraint Member

In accordance with this aspect, a restraint member may be used to maintain the hair adjacent the hair dryer 10. The restraint member may be used to maintain the hair adjacent the outlet opening of the hair dryer when a jet of air 102 with a velocity of, e.g., at least 70, 80, 90, 100 or 110 mph when the air contacts the hair, is directed from the outlet opening at the hair. Optionally, the restraint member may have one or more air outlets that produce the high velocity jet(s) of air. This aspect may be used by itself or in combination with one or more of the other aspects set out herein.

For example, if the jet of air 102 is applied to free hanging hair, a restraint member 120 may be used to maintain the hair adjacent the outlet port 36 of the hair dryer 10. For example, a restraint member 120 may be positioned across the hair from the outlet port 36 (opposed to and facing) to prevent the hair from being blown away from the outlet port 36 during operation. The restraint member 120 may be, for example, a bush, a comb, or a hand of the user. If the hair dryer 10 is redirected to move the jet of air 102, the restraint member 120 may be moved correspondingly. For example, the user may hold the hair dryer 10 adjacent the hair with one hand and position the other hand on the other side of the hair across from the hair dryer 10, and then move the hair dryer 10 in downward sweeps from a position below the chin to the tips of the hair, with their hand mirroring the movement of the hair dryer 10.

The restraint member may be a separate from the hair dryer 10, as with a user's hand or a separate comb or brush. However, the restraint member may also be attached to the hair dryer 10 and/or the restraint member may be part of the hair dryer 10. For example, as exemplified in FIGS. 1 and 38-40, the restraint member may include one or more hollow projections extending away from the hair dryer 10 to carry the air away from the hair dryer 10. The hollow projections may be teeth of a brush or comb attachment 120.

Drying Using Heat

In accordance with this aspect, hair dryer 10 may be operable in a second mode wherein water is removed from hair by directing heated heat, such as heated air and/or IR radiation at the hair being dried. This mode may be used by a user after the user has operated the hair dryer in the first mode of operation. This aspect may be used by itself or in combination with one or more of the other aspects set out herein.

An advantage of this aspect is that less power is required to remove water using heat as some water has been removed, such as by using sub-atmospheric pressure and/or a jet of air. Further the use of less heat or a lower temperature of heat will reduce the damage to hair that occurs during the use of a conventional hair dryer.

In accordance with this aspect, heated air may be supplied by air exiting the outlet port 56 of the secondary air flow path 52 (see for example FIGS. 4, 8 and 121) or air exiting the outlet port 36 of the primary air flow path 32 (see for example FIGS. 18, 19 and 23-25) or, as discussed subsequently, an IR heating element may direct heat at the hair being dried.

If the hair dryer has a suction inlet 34 at one end of the hair dryer and a heated air outlet 56 at a longitudinally opposed end of a hair dryer as exemplified in FIGS. 120, 121, then a user may be able to switch from the first mode of operation to the second mode of operation by, e.g., flipping the hair dry from an orientation in which the inlet 34 faces the hair that is being dried to an orientation in which the outlet 56 faces the hair to be dried. Concurrently, the user may release an actuator that initiates the first mode of operation and the user may press an actuator that initiates the second mode of operation. Alternately, the hair drier may have an actuator with three positions, namely off, actuate the first mode of operation and actuate the second mode of operation. Alternately, the hair dryer may sense which end is directed to the hair being dried and, when the actuator is pressed, the hair dryer will actuate the appropriate mode of operation.

Figure 48:
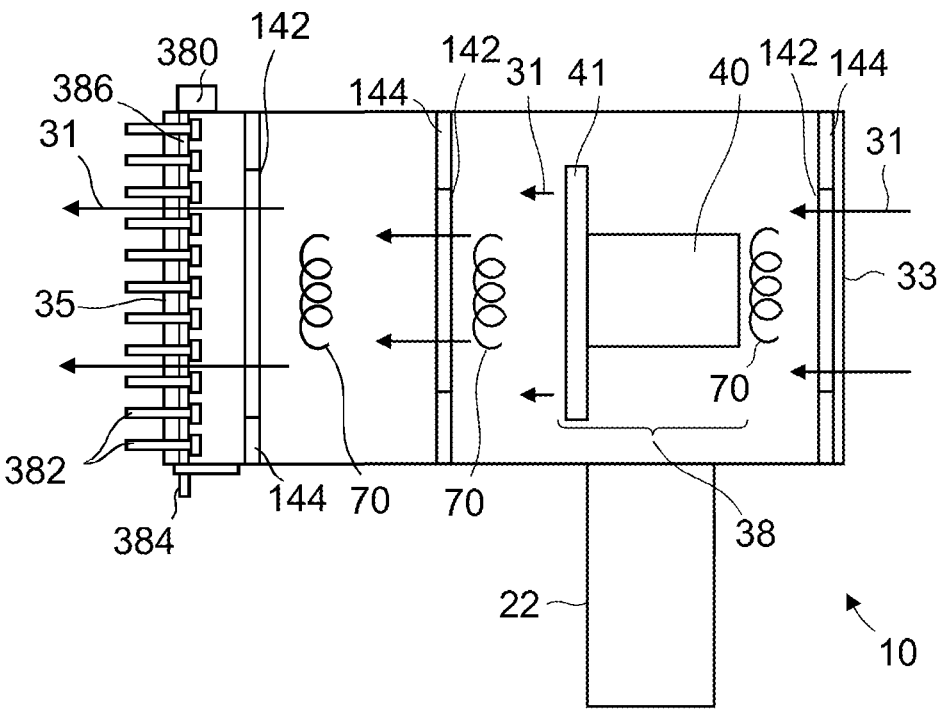
FIG. 48 is a cross-sectional view of a further alternate embodiment of the hair dryer having multiple adjustable apertures.

As exemplified in FIG. 48, one or more heating elements 70 may be upstream, downstream, or both upstream and downstream of an air moving unit.

Figure 8:
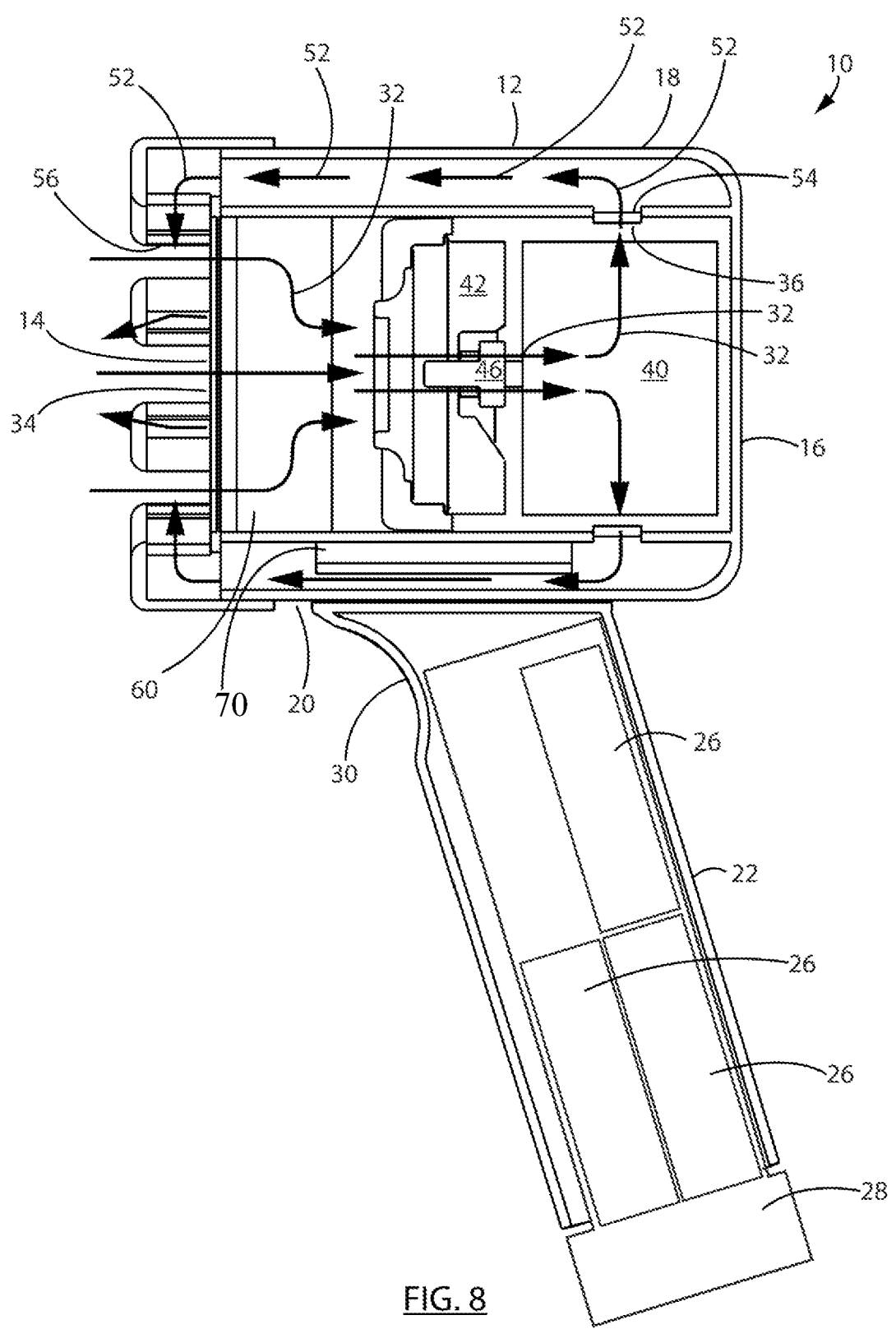
FIG. 8 is a cross-sectional view along the line 8-8 in FIG. 5.

As exemplified in FIGS. 4 and 8, one or more heating elements 70 may be provided in secondary air flow path.

Heating element 70 may be any heating element 70 that can heat air flowing through secondary air flow path 52 and/or it may be an IR heating element. For example, heating element 70 may be a resistive heater and/or an infrared heating element.

The heating element may be powered by an on board power supply e.g., batteries, to resistively heat the heating element or a combustible fuel (e.g., hydrogen or propane) to produce combustion that heats the heating element 70 or the air directly. Alternately, if hair dryer 10 is corded, heating element 70 may be a resistively heated member that is powered by household current.

It will be appreciated that the heating element may be internal the secondary air flow path 52, it may be external to the secondary air flow path 52 so as to heat the conduit through which the air flows, it may be internal primary air flow path 32, optionally downstream of the motor 40 or it may be external the primary or secondary air flow path 32, 52 so as to heat the conduit through which the air flows, optionally downstream of motor 40.

Optionally, an infrared heating element may heat an infrared-absorbing target 190 (e.g., an element that absorbs infrared radiation). In such a case the infrared-absorbing target 190 and optionally the infrared heating element may be provided in the air flow path.

Optionally, if the secondary air flow path is annular or substantially annular (e.g., it extends around part or all of the outer perimeter of the inlet passage downstream from inlet port 42), then the heating element 70 may be one or more elements extending circumferentially around the inlet passage and optionally the motor and fan assembly 38 as exemplified in FIGS. 113-116. The heating elements may be a continuous annular or partially annular member, or it may comprise a plurality of circumferentially spaced apart heating Heating element 70 may be separately actuatable or it may be actuated when motor 40 is energized. Heating element 70 may also be operable to provided increased or decreased heat automatically in response to a temperature of the hair dryer 10 and/or hair and/or outlet temperature of air at an outlet 35 of the air flow path 31, as described further elsewhere herein. For example, heating element 70 may be operable to provide increased heat automatically in response to a sensed decrease in the outlet temperature of air at the outlet 35.

Alternately, or in addition, the air may be heated by passing over motor 38 or otherwise cooling motor 40. Accordingly, a separate heating element 70 may not be provided.

Temperature Limit

In accordance with this aspect, hair dryer 10 may be operated to limit the temperature of air used to dry hair and/or the temperature of hair dried by the hair dryer 10. For example, once hair has been partially dried by using suction and/or a jet of air (the first drying mode), heated air, which may be at a lower temperature than conventional hair dryers, may be used to blow dry the partially dried hair. Alternately, or in addition, heat may be directed at the hair, such and by an IR heating element optionally with air being directed at the hair. This aspect may be used by itself or in combination with one or more of the other aspects set out herein.

In accordance with this aspect, the amount and delivery of heat may be adjusted to prevent hair being heated to more than 75° C., 70° C., 60° C. or 50° C. For example, one or more of the temperature of the heated air, the air flow rate and the amount of IR heat emitted may be adjusted.

A hair dryer 10 may include a sensor operable to monitor at a location (e.g., at the air outlet port) a temperature of the air that is produced by the hair dryer and/or a temperature of a portion of the hair of the person at which the air and heat are directed. A controller may be operable to adjust an operating parameter of the hair dryer 10 when the sensor issues a signal indicative of the temperature of the air at the location and/or the temperature of the portion of the hair being outside a predetermined temperature range whereby, after issuance of the signal, the fan and motor assembly 38 continues to operate and the temperature of the air at the location and/or the temperature of the portion of the hair is adjusted to be within the predetermined range.

Adjusting the operating parameter may include one or more of reducing power provided to the heater, increasing a velocity of the air flow passing over the heating element such as by increasing a speed of rotation of the fan, increasing a volume of the air flow exiting the air outlet port per second such as by adding bleed air which bypassing the heating element or increasing a cross-sectional flow area of at least one adjustable aperture in the air flow path.

In the first operating mode, the predetermined temperature range may have a maximum temperature 75° C., 70° C., 60° C. or 50° C. In a second operating mode, the hair dryer 10 may be operable to periodically or selectively increase the temperature of the air at the location and/or the temperature of the hair up to 120° C., such as if a user needs to set a curl.

Optionally, the hair dryer 10 may also include a signaling member (e.g., a light or speaker or vibration member). The signaling member may issue a signal (e.g., the light turns on or the speaker generates a noise of the handle 22 vibrates) to a user when the temperature of the air at the location in the airflow path and/or the temperature of the portion of the hair exceeds the predetermined temperature.

Figure 20:
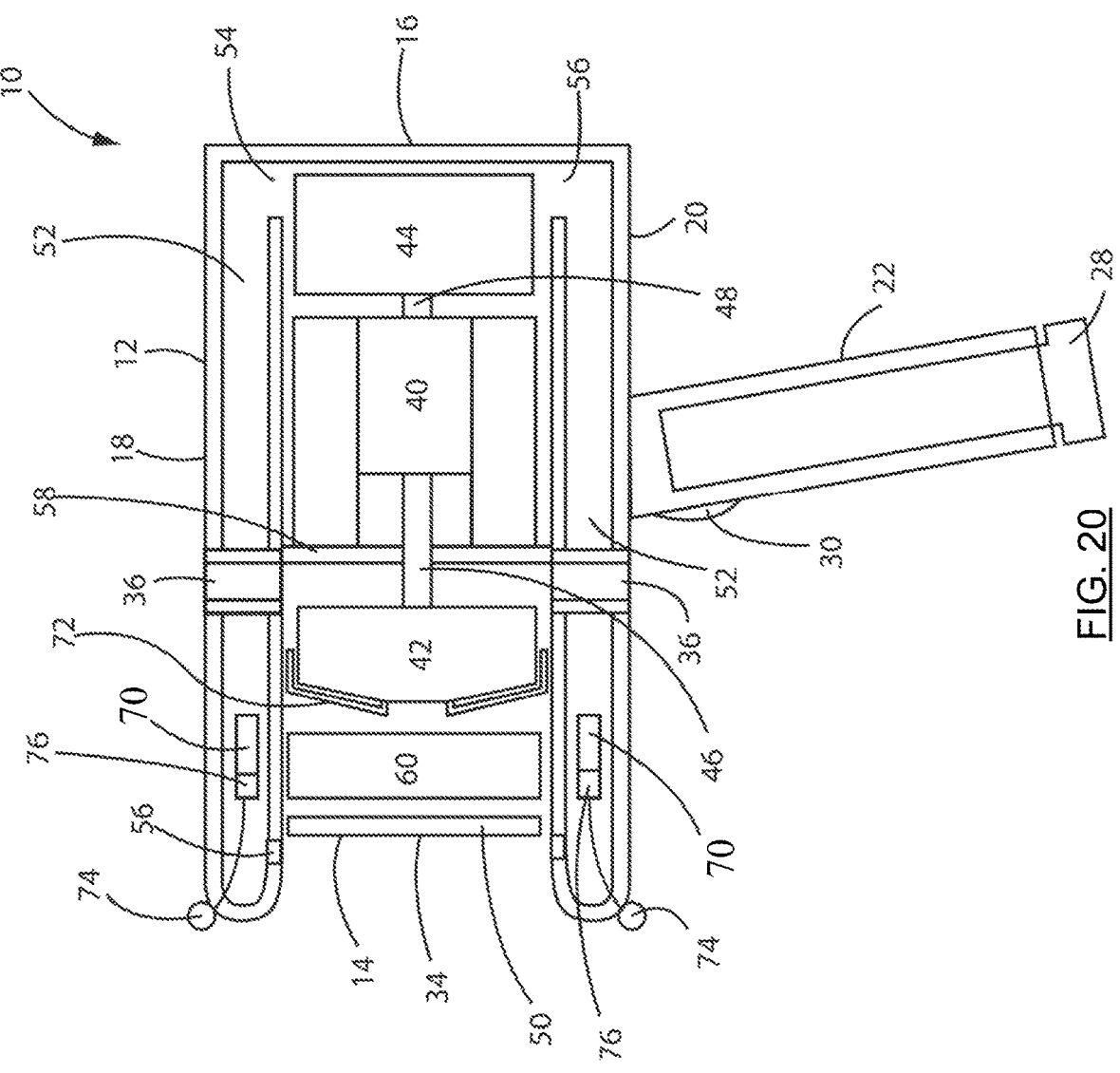
FIG. 20 is a cross-sectional view of a further alternate embodiment of the hair dryer having a motor and fan blade assembly that comprises two opposed fan blades.

For example, as exemplified in FIG. 20, hair dryer 10 may have a sensor 74 (see also sensor 168 in FIG. 54) to monitor the temperature of hair being dried. For example, a thermal sensor and/or thermal camera may be provided, e.g., adjacent outlet port 56, to monitor the temperature of hair being dried. As or once the temperature reaches a predetermined or pre-set value, about 50° C., about 60° C., about 70° C. or about 75° C., sensor 74 may send a signal to control system 76 (e.g. a controller) which, e.g., reduces the temperature of the air being used to blow dry hair (e.g., reducing the power provided to heating element 70) and/or reduce the velocity of the heated air being used to blow dry hair and/or increasing the velocity of the air being used to blow dry hair by adding bleed air.

Alternately, or in addition, hair dryer 10 may have a sensor to monitor the temperature of air being used to blow dry hair. For example, a thermal sensor may be provided, e.g., in secondary air flow path 52, to monitor the temperature of air in secondary air flow path 52. As or once the temperature reaches a predetermined or pre-set value, about 50° C., about 60° C., about 70° C. or about 75° C., a sensor may send a signal to control system e.g. a controller) which, e.g., reduces the temperature of the air being used to blow dry hair (e.g., reducing the power provided to heating element 70) and/or reduce the flow rate of the heated air being used to blow dry hair and/or increasing the velocity of the air being used to blow dry hair by adding bleed air.

Multiple Air Flow Paths

In accordance with this aspect, and as discussed previously, the hair dryer 10 includes more than one air flow path 31, e.g., a primary air flow path 32 and a secondary air flow path 52. Each air flow path may be used for a different operating mode of the hair dryer. For example, the first operating mode may be used to dry hair without water being subjected or substantially subjected to a phase change. Accordingly, the first operating mode may dry the hair by withdrawing water from the hair (drawing water out of the hair and into the hair dryer) and/or by directing a high velocity jet of air at or into the hair using the primary air flow path 32. Subsequently, heat may be applied to the hair, such as by blowing heated air at the hair and/or blowing air while directing IR heat at the hair using the secondary air flow path 52. The air flow rate in the primary air flow path 32 may be less than the air flow rate in the secondary air flow path 52 (e.g., a higher air flow rate may be needed for a blow drying mode than for a suction mode), as described further subsequently. This aspect may be used by itself or in combination with one or more of the other aspects set out herein.

As exemplified in FIGS. 1-8, 109, 110, 120 and 121, hair dryer 10 has a primary air flow path 32 that extends from an inlet port 34 to an outlet port 36 and a secondary air flow path 52 that extends from an inlet port 54 to an outlet port 56. The primary air flow path 32 may be used in the first mode of operation to dry hair and the secondary air flow path 52 may be used in the subsequent second mode of operation to dry the hair using heat. In some uses, the hair dryer 10 may be used in a first mode for less than five minutes, such as one to 5 minutes, or 1-3 minutes. Accordingly, in the first mode, the hair dryer may be used for up to 1, 2, 3, 4 or 5 minutes, The hair dryer 10 may be used in a second mode for less than 15 minutes, such as 3 to 15 minutes, 3 to 10 minutes, or 3 to 8 minutes.

Various configurations for the primary and secondary air flow paths 32, 52 may be used. The primary air flow path 32 may extend from an exterior inlet port 34. The secondary air flow path 52 may extend to an exterior outlet port 56 (see for example FIG. 110). The primary and secondary air flow paths 32, 52 may be isolated from each other as in the embodiment of FIGS. 1-4. Alternately as discussed previously, the secondary air flow path 52 may be an extension of the primary air flow path 32 so as to form a continuous joined air flow path 31 if some or all of the air in the primary air flow path is redirected to the front of the hair dryer 10 (see for example the embodiment of FIGS. 5-8).

Since a greater volumetric air flow rate may be needed for blow drying than for suction and/or using high-velocity air to drive water from hair, the volumetric air flow rate in the primary air flow path 32 may be less than the volumetric air flow rate in the secondary air flow path 52. The difference in volumetric air flow rates may be maintained by, e.g., the use of bypass valves, separate air flow paths, etc., such as disclosed elsewhere herein.

Primary Air Flow Path

In the first operating mode, a primary air flow path 32 may be provided for the air which is drawn into the hair dryer during the first mode of operation. Air may flow in a single direction through primary air flow path 32 e.g., from the front end 14 towards the rear end 16 so as to exit, e.g., midway along the length of the hair dryer as exemplified in FIG. 4 or to rear end 16 as exemplified in FIG. 9. In FIG. 4, reference numerals 32 point to arrows that show the air flowing through the primary air flow path. Accordingly, reference numeral 32 is used to designate the primary air flow path. Primary air flow path 32 may be of any design that draws air into the hair dryer, and which may subsequently exhaust the air through an outlet port 36.

It will be appreciated that outlet port 36 may be provided at any location and may direct air in any direction. The air travelling through the primary air flow path may be exhausted from hair dryer 10 in a direction such that the exhausted air is not directed back towards the hair being dried. Accordingly, outlet port 36 may direct air rearwardly and/or upwardly (see for example FIGS. 4, 9 and 18).

Alternately, some or all of the air travelling through primary air flow path 32 may be directed back towards the hair being dried. In such a case, air from the primary air flow path 32 that is redirected at the hair being dried may form some or all of the air in a secondary air flow path 52 (see for example FIG. 8).

An air moving member (e.g., motor and fan assembly 38) is provided to draw air into primary air flow path 32. It will be appreciated that each of primary air flow path 32 and secondary air flow path 52 may have its own motor and fan assembly 38 provided therein (see for example FIGS. 120, 121). Alternately, two motor and fan assemblies 38 may be used to move air through a joined primary and secondary air flow path (see for example FIG. 111). Alternately, a single motor and fan assembly 38 may be used to move air through each of the primary and secondary air flow paths (see for example FIG. 8). Alternately, a single motor 40 and two fan blades 42, 22 may be used to move air through each of the primary and secondary air flow paths (see for example FIGS. 4 and 112).

Water entrained in air drawn into the hair dryer during the first operating mode may damage the motor 40. Accordingly, the air flow path 32 may be configured to reduce or prevent air drawn into the hair dryer during the first mode of operation travelling past motor 40 and/or to remove water from the air prior to the air traveling over the motor 40.

As exemplified in FIGS. 4 and 20 the air moving member is configured to inhibit or prevent water passing over the motor 40. As exemplified in FIGS. 4 and 20, first fan blade 42 may be a by-pass fan. Such a fan blade is configured to draw air through primary air flow path 32 without the air passing over motor 40. Accordingly, motor 40 may be positioned exterior to primary air flow path 32, e.g., motor 40 may be positioned in a motor housing that is sealed or essentially sealed from primary air flow path 32. As exemplified in FIG. 4, a bulkhead wall 58 is positioned in front of motor 40 and axle 46 extends from motor 40 through bulkhead wall 58 to first fan blade 42. A bearing may be provided in the opening of bulkhead wall 58 through which axle 46 extends. Accordingly, in operation, motor 40 causes fan blade 42 to spin and draw air in through inlet port 34, to and past fan blade 42 and out through outlet port 36. As exemplified in FIGS. 1-4, a single outlet port 36 may be provided, such as on the top end of the main body 12. Alternately, as exemplified in FIG. 20, two or more outlet ports 36 may be provided. Optionally the outlet ports direct air away from the hair being dried, such as rearward as exemplified in FIG. 4.

Alternately or in addition, as exemplified in FIG. 8, some or all of the water is removed to reduce or prevent water being present in air that passes over the motor 40. As exemplified in FIG. 8, a water separator 60, which is discussed subsequently, is provided in primary air flow path 32 upstream of motor 40.

Secondary Air Flow Path

A secondary air flow path 52 may be provided for the second mode of operation (the blow dry mode). As the first and second operating modes differ, the air flow path for each mode may also differ. Air may flow in a single direction through secondary air flow path 52 e.g., from the rear end 16 or a rearward portion of hair dryer 10 to the front end 14. As mentioned previously, some or all of the air travelling through the primary air flow path 32 may be directed back towards the hair being dried via the secondary air flow path 52. Such an embodiment is exemplified in FIGS. 9, 10, 99 and 100.

In FIG. 9, reference numerals 52 point to arrows that show the air flowing through the secondary air flow path. Accordingly, reference numeral 52 is used to designate the secondary air flow path. Secondary air flow path 52 may be of any design that exhausts air towards hair that is being dried. The air travelling through the secondary air flow path may be exhausted from hair dryer 10 in a direction such that the exhausted air is directed towards the hair being dried.

It will be appreciated that inlet port 54 for secondary air flow path 52 may be provided at any location. Accordingly, for example, inlet port 54 may be a port on the exterior of hair dryer 10 or which draws air from the ambient into hair dryer 10 and into secondary air flow path 52 (see for example FIGS. 120, 121). It will be appreciated that if some or all of the air travelling through primary air flow path 32 is directed back towards the hair being dried through secondary air flow path 52 as exemplified in FIGS. 9, 10, 99 and 100, then outlet port 36 of primary air flow path 32 may be inlet port which allows ambient air to enter the hair dryer for the secondary air flow path 52 and the inlet port 54 may be provided at an internal location in the hair dryer 10. Accordingly, as exemplified in FIG. 9, air enters hair dryer 10 through inlet port 34 provided at front end 14 and travels rearwardly through water collection member 60 to motor and fan assembly 38 and then through outlet port 36 (which doubles as inlet port 54) and forwardly through secondary air flow path 52 to outlet ports 56 provided on front end 14.

Redirecting Member

In accordance with this aspect and as discussed previously, primary and secondary air flow paths 32, 52 may be connectable in air flow communication with each other so as to provide a continuous joined air flow path 31 for use in the second mode of operation. This aspect may be used by itself or in combination with one or more of the other aspects set out herein.

An advantage of this aspect is that the same end of the hair dryer may be used in each of the first and second operating modes instead of the user having to flip the hair dryer so different end faces the hair to be dried. For example, air may travel in a single direction through hair dryer 10 in the first operating mode (e.g., from front end 14 to or toward the rear end 16, see FIGS. 9 and 99) and accordingly, the primary air flow path may have a low back pressure. Further, as exemplified in FIGS. 8, 10 and 100 air may be redirected through hair dryer 10 when hair dryer 10 is in use in the second operating mode and therefore the same side of the hair dryer may be used for each operating mode.

In the embodiment of FIG. 8, the air flow path is fixed and after air reaches the rear end of the primary air flow path 32, the air is redirected forwardly by passing through an orifice in an internal sidewall into the secondary air flow path 52. Alternately, as exemplified in FIGS. 9, 10, 99 and 100 a redirecting member 62 is provided to reconfigure the air flow path. In the configuration of FIGS. 9 and 99, the redirecting member is open, and air may exit primary air flow path 32 via outlet port 36. In the configuration of FIGS. 10 and 100, the redirecting member 62 has been moved to close outlet port 36. Accordingly, air travelling through primary air flow path 32 is directed through an internal inlet port 54 into secondary air flow path 52. This embodiment is advantageous as a lower back pressure air flow path is provided for the first operating mode while the same end of the hair dryer is used for the first and second operating modes.

Optionally, it will be appreciated that redirecting member 62 may concurrently open the exit of primary air flow path 32 and close the entrance to secondary air flow path 52. As exemplified in FIGS. 9, 10, 99 and 100 redirecting member 62 is operable between a first open position in which an exit from primary air flow path 32 is open and the entrance (internal inlet port 54) to secondary air flow path is closed and a second closed position in which the exterior outlet 36 from the primary air flow path 32 is closed and the entrance (internal inlet port 54 which functions as the internal outlet of the primary air flow path 32) to the secondary air flow path 52 is opened.

The redirecting member 62, 410 may be any member that may be repositionable and/or reconfigurable to close off the primary air flow path 32 to cause some or all of the air to enter the secondary air flow path 52. For example, the redirecting member 62 may be an iris, a valve, sliding shutters having upper and lower portions 62a, 62b (see FIG. 9) or the like.

Alternate Fan Blade Design

In accordance with this aspect, if an air moving member has two fan blades, then a first fan blade may be configured to provide relatively more suction than a second fan blade and the second fan blade may be configured to provide relatively more air flow than the first fan blade. This aspect may be used by itself or in combination with one or more of the other aspects set out herein.

An advantage of this aspect is that each mode of operation may have a fan blade that is appropriate for that mode of operation. Accordingly, the fan blade used in the first mode of operation may be a fan blade which is selected based on the desired suction that is to be created. Similarly, the fan blade used in the second mode of operation may be a fan blade which is selected based on the desired air flow velocity that is to be created. As a result, when the hair dryer is operating in the first mode to draw air into the hair dryer, relatively more suction may be provided and when the hair dryer is being used in the second mode, relatively more air flow may be provided.

It will be appreciated that each fan blade may be driven by the same motor (see for example FIGS. 20 and 110) or each fan blade may be driven by a different motor (see for example FIG. 120).

FIG. 20 exemplifies an embodiment wherein two fan blades are provided, and which are driven by a common motor 40 and which are fixed in position with respect to a cowling surrounding the fan blade. As exemplified, the first fan blade 42 may be configured such that the fan blade is located proximate the cowling 72 of a motor and fan blade assembly air inlet. The second fan blade 44 may be configured such that the fan blade is located spaced from the cowling 72. Increasing the spacing between a cowling and the fan blade may increase the volumetric air flow produced by the fan blade and reduce the suction produced by the fan blade. Decreasing the spacing between a cowling and the fan blade may increase the suction produced by the fan blade and reduce the volumetric air flow produced by the fan blade. It will be appreciated that fan blade 44 may have a cowling 72 and may be spaced from such a cowling 44 by a greater distance than fan blade 42 is spaced from cowling 72.

In the embodiment of FIG. 20, each fan blade is in a different air flow path. The first fan blade 42 is positioned in primary air flow path 32 close to cowling 72 and the second fan blade 44 is positioned in secondary air flow path 52 spaced from motor 40 at rear end 16. Accordingly, the first fan blade 42 will produce more suction than the second fan blade 44. The additional suction assists in drawing moisture from hair into inlet port 34. Conversely, fan blade 44 will produce more air flow than fan blade 42. The higher air flow is beneficial when the hair dryer is used to blow dry hair.

Alternately, as discussed subsequently with respect to FIGS. 16 and 17, the position of a fan blade with respect to the cowling 72 may be adjustable. Adjusting the distance between the fan blade and the cowling may be used to adjust a motor and fan blade assembly 38 from one that produces high suction (see FIG. 16) to one that produces higher airflow and lower suction (See FIG. 17).

Alternately, as discussed subsequently with respect to FIGS. 120 and 121, an impeller may be provided in the primary air flow path 32 to provide suction and a propeller may be provided in the secondary air flow path 52 to provide air flow.

Variable Suction Fan Blade (Variable Gap Between the Fan Blade and a Cowling)

In accordance with this aspect, a motor and fan blade assembly may be reconfigurable to produce enhanced suction or enhanced air flow. This aspect may be used by itself or in combination with one or more of the other aspects set out herein. In particular, this aspect may be used in conjunction with, or in lieu of, using different fan blade configurations as discussed previously.

In accordance with this aspect, the fan blade is reconfigurable by adjusting the gap or spacing between an upstream face of a fan blade and a fan blade cowling. Increasing the gap would tend to increase the air flow produced by the fan blade whereas decreasing the gap would tend to increase the suction produced by the fan blade.

The gap may be adjustable by manually moving fan blade 42 with respect to cowling 72. Alternately, the fan blade may be moved by an electronically actuated member (e.g., a solenoid). As exemplified in FIGS. 16 and 17, handle 22 is moveably (e.g., pivotally) mounted to main body 12. Pivoting the handle adjusts the gap between the upstream face of fan blade 42 and fan blade cowling 72. Accordingly, a mechanical linkage extending between handle 22 and cowling 72 and/or fan blade 42 may be provided. As the handle is pivoted, e.g., forwardly, from the high suction mode position of FIG. 16 to the high air flow mode position of FIG. 17, the gap between the upstream face of fan blade 42 and fan blade cowling 72 is increased thereby adjusting motor and fan blade assembly 38 to produce higher air flow and lower suction. Conversely, as the handle 22 is pivoted, e.g., rearwardly, from the high air flow mode of FIG. 17 to the high suction mode position of FIG. 16, the gap between the upstream face of fan blade 42 and fan blade cowling 72 is decreased thereby adjusting motor and fan blade assembly 38 to produce higher suction and lower air flow.

Figures 16, 17:
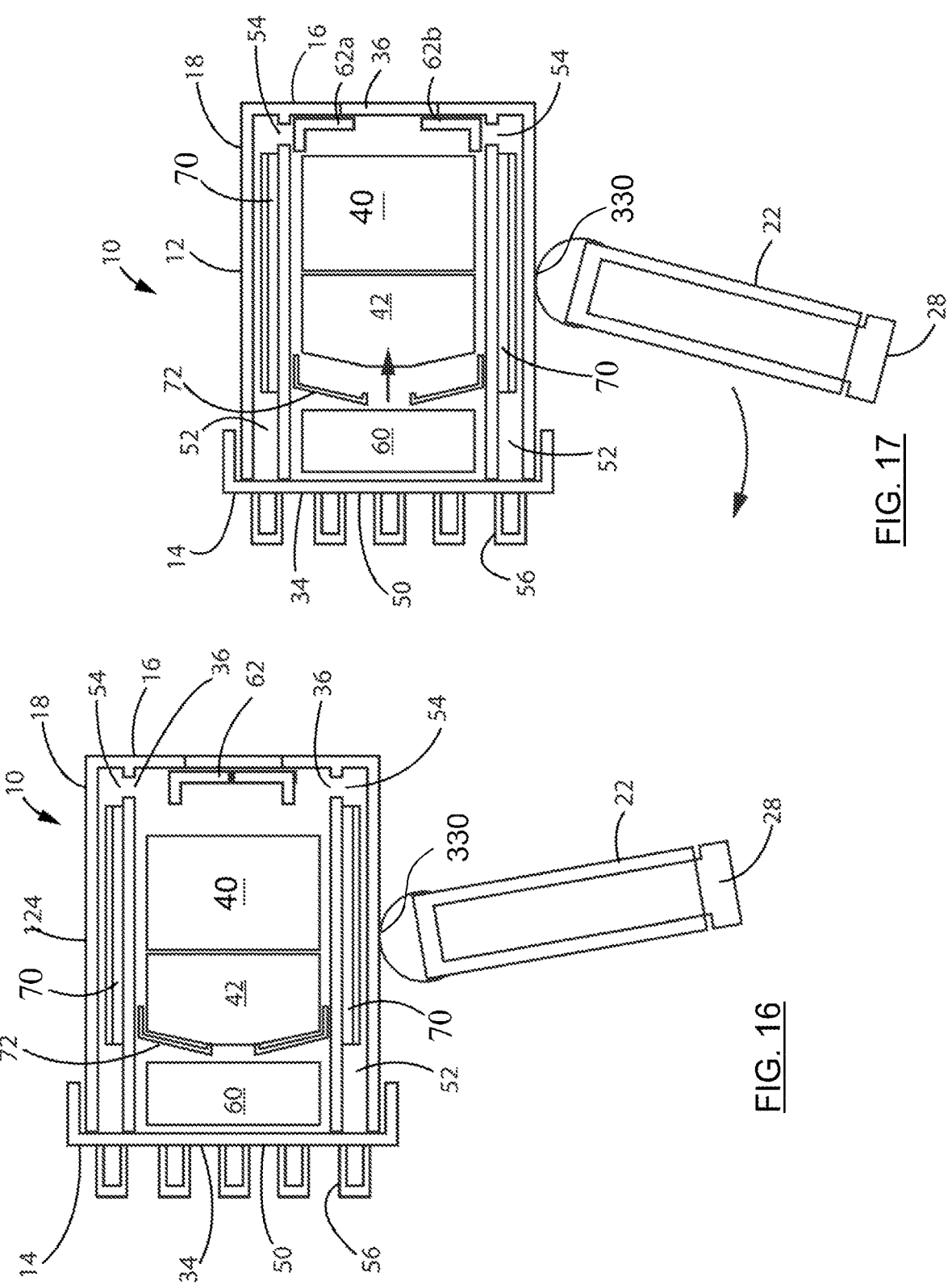
FIG. 16 is a cross-sectional view of a further alternate embodiment of the hair dryer configured in a high suction mode of operation.
FIG. 17 is a cross-sectional view of the further alternate embodiment of the hair dryer of FIG. 16 configured in a high air flow mode of operation.

In the embodiment of FIGS. 16 and 17, the redirecting member may be concurrently or separately moved to adjust the air flow path from a straight through air flow path wherein air travel only through the primary air flow path 32, which may be used for suction drying (FIG. 16) to one wherein the air is redirected to travel through the secondary air flow path 52 and exit the front of the hair dryer for, e.g., blow drying (FIG. 17).

Accordingly, when a user desires to change drying mode from the first mode to the second mode, the user may rotate the handle forwardly to produce higher air flow for blow drying.

Dual Sided Hair Dryer

In accordance with this aspect, one side of a hair dryer 10 (e.g., the front side) uses suction to draw moisture from wet hair in the first operating mode and the second (e.g., axially opposed side) blows air, optionally heated air, to further dry the wet hair in the second operating mode. This aspect may be used by itself or in combination with one or more of the other aspects set out herein.

An advantage of this aspect is that the air flow path through the hair dryer may be simplified. Once hair has been dried to a particular degree of dryness using suction wherein the suction inlet is at, e.g., the front side of the hair dryer 10, a user may turn the hair dryer around and then use the other side (e.g., the rear side) to blow dry the wet hair. Accordingly, a redirecting member 62 is not required. Accordingly, the air flow path in each operating mode may be shorter and may therefore have a lower back pressure, thereby increasing the volume of air flow without changing the motor and fan blade assembly.

For example, FIGS. 13, 14, 15, 18, 19, 21, 22A, 28, 48, 49, 50, 53, 54 and 75 are similar to FIG. 8 except that the secondary air flow path 52 is located at the end of the primary air flow path and a joined air flow path 31 that travels generally linearly through the hair dryer 10 is provided. As exemplified, air enters through inlet port 33 (which is the inlet port 34 of the primary air flow path 32) provided at front end 14 of main body 12 and exists through outlet port 35 (which is the outlet port 56 of the secondary air flow path 52) provided at rear end 16 of main body 12. In the first operating mode, if suction is used, air may be drawn through hair into the inlet port 33, 34, water may be removed by optional water separator 60 and the air then exhausted through the outlet port 35. In the second operating mode, heating elements 70 may be actuated. Air may be drawn in through inlet port 33 pass over the motor and fan assembly and then over the heating elements 70 to exit port 35 as heated air that is directed at the hair to be dried.

As discussed subsequently, some air may be recirculated through a recirculation conduit 366 in the hair dryer to increase the exit temperature of the air (see FIG. 14), some air may be vented via a vent conduit 352 to increase the exit temperature of the air exiting the outlet port 35 (see FIG. 15), the water separator 60 may be bypassed in the second operating mode to increase the air flow through the hair dryer (see FIGS. 21 and 22A) and additional inlet and outlet ports and more than one heaters provided in different locations may be included to adjust the air flow rate and/or temperature of the air exiting the hair dryer (see FIGS. 48, 49, 50, 53 and 54). One or more of these features may be used in any hair dryer.

It will be appreciated that in embodiments which use a dual sided hair dryer that a separate power button may be provided for each mode of operation. For example, as exemplified in FIG. 18, when the first side of hair dryer is in operation (e.g., in the first drying mode of operation) then power button 30a, which faces forwardly, may actuate hair dryer 10. Similarly, when the second side of hair dryer is in operation (e.g., in the second drying mode of operation) then power button 30b, which faces rearwardly, may actuate hair dryer 10.

Single Sided Hair Dryer

In accordance with this aspect, the same side of a hair dryer 10 (e.g., the front side) is used in each of the operating modes. This aspect may be used by itself or in combination with one or more of the other aspects set out herein.

Accordingly, in the first operating mode suction and/or high velocity air may be directed at the hair of a person and in the second operating mode, the same side (outlet port) of the hair dryer may be used to blow air, optionally heated air, to further dry the wet hair. For example, FIG. 4 exemplifies a hair dryer using two separate air flow paths wherein, in the first operating mode, air is drawn in through inlet 34, water may be removed by water separator 60 and the air then exhausted through the outlet port 36. In the second operating mode, heating element(s) 70 may be actuated. Air may be drawn in through inlet port 54 on the rear side of the hair drier, pass over the motor and fan assembly and then over the heating elements 70 to exit the front of the hair drier as heated air that is directed at the hair to be dried.

Alternately, the same side of a hair dryer may be used to provide suction in a first operating mode and in the second operating mode wherein the primary air flow path 32 is used in the first mode of operation and a single joined air flow path 31 is used in the second mode of operation. For example, as exemplified in FIG. 9, in the first mode of operation, air travels linearly through the hair dryer. Air is drawn into the hair dryer through inlet port 34, passes through the water separator 60 and exits through outlet port 36. In the second operating mode that is exemplified in FIG. 10, after passing through the primary air flow path 32, air is introduced to the secondary air flow path 52 by, e.g., a redirecting member 62 which partially or fully closes outlet port 36. It will be appreciated that various valving or other means may be used to direct air into the secondary air flow path 52.

As discussed with respect to a dual sided hair dryer, a single sided hair dryer may incorporate recirculating some air through a recirculation conduit 366 in the hair dryer to increase the exit temperature of the air, venting some air via a vent conduit 352 to increase the exit temperature of the air exiting the outlet port 35, bypassing a water separator 60 in the second operating mode to increase the air flow through the hair dryer and providing additional inlet and outlet ports and more than one heater in different locations to adjust the air flow rate and/or temperature of the air exiting the hair dryer. One or more of these features may be used in any hair dryer.

Temperature Control

In accordance with this aspect, air exiting an outlet of the hair dryer 10 and/or hair that the hair dryer 10 is directed at is maintained at a generally constant temperature, such as within 20% of a set point. This aspect may be used by itself or in combination with one or more of the other aspects set out herein.

A generally constant outlet temperature and/or hair temperature may protect hair from damage due to excess heat. Controlling the outlet temperature and/or hair temperature may allow the user to use a variety of orientations and methods of use without concern about the hair or a person's skin being overheated. For example, the user may bring the hair dryer 10 near to or abutting hair without the corresponding increase in back pressure and decrease in air flow rate causing a spike in the temperature of air exiting the hair dryer 10.

A generally constant outlet temperature may be between 40° C. and 75° C., between 50° C. and 70° C., between 55° C. and 65° C., and optionally about 60° C. A generally constant hair temperature may be between 25° C. and 75° C., between 35° C. and 60° C., between 40° C. and 55° C., and optionally about 60° C., 50° C., 45° C., or 40° C. For example, a hair dryer may have, e.g., three different output temperatures, such as high, medium, and low temperatures 60° C., 50° C. and 40° C.

In some examples, a user may select a generally constant temperature to be maintained. For example, the user may be asked to choose between a high temperature and a low temperature or between high, medium, and low temperatures. In some examples, the user may be able to set a desired temperature as discussed elsewhere herein.

Temperature Control by Fan Blade Matching

In accordance with this aspect, air exiting an outlet of the hair dryer 10 and/or hair that the hair dryer 10 is directed at is maintained at a generally constant temperature by selecting one or more fan blade and one or more motor such that the air flow generated by the one or more fan blade balances the heat generated by the one or more motor over the operational range of the one or more motor in the hair dryer 10 to produce a generally constant heated air temperature over a substantial portion or substantially most of the rate or rotation of the motor. This aspect may be used by itself or in combination with one or more of the other aspects set out herein.

An advantage of this aspect is that the waste heat generated by as a byproduct of the use of, e.g., the motor and fan assembly 38 may be used to heat air.

The generally constant outlet temperature and/or hair temperature may be maintained by adjusting the air flow through the air flow path 31. The air flow may be adjusted such that changes in the amount of heat generated by the rate of rotation of the motor across the operational range of the motor may be balanced by changes in the amount of air flow. Balancing the air flow and the heat generation may result in a generally constant output temperature due to heat from the motor.

The air flow may be adjusted by adjusting the rate of rotation of the fan blade. The fan blade 42, 44 may be driven by the motor 40 and may have, e.g., the same rate of rotation as the motor over the operational range of the motor.

A fan blade 42, 44 may be selected that produces the air flow needed over the operational range of a motor 40. A fan blade 42, 44 may generate, e.g., an air flow volume per second for various rates of rotation, and the air flow generated by the fan blade for different rotational speeds of the fan blade may be an air flow profile of the fan blade 42, 44. Accordingly, the faster a fan blade rotates, the more air flow it will produce. However, these air flow profiles are typically not linear. A motor 40 may generate an amount of heat per second for various rates of rotation over an operational range of the motor 40, and the amount of heat per second generated for different rotational speeds of the motor may be a heat generation profile of the motor 40. Accordingly, the more power provided to a motor, the faster the motor will rotate and the more waste heat that will be generated. However, these heat generation profiles are typically not linear. The fan blade 42, 44 and the motor 40 may be selected such that the air flow profile matches the heat generation profile so that, over most or all of the operating range of the hair dryer, the amount of air flow produced by the fan blade draws an amount of air that cools the motor such that the outlet temperature and/or the hair temperature may be maintained at a generally constant temperature (e.g., ±20° C. or less, ±15° C. or less, ±10° C. or less).

In some examples, the rate of rotation of the motor may be adjusted using pulse width modulation of power provided to the motor. The use of pulse width modulation of power provided to the motor may also reduce the power consumption of the hair dryer 10.

Heat from the motor may be used instead of or in addition to the use of heating elements 70. In some examples, a hair dryer 10 may not include a heating element 70 or may not user the heating element 70 for lower temperature settings such as 40° C., 50° C., 60° C., or 70° C. The use of heat from the motor and/or other components of the hair dryer 10, such as the batteries, may be possible due to the low operational temperatures of the hair dryer 10, and may be sufficient to warm the air flow to 40° C., to 50° C., to 60° C., or to 70° C.

It will be appreciated that the waste heat generated as a byproduct of the use of, e.g., the motor and fan assembly 38, may be supplemented by heat generated by a heating element to further warm air and/or hair.

Temperature Control by Air Flow Control

In accordance with this aspect, air exiting an outlet of the hair dryer 10 and/or hair that the hair dryer 10 is directed at may be maintained at a generally constant temperature or temperature range by controlling the air flow through the air flow path 31.

This aspect may be used by itself or in combination with one or more of the other aspects set out herein.

The selection of a fan blade is only one way of controlling the air flow through an air flow path. In some examples, the outlet temperature is also or alternatively maintained by alternative ways of controlling the air flow. Increasing the air flow without providing additional heat (e.g., maintaining a constant power to a heating element) will adjust the temperature of air exiting the hair dryer. Accordingly, maintaining a constant power to a heating element while the air flow is increased will result in the temperature of air exiting the hair dryer being reduced.

The air flow may be adjusted in a variety of ways in addition to or in lieu of adjusting the rate of rotation of the motor and fan blade assembly. For example, one or more of the following may be used.

The cross-sectional area of the air flow path 31 may be constricted, such as by using one or more irises to constrict the cross-sectional area of a portion of the air flow path 31.

The spacing between the fan blade 42, 44 and the housing or cowling of the fan may be adjusted to change the air flow.

A plurality of fan blades and/or motors may be provided and selectively operated to control the air flow.

One or more valves may be provided and selectively operated to control the air flow.

The pitch of the vanes of one or more fan blades may be adjusted to adjust the air flow.

Recirculation of some of the air flow.

Variable Cross-Sectional Area of the Air Flow Path

In accordance with this aspect, an air flow path 31 has a variable cross-sectional area. The air flow path 31 may be constricted to reduce the cross-sectional area in a direction transverse to the direction of the flow of air through the air flow path 31. When the cross-sectional area of the air flow path is reduced, the velocity of air exiting the hair dryer may be increased. In addition, the volume of air exiting the hair dryer may be reduced. Conversely increasing the cross-sectional area may reduce the velocity of the air flow and increase the volume of air flow. This aspect may be used by itself or in combination with one or more of the other aspects set out herein.

An advantage of this aspect is that increasing the velocity of the air exiting the hair dryer reduces the contact time of the air with the heating element 70 and will reduce the temperature of the air reaching the hair. Accordingly, a high speed air flow may be produced at the outlet 35. Similarly decreasing the velocity of air (by increasing the cross-sectional flow area) will increase the temperature of the air.

A further advantage of this aspect is that the air flow may be shaped (e.g., to produce an air flow that has a generally rectangular shape in a plane perpendicular to the direction of flow as exemplified in FIG. 26). Accordingly, a patterned air flow may be produced at the outlet 35. Accordingly, one or more jets of high velocity air may be produced using this aspect.

A further advantage is that air flow may be controlled without adjusting the rate of rotation of the motor 40. For example, decreasing the cross-sectional area of the air flow path 31 increases the backpressure within the hair dryer 10. Increasing backpressure within the hair dryer 10 decreases the volume of air that passes through the hair dryer 10 per unit of time. Therefore, increasing the backpressure may allow a reduction in the volume of air passing through the hair dryer 10 per unit time without adjusting the motor 40 and/or fan blade 42, 44, such as without decreasing the rate of rotation of the motor 40 and/or changing the configuration of the fan blade assembly (e.g., the pitch of fan blade 42, 44 and/or spacing of fan blade 42, 44 from the cowling of the fan blade housing).

For example, changing the rate of rotation of the motor 40 affects the amount of heat from the motor that is available to heat the air flow. Accordingly, in some embodiments to increase the temperature of the air it may be desired to decrease the velocity of air passing through the hair dryer 10 per unit of time without decreasing the rate of rotation of the motor 40 and/or independently of changes to the rate of rotation.

The cross-sectional area of the air flow path 31 may be adjusted by constricting or unconstricting (opening) the air flow path 31. For example, the air flow path may be constricted by adding attachments or closing adjustable apertures or irises.

As exemplified in FIGS. 26 to 28, the cross-sectional area of the air flow path 31 may be constricted by adding an attachment, such as attachment 104, having a smaller cross-sectional area than the smallest cross-sectional area of the air flow path 31. The attachment may be added at any point along the air flow path, such as an attachment added at the inlet end of the air flow path 31 or an attachment added at the outlet end of the air flow path 31 or both.

As exemplified by FIGS. 30 to 34, the cross-sectional area of an air flow path 31 may be constricted by closing an adjustable aperture 142 in the air flow path 31. In the illustrated example, blades 114 are moved into or out of the air flow path 31 to adjust the size of the aperture 142. In some examples, a variable iris or other adjustable aperture 142 may be used.

As exemplified in FIG. 48, multiple adjustable apertures 142 may be provided. For example, an adjustable aperture 142 may be provided upstream of a fan blade 42, 44 to control the volume of air passing through the hair dryer 10 per unit time, and an adjustable aperture 142 may be provided downstream of a fan blade 42, 44 to control the volume of air passing through the hair dryer 10 per unit time and/or the shape of an air flow exiting the hair dryer 10.

Adjustable apertures 142 may be provided at the inlet, midpoint, and/or end of an air flow path 31. In the illustrated example of FIG. 48, three variable irises 144 are provided to form three adjustable apertures 142.

Figures 35, 36, 37:
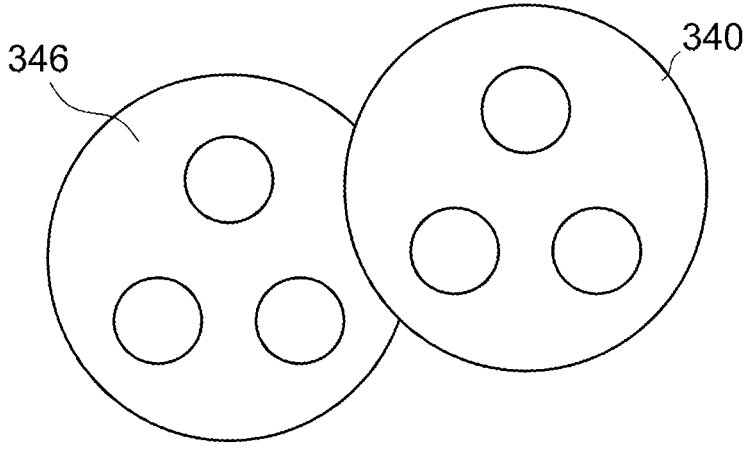
FIG. 35 is a schematic diagram of a pair of plates for controlling air flow.
FIG. 36 is a schematic diagram of the plates of FIG. 35 in a first arrangement.
FIG. 37 is a schematic diagram of the plates of FIG. 35 in a second arrangement.

Similarly, the cross-sectional flow area may be adjusted by aligning the apertures 342, 344 of the plates 340, 346 of FIGS. 35 to 37 as discussed elsewhere herein).

Variable Gap Between the Fan Blade and a Cowling

As discussed previously, a fan blade may be reconfigurable by adjusting the gap between an upstream face of a fan blade 42, 44 and a fan blade cowling 72.

Increasing the gap would tend to increase the air flow produced by the fan blade whereas decreasing the gap would tend to decrease the air flow produced by the fan blade.

Accordingly, the motor and fan blade assembly may be configured to produce air flow and not suction. In such a case, the amount of air flow may be adjusted by adjusting the position of the fan blade with respect to the cowling. Accordingly, when the outlet temperature of the air requires adjustment, the position of the fan blade with respect to the cowling may be adjusted to increase the volume of air flow and thereby reduce the temperature of the air exiting outlet port 35. Alternately, the position of the fan blade with respect to the cowling may be adjusted to decrease the volume of air flow and thereby increase the temperature of the air exiting outlet port 35.

Multiple Motors and/or Fan Blades

In accordance with this aspect, the hair dryer 10 includes more than one air moving member. For example, a motor and fan assembly may have two or more fan blades and/or two or more motor and fan blade assemblies may be provided. This aspect may be used by itself or in combination with one or more of the other aspects set out herein.

An advantage of this aspect is that the air flow through the hair dryer 10 may be adjustable by using different fan blades, which produce different air flows. Accordingly, multiple fan blades 42, 44 may allow for multiple air flow volume levels (cfm) and/or suction level and/or velocity to be obtained by selectively operating and/or adjusting one or more fan blades 42, 44. For example, a fan blade the produces high suction but low volumetric air flow may be provided in the primary (suction) air flow path 32 and a fan blade that produces high air flow but low suction may be used in the secondary (blow dry) air flow path 52. Both fan blades may be driven by the same motor (see FIG. 8) or different motors (see FIG. 120). Optionally, the rate of rotation of the motor may be adjusted depending upon the mode of operation. Accordingly, the rate of rotation may be higher in the first mode of operation than the second more of operation. Alternately, the rate of rotation may be lower in the first mode of operation than the second more of operation As exemplified in FIGS. 120 and 121, two or more motor and fan blade assemblies may be utilized (e.g., one motor and fan blade assembly to produce a high level of suction and another motor and fan blade assembly to provide air flow for blow drying in the second mode of operation). For example, a fan blade that produces high suction but low air flow may be provided in the primary (suction) air flow path 32 and a fan blade that produces high air flow but low suction may be used in the secondary (blow dry) air flow path 52 wherein each fan blade is driven by a different motor. The rate of rotation of the motors may be the same of different. Accordingly, the rate of rotation may be higher in the first mode of operation than the second more of operation. Alternately, the rate of rotation may be lower in the first mode of operation than the second more of operation.

Accordingly, for example, if supplemental air is provided as discussed subsequently using a bypass port, a first motor and fan blade assembly may be used to move air through one of the primary and secondary air flow paths and a second motor and fan blade assembly may be used to provide a secondary source of air. Accordingly, multiple fan blades 42, 44 may enable multiple air flow directions or variations. Alternately, or in addition, two motor and fan blade assemblies 38 may be provided in a single air flow path (a primary or secondary air flow path) to adjust the air flow therethrough.

Multiple motors and/or fan blades may allow the characteristics (e.g., volume per unit of time) of air flow through one portion of the hair dryer 10 (e.g., the water separator 60) to be different (e.g., lower) from the characteristics of air flow in another portion (e.g., higher for air exiting the outlet 56 of the secondary air flow path 52 for blow drying). This may be in addition to or in alternative to having bypass openings, bleed outlets, and/or supplementary inlets.

Characteristics (e.g., rate of rotation, pitch of fan blade vanes, etc.) of each motor and/or fan blade may be controlled independently. These characteristics may be controlled in response to sensed values received from a sensor, or in response to settings received from a user. For example, the speed of rotation of the motor driving the first fan blade(s) 42 in a suction operation may change in response to the proximity (e.g., measured by a proximity sensor as discussed elsewhere herein) of the hair of a user to the hair dryer 10 (e.g., motor speed may increase as the hair is drawn near to the suction inlet port). In another example, the speed of the motor driving the first fan blade(s) 42 in a suction operation may change in response to the conductively (e.g., measured by a sensor on the surface of the hair dryer 10) of the user's hair (e.g., the conductively decreases as the hair dries, and the motor speed increases as the conductivity decreases).

Figure 49:
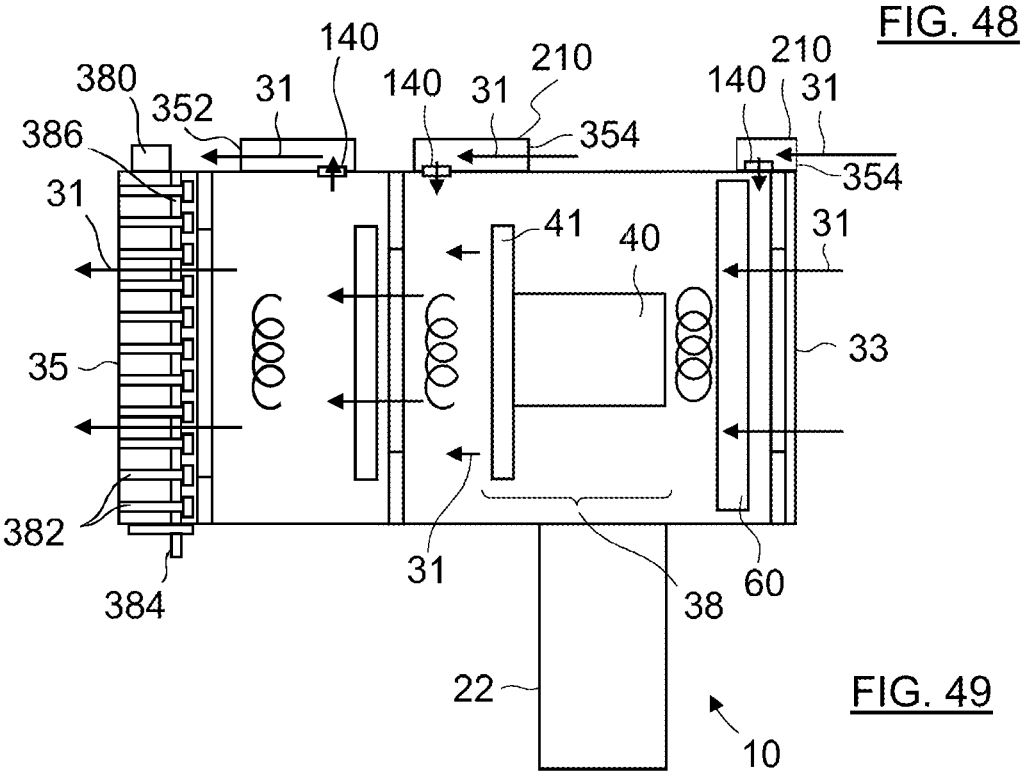
FIG. 49 is a cross-sectional view of a further alternate embodiment of the hair dryer having a plurality of inlet ports and a plurality of outlet ports.

As exemplified in FIG. 49, hair dryer 10 may have an air flow path 31 with one or more supplementary air flow branches or conduits 210 (which may be a vent outlets 352 or a supplementary inlet 354). One or more of the optional vent outlets 352 and/or supplementary inlets 354 may be selectively openable, and may be, e.g., opened in one mode of operation and closed in another or opened or closed automatically in response to changes in temperature or usage of the hair dryer 10, as described further elsewhere herein. For example, an inlet port may be opened to increase the air flow into the air flow path 31, and an outlet port may be opened to decrease the air flow delivered to hair. One or more vent outlets 352 and/or supplementary inlets 354 may be governed by a valve 140.

Accordingly, one or more vent outlets 352 may form a bleed air flow path to selectively bleed air from the main air flow. For example, a bleed air flow path may be opened by opening a valve 140 to bleed air from the air flow path 31 to reduce the air flow (volume of air per unit of time—e.g., cfm) that is discharged towards the user. However, the air flow entering inlet 33 may be maintained at a sufficient level to cool the motor.

Alternately, a supplementary inlet 354 may be opened at various positions along the air flow path 31. For example, a supplementary inlet 354 may be opened downstream of the motor 40 to reduce the temperature of a mixed air flow exiting the hair dryer by allowing air that has not passed over the motor 40 or an energized heating element 70 to be drawn in and combined with air that has passed over the motor or an energized heating element 70.

As exemplified in FIG. 49, a hair dryer may have two supplementary air flow branches 210. Each supplementary air flow branch 210 may have a valve 140 which is operable to open and close the branch. One or more heating elements (exemplified as resistively heatable elements in FIG. 49) may be provided in the air flow path from air inlet 33 to air outlet 35. A main motor and fan blade assembly 38 is provided in the main air flow path (the motor axis is aligned in this example to intersect the air inlet 33 and the air out 35). If additional air flow is required, then a valve 140 may be opened and additional air may be drawn into the main air flow path by the main suction motor and fan blade assembly 38. If the heater rearward of the main motor and fan blade assembly 38 is energized, the provision of additional air will result in a higher flow rate of air through the hair dryer and out the air outlet 35. As a result, the temperature of the air exiting the hair dryer will be reduced.

Optionally, a secondary motor and fan blade assembly may be used to draw air through a supplementary air flow branch 210. For example, as exemplified in FIG. 50, the rearward supplementary air flow branch 210 has a secondary motor and fan blade assembly positioned to draw air from supplementary inlet 354 through the supplementary air flow branch 210 into the main air flow path.

It will be appreciated that the supplementary air flow branch 210 may be located at various location and that more than one supplementary air flow branch 210 to introduce air into the hair dryer may be provided.

Figure 50:
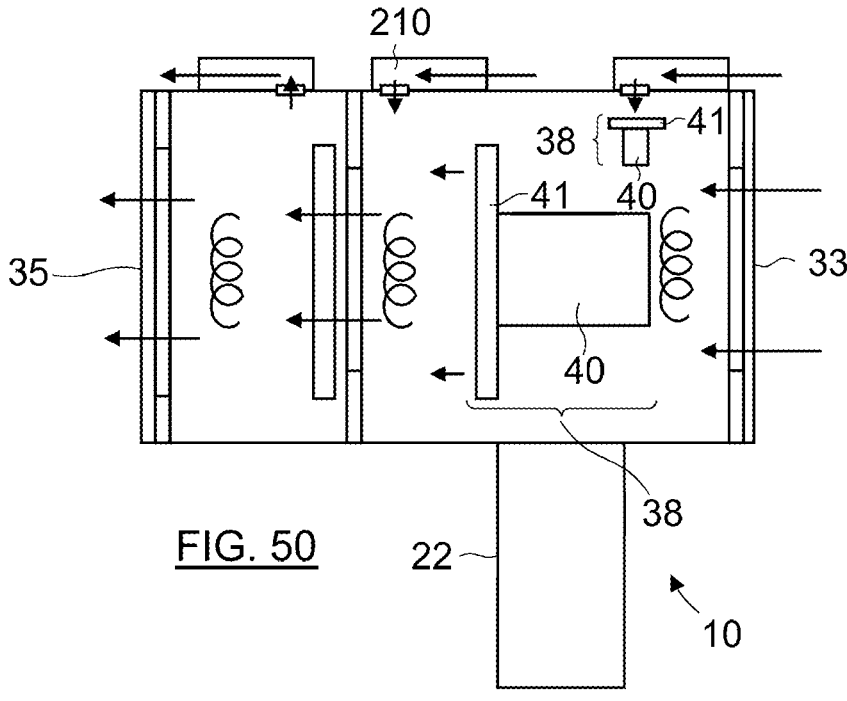
FIG. 50 is a cross-sectional view of a further alternate embodiment of the hair dryer having a plurality of motors and a plurality of fan blades.

It will be appreciated that the hair dryer may have multiple heating elements (such as the embodiment of FIGS. 49 and 50 which has three resistively heatable elements). One or more of the heating elements may be energized at a time and the valves 140 may be opened or closed to alter the air flow path through the hair dryer such that more air or less air passes over one or more of the heating elements and therefore the amount of air that is heated, and the temperature of the heated air, may be varied.

As exemplified in FIG. 50, the forward most valve 140 is opened such that air exits the main air flow path through the forward most supplementary air flow branch 210. In this example, the forward most resistively heatable element may be energized (and optionally it may be the only heating element that is energized). In such a case, only some of the air exiting the hair dryer and directed towards a person's hair passes over an energized heating element. Therefore, the air exiting the supplementary air flow branch 210 may mix with the heated air exiting air outlet 35 to produce a cooler air stream that is directed at a person's hair.

It will be appreciated that, if the middle resistively heatable element were also energized, then all of the air would be heated by the middle resistively heatable element and some of the air heated by the forward most resistively heatable element. Accordingly, the temperature of the mixed air stream that reaches a person's hair may be increased.

Figures 14, 15:
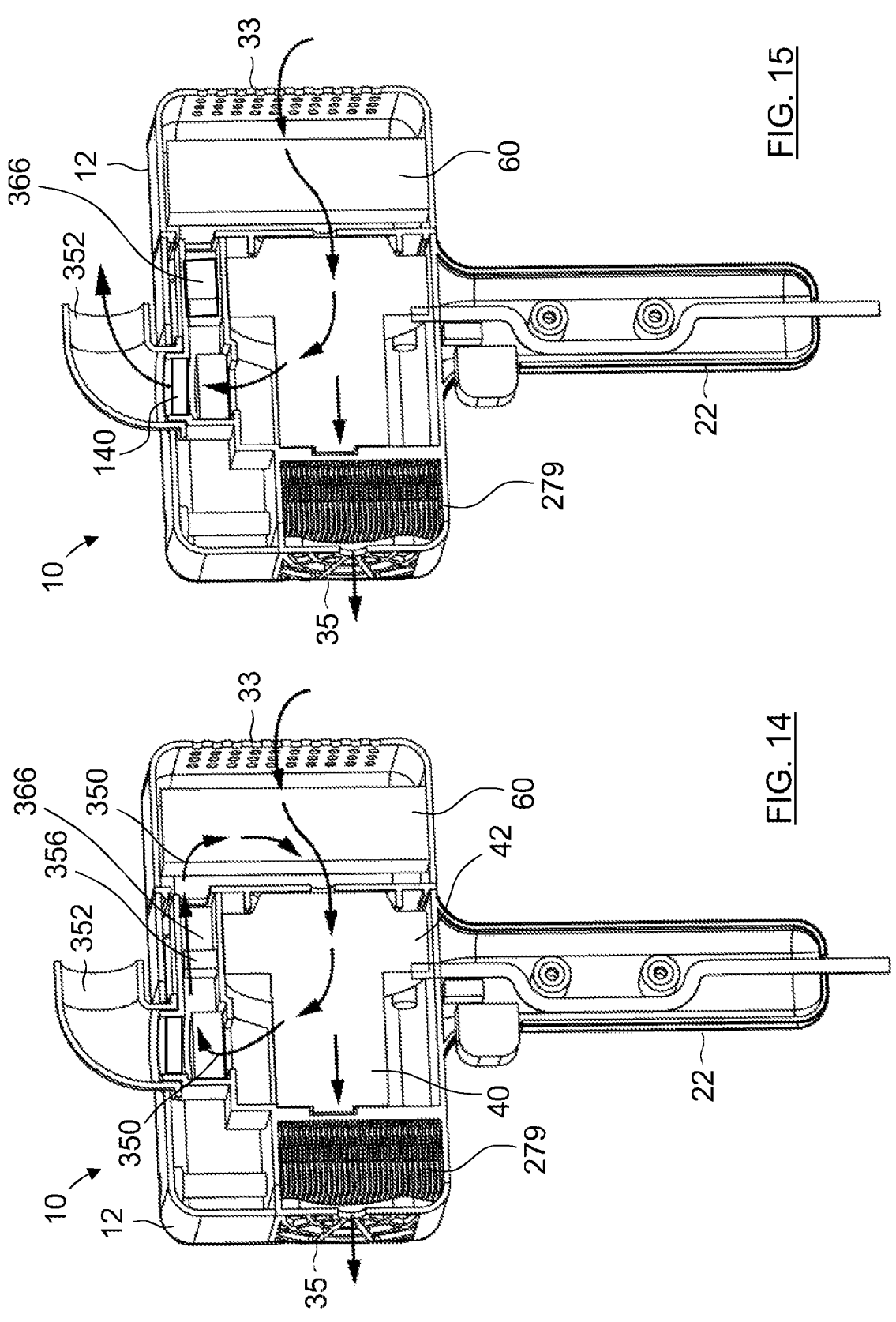
FIG. 14 is a cross sectional view of the hair dryer of FIG. 11 showing a second air flow route.
FIG. 15 is a cross sectional view of the hair dryer of FIG. 11 showing a third air flow route.

It will also be appreciated that, if the temperature of the air exiting the hair dryer through outlet 35 is too low, and if the forward most supplementary air flow branch 210 in FIG. 50 were directed away from the front outlet 35 as exemplified in FIG. 15, then the forward most resistively heatable element may be energized and only part of the air flow produced by the main motor and fan blade assembly may pass over the heating element so as to produce a lower flow rate of hotter air.

Accordingly, by using multiple motor and fan blade assemblies (which may be provided for each supplementary air flow branch 210) and optionally opening and closing one or more supplementary air flow branches 210, and energizing one or more heating elements to heat air in one or more portions of the main air flow path or a supplementary air flow branch 210, the volume of air exiting the hair dryer and directed towards a person's hair, and the temperature of the air, may be increased or decreased.

It will be appreciated that each motor 40 and/or fan blade 42, 44 may be operable according to directions received from a user, or automatically in response to a temperature and/or operational mode or method of use of hair dryer 10, as described further elsewhere herein.

Valves to Adjust Air Flow

In accordance with this aspect, the hair dryer 10 includes one or more valves to adjust the air flow path to increase or decrease the volumetric air flow exiting an air outlet of the hair dryer that directs air at the user. This aspect may be used by itself or in combination with one or more of the other aspects set out herein.

As discussed previously, a valve 140 may be operated in conjunction with a hair dryer to draw additional air into a hair dryer or to enable some of the air to exit the hair dryer (through an air flow branch 210) other than through an air outlet 35 which is directed at the hair of a user.

For example, in the embodiment of FIG. 15, a valve 140 may be opened to enable some air to exit the hair dryer via a vent outlet 352 which directs air away from the hair to be dried. It will be appreciated that vent outlet 352 may be considered a supplementary air flow branch 210 that directs air away from the hair being dried.

Accordingly, by opening and closing one or more valves 140, and energizing one or more heating elements to heat air in one or more portions of the main air flow path, the volume of air exiting the hair dryer and directed towards a person's hair, and the temperature of the air, may be increased or decreased.

Variable Pitch Fan Blade

In accordance with this aspect, one or more fan blades 42, 44 are variable pitch fan blades. This aspect may be used by itself or in combination with one or more of the other aspects set out herein.

In accordance with this aspect, a fan blade 42, 44 may be adjustable to, e.g., provide varying volumes of air flow, varying levels of air speed, or varying levels of pressure (suction). An advantage of this aspect is that a fan blade 42, 44 may be used to produce a variable air flow.

Figure 51:
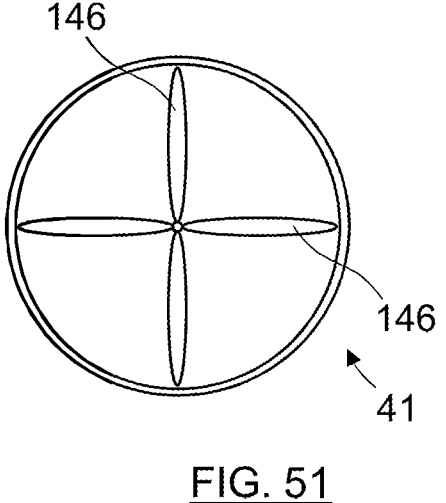
FIG. 51 is a front view of an embodiment of a variable pitch fan blade having vanes at a first pitch.
Figure 52:
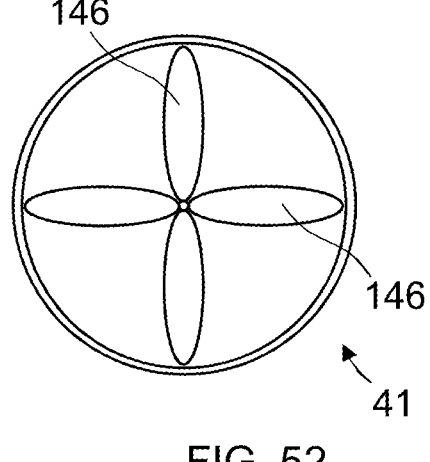
FIG. 52 is a front view of the variable pitch fan blade of FIG. 51 having vanes at a second pitch.

As exemplified in FIGS. 51 and 52, a variable pitch fan blade includes vanes 146 with adjustable pitch. Accordingly, the pitch of the vanes may be increased or decreased to change the air flow (e.g., the volume of air passing through the hair dryer 10 per unit time) produced by the fan blade.

The pitch of the vanes 146 may be controlled by, e.g., selecting a setting using a button communicatively coupled to the variable pitch fan blade. In some examples, the pitch of the vanes 146 may be controlled automatically in response to a temperature or operational setting or mode of use of the hair dryer 10. For example, the pitch of the vanes 146 may be adjusted in response to a sensor output to, e.g., increase air flow to reduce the temperature of an infrared heating element of the hair dryer 10 and/or the temperature of hair adjacent the hair dryer 10 and/or the outlet temperature of air at the outlet 35 directed at the hair by producing increased air flow over a heating element.

Recirculation Path

In accordance with this aspect, air may be recirculated within the hair dryer 10. Recirculating some of the air may reduce the air flow through the hair dryer (e.g., exiting air outlet 35) and thereby increase the temperature of air exiting the hair dryer. This aspect may be used by itself or in combination with one or more of the other aspects set out herein.

An advantage of this aspect is that one or more of the temperature, velocity, or volume of air used and/or produced at an outlet 35 of the hair dryer 10 may be adjusted without adjusting the number or configuration of one or more inlets and/or one or more outlets and/or without adjusting a fan speed or the amount of power provided to a heating element.

A hair dryer 10 may include a recirculation air flow path 350 leading from a location downstream of the motor and fan assembly 38 and/or the fan blade 42, 44 to a location upstream of the fan blade 42, 44, as in the example of FIGS. 11 to 15. Optionally, the location upstream of the fan blade 42, 44 is downstream of any water collection member 60. A valve 356 may control the passage of fluid through the recirculation air flow path 350. When the valve 356 is open, the lower pressure upstream of the motor and fan assembly 38 may draw air flow from the downstream location through a recirculation conduit to the upstream side of the motor and fan blade assembly 38.

It will be appreciated that a duct or other conduit 366 may carry fluid between the upstream and downstream locations. Fluid flow through the duct may be governed by valve 356. Accordingly, the upstream and downstream locations may be separated from one another by the length of the duct, which may be, e.g., up to the length of the hair dryer 10.

Optionally, valve 356 operates automatically in response to system conditions. For example, the valve 356 may automatically open and/or close in response to a predetermined difference in pressure between the upstream location (e.g., the fan inlet) and the downstream location (e.g., the fan outlet) or a temperature sensed at, e.g., air outlet 35.

Optionally, the hair dryer 10 may also or alternatively incorporate at least one vent outlet 352 or supplementary inlet 354 governed by a valve 140, as described elsewhere herein, to further allow for air flow control. A difference in pressure between an exterior of the hair dryer 10 and an interior of the air flow path 31 downstream of the fan 42, 44 may drive an air flow out through the vent outlet 352. Optionally, the vent outlet 352 is directed away from the main outlet 35 and/or the rear end 16 (e.g., forwardly, as in the example of FIG. 14). Hair dryer 10 may include a baffle or conduit to direct fluid exiting through a vent outlet 352.

Temperature Control by Heating Element Control

In accordance with this aspect, air exiting an outlet of the hair dryer 10 and/or hair that the hair dryer 10 is directed at is maintained at a generally constant temperature by adjusting the temperature of a heating element 70. This aspect may be used by itself or in combination with one or more of the other aspects set out herein.

In some examples, the generally constant outlet temperature and/or hair temperature is maintained by adjusting the output of a heating element 70. A sensor 168 (FIG. 54) may be provided to sense the temperature of air at the outlet port

35 and/or to sense the temperature of a user's hair. The sensed temperature may be used to determine whether to increase, decrease, or maintain the temperature of the heating element 70.

The hair dryer 10 may be operable to anticipate a desired temperature, such as by lowering the temperature of a heating element 70 when the hair is near the desired temperature. For example, the hair dryer 10 may reduce the temperature of a heating element 70 when the hair is within 15° C., within 10° C., or within 5° C. of the desired temperature.

It will be appreciated that alternately, or in addition to adjusting the output of a heating element 70, the sensor 168 may be used to adjust any one or more other components of the hair dryer. For example, the sensor 168 may be used to adjust any one or more component that may adjust the air flow and/or temperature of air exiting the hair dryer outlet 35. For example, it may adjust the rate of rotation of a motor 40, the position of a valve 140, the position of a fan blade 42, 44 to a cowling 72, a pitch of vanes 146, the position of an iris, etc.

Infrared Heating Element

In accordance with this aspect, hair dryer 10 may include an infrared heating element. The infrared heating element may direct infrared radiation forwardly (e.g., during a first mode of operation) and/or rearwardly (e.g., in a second mode of operation wherein a two sided hair dryer is utilized) and/or internally to assist in drying hair and/or styling hair. This aspect may be used by itself or in combination with one or more of the other aspects set out herein.

An advantage of this aspect is that heat produced by the IR radiation may enhance drying during the first and/or second mode of drying. For example, the IR radiation may be directed at the position of the hair of a user when the hair dryer 10 is in use and used to produce a jet of air or the hair dryer uses suction to dry hair. As IR radiation is not reliant on air flow to deliver the heat produced by an IR heater, the same amount of heat may be received by the hair regardless of the amount or velocity of air directed at the hair. Therefore, for example, energy may not be lost by heated air bypassing the target hair.

It will be appreciated that, optionally, the hair of a person may be dried with or without air flow. Accordingly, the use of IR radiation may provide heat, or additional heat, to dry or style hair prior to, subsequent to or during the first and/or second operating mode.

Alternately, or in addition, IR radiation may be directed at an infrared-absorbing target 190, as described further elsewhere herein. The infrared-absorbing target 190 may be heated by IR radiation and then used to heat air passing over the infrared-absorbing target 190.

Optionally, the location at which the IR radiation is directed may be adjustable. For example, an infrared heating element may optionally be adjustable between heating a distal surface (the hair of a person) and heating an adjacent surface (an infrared-absorbing target 190). Accordingly, the direction of IR radiation may be adjusted by adjusting a configuration and/or position of an infrared heating element and/or an infrared reflector, opening and closing one or more irises and/or rotating the infrared heating element.

Infrared heating element 92 may be made of any material in the infrared heating arts, such as a nickel chrome element.

Figures 59, 60, 61:
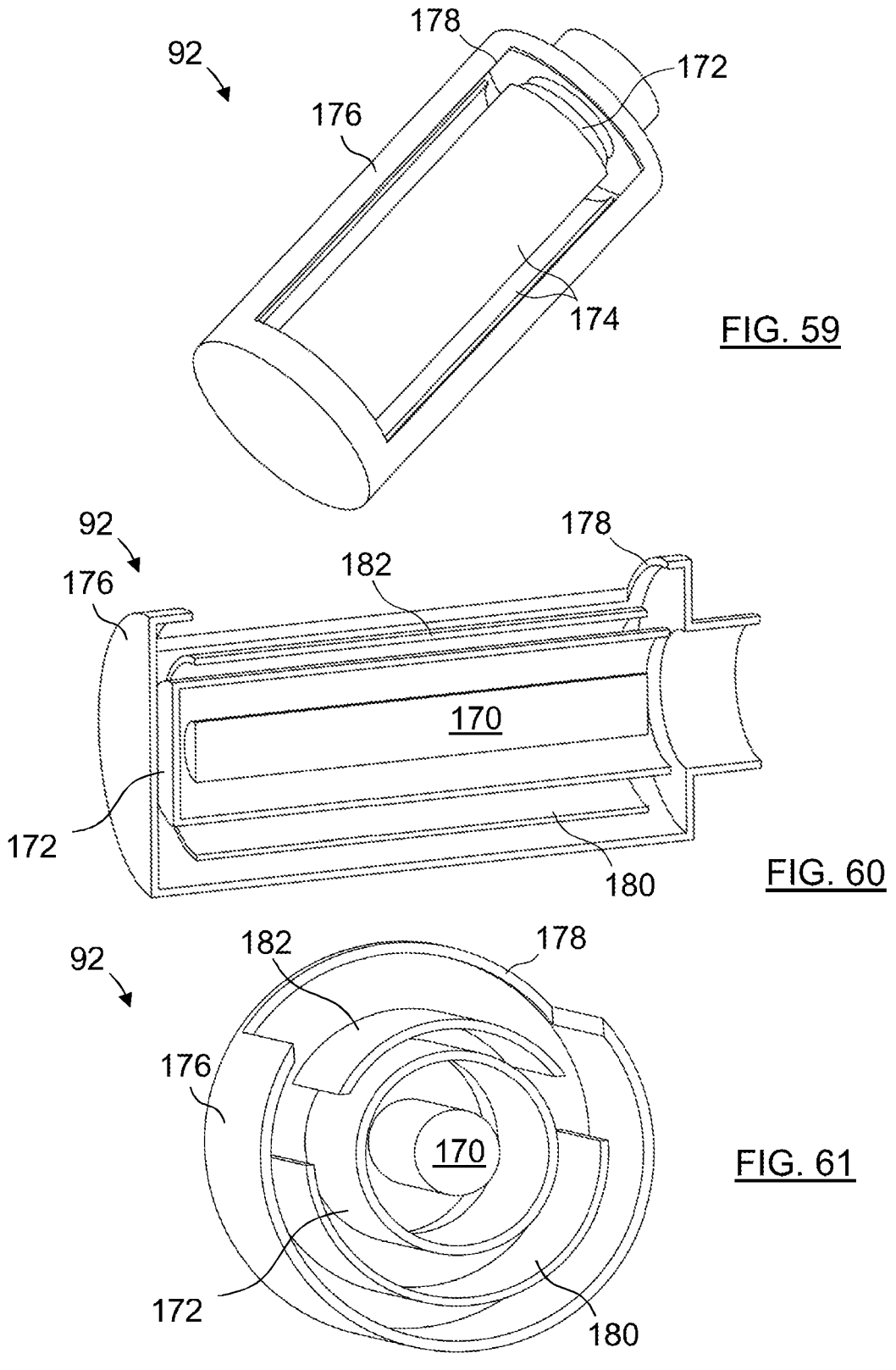
FIG. 59 is a perspective view of an embodiment of an infrared heating element.
FIG. 60 is a first cross-sectional view of the infrared heating element of FIG. 59.
FIG. 61 is a second cross-sectional view of the infrared heating element of FIG. 59.

Infrared heating element 92 may be of any shape and configuration and one or more infrared heating elements 92 may be provided. For example, the infrared heating element 92 may comprise a generally annular infrared heating element 92 (see for example FIG. 25) or an elongated linear infrared heating element 92 (see for example FIGS. 59-61) or, or a plurality of, e.g., point source infrared heating elements 92.

Infrared heating element 92 may be provided at any location internal or external to the hair dryer. As exemplified in FIG. 25, infrared heating element 92 is provided at front end 14 and, optionally immediately downstream of and interior to inlet port 33. Accordingly, air flow may pass through the center of the infrared heating element as air enters the hair dryer via inlet 33. In this embodiment, the infrared heating element may be used during part or all of the time that the hair dryer is operated to use suction in the first operating mode.

Infrared heating element 92 may be positioned proximate screen 50 and, e.g., forward of water collection member 60 if a water collection member is provided. Optionally, infrared heating element 92 may abut or be positioned adjacent the inner surface of screen 50. In such a position, infrared heating element 92 may heat screen 50 such as by abutting the inside surface of the screen or being positioned close to the inner surface of the screen 50. Accordingly, when hair is drawn or blown against screen 50, the hair may be dried by contact heating with screen 50. It will be appreciated that any IR radiation that travels past screen 50 may also dry hair positioned adjacent screen 50.

In operation, infrared heating element 92 may be automatically actuated when motor 40 is energized, it may be manually actuated by a user using a separate power control or it may be actuated if a sensor 74 detects, e.g., a particular degree of dryness or temperature of hair being dried and/or outlet temperature of air.

The effectiveness of infrared heating generally decreases as the distance from the infrared heating element 92 increases. As hair is drawn against screen 50, and as infrared heating element 92 may be positioned proximate but internal of screen 50, then the infrared radiation may have a short distance to travel and, therefore, much or most of the energy input into the infrared heating element 92 may produce heat that is used to dry hair.

It will be appreciated that the infrared heating element 92 may be exposed to water during use. Accordingly, the infrared heating element 92 may be provided in a water resistant or waterproof casing. In such a case, the casing may have a portion (a window 178) that is transparent to IR radiation or the entire casing may be made from a material that is transparent to IR radiation.

As exemplified in FIGS. 59 to 64, the infrared heating element 92 may include a resistive member 170, such as a wire, that extends through a body 172, such as a quartz body. The resistive member may be heated by current passing therethrough to a temperature at which it emits IR radiation. A housing or casing 176 holds the infrared heating element 92. As exemplified, a window 178 is provided through which radiation may exit. In this embodiment, housing 176 may be opaque to IR radiation. As the quartz body will emit radiation in all directions around the body, at least one reflector 174 is optionally used to direct the IR radiation through one or more windows 178. It will be appreciated that the direction in which the IR radiation is directed may be adjusted by adjusting the position of window 178 (e.g., rotating the housing 176 about a longitudinal axis extending through the quartz body, or by opening or closing the window (such as by using an iris).

It will be appreciated that an infrared heating element may also be used in a first mode of operating wherein high velocity air jets are directed at the hair of a person or in a second operating mode wherein air or heated air is used to dry or further dry the hair of a person. For example, in the embodiments of FIGS. 4, 12, 28, 47 and 48 an infrared heating element may be positioned exterior to the hair dryer and directed forwardly in the direction of air flow exiting the hair dryer. Alternately, or in addition, an infrared heating element may be positioned internal of the hair dryer exterior to or interior of the air flow path. For example, an annular, semi annular or a plurality of infrared heating elements may be positioned internal of the hair dryer and surround or partially surround the air flow conduit, e.g., immediately upstream of the air outlet. Alternately, or in addition, one or more infrared heating elements may be positioned in the air flow path similar to infrared-absorbing target 190 in FIG. 65.

Infrared Heating Element Reflector

In accordance with this aspect, one or more reflectors 174 may be used to determine the location and/or the size of the focus area of the infrared heating element 92. This aspect may be used by itself or in combination with one or more of the other aspects set out herein.

A reflector may be used to direct infrared radiation. For example, as exemplified in FIGS. 59-61, a rear reflector 180 may be positioned on one side of a quartz body 172 of an infrared heating element 92 to direct radiation in a forward direction. This may increase the amount of radiation directed in the forward direction and/or protect components (e.g., a motor) positioned rearwardly of an infrared heating element 92 from being heated by the infrared heating element 92.

A reflector may be made of any material which is opaque or generally opaque to infrared radiations. Accordingly, the reflector may be made of aluminum or an aluminum coated member.

Optionally, a forward reflector 182 may be positioned on a forward side of the IR element (e.g., opposite of the rear reflector 180) to further focus the radiation from the infrared heating element 92. For example, a combination of forward reflector 182 and rear reflector 180 may be positioned to control the propagation direction of radiation, such as to limit radiation to generally a single propagation direction.

Focusing radiation on a focus area may reduce the heating of adjacent surfaces, reducing the unnecessary heat damage to the adjacent surfaces and also reducing the amount of on board power that is used to dry hair.

Optionally, a reflector, such as a rear reflector, may be adjustable. For example, it may be rotatable so as to direct the infrared radiation in a different direction (e.g., to selectively direct the infrared radiation at the hair of a person or at an infrared target) and/or, as discussed subsequently, the focal point of the reflector may be adjusted (e.g., it may be translatable (e.g., forwardly and/or rearwardly to adjust the focal point of the infrared radiation to, e.g., target the IR radiation at the hair of a person) and/or reconfigurable (e.g., by adjusting the curvature of the reflector)).

Adjustable Focus

In accordance with this aspect, the focal point of the infrared radiation provided by an infrared heating element may be variable. This aspect may be used by itself or in combination with one or more of the other aspects set out herein.

An infrared heating element may be focused on a focal point. The focus area may have a size and a location relative to the infrared heating element 92, and may be spaced a distance from the infrared heating element 92.

The heat from an infrared heating element 92 may be directed out from a hair dryer 10 to be focused on hair in any operating mode of the hair dryer. For example, an infrared heating element 92 may have a circular focus area of about 1 inch in diameter spaced about 3 inches from the hair dryer, and the user may position the hair at this focus area to receive the focused radiation. For example, the user may position a curled portion of hair at the focus area to receive IR radiation to set a curl. The infrared heating element 92 may also deliver radiation if an object is too far or too near, but the optimal delivery location may be at the focus area.

In accordance with this aspect, an infrared heating element may have one or more adjustable reflectors that may be moved or reconfigured to change the location of the focal point and/or the size of the focus area. Accordingly, as exemplified in FIGS. 62 to 64, infrared heating element 92 may include an adjustable rear reflector 180. The adjustable rear reflector 180 may be translated between at least a first (rearward) position (FIG. 63) and a second (forward) position (FIG. 64) to adjust the focus of the infrared heating element 92. Optionally, the position of the reflector may be infinitely adjustable between the forward and rearward positions.

Optionally, further reflectors may be used to maintain a size of the focus area, and moved together to change the location of the focus area, such as to bring the focus area nearer or farther from the hair dryer 10.

It will be appreciated that the position of the reflector (and therefore the focal point) may be automatically adjustable. For example, a distance sensor such as a small Lidar or ultrasonic sensor may optionally be used to determine or detect the distance of, e.g., front end 14 of hair dryer 10 to the hair of the user. The sensor may send a signal to an actuator to move the position and/or configuration of the reflector and/or the position or configuration of the IR heating element to position the focal point at the location of the hair being dried.

Focus Location Indicator

In accordance with this aspect, the hair dryer is operable to indicate where the infrared radiation is focused. An advantage of this design is that a user may be able to position the hair relative to the hair dryer such that much, or most and optionally all of the IR radiation is directed that the hair being dried. Showing where the infrared radiation is focused may assist a user in accurately directing the infrared heating element at a desired surface and/or adjusting the focus to a desired setting This may be particularly useful is the hair dryer is used to set curls. This aspect may be used by itself or in combination with one or more of the other aspects set out herein.

Where the infrared heating element has a non-adjustable focus, a fixed indicator may be used. For example, a fixed projection or leg may extend out to the focus area to show where the focus area is. Accordingly, a user may hold a desired surface (e.g., part of the hair being dried) against or near the end of the fixed projection or leg to receive IR radiation at the desired surface.

An infrared heating element 92 with a variable focus may be used with a variable indicator to show where the infrared heating element 92 is being focused.

Figures 62, 63, 64:
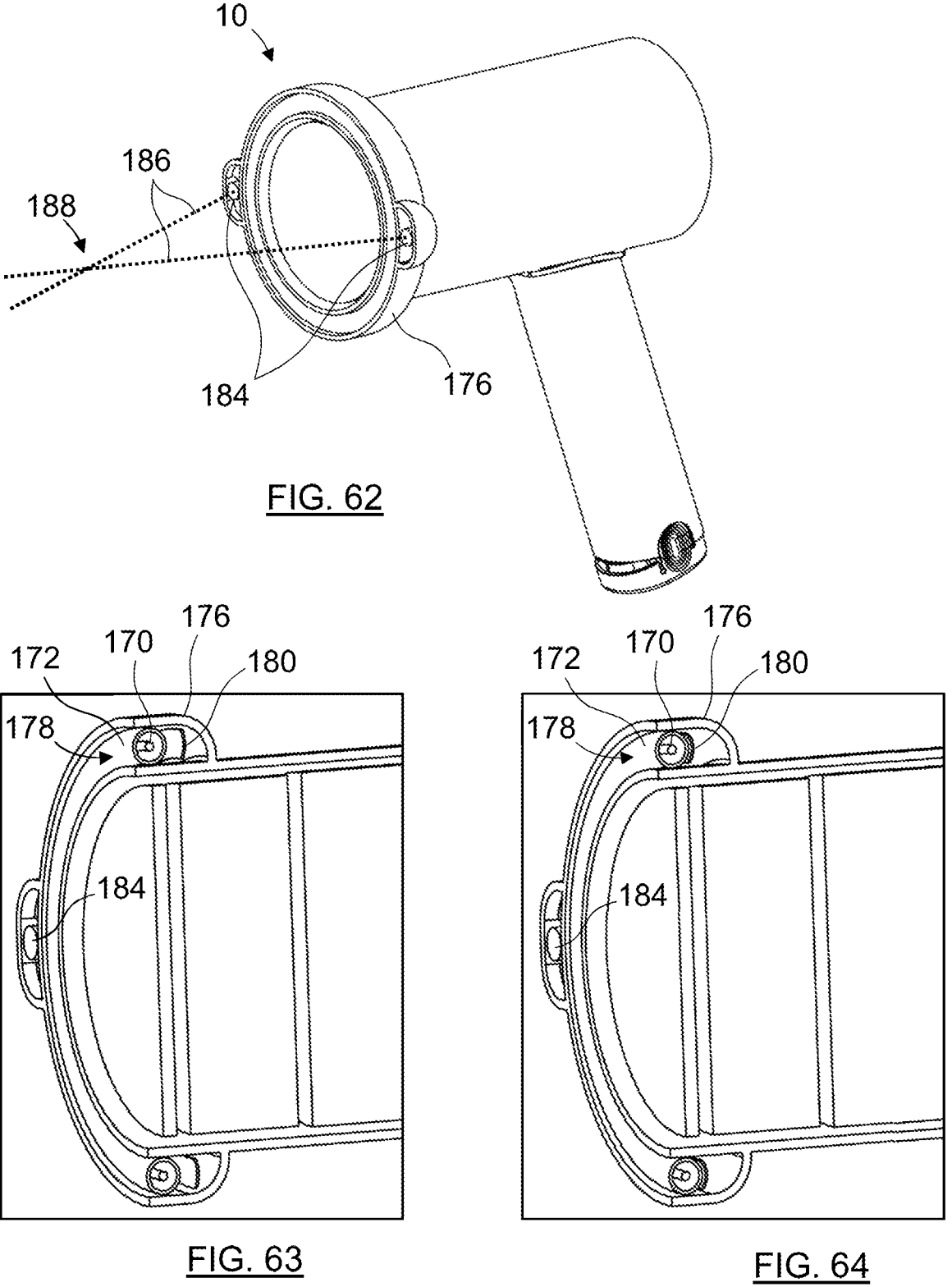
FIG. 62 is a perspective view of a further alternate embodiment of the hair dryer having an infrared heating element with a variable focus.
FIG. 63 is an expanded view of a portion of a cross-sectional view of the hair dryer of FIG. 62, with a rear reflector in a first position.
FIG. 64 is an expanded view of a portion of a cross-sectional view of the hair dryer of FIG. 62, with the rear reflector in a second position.

As exemplified in FIG. 62, a pair of light sources 184 may direct beams of light 186 along paths that intersect at the focus point 188. A user may have an object, such as hair, positioned in front of the hair dryer 10, and use the proximity to each other of the dots produced by the beams 186 on a surface of the object to determine how close the object surface is to the focus point 188 of the infrared heating element 92. The user may then be able to position the hair relative to the hair dryer such that the hair is positioned at the point at which the beams intersect. This focus location indicator may also be used if the infrared heating element has a non-adjustable focus.

The orientation of a focus location indicator of the hair dryer 10 may be coupled to that of the focusing member. In the exemplary embodiment of FIGS. 62 to 64, the projection angles of the pair of light sources 184 may be adjusted concurrently with the reflectors 174 of the infrared heating element 92 to provide an accurate indication of where the infrared heating element 92 is focused. For example, movement of the reflector 174 may move or adjust the focus location indicator (e.g., light sources 184) such that the focus location indicator indicates the new focal point 188. Similarly, reconfiguration of the reflector and/or movement and/or reconfiguration of the IR element may also move or adjust the focus location indicator.

Infrared-Absorbing Target

In accordance with this aspect, an infrared heating element may be focused on an infrared-absorbing target, that is optionally in the air flow path, to heat the infrared-absorbing target so that the infrared-absorbing target may heat an air flow in the air flow path. This aspect may be used by itself or in combination with one or more of the other aspects set out herein.

An advantage of this aspect is that an infrared heating element 92 may be positioned outside the air flow stream and focused on an infrared-absorbing target within or thermally in communication with the airflow stream. Accordingly, the infrared heating element 92 may be exterior to the air flow stream to prevent the air flow stream from cooling the infrared heating element 92.

An infrared heating element will generate a quantity and/or type of infrared radiation as a function of the temperature of the infrared heating element. Air flow over the infrared heating element will cool the infrared heating element, which may reduce the amount of infrared radiation produced by the infrared heating element. Particularly where a short wave infrared heating element is used to heat a selected area of an object remote from the infrared heating element, air flow over the infrared heating element may affect the ability of the infrared heating element to heat the selected area.

Figures 65, 66:
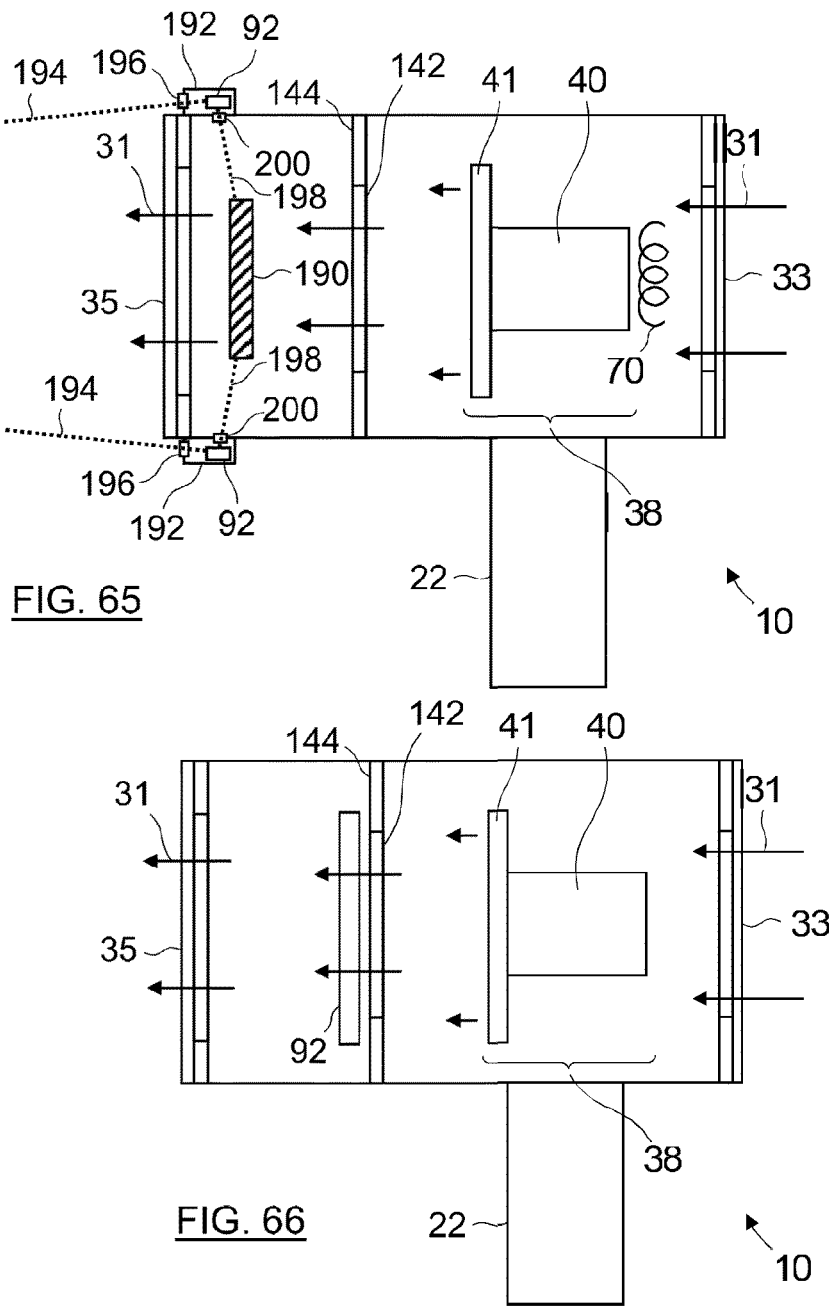
FIG. 65 is a cross-sectional view of a further alternate embodiment of the hair dryer having an infrared-absorbing target in the air flow path.
FIG. 66 is a cross-sectional view of a further alternate embodiment of the hair dryer having an infrared heating element downstream and adjacent an adjustable aperture.

An example is shown in FIG. 65, in which an infrared-absorbing target 190 is placed in the air flow stream. Infrared heating element 92 is focused on the infrared-absorbing target 190 to heat the infrared-absorbing target 190. Since the infrared heating element 92 is outside the airflow stream, air flowing through the air flow stream does not pass over the infrared heating element 92.

It will be appreciated that the infrared-absorbing target 190 may be positioned inside the hair dryer, exterior to the hair dryer in the air flow path and/or in an accessory tool, which may be removably mounted to the hair dryer.

Selecting the Direction of Infrared Radiation

In accordance with this aspect, the infrared heating element may have two or more radiation paths that may be used concurrently and/or selectively. This aspect may be used by itself or in combination with one or more of the other aspects set out herein.

An advantage of this aspect is that radiation from the infrared heating element may be selectively directed on either or both of an infrared-absorbing target in the air flow stream and hair, which may be adjacent the outlet. For example, a first infrared path may be provided that is directed towards an area in front of the hair dryer and a second infrared path may be provided that is directed towards an infrared absorbing target. A blocking member may reduce or prevent infrared radiation travelling in one or both directions. The blocking member may be selectively positionable in one or both of the radiation paths. Accordingly, the blocking member may be a shroud or cover that is opaque to IR radiation that may be moved (e.g., rotated or translated) in front of the infrared heating element so as to fully or partially block one of the radiation paths.

Alternately, the blocking member may be an openable port (e.g., an openable iris) that is selectively openable to enable infrared radiation to travel along one or both of the radiation paths.

In the exemplary embodiment of FIG. 65, a cover 192 is positioned in front of the infrared heating element 92. A first radiation path 194 extends from the infrared heating element 92 through a first radiation port 196. A second radiation path 198 extends from the infrared heating element 92 through a second radiation port 200. Each of first and second radiation paths 194, 198 is independently selectively openable by opening and closing the respective ports 196, 200.

The first radiation path 194 may be opened to direct infrared radiation towards hair which may be adjacent the outlet of the hair dryer. The second radiation path 198 may be opened to direct infrared radiation towards the infrared-absorbing target 190.

Variable Air Flow over the Infrared Heating Element

In accordance with this aspect, an infrared heating element is positioned in an air flow path to be cooled by an air flow, and the air flow over the infrared heating element is variable. This aspect may be used by itself or in combination with one or more of the other aspects set out herein.

An advantage of this aspect is that the temperature of an infrared heating element may be controlled by controlling the amount of air that flows over the infrared heating element. Increasing the temperature of the infrared heating element produces shorter wavelength radiation and increases the proportion of the input energy that is emitted as IR radiation and reducing the proportion of the input energy that produces convective heat. Reducing the temperature of the infrared heating element reduces the amount of infrared radiation and increases the amount of convective heat that is produced. Accordingly, for example, as air passes over an energized infrared heating element, the temperature of the infrared heating element may be reduced and the amount of infrared radiation emitted is reduced while the air passing over the infrared heating element is heated as the infrared heating element is cooled. Accordingly, increasing the amount of air flow over the infrared heater 92 will decrease the amount of infrared radiation and the temperature of the air exiting the hair dryer is increased. Similarly, decreasing the amount of air flow over the infrared heater 92 will increase the amount of infrared radiation and the temperature of the air exiting the hair dryer is decreased. As a result, if the air flow over a heating element is quickly (e.g., over 1 second) stopped, the temperature of the infrared heating element will increase quickly and enable the hair dryer to quickly (within 1-2 seconds or less) provide an intense amount of infrared radiation to, e.g., set a curl.

The temperature of the infrared heating element in operation may be adjusted by adjusting the current to the infrared heating element and/or by adjusting the air flow over the infrared heating element. Increasing the air flow over an infrared heating element will cool the infrared heating element and thereby reduce the amount of infrared radiation that is emitted. Accordingly, if the infrared heating element is in a main air flow path, the amount of air flow produced by a motor and fan blade assembly 38 may be used to adjust the infrared heating element from producing infrared heat to convective heat. Similarly, if the infrared heating element is in a supplemental air flow path 210, a valve may be opened or adjusted to enable air to flow over the infrared heating element or to enable additional flow over the infrared heating element to adjust the infrared heating element from producing infrared heat to convective heat.

In the exemplary embodiment of FIG. 66, the infrared heating element 92 is positioned downstream and adjacent an adjustable aperture 142 within the air flow path 31. By closing or partially closing the adjustable aperture 142, the air flow can be prevented from flowing over portions of the infrared heating element 92 of the air flow thereover reduced and the temperature of the infrared heating element 92, or portions thereof, can be increased. For example, a variable iris 144 may be closed to close the adjustable aperture 142.

A variable air flow over an IR heating element may be used to adjust the output of the heating element 70 for different applications. For example, when blow drying, a user may decrease the temperature of an infrared heating element 92 so that the infrared heating element 92 heats air as it passes over the infrared heating element 92. When curling hair, a user may increase the temperature of an infrared heating element 92 so that the infrared heating element 92 emits radiation that can be focused on the curl of hair to set the curl.

Water Separation and Collection Member or Members

In accordance with this aspect, some, a substantial portion or substantially all of water entering, e.g., an inlet port 33, is removed by one or more water separators 60 (e.g., 20-70 wt. %, 30-60 wt. % or 30-50 wt. %). This aspect may be used by itself or in combination with one or more of the other aspects set out herein.

An advantage of this aspect is that water may be removed from an air stream passing over motor 40 to reduce or prevent water damaging motor 40. A further advantage is that, if some or all of the air is heated to use in drying hair, water has been removed from the air that is to be heated thereby reducing the power requirement to heat the air.

Accordingly, if some or all of the air exiting the primary air flow path 32 is directed back towards the hair being dried and/or passes over motor 40 (see for example FIG. 10), then the air may be treated to remove water therefrom prior to the air being directed back towards the hair being dried. Alternately or in addition, the air may be heated prior to the air being directed back towards the hair being dried. It will be appreciated that even if some or all of the exhausted air is not directed back towards the hair being dried, the air may still be treated to remove water therefrom prior to the air being exhausted from hair dryer 10 so as to reduce air with entrained water passing over motor 40 and/or exiting the hair dryer.

Water separator 60 may be any member that removes some or all of the water in an air flow. The separated water may be retained in the water separator 60 or water separator 60 may separate water from the air stream and the separated water may be collected in a tank or container 152 (which may be referred to as a collecting member). The water separator may remove water from the air by trapping water as air passes through the water separator (e.g., the water separator may be an open cell foam), by changing the air flow pattern and collecting the separated water in a water collection member (e.g., by using a momentum separator such as a baffled air flow path, one or more cyclones or a separator that uses a spinning disc or the like to direct water radially, such as a Prandtl layer separator 370 as separator 60 and collecting the water in a container 152 to sequester the collected water) or the like.

Figures 21, 22A:
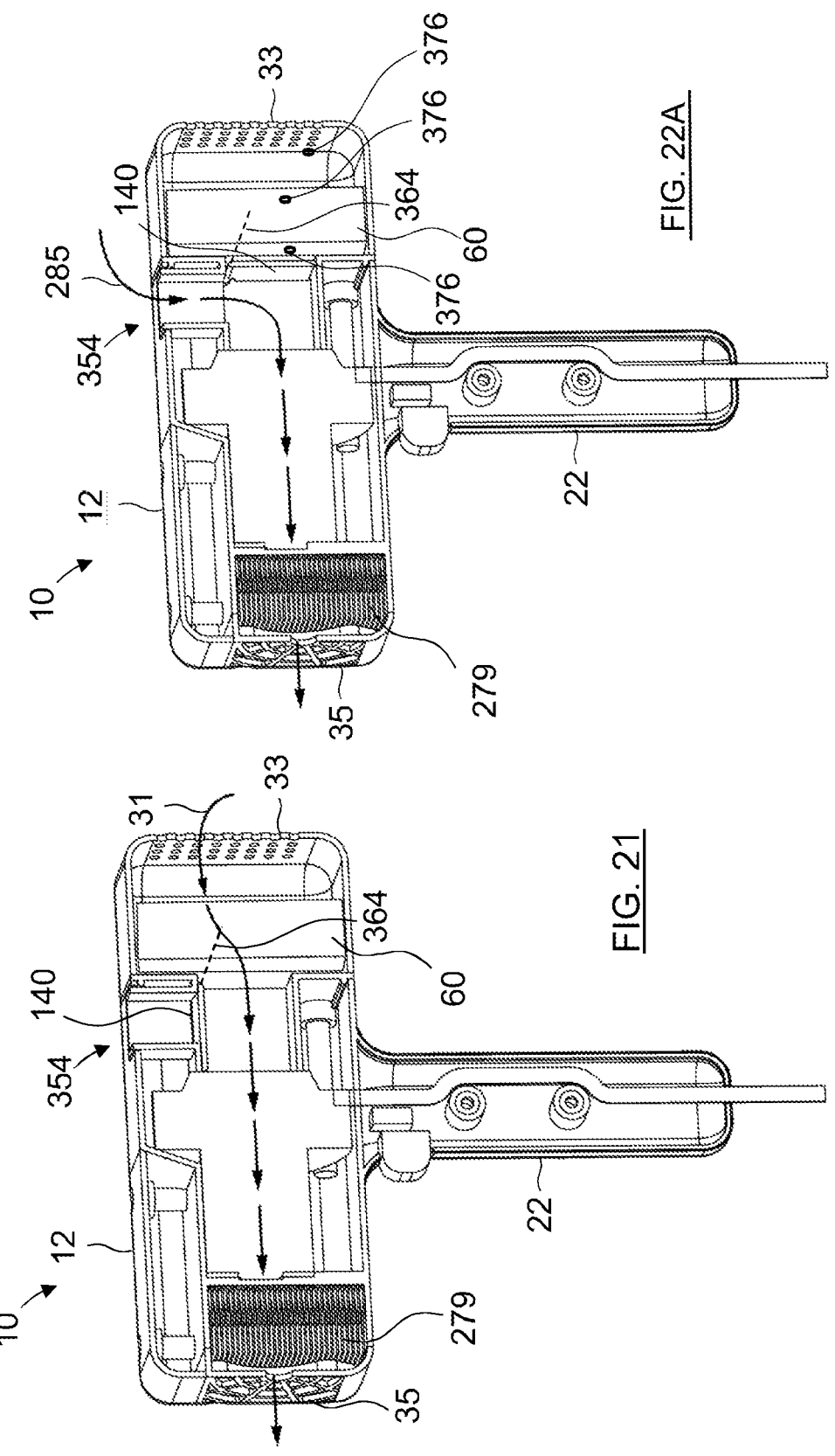
FIG. 21 is a cross sectional view of a further alternate embodiment of the hair dryer having a bypass vent and showing a first air flow route.
FIG. 22A is a cross sectional view of the hair dryer of FIG. 21 showing a second air flow route.
Figure 22B:
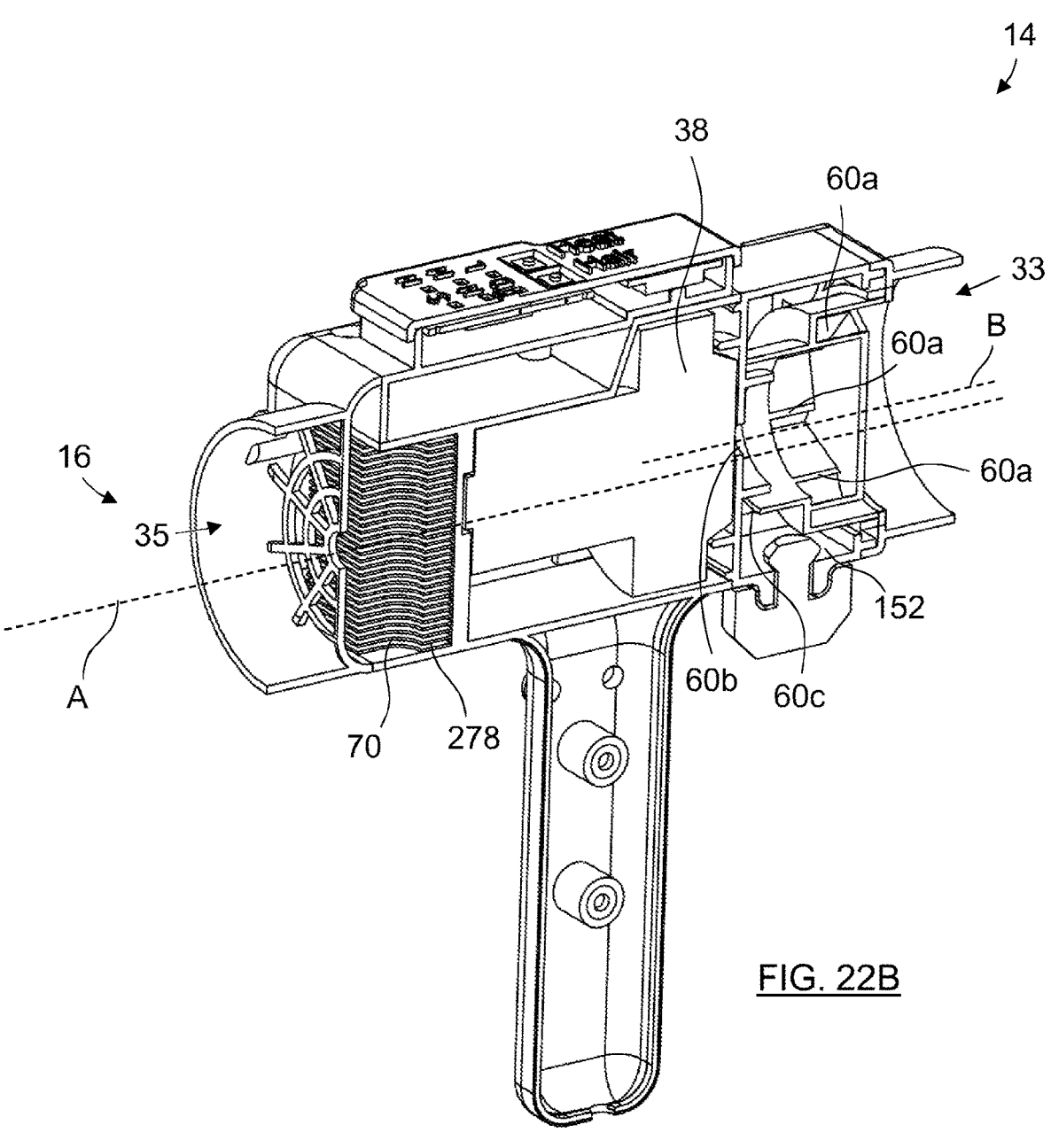
FIG. 22B is a cross sectional view of an alternate hair dryer having a cyclone as a water separator.

As exemplified in FIGS. 22B and 28, the water separator 60 may be a cyclone. It will be appreciated that the water separator 60 may comprise or consist of a single cyclone, a plurality of cyclones in parallel or a multi-stage cyclonic separator, wherein each cyclonic stage may comprise a single cyclone or a plurality of cyclones in parallel.

Each cyclone has at least one cyclone air inlet 60a and at least one cyclone air outlet 60b. Optionally, the or each cyclone may have a single air inlet 60a and/or a single air outlet 60b. Optionally, one or more of the cyclones may have multiple air inlets 60a (a multi-inlet cyclone, see for example FIG. 22B) and one or more cyclone air outlets 60b. For example, a water separator 60 may be a single cyclone having a plurality of air inlets and a single air outlet.

One or more of the cyclones may be a cylindrical cyclone or a frusto conical cyclone. Any one or more of the cyclones may have a vortex finder that is cylindrical or frusto conical.

The cyclone or cyclones may have any orientation. Each cyclone has a cyclone axis of rotation B. The portable handheld hair dryer has a hair dryer axis A extending from front end 14 to rear end 16. In the orientation of FIG. 22B, the hair dryer axis is horizontal. The or each cyclone may have an axis of rotation that extends vertically (i.e., transverse) to the hair dryer axis or the cyclone axis of rotation may be generally parallel to the hair dryer axis (i.e., generally horizontal).

Water may optionally accumulate in a lower region of the or each cyclone. Optionally, the or each cyclone may have a separated water outlet 60c that is in fluid flow communication with tank 152, such as via a line 150. Tank 152 may be removable for emptying and/or have an openable plug 66 (see for example FIG. 19) to drain tank 152 while it is located in the hair dryer or removed therefrom. In order to inhibit or prevent water flowing from tank 152 to the cyclone, a reverse flow inhibiting member may be provided. The reverse flow inhibiting member may be a valve 149, which may be a one way valve 149, which may be provided in line 150 (see for example FIG. 28). Alternately or in addition, the reverse flow inhibiting member may be a pump may be used to transfer water from the cyclone to the tank 152. The valve 149 or other reverse flow inhibiting member may be provided adjacent the separator 60 or elsewhere along the line 150 (e.g., adjacent the tank 152).

As exemplified in FIG. 136, tank 152 may be in the handle 22. The line 150 may extend from the water separator 60 to the tank 152 in the handle 22. Alternatively, or additionally, as exemplified in FIG. 137, the tank 152 may be external to the hair dryer 10. The line 150 may lead to a tank 152 outside the main body 12. As exemplified in FIG. 137, the line 150 may extend along the power cord 24 and the tank 152 may be provided adjacent (e.g., secured to) a power supply 24a. It will be appreciated that line 150 may be of any length and need not parallel the power cord 24. Accordingly, tank 152 may be positioned at any convenient location remote from the hair dryer.

Alternately, separator 60 in FIG. 28 may be an open cell foam. If water separator 60 is open cell foam, then the water separator may also function as a water collection member. Water absorbed by the open cell foam may be removed by compressing the open cell foam, withdrawing the open cell foam for drying or replacement with a drier open cell foam (e.g., through an openable port provided on main body 12 and/or removing the front end 14 of the main body to expose the foam), or removing an end of the hair dryer that includes the water separator as in the embodiment of FIGS. 119-120 or enabling air to flow through the open cell foam to evaporate water retained therein. Such air flow may occur during the drying of hair and/or subsequently when the hair is dried and, e.g., the hair dryer is placed in a stand or the like. A foam water separator 60 may be compressible while, e.g., located in the hair dryer, such as by a manual or a motor driven plate that moves, e.g., axially to the right to compress the foam, thereby removing water from the foam which may flow due to gravity or a pump into tank 152 via line 150. Tank 152 may be drained (e.g., by removing a plug 66, see FIG. 19) or removed to empty the water therefrom. It will be appreciated that the foam may be removed for drying (with or without having been compressed).

Figure 53:
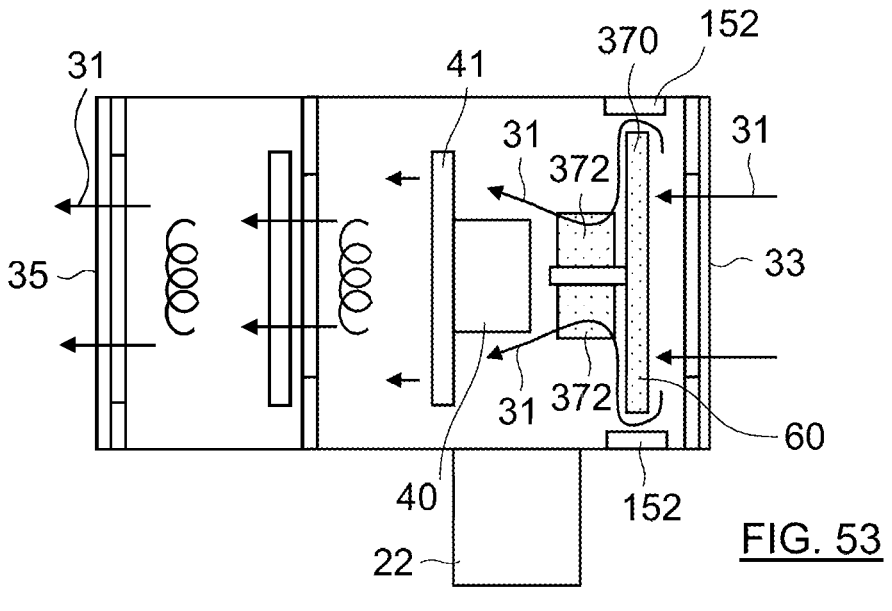
FIG. 53 is a cross-sectional view of a further alternate embodiment of the hair dryer having a Prandtl separator.

As exemplified in FIG. 53, a Prandtl separator 370 may be placed in the air flow path 31, and arranged to separate water from an air flow passing thereover. Water separated from the air flow may be directed, e.g., by centrifugal force and/or gravity, to a collection member (tank 152). For example, a Prandtl separator 370 may direct water into a tank 152 that may be located radially outward and/or below the Prandtl separator 370.

A Prandtl separator may have any structure known in the separator arts.

For example, a Prandtl separator may include a continuous disc to direct fluid past the radially outer edge. A Prandtl separator may include a disc with one or more apertures therethrough to allow fluid to pass through the Prandtl separator disc. However, it will be appreciated that any separator that relies upon a rotating member to separate water from air may be used.

The Prandtl separator 370 may be mechanically connected (e.g., via an axle) to a motor (e.g., motor 40). However, the Prandtl separator 370 may also or alternatively be driven by air movement, e.g., air movement driven by the motor and fan assembly 38. For example, the Prandtl separator 370 includes one or more plates 372 secured to the main body of the Prandtl separator 370. Air flow over the plates 372 may cause rotation of the Prandtl separator 370. Accordingly, the motor and fan assembly 38 may not be drivingly mechanically connected to the Prandtl separator.

The air flow pattern may be adjusted by using a momentum separator, other than a cyclone or a Prandtl layer separator, such as by reducing the velocity of the air travelling through a container (e.g., the cross-sectional flow area of the container is greater than the cross-sectional flow area of inlet port 34) and/or by passing the air through a baffled or a tortuous flow path.

Figures 123, 124, 125:
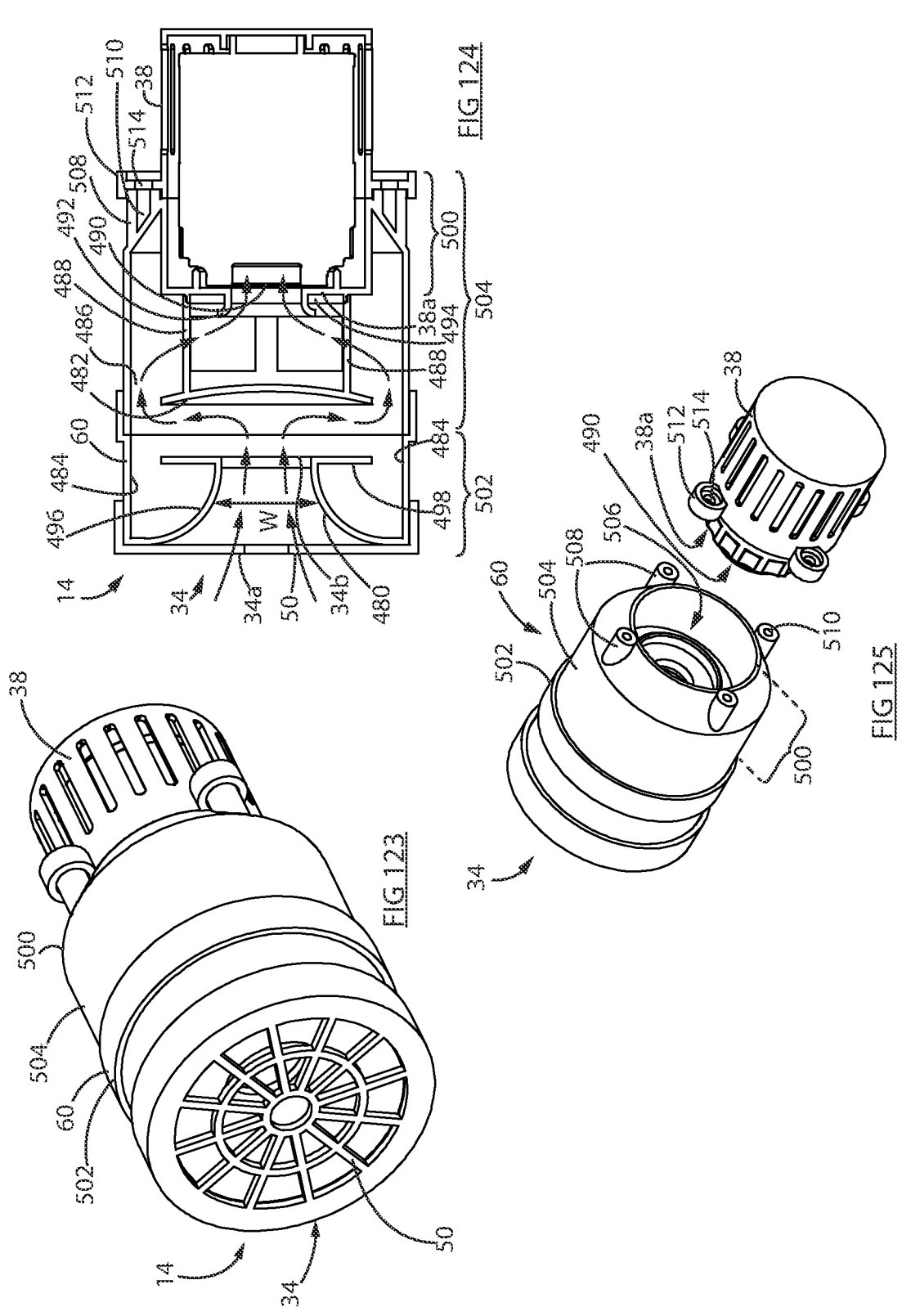

Alternately, as exemplified in FIG. 124, separator 60 may be a momentum separator. As exemplified, the air inlet 34 is a conduit that has an inlet end 34a and an outlet end 34b. Optionally, the outlet end 34b is narrower in a direction transverse to the direction of the air flow through the inlet 34 than the inlet end 34a. The width W of the air inlet may decrease continually from the inlet end 34a to the outlet end 34b. The width W may decrease at a continuous rate or the width may decrease at a greater rate as the air travels inwardly through the inlet 34. As exemplified, inlet 34 comprises a funnel shaped inlet 480 terminating at outlet end 34b.

The air entering the water separator 60 is directed towards a plate 482. Plate 482 causes the incoming air flow stream to be redirected outwardly towards side walls 484. Optionally the plate 482 is configured to inhibit air from being reflected backwards towards the outlet end 34b of the inlet 34. Optionally, plate 482 is concave.

Plate 482 may be supported in position by any means. Optionally, one or more ribs 488 may be provided to support the plate 482. The ribs may be mounted to any portion of the water separator 60. Referring to FIG. 124, the ribs are exemplified as being mounted to the front end 38a of the motor and fan assembly 38. As exemplified, the front end 38a has an inlet port 490. A flange member 492 is provided on front end 38*a*. A ring member 494 is secured around the flange 492. Flange 492 therefore, secures the ring member 494 in position. A plurality of ribs 488 extend axially forwardly to a rear side of plate 482 thereby securing plate 482 in position. Optionally, four ribs 488 may be provided and the ribs may be equidistantly spaced apart (e.g., they may be angularly spaced 90° apart).

The sidewall 484 may be cylindrical and therefore define an annular region 486 extending angularly around plate 482. It will be appreciated that the region 486 between the plate and the sidewall 484 may be continuous so as to define an annular region or it may be one or more discrete regions.

Accordingly, as air exits outlet end 34*b*, the air is directed outwardly towards sidewall 484 and enters the annular region 486. Motor and fan assembly 38 may then draw the air rearwardly past plate 482. The air may travel inwardly between the ribs 488 and travel inwardly to the inlet 490 of the motor and fan assembly 38. The rapid changes in direction of the air stream will cause water droplets entrained in the air stream to be de-entrained. The water droplets may then fall downwardly under the influence of gravity to the portion of the sidewall 484 that is the bottom. It will be appreciated that, depending upon the orientation of the hair dryer 10, the portion of the sidewall 484 that is the bottom may vary and the water may flow angularly around the sidewall 484 as the orientation of the hair dryer 10 is changed.

In order to inhibit separated water from exiting the water separator 60 through the outlet end 34*b*, the inner surface 496 of the funnel shaped inlet 480 may be provided with a backward flow inhibitor 498. As exemplified, backward flow inhibitor 498 is a flange or ring provided around the outlet end 34*b*. Accordingly, if water were to flow along inner surface 496, the water would encounter backward flow inhibitor 498, which would inhibit or block the flow of water inwardly along the inner surface 496 to outlet end 34*b*, thereby preventing or inhibiting water exiting the water separator through the outlet end 34*b*. It will be appreciated the backward flow inhibitor 498 may be provide at any location along inner surface 496 and optionally is located at the inner end of the inner surface 496 at outlet end 34*b*. The backward flow inhibitor 498 may be any shape. As exemplified, the backward flow inhibitor 498 may be a generally flat flange that extends radially outwardly. It will be appreciated that the backward flow inhibitor 498 may extend outwardly and forwardly or outwardly and rearwardly.

Alternately or additionally, as exemplified in FIG. 130, a momentum separator 60 may include an air flow path 31 in which air travels in a first direction that includes a rearward directional component and subsequently in a second direction that includes a forward directional component. The rapid change in direction of the air stream will cause water droplets entrained in the air stream to be de-entrained and fall onto the portion of the sidewall 484 that is, based on the orientation of the hair dryer, the bottom. The change in direction may be produced by the air flow encountering a redirecting wall (e.g., rear wall 520 of the water separator 60) and/or by flow mechanics produced by, e.g., the positioning ai the air inlet(s) and air outlet(s) of the water separator 60. In some examples, the first direction may be a generally rearward direction (i.e., generally parallel to the hair dryer axis A) or a rearward direction (i.e., parallel to the hair dryer axis A). Similarly, in some examples the second direction may be a generally forward direction (i.e., generally parallel to the hair dryer axis A) or a forward direction (i.e., parallel to the hair dryer axis A). Optionally, one or more screens may be provided in the air flow path in the water separator 60 to assist in separating water from the air flow and/or inhibiting re-entrainment of water that has been separated.

As exemplified in FIGS. 134 and 135, the water separator 60 may comprise a body having a sidewall 484 extending between an inlet end 60*e* and a rear end 60*g* and defining an interior volume 60*f*. Front end 60*e* (e.g., adjacent front body 556 having a front wall of the volume 60*f*) is provided with at least one inlet conduit. As exemplified, front end 60*e* has a plurality of inlet conduits 34 extending rearwardly into volume 60*f*. Rear end 60*g* is provided with the air outlet of volume 60*f*. As exemplified, the air outlet comprises conduit 522 which extends from the outlet 60*b* of the volume 60*f* to an outlet end 522*b* of conduit 522 located at the rear end 60*g* of the water separator 60. In the embodiment of FIGS. 134 and 135, the hair dryer 10 has an air flow passage extending to the front end (as was exemplified in the embodiment of FIG. 8). Accordingly, an air flow passage 52 is radially outwardly of the water separator 60 (e.g., between sidewall 484 of the water separator 60 and the outer wall 552 of the hair dryer 10). One or more support ribs 554 may extend between sidewall 484 and outer wall 552 to secure water separator 60 in position. As discussed in more detail subsequently, water separator 60 may have one or more screens 532, 534 and 536 through which part or all of the air passes as the air travels through the water separator.

Still referring to FIGS. 134 and 135, motor and fan assembly 38 may be received in a motor housing rearward of the water separator 60 and may be secured in position by any means known in the art. As exemplified, retaining plate 550 is provided with a plurality of screw ports 514 which may be aligned with screw receiving mounts 508 and screws inserted therein to secure motor and fan assembly 38 in the hair dryer 10.

Water separator 60 is optionally removably mounted to the hair dryer 10 at a location forward of the motor and fan assembly 38.

Figure 131:
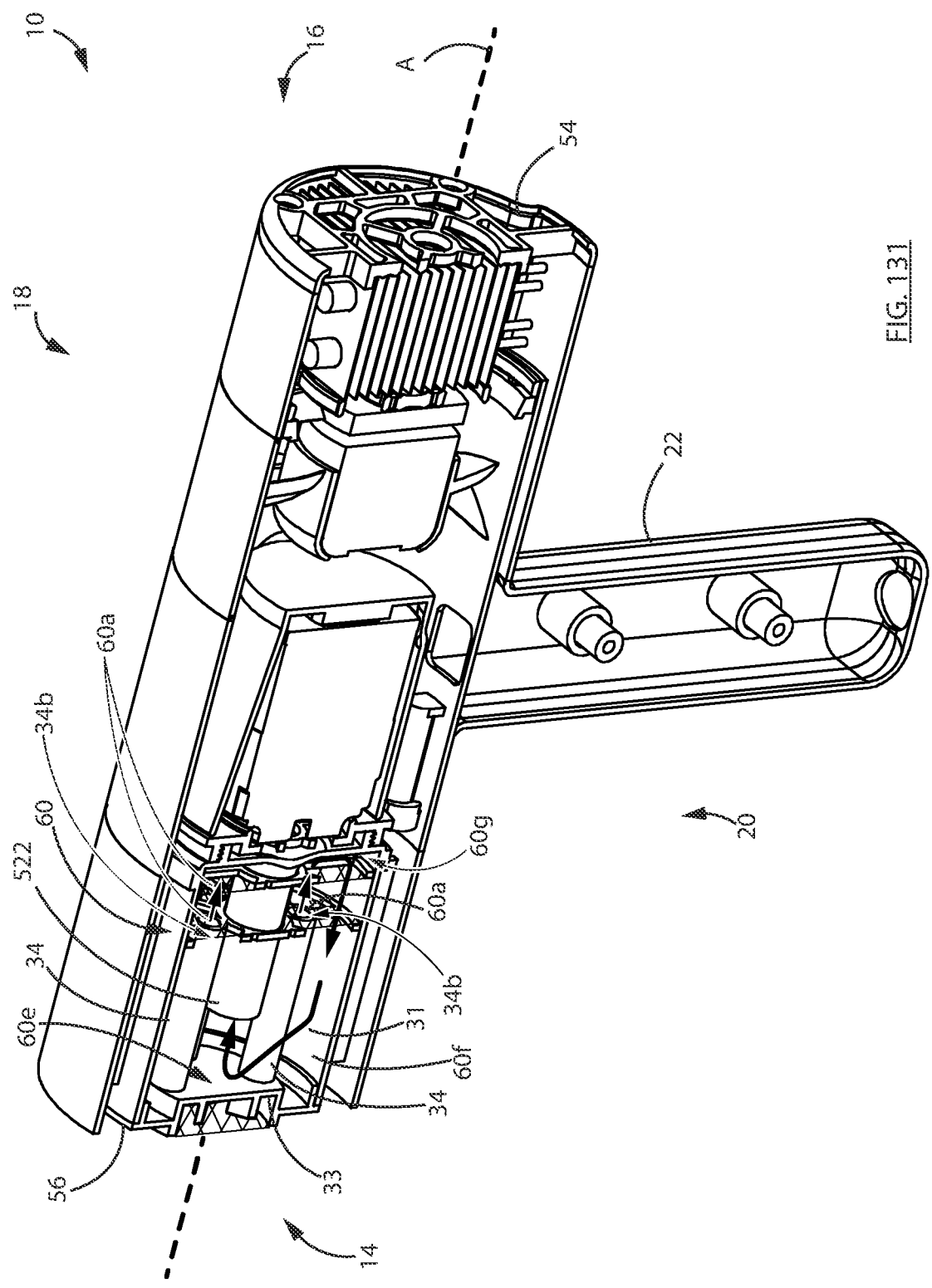

As exemplified in FIG. 131, the air may be directed in the first direction by the air inlet 34. As exemplified, the air inlet 34 includes one or more conduits that extend rearwardly from a water separator air inlet end 60*e* into a water separator volume 60*f* (e.g., parallel to the hair dryer axis A). At the outlet end or ends 34*b* of the air inlet conduit or conduits 34, each conduit 34 comprises a water separator inlet port 60*a* defining an entrance to the water separator volume 60*f*.

In order for the air to reverse or generally reverse direction as the air passes through the water separator, optionally the outlet 60*b* from the volume 60*f* is forward to the inlet 60*a* to the volume 60*f*. Accordingly, one or both of the inlet and the outlet to the water separator 60 may comprise one or more conduits. As exemplified, the air inlet comprises a plurality of inlet conduits 34 and the air outlet comprises a single centrally positioned outlet conduit 522 which is surrounded by the inlet conduits 34.

Each of the inlet conduit(s) 34 may extend from the hair dryer air inlet port 33 to a water separator inlet port 60*a*. The inlet port or ports 60*a* are spaced from the air inlet end 60*e* by a distance that results in the air flow path including a forward directional component prior to passing through outlet 60*b* and exiting the separator volume 60*f*.

As exemplified in FIG. 130, the air outlet or outlets 60*b* of the separator 60 may be forward of the inlet port or ports 60*a*, such that the air flow path 31 in the momentum separator 60 must include a forward directional component as the air moves from the inlet port or ports 60*a* to the outlet 60*b* (e.g., the sum of the distance between the front end 60*e* and the inlet port or ports 43c and the distance between the rear end 60g and the outlet port or ports 60b is greater than the distance between the front end 60e and the rear end 60g).

Once the air enters the separator 60 through the inlet port or ports 60a, the air may be directed towards a deflecting surface, and subsequently deflected and/or drawn (e.g., by the motor and fan assembly 38) in the second direction which includes the forward directional component. As exemplified, the air entering the water separator volume 60f is directed towards a rear wall 520 at the outlet end 60g of the water separator 60. The air may be subsequently deflected by the rear wall 520 and/or due to flow mechanics to travel in the second direction (a generally forward direction in the illustrated example) towards the air outlet or outlets 60b. The air outlet or outlets 60b may be the entrance of one or more outlet conduits 522. The outlet conduit or conduits 522 extend into the separator volume 60f from the air outlet end 60g, forward of the inlet(s) 60a.

The cross-sectional area of the inlet(s) 60a may be larger or smaller than the cross-sectional area of the outlet(s) 60b, however in some examples the cross-sectional area of the outlet(s) 60b is at least equal to the cross-sectional area of the inlet(s) 60a (e.g., the areas may be equal) to reduce backpressure. Optionally, as exemplified in FIG. 130 the inlet 34 may comprise a plurality of inlets conduits (e.g., spaced from one another) while the separator 60 comprises a single conduit 522. The inlets 60a may be radially spaced outward from the outlet 60b, and the outlet 60b may be positioned such that the axis of the separator 60 passes though the outlet 60b.

It will be appreciated that the inlet(s) 60a and outlet(s) 60b may be arranged in any pattern within the separator 60. Optionally, as exemplified, the inlet conduits 34 may be equidistantly spaced conduits (e.g., in an annular pattern, such as four conduits angularly spaced 90° apart) and arranged about the axis of the separator 60, with the outlet 60b arranged such that the axis of the separator 60 passes through the outlet 60b. This may promote a balanced air flow within the separator volume 60f, and the central position of the outlet 60b may direct the air flow to pass through to a centrally positioned motor and fan assembly 38. Alternately, the inlet conduits may be arranged, e.g., in a semi-annular pattern (e.g., they may define an annular sector).

As exemplified in FIG. 132, the motor and fan assembly 38 may optionally direct the air flow out through outlet ports 35. Optionally, the air flow path through the water separator 60 may be a primary air flow path with outlets 36 to an exterior of the hair dryer 10, and a separate, secondary air flow path 52 may extend from an air inlet 54 to an air outlet 54, as also shown in FIG. 130.

As exemplified in FIG. 130, the inlet port or ports 60a and the outlet or outlets 60b may each be spaced from at least one part of the sidewall 484 such that water separated from the air stream may accumulate against the sidewall 484 as a body of water without the body of water reaching the inlet 60a or outlet 60b. The distance between the sidewall 484 and the nearer of an inlet 60a or an outlet 60b may determine the amount of water that can be retained by the separator 60. While any number of inlet conduits 34 and/or outlet conduits 522 may be used, a plurality of inlet conduits 34 may allow the diameter of each conduit 34 to be reduced such that the minimum distance between the sidewall 484 and an inlet 60a is increased and a greater volume of water can be held in the separator 60 (e.g., at least four conduits 34). Optionally, the rear portion of volume 60f rearward of the inlet(s) 60a and/or the forward portion of volume 60f forward of the outlet(s) 60b) is at least equal to the lower portion of the volume 60f below the inlet(s) 60a and outlet(s) 60b (i.e., such that the water carrying capacity of the separator 60 is at least the same if tipped up or down).

Optionally, a sensor or automated shut off (e.g., a conductive or capacitance sensor) may be triggered if the water level of the body of water reaches a threshold (e.g., if the water is detected entering and/or nearing an inlet 60b or if the weight of the water reaches a threshold), and may cause the motor and fan assembly 38 to shut off (e.g., to reduce risk to a user). In some examples, the automated shut off is not needed, such as if the motor and fan assembly 38 is a low voltage assembly, or insulated (e.g., an insulator limits current between windings of a brushless motor or the motor operates with a ground-fault circuit interrupter), and/or the power supply is electrically isolated (e.g., on a brushed motor).

In some examples, one angular section of sidewall 484 of the separator 60 has a greater separation between the sidewall 484 and the nearest inlet 60a or outlet 60b than one or more other angular section. For example, the lower-most inlet 60a may be spaced from the nearest sidewall 484 of the separator 60 (i.e., the sidewall 484 nearest to the handle 22) by a larger distance than one or more other inlet 60a. This may allow a greater volume of water to accumulate in the separator 60 if the separator 60 is in one predetermined orientation, particularly if the larger spacing is at the bottom side of the hair dryer 10 during normal operation of the hair dryer 10 (e.g., with an axis B of the separator 60 extending horizontally).

Optionally, the inlet conduit or conduits 34 each have a circular cross-sectional shape, as exemplified in FIG. 130. This may allow for a simplified construction and/or operation. However, in some examples, the inlet conduit or conduits 34 may have other cross-sectional shapes, such as an annular conduit or one or more segments of an annular conduit (i.e., having an arch-shaped cross section, e.g., an angular extent of 10 or 20°).

Optionally, as exemplified in FIGS. 131 and 133, the hair dryer 10 includes an inlet screen 526 covering the inlet 33 of the hair dryer 10. Inlet screen 526 may prevent hair and/or debris (e.g., bits of fluff) from entering the hair dryer 10. As exemplified in FIG. 130, the inlet screen 526 may cover a recess or manifold 528, and the inlet conduit(s) 34 may extend from the recess or manifold 528 to the inlet(s) 60a. The recess or manifold may have a width or diameter equal to the spacing of the conduits 34, to facilitate air flow into the conduits 34 and/or allow for water to drain out of the manifold 528 into the separator 60. One or more baffles 524 may be provided to assist in directing air flow into the conduits 34.

Alternately or additionally, separator 60 may include one or more screen 530 through which the air stream is forced to pass. The screen(s) 530 may be fine mesh screens. Forcing air through the screen(s) 530 may cause water droplets entrained in the air stream to be de-entrained and fall onto the portion of the sidewall 484 that is the bottom based on the orientation in which the hair dryer is being used at the time. Additionally, or alternatively, the screen(s) 530 may inhibit movement of the accumulated body of water in the water separator 60 (e.g., inhibit sloshing and/or inhibit water from moving back into the outlet(s) 60a). The air stream may be forced through a plurality of stages of screens (e.g., the same air passes through screen material at least twice).

As exemplified in FIGS. 133 to 136, the screen(s) 530 may include one or a plurality of screens provided in the water separator air flow path 31. An inlet port screen(s) 532 may be on the inlet port(s) 60a. The inlet port screen(s) 532 may cover the inlet port(s) 60a (e.g., such that air is forced through the screen 532 when entering the volume 60f). It will be appreciated that screen 532 may be positioned internal of the conduit 34. However, screen 532 is optionally provided exterior to the conduit, such as abutting the outlet 60a of the inlet conduit 34.

The screen(s) 530 may also or alternatively include one or more interior screen(s) within the volume 60f (i.e., between the inlet(s) 60a and the outlet(s) 60b). The interior screens may include a first interior screen 534 spaced from the inlet port screen 532. The interior screens may also or alternatively include a second interior screen 536 spaced from the first interior screen 564. Each of the first and second interior screens 534, 536 is between the water separator inlet end 60e and the water separator outlet end 60g. Optionally, as exemplified in FIG. 133, the outlet conduit 522 extends through one or both of the first and second interior screens 534, 536.

As exemplified in FIGS. 134 and 135, second interior screen 536 may be positioned rearward of first interior screen 534. For example, second interior screen 536 may be positioned proximate rear end 60g of the water separator 60. Accordingly, some of the air may pass through second interior screen 536 prior to travelling forwardly to outlet 60b. For example, at least 40%, 50%, 60%, 70% 80% or more of the air ay pass through second interior screen 536 prior to travelling forwardly to outlet 60b.

First interior screen 534 may be positioned at any location forward of second interior screen 536 such that at least some of the air passes through first interior screen 534 as the air travels to the outlet 60b. Optionally, first interior screen 534 may be positioned such that all of the air passes through first interior screen 534 as the air travels to the outlet 60b. Accordingly, as exemplified in FIG. 136, first interior screen 534 is provided between second interior screen 536 and the outlet 60b (the inlet to conduit 522).

As exemplified in FIGS. 133 and 136, the second interior screen 536 may adjoin the port screen(s) 532. Optionally, the second interior screen 536 and the port screen(s) 532 are formed of a common screen body.

As exemplified, the screen 530 comprise a frame 538 on which a mesh is provided. the mesh of one or more of the screens 532, 534, 536 may have a mesh size between 10 mesh and 100 mesh, or between 40 mesh and 80 mesh, or about 60 mesh. The mesh size of each of the screens 532, 534, 536 may be the same or different. In some examples the mesh size of each stage of screens is at least as large as the preceding stage (e.g., the mesh size of interior screen 534 is at least as large as that of port screen 532 and the mesh size of interior screen 536 is at least as large as that of interior screen 534). In some examples, the screen size of the port screen 532 is less than the screen size of the interior screen(s) (e.g., the port screen 532 has a mesh size of 20 and the interior screens 534, 536 each have a mesh size of 60 or the first interior screen 534 has a mesh size of 40 and the second interior screen 536 has a mesh size of 60).

It will be appreciated that the water separator 60 may be of any shape. As exemplified in FIG. 124, the water separator 60 extends around a portion of the motor and fan assembly 38. As exemplified in FIG. 125, the rear end of the water separator 60 may have a recess 506 in which at least the forward portion of the motor and fan assembly 38 having the inlet 38a may be removably receivable. The arm members 500 may define some or all of the recess 506. For example, the rear end of the water separator 60 may have screw receiving mounts 508 having screw receiving openings 510 and the motor and fan assembly 38 may have flanges 512 having screw ports 514. Accordingly, the flanges 512 may be aligned with the screw receiving mounts 508 and a screw inserted through screw ports 514 and then secured into screw receiving openings 510 so as to removably mount the motor and fan assembly 38 in the recess in the water separator 60. Accordingly, the water separator 60 has an arm portion 500 (that is optionally annular) that surrounds the forward part of the motor and fan assembly 38. The arm portion 500 provides an additional portion of the sidewall 484 on which separated water may be retained. It will be appreciated that the arm portion 500 may extend along part or all of the motor and fan assembly 38. The arm portion 500 may be considered part of a tank 152 for the water separator.

The water separator 60 may be emptied by any means discussed herein. Optionally, the water separator 60 may be openable. For example, the water separator 60 may have a forward portion 502 that is separable from a rearward portion 504. The forward and rearward portions may be secured together by any means. For example, one or more latches may be provided. Alternately, a rotatable mount, such as a screw mount or a bayonet mount, may be used. Accordingly, a user may rotate the front portion 502 with respect to the rear portion 504 so as to open the water separator 60. Water may then be emptied from the water separator.

It will be appreciated that the water separator 60 may be opened while the water separator 60 is mounted in position in the hair dryer 10 or after the water separator 60 has been removed from the air dryer as discussed subsequently herein.

If the water collection member is a tank 152 in which water is sequestered (see for example FIG. 19), then tank 152 may be emptied by removing the tank 152 or removing a plug 66 so as to open a drainage port 64 when the tank 152 is on board the hair dryer or has been removed from the hair dryer. Optionally, the tank 152 may be heated to evaporate water (e.g., to reduce the amount of maintenance needed by a user).

It will be appreciated that tank 152 may have an internal member that inhibits water exiting the tank 152. For example, tank 152 may have one or more baffles. Alternately or in addition, tank 152 may have a foam member therein or a honeycomb structure. An advantage of this design is that the water in the tank will tend to remain in position as the hair dryer is moved. Accordingly, when the hair dryer is used at an angle, water will tend to remain in tank 152 and not flow back into the water separator 60. Optionally, the foam may be removable from tank 152 for drying or replacement. Alternately or in addition, the foam may be compressible while in tank 152 so as to drain water from tank 152. For example, a plate may be driven manually or by a motor that moves, e.g., axially to the right to compress the foam, thereby removing water from the tank 152, such as through a drain when a plug 66 has been removed.

It will be appreciated that a water separator 60 and a water collection member may be provided regardless of whether air in primary air flow path 32 is redirected to secondary air flow path 52 and/or if a by-pass fan is used.

In some embodiments, the water separator and the water collection member 60 is between 10 and 40 mm, 20 mm and 30 mm or about 25 mm in thickness parallel to the direction of air flow through the water collection member 60. For example, the water collection member 60 may be an open cell foam block 25 mm thick along a dimension parallel to the direction of air flow through the water collection member 60.

Figure 122:
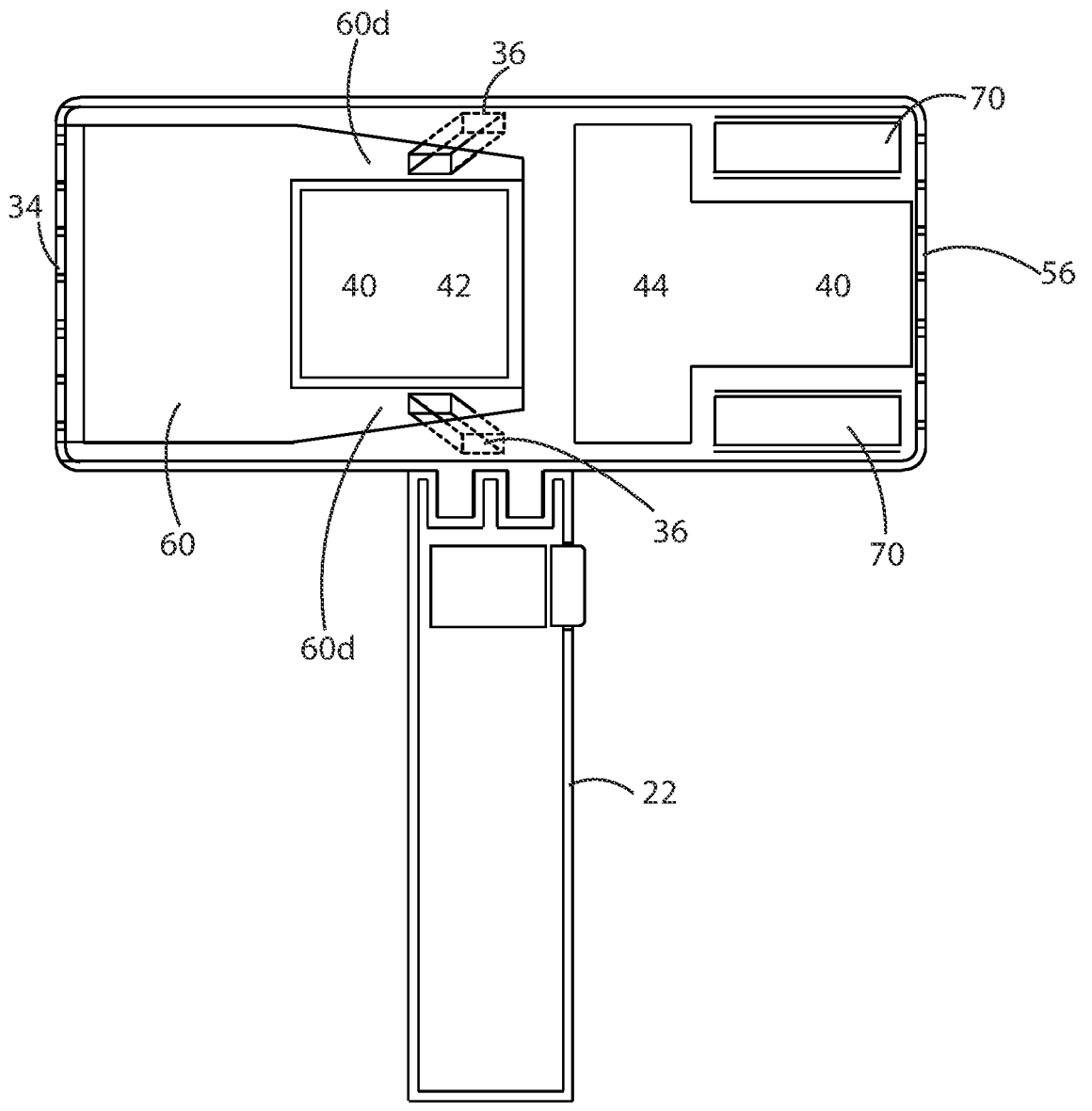

It will be appreciated that the water separator 60 and the water collection member 152 (if provided) may be of any shape. Optionally, as exemplified in FIG. 122, the water separator 60 may be configured such that part or all of the water separator and/or the water collecting member 152 may surround part of all of a motor and fan assembly 38. For example, as exemplified in FIG. 122, portion 60*d* of the water separator 60 is annular in shape and surrounds the motor and fan assembly 38. It will be appreciated that portion 60*d* may extend axially to overlie only part of the motor and fan assembly 38 and/or may extend partway or all the way around the perimeter of the motor and fan assembly 38.

The water separator 60 and/or tank 152 may be made of any material. Optionally, the water separator 60 and/or tank 152 are made of a transparent material and the interior of the water separator 60 and/or tank 152 is visible from exterior to the hair dryer. Accordingly, for example, the outer wall of the main body 12 that overlies the water separator 60 and/or tank 152 may be transparent or may have a window (opening) and/or a transparent portion. Alternately, or in addition, part or all of the water separator 60 and/or tank 152 may form part of the outer surface of the hair dryer. See for example FIG. 123.

It will be appreciated that the water separator 60 and/or the tank 152 may be removable. For example, as in the embodiments of FIGS. 121-125, the end of the hair dryer 10 having the water separator 60 and/or the tank 152 may be removable.

As exemplified in FIG. 133, a rotatable mount 540, such as a screw mount or a bayonet mount, may be used. Accordingly, a user may rotate the front portion 542 with respect to the rear portion 544 so as to remove the water separator 60. The separator 60 may be sealed when removed (i.e., to prevent water from spilling out).

Optionally, a foam filter 546 may be between the separator 60 and the motor and fan assembly 38. The foam filter between the separator 60 and the motor and fan assembly 38 may be removeable (e.g., exposed) when the separator 60 is removed and/or may be removed from the rear portion of the hair dryer 10 with the water separator 60 (e.g., may be mounted to the removeable portion). Alternatively, or additionally, the foam may be in a compartment that can be accessed through a door, and the door may be openable when (e.g., only when) the separator 60 is removed from the rear portion of the hair dryer 10.

If part or all of the water separator 60 and/or tank 152 are transparent or part or all of the outer wall of the hair dryer 10 is transparent, then a user may notice when the water separator 60 and/or the tank 152 require emptying and then remove the water separator 60 and/or the tank 152 for emptying or cleaning or replacement.

Minimizing Re-entrainment

In accordance with this aspect, the velocity of air through the water separator 60 may be reduced, eliminated and/or stabilized to reduce or prevent re-entrainment of water in the air flow. For example, when the hair dryer is used in the second operating mode, the water separator 60 may be bypassed or the velocity of the air flow therethrough may be reduced. Alternately, or in addition, the air flow through the hair dryer may be controlled to avoid surges in air flow during the first mode when suction is being used and the hair is moved away from the hair dryer air inlet. This aspect may be used by itself or in combination with one or more of the other aspects set out herein.

An advantage of this aspect is that the air flow velocity through the water separator 60 may be kept from becoming sufficiently high to re-entrain water or a significant amount of water that is in the water separator 60 and/or tank 152. Water re-entrained in the air flow exiting the water separator may pass over and damage a component of the hair dryer (e.g., the motor 40).

Further, as the velocity of the air through the water separator increases, the moisture capture efficiency of the water separator may decrease. This relationship may be non-linear, with a small reduction in efficiency across a range of low velocities, and a rapid reduction in efficiency as the velocity increases above the range of low velocities. A change in velocity may result in an exponential change in re-entrainment (e.g., the re-entrainment rate of moisture may increase by a factor that is equal to the square of the factor by which the velocity increased). Accordingly, keeping the velocity lower may substantially increase the moisture capture efficiency of the water separator 60.

For example, the velocity of air through the water separator 60 during the suction mode may be kept within acceptable limits by maintaining the volume of air per unit time through the water separator at, e.g., less than 15 CFM or less than 10 CFM, e.g., between 2 CFM and 15 CFM, between 4 CFM and 10 CFM, or at about 6 CFM.

Generally, as the hair dryer 10 is used in a suction mode to draw water from hair, the hair dryer 10 is held against or near the hair and the hair may partially obstruct the air inlet 33. This obstruction reduces the air flow volume per unit time which therefore reduces the air flow velocity through the water separator. However, when a user removes the hair dryer 10 from the hair, the flow restriction created by the hair is removed and the volume of air per unit time passing through the water separator 60, and therefore the air flow velocity, will increase. If a user is applying and removing the hair dryer 10 repeatedly, the air flow velocity will also fluctuate repeatedly. For example, the volume may change from, e.g., 5-15 CFM to 35 CFM or more repeatedly. Placing hair against the screen 50 may result in an effective inlet port cross-sectional area of the inlet port 33 that is, e.g., 50%, 40%, or 25% of the inlet port cross-sectional area.

To control the air flow velocity through the water separator 60, the air flow path used in the first mode of operation may be configured or reconfigurable to limit the air flow volume through the hair dryer 10 when hair is not placed against the screen 50. Alternately, or in addition, the air moving member in the primary air flow path may be configured or operated to limit the air flow volume through the hair dryer 10 when hair is not placed against the screen 50.

In a first embodiment, the volumetric flow rate of air may be limited by providing a restrictor in the primary air flow path. The restrictor may be in the water separator, upstream of the water separator or downstream of the water separator. When hair is placed against the intake screen 50, the hair will provide a restriction to air entering the hair dryer and the hair may thus limit the air flow through the water separator. When the hair is removed from the screen 50, the restriction provided by the hair is removed and the volumetric flow rate of air into the hair dryer would increase. By providing a restrictor in the primary air flow path, the restrictor may limit the volumetric flow rate of air through the water separator to a desired maximum flow rate when hair is removed from screen 50 without adjusting the rate of rotation of the suction motor.

The restrictor may be created by, e.g., a constriction of the air flow path, an obstruction in the air flow path, and/or an abrupt redirection in the direction of travel through the air flow path. The restrictor may operate as a bottleneck to limit the air flow at one or more locations and thereby limit the air flow through the water separator 60.

For example, the cross-sectional flow area in a direction transverse to a direction of a flow of air through a portion 452 of the primary air flow path 32 (hereinafter referred to as the "first portion cross-section flow area") may be less than the cross-sectional flow area of the inlet port 34 (e.g., less than 100%, 75%, 50%, 40%, or 25% of the cross-sectional flow area of the inlet port 34). The portion 452 of the primary air flow path 32 may be downstream of the water separator 60, and may alternatively or additionally be upstream of the motor and fan assembly 38 and/or upstream of at least one supplementary inlet 354 introducing bleed air into the secondary air flow path 52.

The first portion cross-section flow area may be fixed or variable. Accordingly, the restrictor may be a port or plate having an orifice of a fixed (i.e., non-variable) diameter. Such a restrictor will provide an absolute limit to the volumetric air flow rate regardless of the amount of hair placed against inlet screen 50. Alternately, the restrictor may have a variable diameter so as to adjust the volumetric flow rate as less hair is placed against the inlet screen 50.

If the first portion cross-section flow area is fixed, then the cross-sectional flow area in a direction transverse to a direction of flow of air through the first portion cross-section flow area may have a diameter or an equivalent diameter of, e.g., between 0.1 inches and 1 inch, between 0.1 inches and 0.5 inches, or about 0.25 inches. Similarly, if the first portion cross-section flow area is variable, then its smallest diameter or equivalent diameter may be the same as the fixed diameter or equivalent diameter as set out above. Accordingly, for a particular water separator, the maximum flow of air through the water separator when hair does not restrict the air flow into the hair dryer through the screen 50 may be limited by a flow restrictor.

Figure 101:
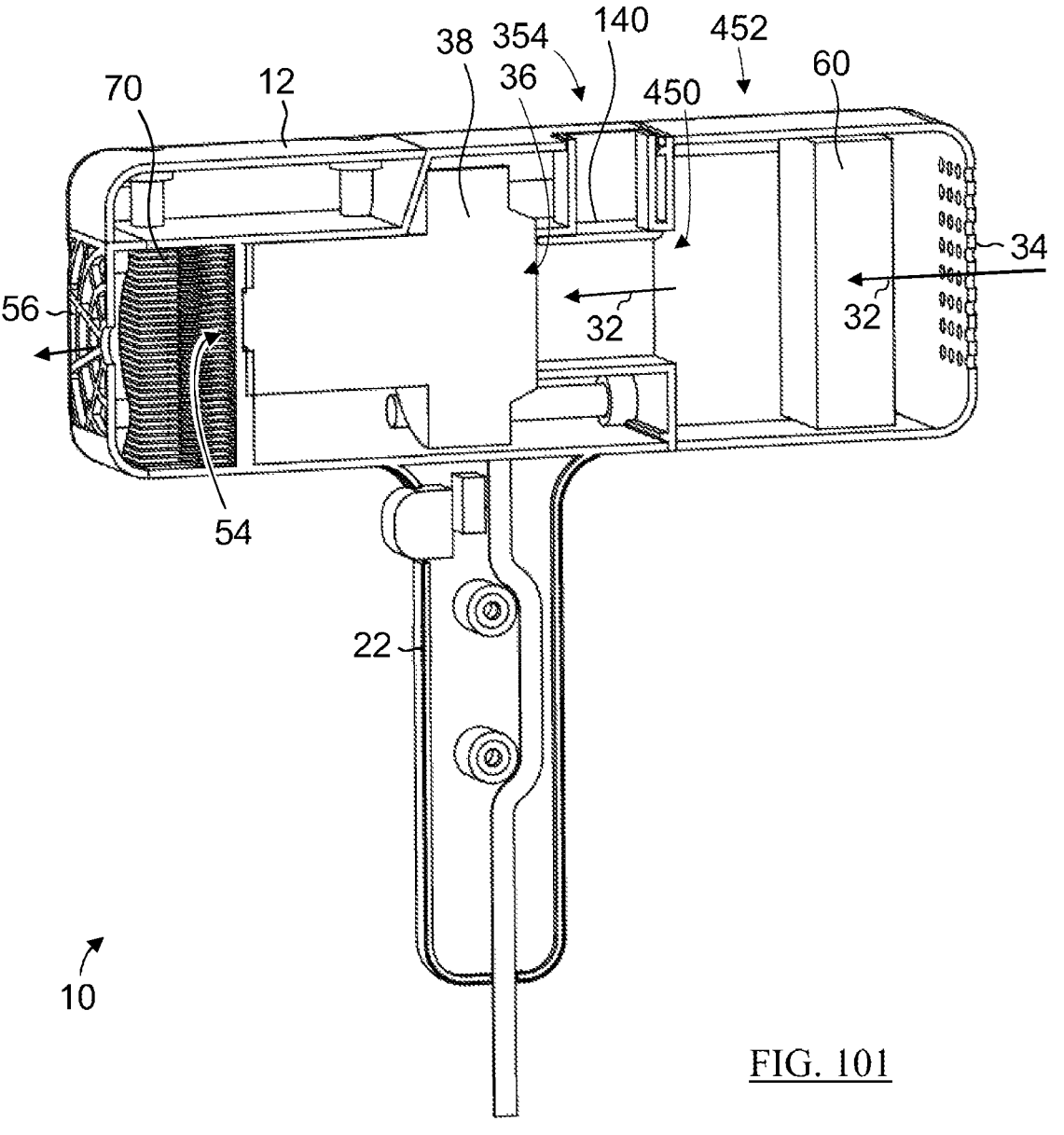
FIG. 101 is a cross sectional view of a further alternate embodiment of the hair dryer having an outlet from the water separator.
Figure 102:
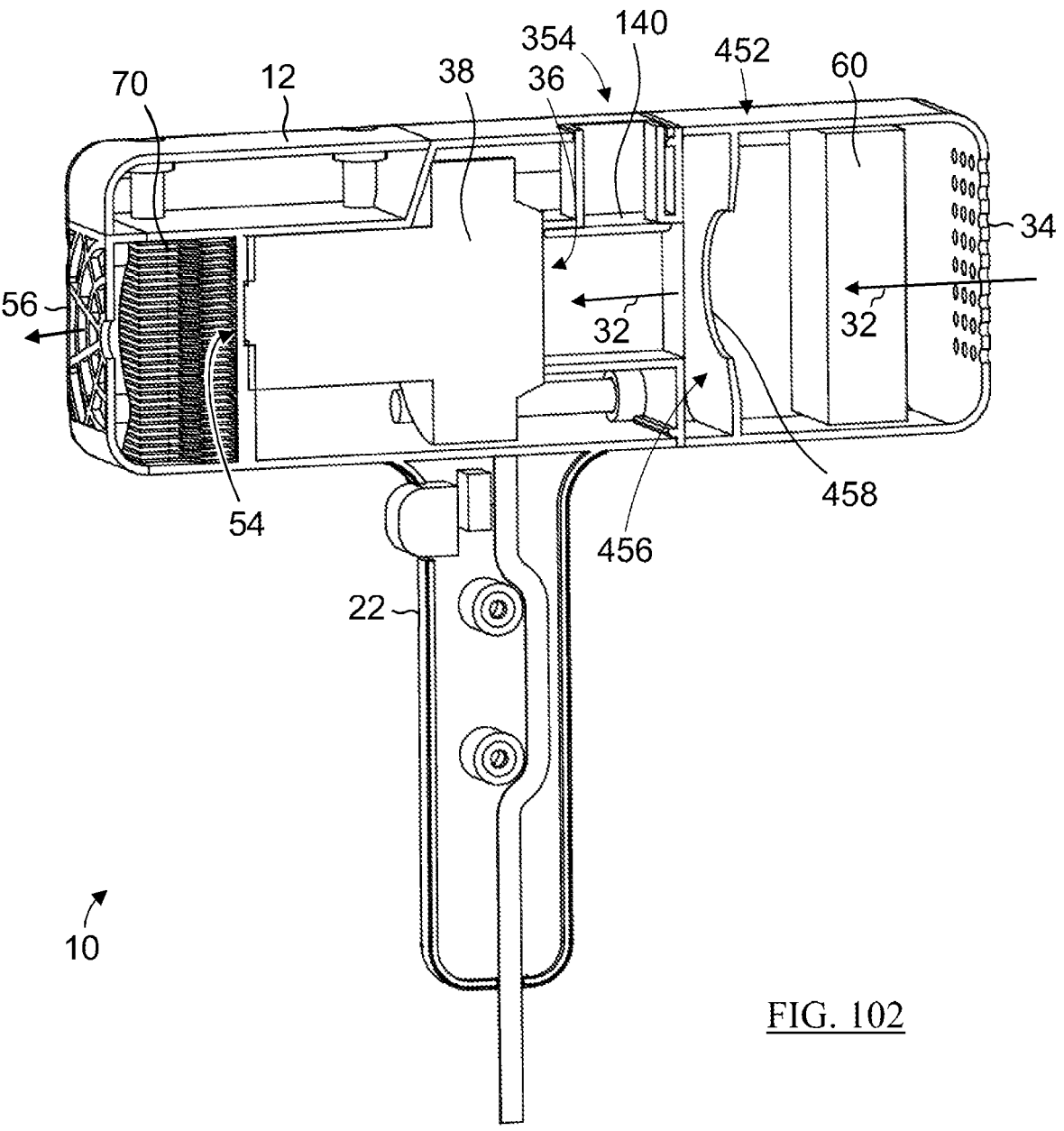
FIG. 102 is a cross sectional view of a further alternate embodiment of the hair dryer having a first obstructing member.

This first portion cross-section flow area may be provided by a portion of the primary air flow path 32 having a narrower diameter. Accordingly, a length some or all of a conduit may be narrowed. Alternately, or in addition, the primary air flow path 32 may be narrowed at a single location, such as by the diameter of the outlet port 450 from the water separator 60, as shown in FIG. 101. The outlet port may be narrowed so as to act as an orifice that limits the volumetric flow rate of air out of the water separator 60.

Alternately or in addition, as exemplified in FIGS. 102 to 108, one or more obstruction members 456 may be added to the primary air flow path 32 to increase the backpressure in the primary air flow path. The obstruction member 456 may extend across the portion 452 of the primary air flow path 32 to create back pressure and the first portion cross-sectional flow area may be the flow path through and/or around the obstruction member 456. The obstruction member 456 may be a separate member that is provided in the primary air flow path 32, such as a plate 458 with an orifice as exemplified in in FIG. 102.

Alternately, or in addition, the restrictor may be one or more valves within the primary air flow path 32 which are operable to partially close, and thereby restrict, the air flow through the primary air flow path 32. These valves may be adjusted to stabilize the volume of air flow per unit time passing through the water separator 60 (e.g., by closing or opening an iris valve 144 at some point along the air flow path 31 (see for example FIG. 48 and FIGS. 102 and 103)).

A suitable valve may be an obstruction member 456 that is or comprises an adjustable member that is moveable between a first configuration in which the first portion cross-section flow area has a first cross-sectional flow area and a second configuration in which the first portion cross-section flow area has a second cross-sectional flow area, wherein the second cross-sectional flow area is greater than the first cross-sectional flow area.

The first and second configurations may be due to, e.g., a movement or a deformation of the obstruction member 456. For example, the obstruction member 456 may be and/or include a deformable member and/or a member having a deformable portion 460. As in the example embodiment of FIGS. 103 and 104, the obstruction member 456 may be and/or include a deformable portion 460 which deforms as the deformable portion transitions from the first configuration (FIG. 103) to the second configuration (104). The deformable portion 460 may be in a relaxed or undeformed state in the first configuration or it may be partially deformed in the first configuration and further deformed in the second configuration.

The deformable portion 460, such as a diaphragm, may be made of or comprise a resilient material, such as an elastomeric material. Alternately, the deformable portion 460 may be a mechanical member made of a plurality of non-deformable members, which are biased (e.g., by a spring) to the first configuration. An example of such a deformable member is an openable iris 144 (see for example FIGS. 105 and 106).

The deformable portion 460 may move in response to, e.g., pressure differences due to the velocity of air. For example, at higher air velocities through the obstruction member 456 the difference in air pressure upstream and downstream of the deformable portion 460 may increase, causing the deformable portion 460 to move in the downstream direction towards the zone of lower pressure. When hair restricts flow into the hair dryer, a lower pressure zone is created on the downstream side of the deformable portion 460 and the pressure differential across the deformable portion 460 draws the elastomeric member inwardly in the flow direction thereby expanding the opening 462 in the deformable portion 460. When hair is removed, more air may flow through the primary air flow path 32 and the pressure downstream of the deformable portion 460 may increase. As the pressure difference across the deformable portion 460 decreases, the deformable portion 460 may rebound to is neutral first configuration. Accordingly, the deformable portion 460 may comprise a diaphragm and the diaphragm may move from the first configuration to the second configuration in response to a pressure downstream of the diaphragm that is less than a pressure upstream of the diaphragm.

The deformable portion 460 may be moved by an actuator (e.g., an arm member driven by a solenoid) that moves in response to signals from a sensor or from a user, or an actuator (e.g., an associated flow restrictor 464) that moves in response to air flow through the primary air flow path 32 or the deformable portion 460 may move itself due to a pressure differential (e.g., a resilient diaphragm as discussed previously).

Figure 103:
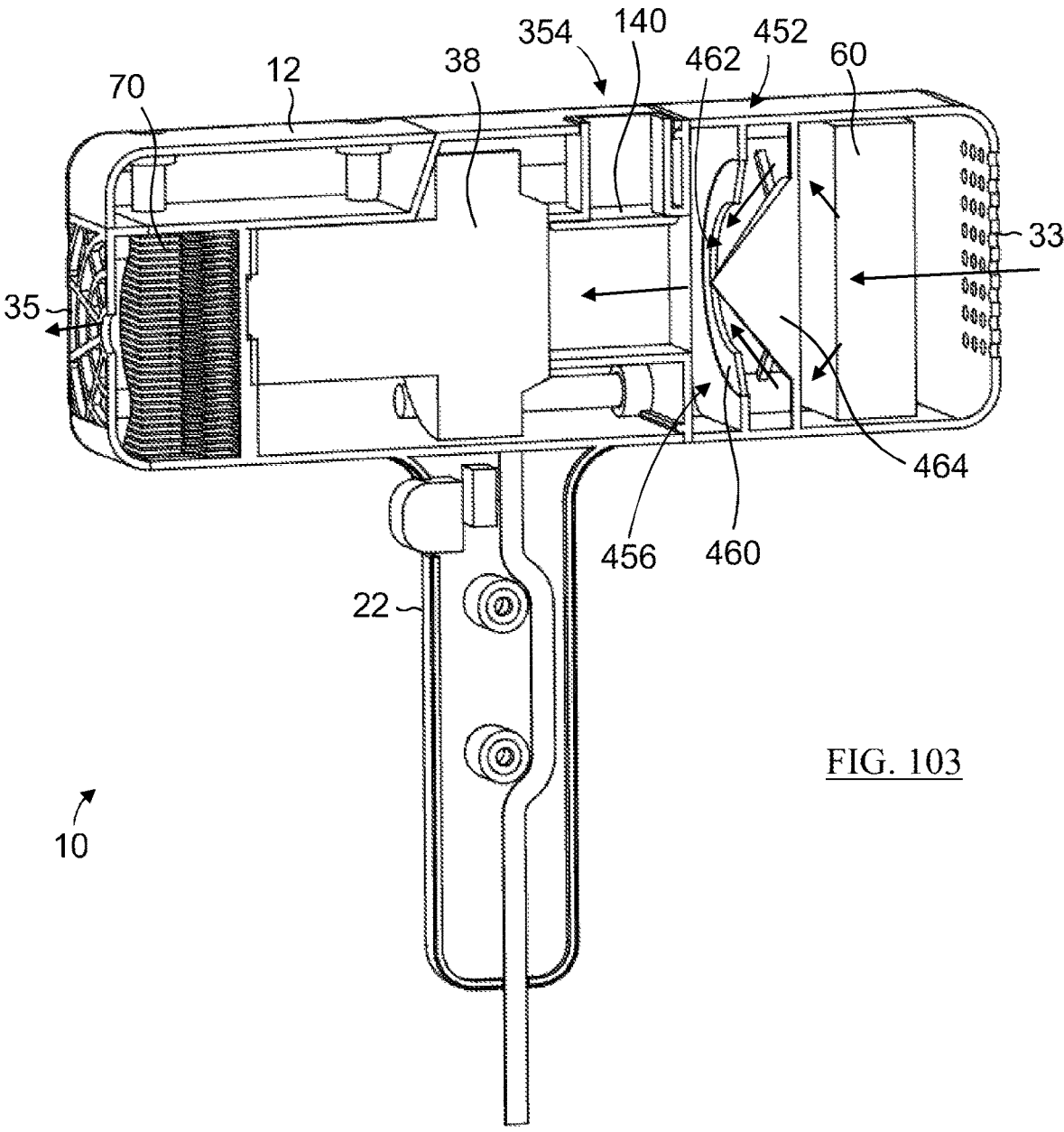
FIG. 103 is a cross sectional view of a further alternate embodiment of the hair dryer having a second obstructing member in a first configuration.
Figure 104:
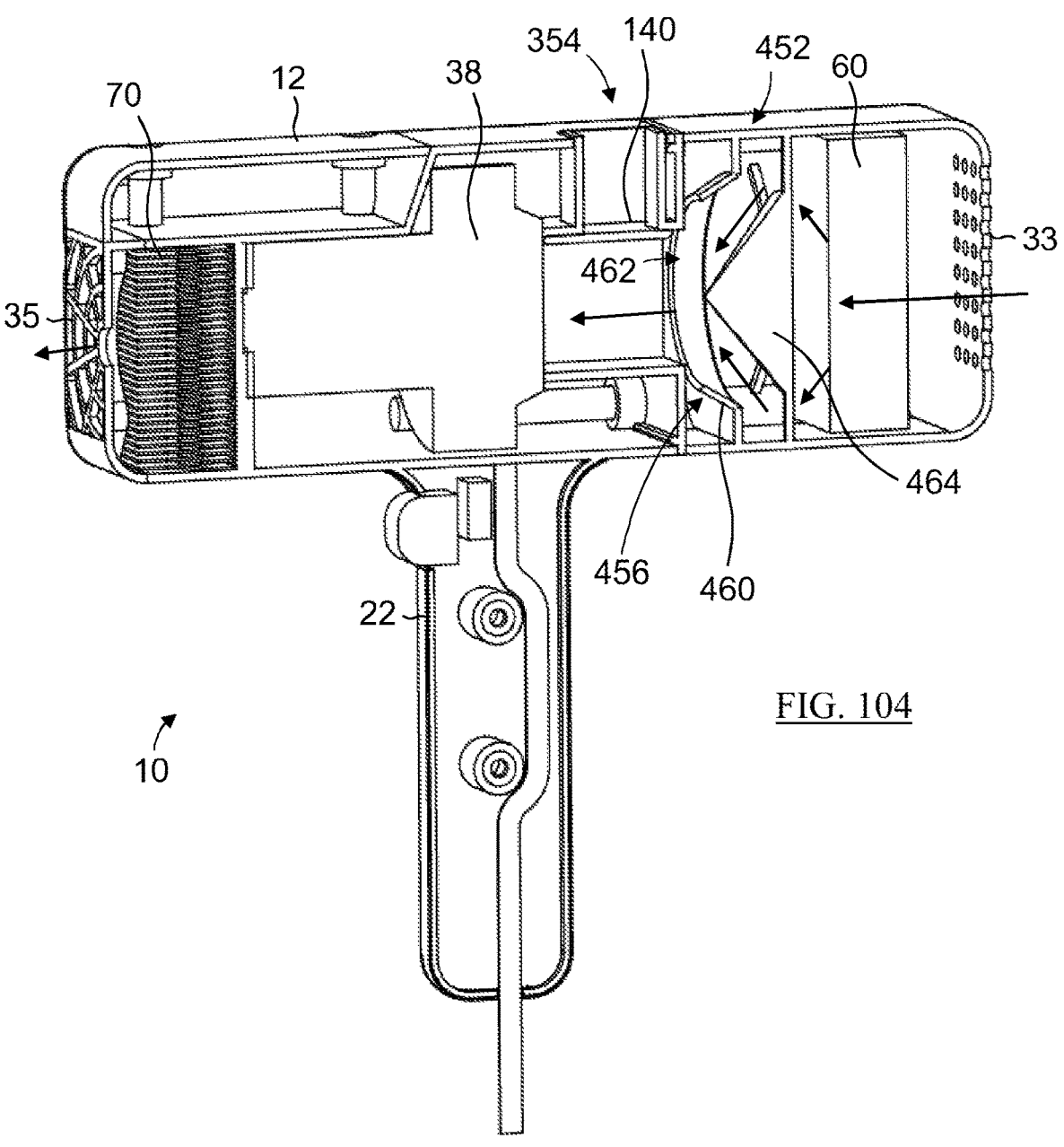
FIG. 104 is a cross sectional view of the hair dryer of FIG. 103 with the second obstructing member is a second configuration.

As exemplified in FIGS. 103 and 104, the deformable portion 460 may be an elastomeric member which has an opening 462 and an associated flow restrictor 464, and the opening 462 may be moveable with respect to the flow restrictor 464. In the first configuration (FIG. 103), the opening 462 is in a first high flow position (no hair is located on screen 50) and the air flow passage past the deformable portion 460 is created by the gap between the flow restrictor and the perimeter of the opening 462. In the second configuration (FIG. 104), the deformable portion 460 is in a high suction position (hair is placed on the screen 50) and deformable portion 460 has deformed inwardly in the flow direction from the first high flow position (FIG. 103). Due to the lower pressure zone created on the upstream side of the deformable portion 460, the deformable portion 460 has moved inwardly and the gap between the flow restrictor and the perimeter of the opening 462 has increased to enable more air to pass through the opening 462. When the hair is removed from the screen 50, more air passes through opening 462 thereby reducing the pressure difference across the deformable portion 460 and the deformable portion 460 may rebound to is neutral first configuration. The deformable portion 460 is biased to the first high flow position (FIG. 103) by, e.g., the resilience of the elastomeric member. It will be appreciated that other biasing members may be used.

It will be appreciated that, in an alternate embodiment, a flow restrictor may not be provided and the air flow passage through the deformable portion 460 may be defined by the size of the opening 462, which increases as the pressure difference across the deformable portion 460 increases.

Figure 105:
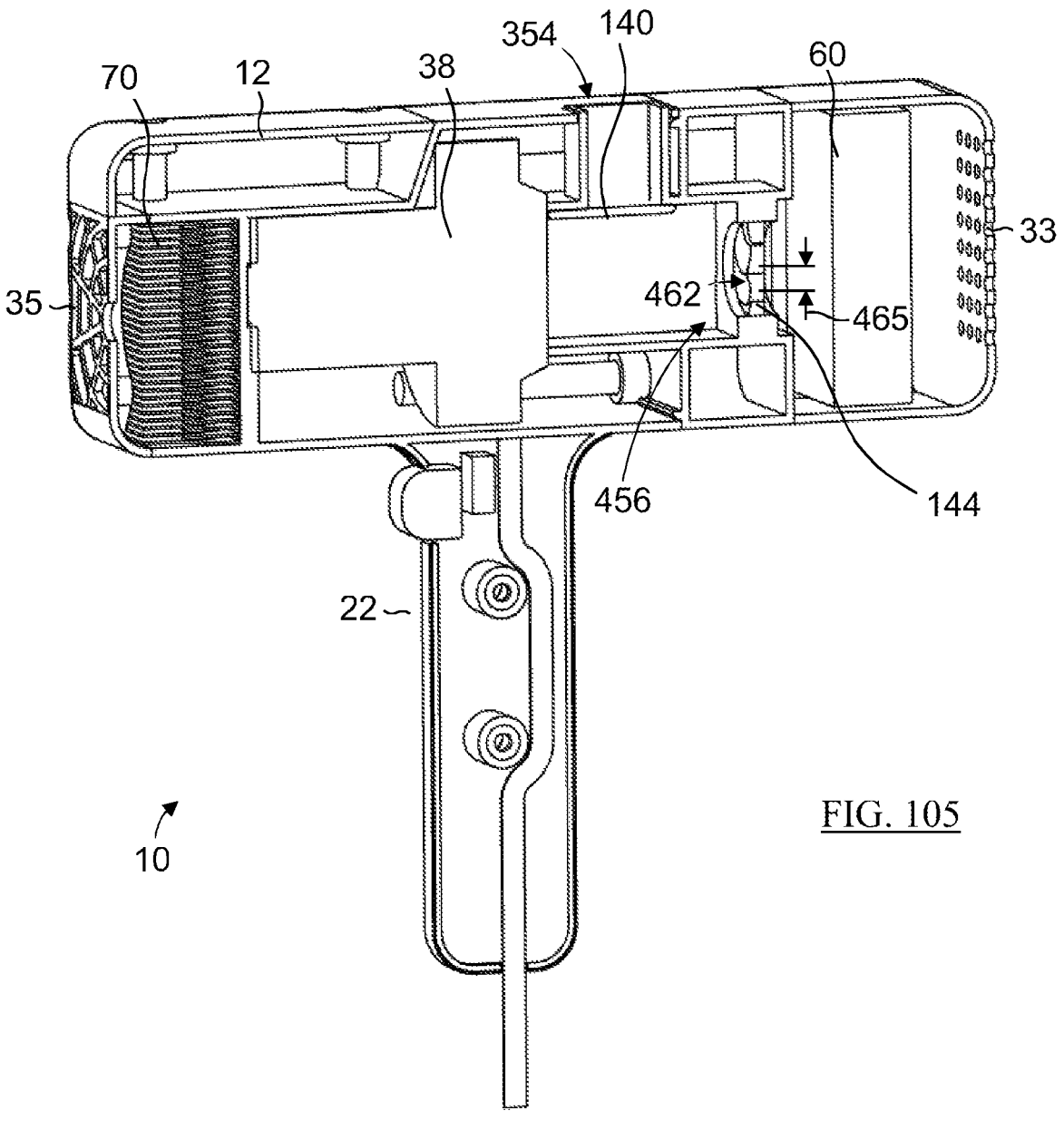
FIG. 105 is a cross sectional view of a further alternate embodiment of the hair dryer having a third obstructing member in a first configuration.
Figure 106:
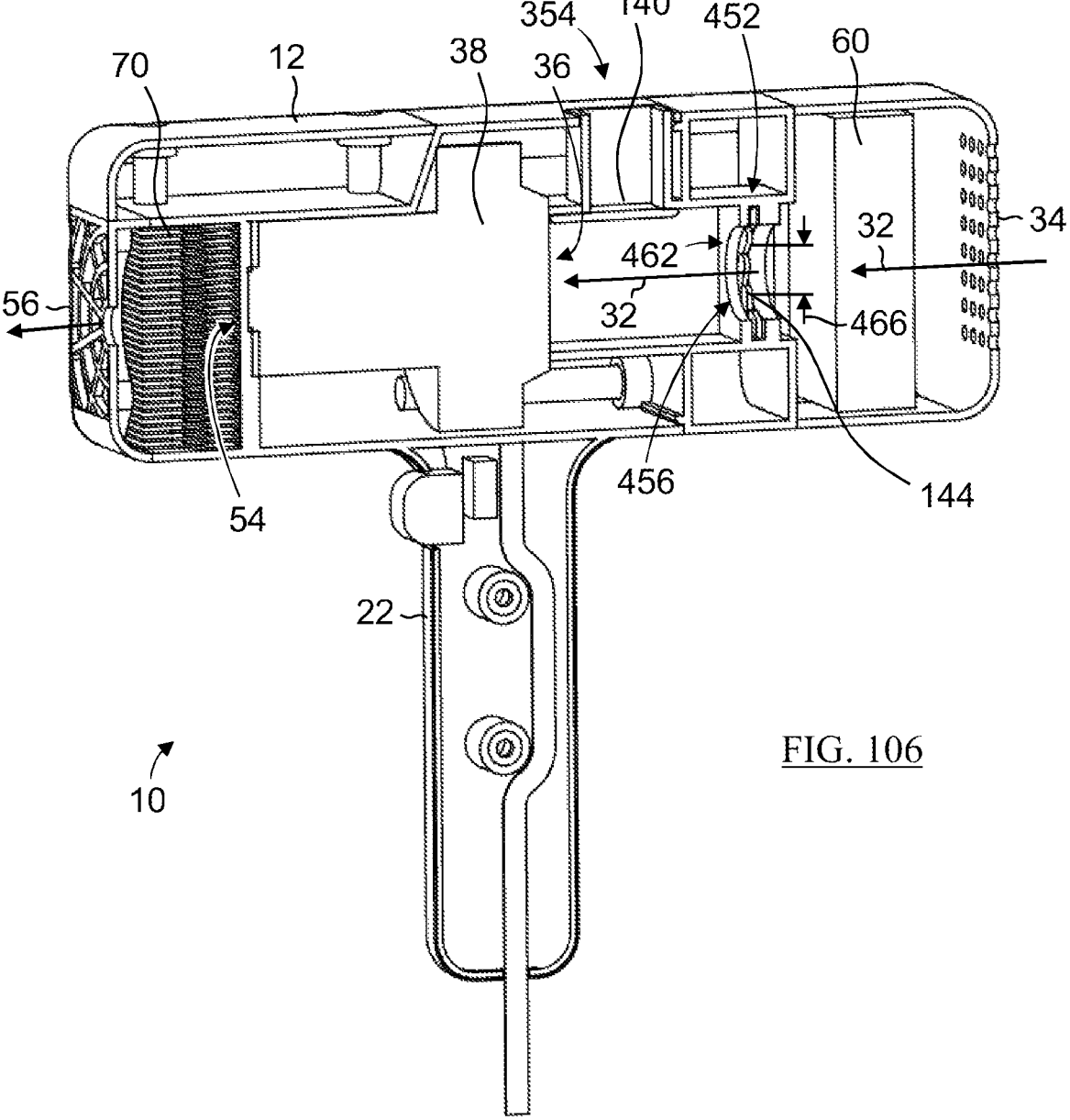
FIG. 106 is a cross sectional view of the hair dryer of FIG. 105 with the third obstructing member is a second configuration.

Additionally, or alternatively, the adjustable member may be an openable iris 144 (see for example FIGS. 105 and 106). In the first configuration (FIG. 105), the iris 144 is in a first high flow configuration and has an opening 462 having a first diameter 465 and, in the second configuration (FIG. 106), the iris 144 is in a high suction configuration and has an opening 462 having a second diameter 466 wherein the second diameter 466 is larger than the first diameter 465. The iris 144 may move between the different configurations based on the pressure difference across the iris 144 or an actuator that is drivingly connected to the iris and which is actuated by, e.g., signals from a sensor or from a user.

Figure 107:
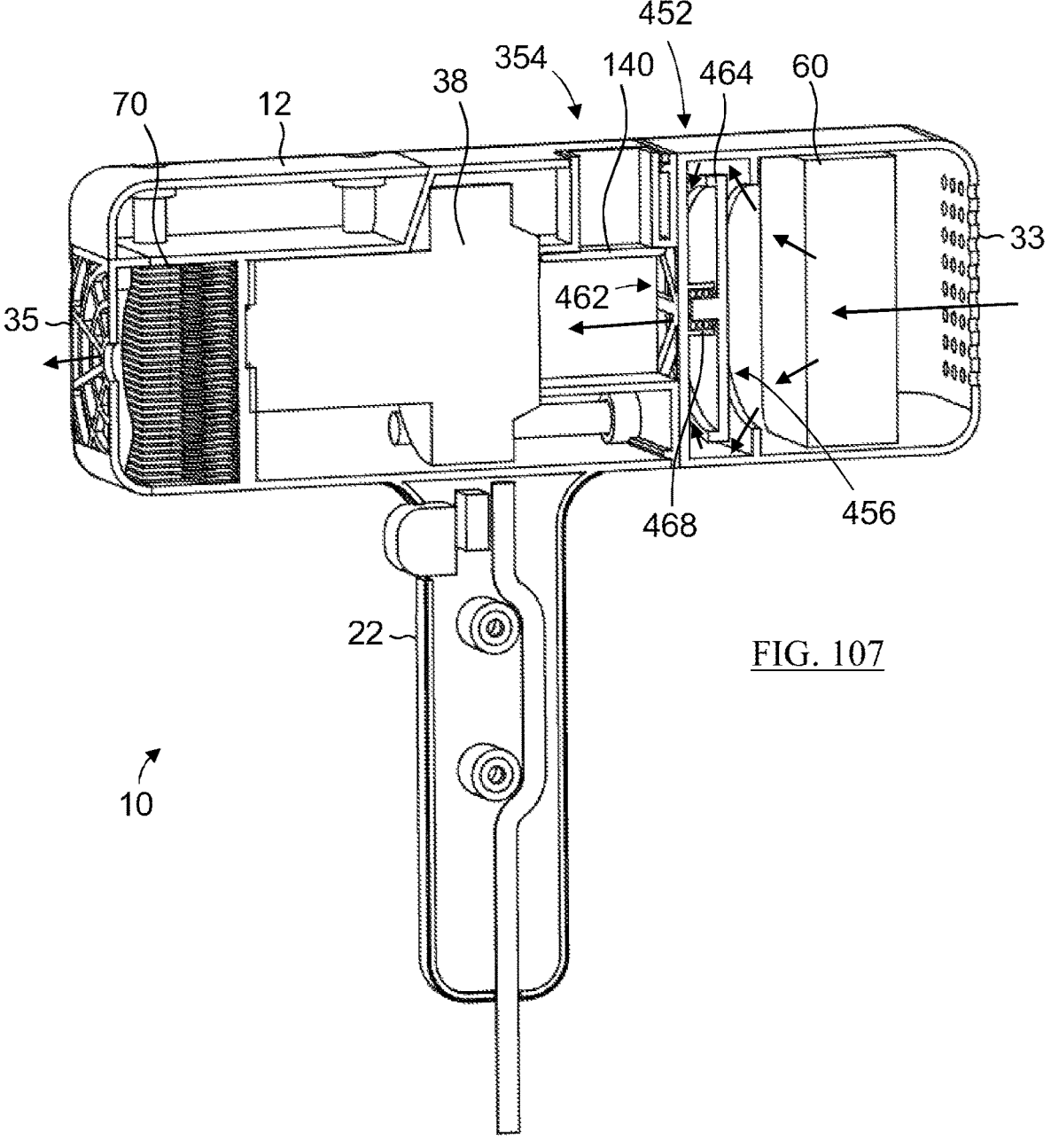
FIG. 107 is a cross sectional view of a further alternate embodiment of the hair dryer having a fourth obstructing member in a first configuration.
Figure 108:
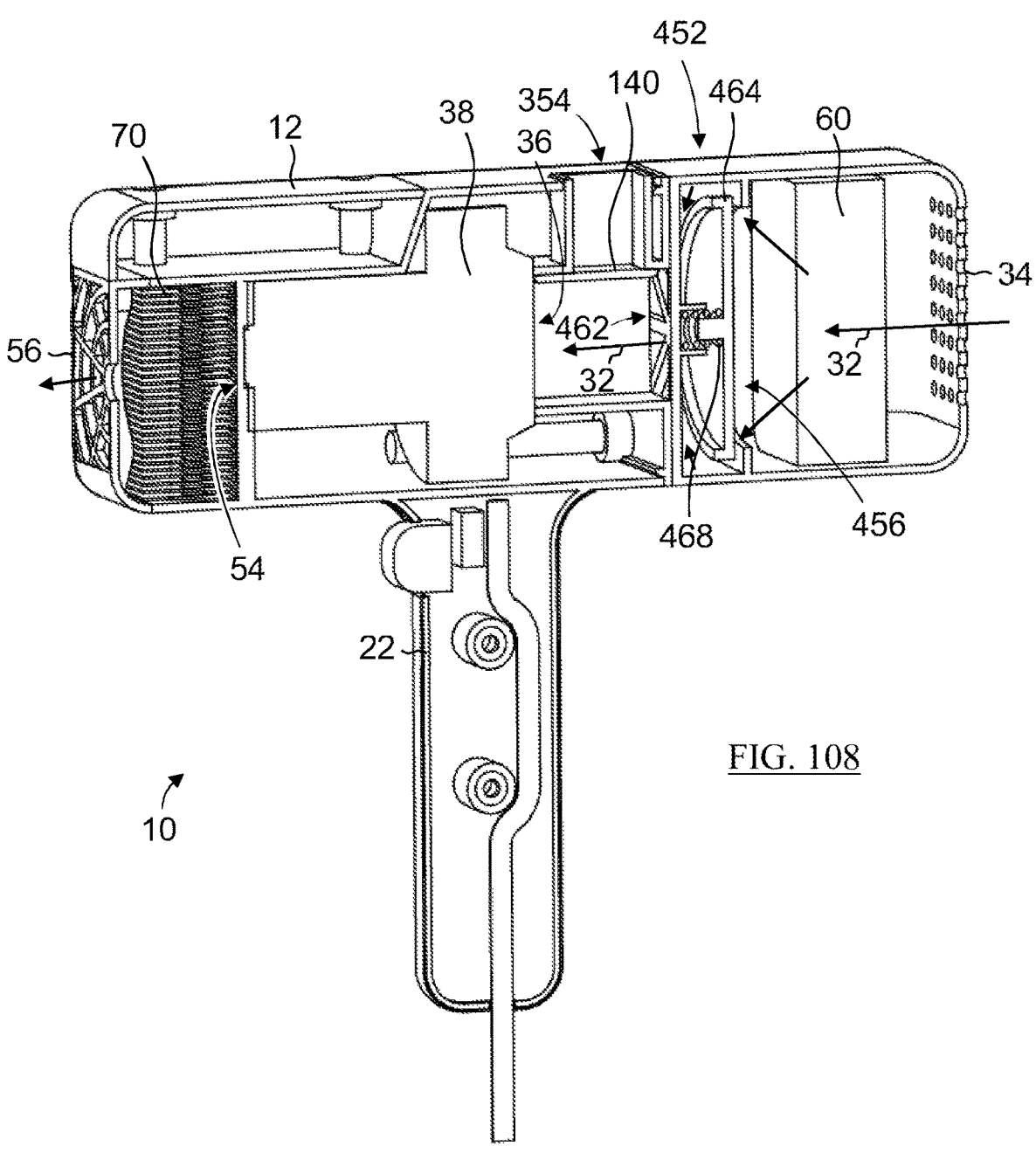
FIG. 108 is a cross sectional view of the hair dryer of FIG. 107 with the fourth obstructing member is a second configuration.

As exemplified in FIGS. 107 and 108, the flow restrictor 464 may move and the obstruction member 456 may have a fixed configuration, e.g., a non-deformable orifice plate. The flow restrictor 464 may be moveable with respect to the opening 462 between a first position (FIG. 107) in which the first portion cross-section flow area has a first cross-sectional flow area and a second position (FIG. 108) in which the first portion cross-section flow area has a second cross-sectional flow area that is greater than the first cross-sectional flow area.

The flow restrictor 464 may be movable between the first and second positions based on a characteristic of air flow through the primary air flow path 32 or by an actuator (e.g., in response to signals from a sensor or from a user). As exemplified in FIGS. 107 and 108, the flow restrictor 464 is moveable inwardly in the direction of flow from the second position (FIG. 108) to the first position (FIG. 107) based on air flow impinging upon the flow restrictor 464. The flow restrictor 464 may be biased to the second position (FIG. 108), e.g., by a biasing member 468 (e.g., a coil spring). Accordingly, when the screen 50 is not blocked by hair, the unrestricted air flow may drive the flow restrictor 464 forwardly, against the force of the biasing member 468, to block or partially block the opening 462 in the orifice plate. When hair restricts flow into the hair dryer, the biasing member 468 moves the flow restrictor 464 outwardly towards the screen thereby increasing the gap between the flow restrictor 464 and the perimeter of the opening 462.

Additionally, or alternatively, bleed air may be admitted into the air flow path through a secondary inlet 354 to a secondary air flow path that may introduce air upstream of a water separator 60 (see for example FIGS. 21, 22A, 49, 109 and 110). Introducing bleed air will reduce the flow of air entering through screen 50 and thereby reduce the flow through the water separator 60. The amount of air introduced via one or more supplementary inlets 354 may provide sufficient air flow to reduce the air flow through the water separator 60 to a level at which re-entrainment is minimized or eliminated when the hair dryer is moved away from the hair being dried by suction.

The air flow into the secondary air flow path may be controlled by a bypass valve 140 which opens or partially opens secondary inlet 354. As exemplified in FIGS. 109, 110, secondary inlet 354 may introduce air into the air flow path between the water separator 60 and the motor and fan assembly 38 (i.e., upstream of the separator 60) to enable the water separator 60 to be bypassed by some or all of the air drawn through the motor and fan assembly 38 (e.g., to compensate for changes in the volume of air drawn by the motor and fan assembly 38 as a result of the application and removal of hair at the inlet port(s) 33).

Bypass valve 140 may be actuated based on, e.g., a proximity sensor that determines when the hair dryer is moved away from the hair being dried, a pressure sensor or a flow sensor that determines, e.g., when the flow through the water separator reaches a level at which water may be re-entrained. Alternately or in addition, the bypass valve 140 may open or partially open in response to changes in air flow volume per unit time and/or velocity so as to prevent the velocity of the air passing through the water separator from increasing to an undesired level. An advantage of such an embodiment is that surges of air through the water separator 60 may be reduced or essentially eliminated.

Bypass valve 140 may open bypass inlet 354 when the hair dryer is used in the second operating mode and/or when the hair dryer uses suction in the first mode and the hair is removed from the inlet. By opening a valve 140 downstream of the water separator 60, the flow of air drawn through the water separator 60 may be reduced as the suction motor will also draw air through the bypass inlet 354 It will be appreciated that valve 140 may fully or partially close an air outlet of the water separator 60 when the valve is moved to an open position to admit air through bypass inlet 354 (see for example FIG. 22A). Accordingly, valve 140 may be used to maintain a generally constant rate of air flow though water separator 60 and, accordingly, surges of air through the water separator 60 that may re-entrain water may be reduced or essentially eliminated.

The bypass opening(s) may be variably opened and closed in response to measurements by one or more velocity control sensors 376 (FIG. 22A). Velocity control sensors 376 may be in or adjacent to the water separator 60 to provide information about the velocity of air within the water separator/collecting member. As exemplified in FIGS. 21 and 22A, a velocity control sensor 376 may be in the air flow path upstream of the water separator 60, in the water separator 60, and/or downstream of the water separator 60. Control circuitry may couple the velocity control sensor(s) 376 to the valve(s) to control the degree to which the bypass opening(s) are opened.

The velocity control sensor(s) 376 may be a flow volume sensor or a direct velocity sensor. For example, the velocity control sensor 376 may be a venturi principle sensor. Another example of a velocity control sensor 376 is a rotationally mounted sensor blade bearing one or more magnets and shaped to rotate at a speed with a known relationship to the speed of air moving over the sensor blade; the frequency with which the one or more magnets pass a stationary point may be measured (e.g., by a reed switch and processor) to determine the speed of air moving over the sensor blade.

The air velocity may also be measured indirectly. For example, the velocity control sensor 376 may measure the pressure within the air flow path 31 upstream of the water separator 60. The pressure may decrease as the velocity of the air increases, and the degree to which the bypass opening(s) are opened may be adjusted in response.

Figure 98:
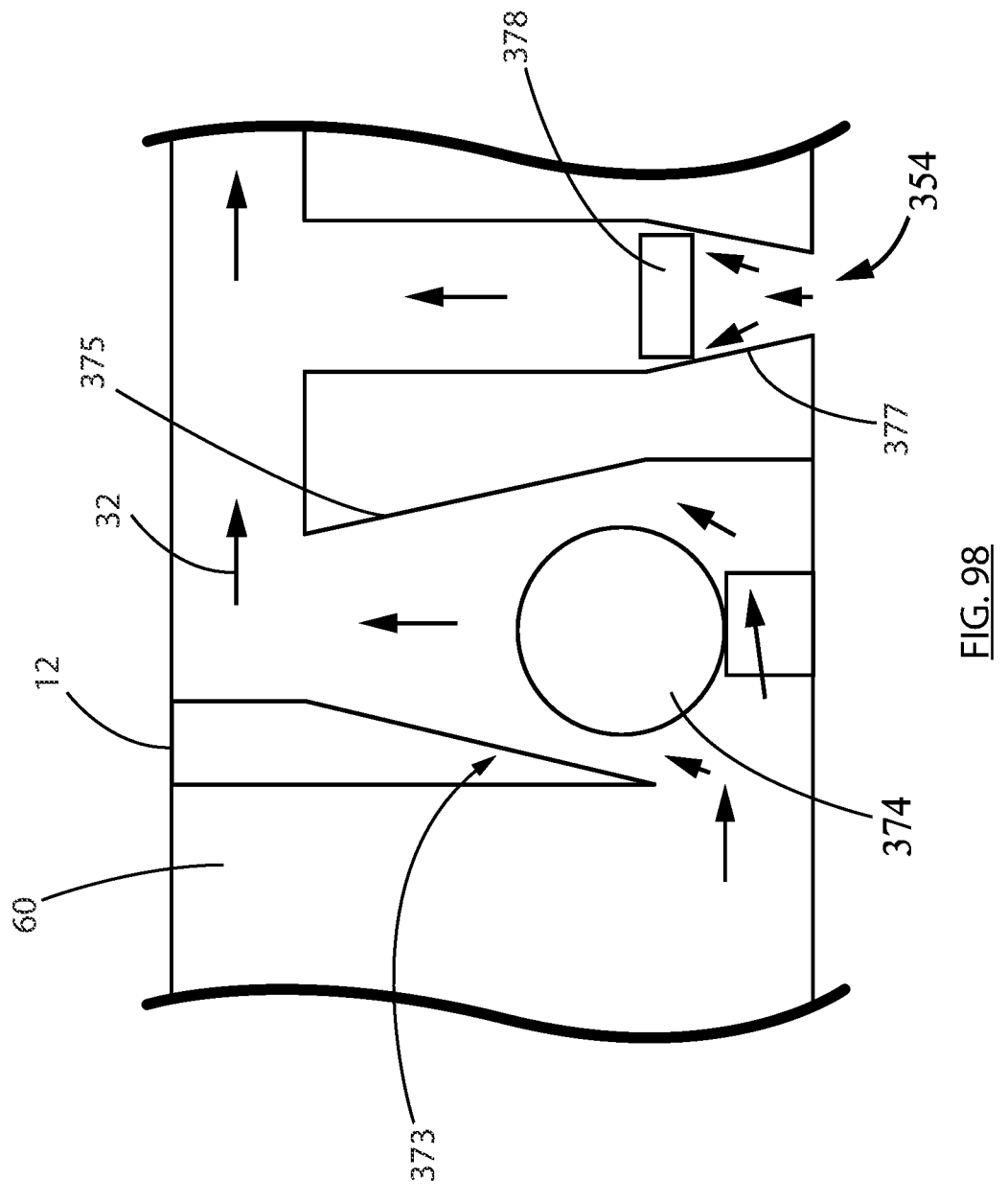
FIG. 98 is a sectional view of a portion of a further alternate embodiment of the hair dryer having a mechanical response valve.

Alternately or in addition, hair dryer 10 may include a mechanical response valve that mechanically responds directly to air velocity and/or volumetric air flow to control the degree to which the bypass opening(s) are open. Such a mechanical response valve may progressively open one or more bypass openings as the velocity of air and/or the volume of air per unit of time through the water separator 60 increases, and progressively close the one or more bypass openings as the velocity through the water separator 60 decreases and/or the volume of air per unit of time through the water separator 60 decreases. In the exemplary embodiment of FIG. 98, a mechanical response valve 373 is provided downstream of water separator 60. A ball 374 is positioned in the air flow path 32. Ball 374 responds to increased velocity by rising to block or partially block a first constricted neck 375 of the air flow path. When the first constricted neck 375 is blocked or partially blocked, a drop in pressure downstream of the first constricted neck 375 and downstream of a second constricted neck 377 that is leading to the bypass inlet 354 causes a blocking member 378 in the second constricted neck 377 to be raised out of the second constricted neck 377 to open the bypass inlet 354. The mechanical response valve 373 depicted in FIG. 98 is merely an example of a possible mechanical response valve; a variety of other mechanical response valves may be used in other examples. It will be appreciated that ball 374 and/or blocking member 378 may be biased to the positions shown in FIG. 98.

Additionally, or alternatively, a characteristic of an air moving unit (e.g., a motor and fan assembly 38) and/or an air moving member of the air moving unit (e.g., a fan blade 42, 44) of the hair dryer 10 may stabilize the velocity of air flow through the water separator 60. For example, the motor 40 may respond to changes in air flow characteristics (e.g., velocity or pressure, such as sensed by sensors 376) and/or user characteristics (e.g., proximity or conductivity of hair) to adjust operational characteristics of the motor 40 (e.g., the motor's rate of rotation) to stabilize the air velocity though the water separator 60. Alternatively, or additionally, the fan blade 42 may respond to changes in air characteristics (e.g., velocity or pressure, such as sensed by sensors 376) and/or user characteristics (e.g., proximity or conductivity of hair) to adjust operational characteristics of the fan blade 42 (e.g., the pitch of vanes of the fan blade) to stabilize the air velocity though the water separator 60.

Additionally, or alternatively, the structure of an air moving member (e.g., the first fan blade(s) 42) may be adapted to draw air through the water separator 60 at the relatively constant volume of air per unit of time. For example, the fan blade may be structured to draw a relatively constant volume of air per unit of time across a wide range of pressure levels of the adjacent air (e.g., between 0 inches of mercury and 15 inches of mercury, between 0 inches of mercury and 10 inches of mercury, or between 0 inches of mercury and 6 inches of mercury). For example, a first fan blade 42 may be a pump-type fan, such as a vane pump.

As discussed with respect to FIGS. 4, 20 and 109-112 the hair dryer 10 may optionally have multiple air moving members (which may be referred to as fan blades and may be impellers and/or propellers) which are driven by one or more motors 40. An advantage of this design is the air moving unit in the primary air flow path 32 may be selected to produce a particular type of flow and the air moving unit in the secondary air flow path 52 may be selected to produce a different type of flow. For example, an impeller (which typically draws a fluid in axially and expels the fluid radially outwardly) is useable to produce pressure and may therefore be used to provide suction. Therefore, one or more impellers may be provided in the primary air flow path 32 to produce suction in the first mode of operation. In contrast, a propeller is used to convert rotational motion of the propeller into thrust and therefore the propeller draws fluid in axially and propels the fluid axially away. Therefore, one or more propellers may be provided in the secondary air flow path 52 to produce a high flow rate of air for blow drying in the second mode of operation.

Using different air moving members may allow the characteristics of air flow through the water separator 60 to be different from the characteristics of air flow used for blow drying (e.g., volumetric flow rate of air or the suction force). This may be used in addition to or alternatively to having bypass openings, bleed outlets, and/or supplementary inlets. Accordingly, the air flow through the water separator 60 may be kept at a low velocity and/or volumetric flow rate of air (e.g., less than 15, 10 or 5 cfm) regardless of the characteristics of air flow elsewhere in the hair dryer 10.

Figure 112:
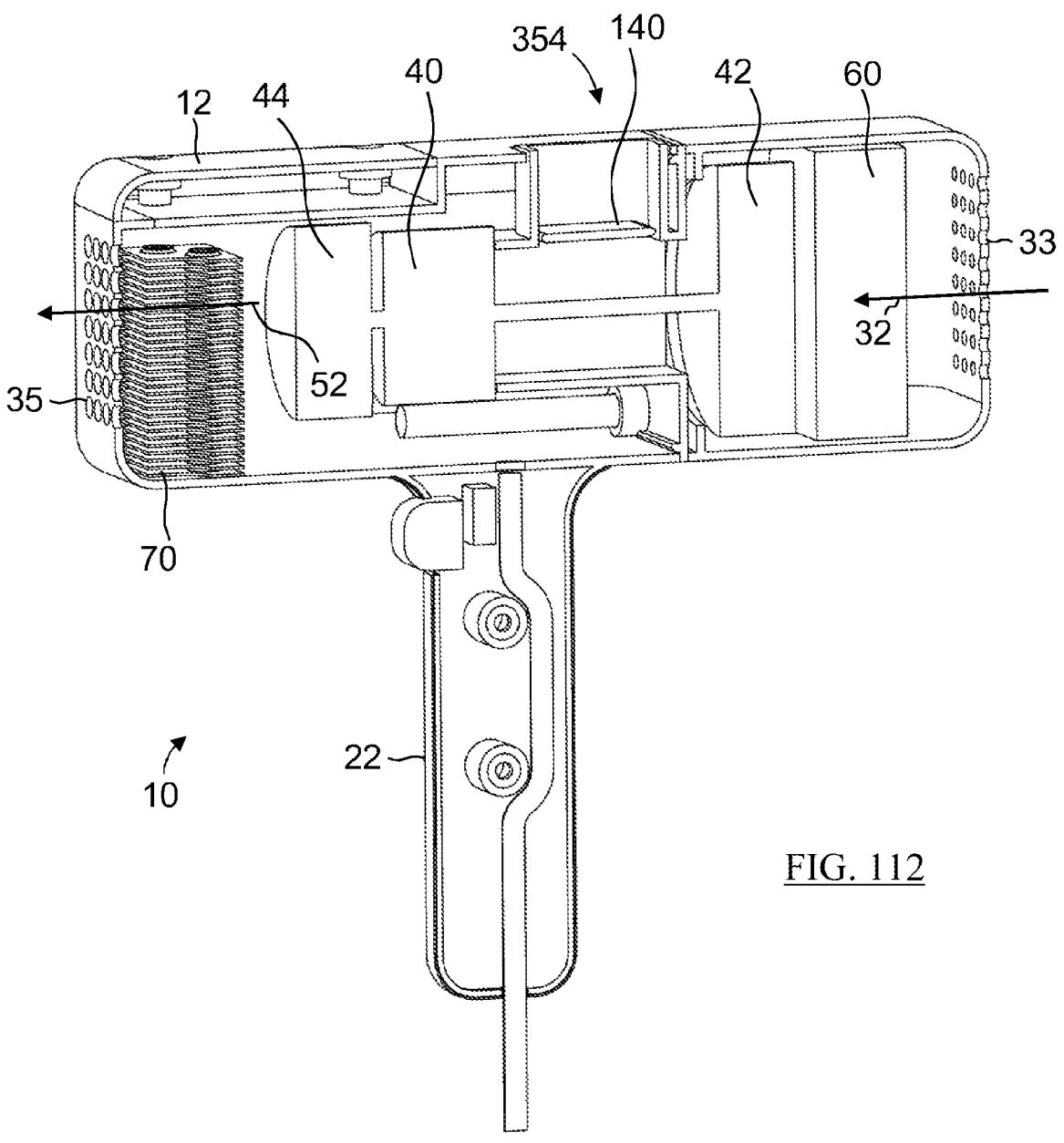
FIG. 112 is a cross sectional view of a further alternate embodiment of the hair dryer having joined primary and secondary air flow paths, each with a separate air moving member driven by a single motor.
Figure 113:
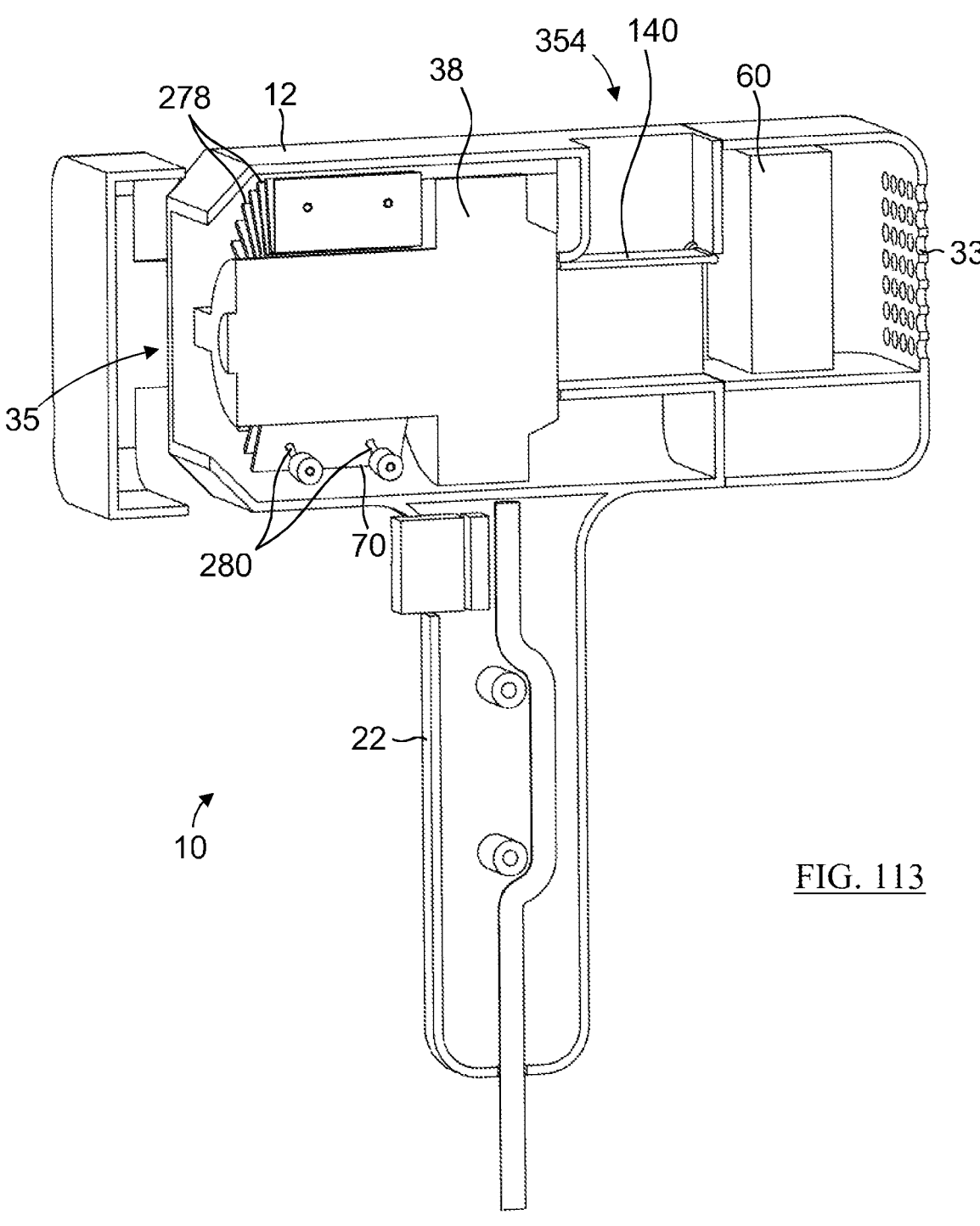
FIG. 113 is a lengthwise cross-sectional view of a further alternate embodiment of the hair dryer having a first annular heating element wherein the heating elements which are oriented radially outwardly from the suction motor.
Figure 114:
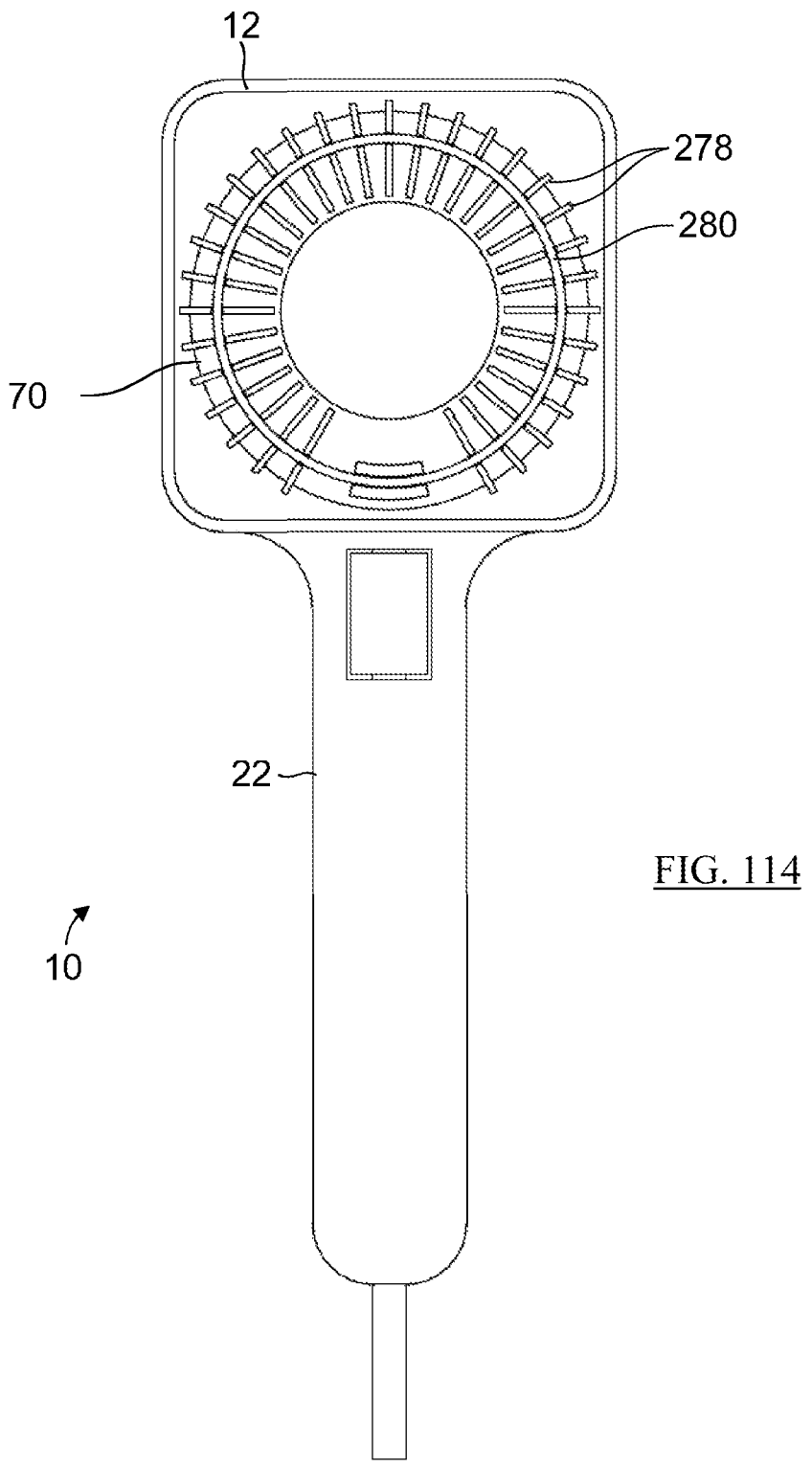
FIG. 114 is a transverse cross-sectional view of the hair dryer of FIG. 113.
Figure 115:
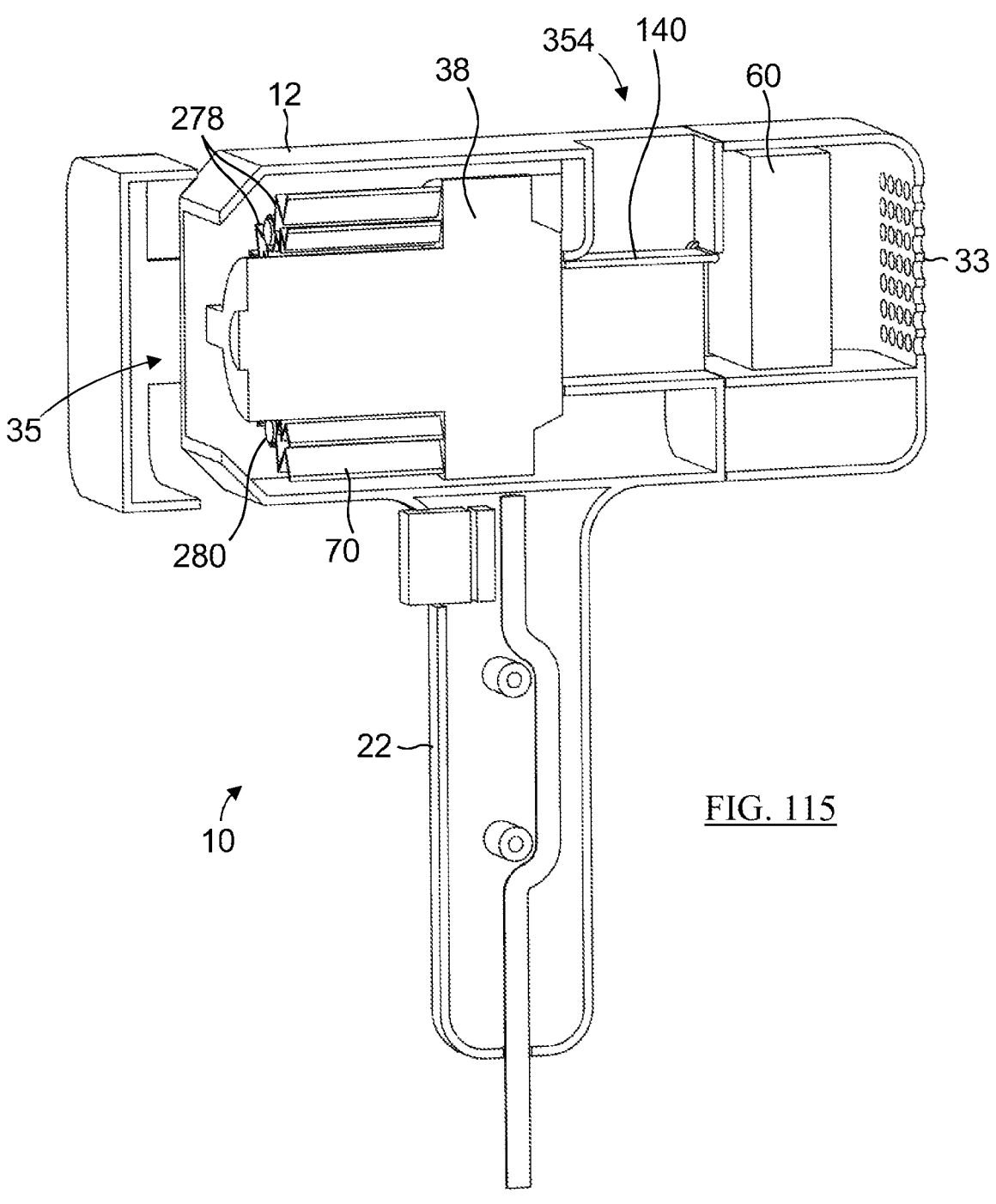
FIG. 115 is a lengthwise cross-sectional view of a further alternate embodiment of the hair dryer having a second annular heating element wherein the heating elements which are oriented axially aligned with the suction motor axis.
Figure 116:
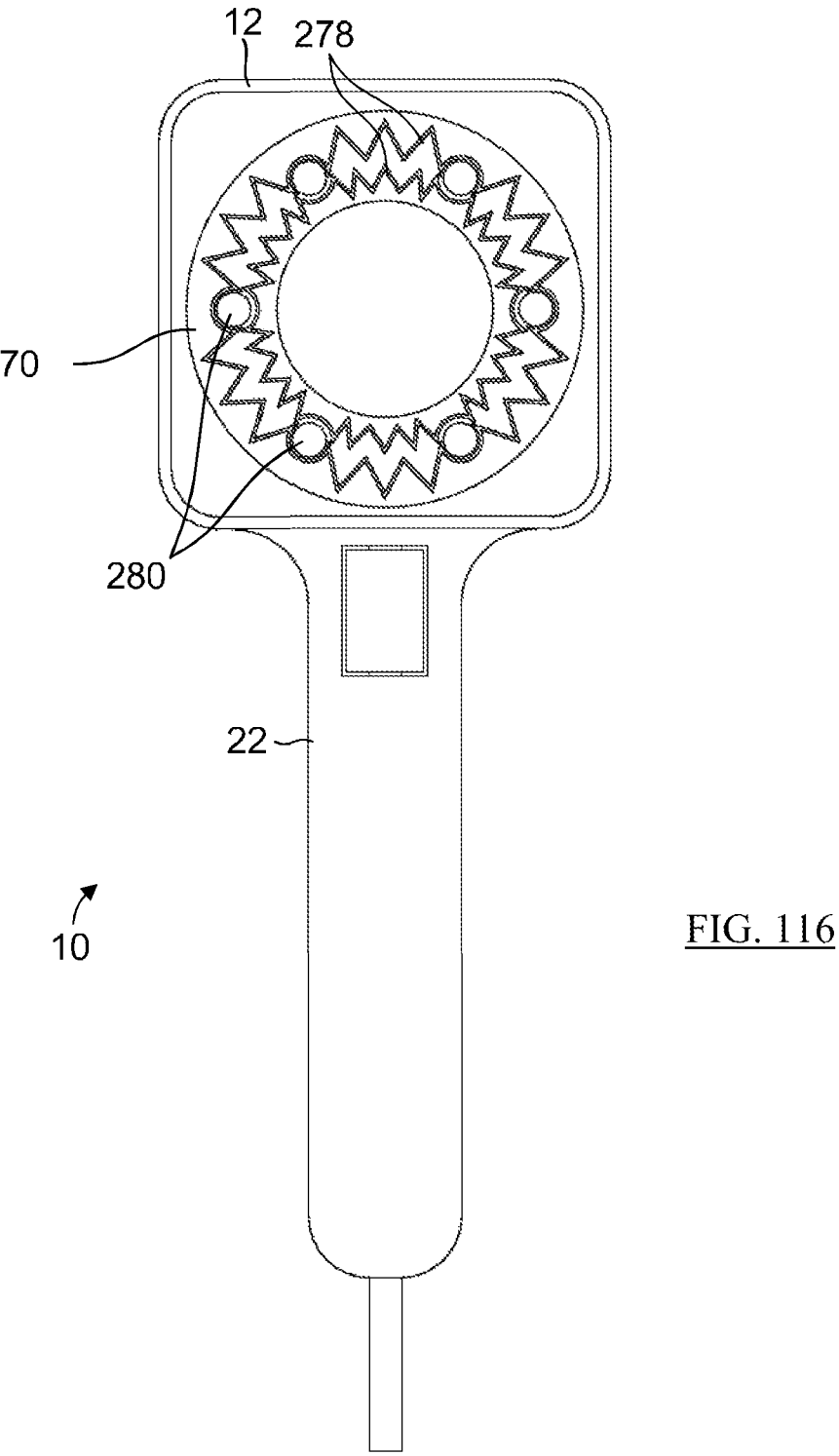
FIG. 116 is a transverse cross-sectional view of the hair dryer of FIG. 115.

If the secondary air flow path 52 is joined to the primary air flow path (i.e., the secondary air flow path 52 is downstream of the primary air flow path 32 as exemplified in FIGS. 20 and 112), then a single motor 40 may drive an air moving member 42 for the primary air flow path 32 and an air moving member 44 for the secondary air flow path 52. Optionally, as exemplified in FIG. 112, bypass air may be introduced into the joined air flow path downstream of the water separator 60 (e.g., downstream of air moving unit 42).

Figure 110:
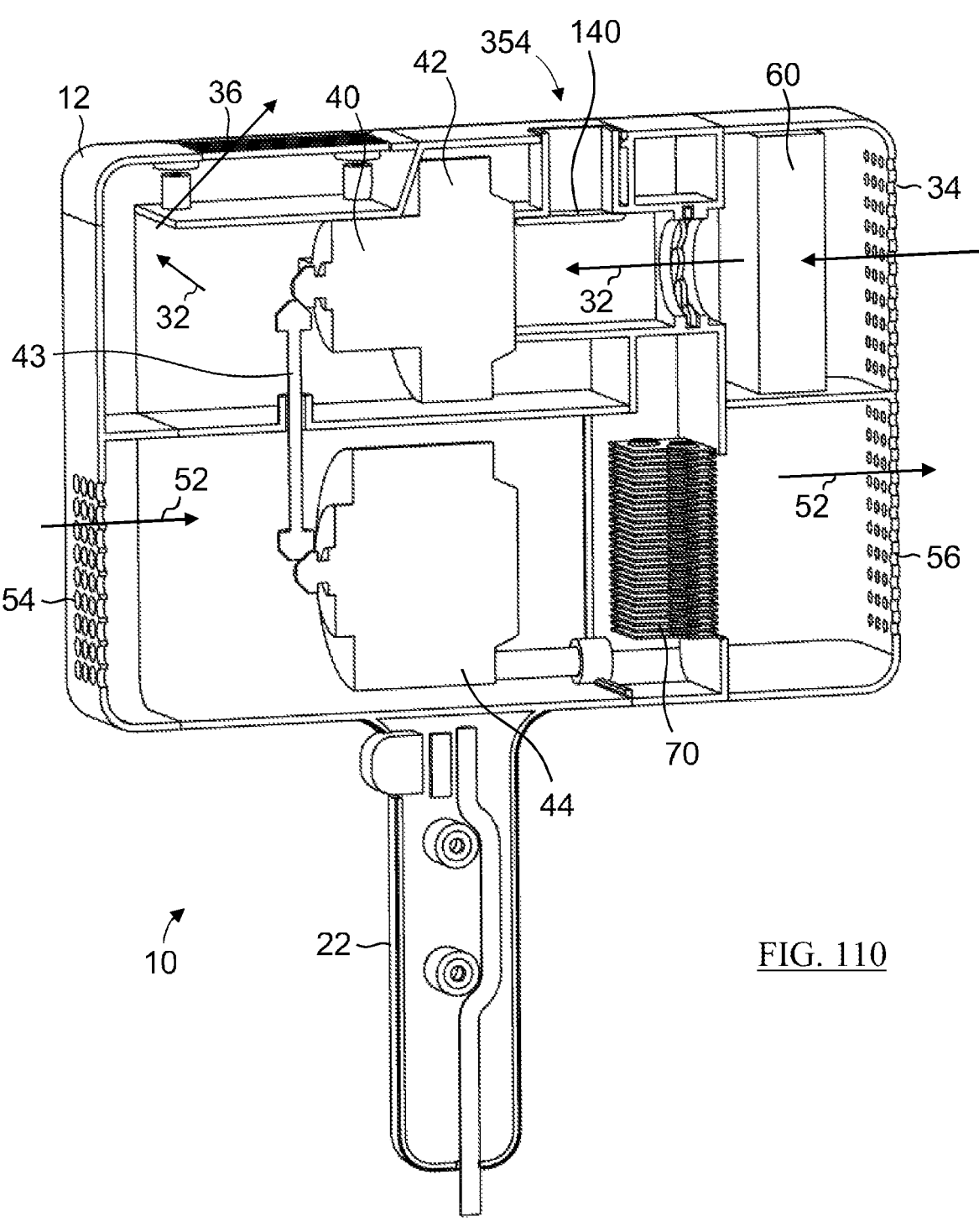
FIG. 110 is a cross sectional view of a further alternate embodiment of the hair dryer having separate primary and secondary air flow paths, each with a separate air moving member driven by a single motor.

Alternately, if the secondary air flow path 52 is separate to the primary air flow path (i.e., air in the primary air flow path 32 exits the hair dryer 10 instead of travelling into the secondary air flow path 52 as exemplified in FIGS. 4 and 110), then a single motor 40 may drive an air moving member 42 for the primary air flow path 32 and an air moving member 44 for the secondary air flow path 52. For example, in the configuration of FIG. 4, the air moving units 42, 44 are axially spaced apart. In the configuration of FIG. 110, the primary and secondary air flow paths 32, 52 are vertically spaced apart and, accordingly, the air moving member 42, 44 are vertically spaced apart. As exemplified, a vertically extending drive shaft 43 extends between motor 40 and air moving unit 44.

Alternately, a first motor 40 may be provided for the air moving member (s) in the primary air flow path 32 and a second motor 40 may be provided for the air moving member (s) in the secondary air flow path 52. As exemplified in FIG. 109, a motor and fan assembly 38 is provided in each of the primary and the secondary air flow paths 32, 52. As with the configuration of FIG. 110, in the configuration of FIG. 109, the primary and secondary air flow paths 32, 52 are vertically spaced apart. However, a vertically extending drive shaft 43 is not required as each air flow path has its own motor and fan assembly 38.

Figure 111:
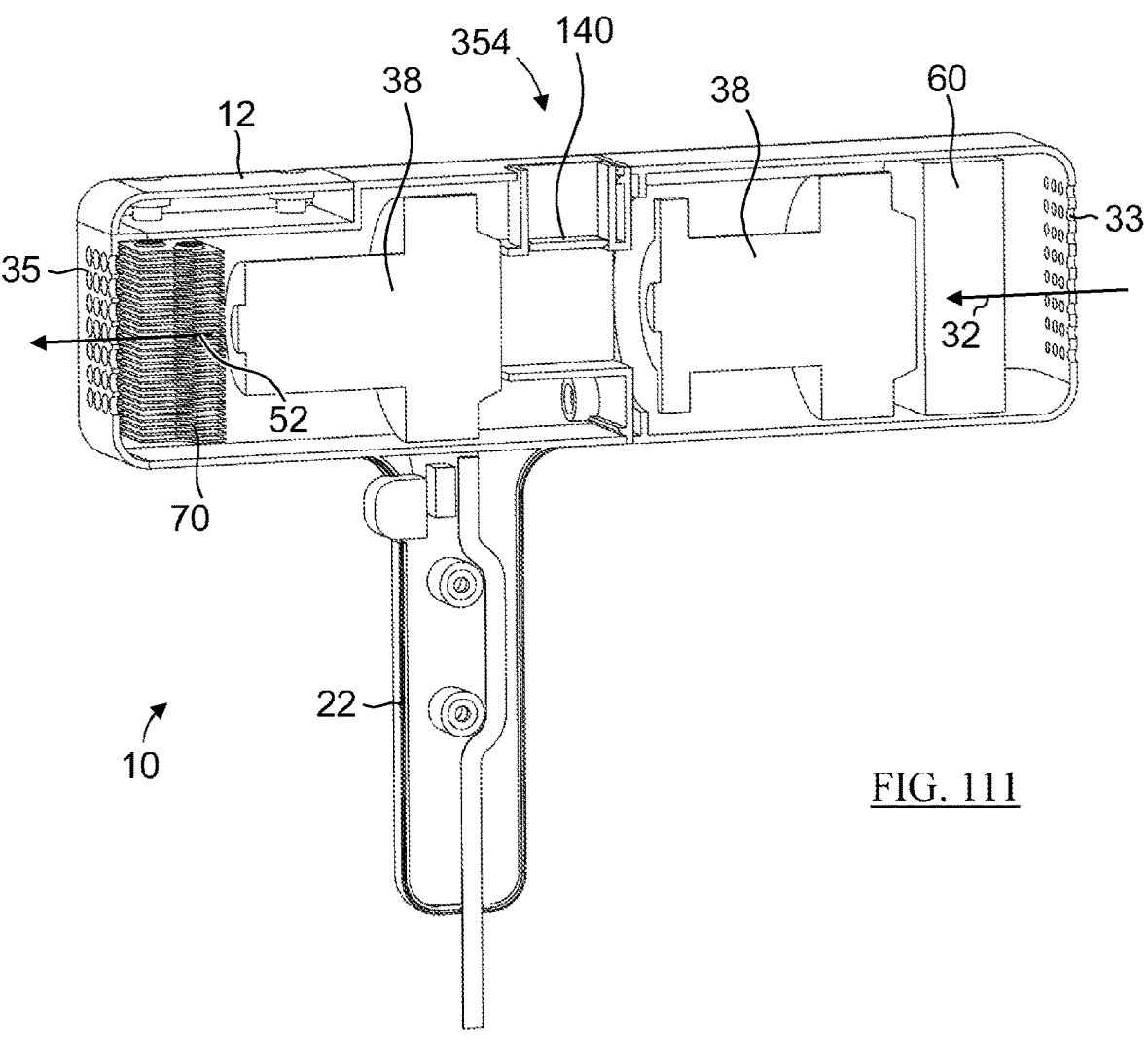
FIG. 111 is a cross sectional view of a further alternate embodiment of the hair dryer having a continuous air flow path (joined primary and secondary air flow paths), with two motor and fan assemblies.

Alternately, if the secondary air flow path 52 is joined to the primary air flow path 32, a motor and fan assembly may be provided in each of the primary and the secondary air flow paths 32, 52 (see for example FIG. 111). As in the configuration of FIG. 53, the primary and secondary air flow paths 32, 52 are axially spaced apart. Optionally, as exemplified in FIG. 111, bypass air may be introduced into the joined air flow path downstream of the water separator 60 (e.g., downstream of first motor and fan blade assembly 38).

FIGS. 120 and 121 exemplify a further embodiment wherein two motor and fan assemblies 38 are utilized and are axially spaced apart. FIG. 120 exemplifies the hair dryer 10 in the first mode of operation. In this mode, air is drawn into the hair dryer through screen 50 that is provided at air inlet 34 for the primary air flow path 32. Suction is produced by the first suction motor and fan assembly 38. The first suction motor and fan assembly 38 has an air moving member 42. The first suction motor and fan assembly 38 may be a brushless DC motor which may optionally have an impeller (air moving member 42). Accordingly, the first suction motor and fan assembly 38 will produce suction to draw air and water from hair placed against screen 50. In operation, the first suction motor and fan assembly 38 will draw air into the water separator 60 and then out through air outlets 36. As exemplified in FIG. 1-4, one or more outlet port 36 may be provided on the sidewall of the hair dryer, optionally at about a mid-point along the length of the hair dryer.

As discussed previously, the velocity of air through the water separator 60 may be reduced, eliminated and/or stabilized to reduce or prevent re-entrainment of water in the air flow. As exemplified, the air outlet of the water separator comprises an orifice that limits the volumetric air flow when hair is removed from screen 50.

The water separator 60 may optionally include a water collection tank 152, Optionally, the screen end of the hair dryer 10 (optionally with the water separator 60 and optionally with a water collection tank 152 if one is provided) is removably mounted to the remainder of the body 12 (e.g., by a bayonet mount, screw mount or one or more latches). An advantage of this design is that the water separator 60 and a water collection tank 152 may be removed for emptying, cleaning and optionally replacement.

FIG. 121 exemplifies the hair dryer 10 in the second mode of operation.

In this mode, air enters the hair dryer through air inlet 54 and travels through a separate passage through the hair dryer to the air outlet 56 of the secondary air flow path 52. As exemplified, the secondary air flow path may be a generally annular conduit 55 that extends generally axially to the second suction motor and fan assembly 38. The second suction motor and air flow path 38 comprises a motor 40 and an air moving member 44. The second suction motor and fan assembly 38 may be a brushed DC motor which may optionally have a propeller (air moving member 44). One or more heating elements 70 may be provided at the end having air outlet 56. As exemplified in FIGS. 113-116, one or more heating elements 70 may be positioned around the motor 40. Accordingly, the air passing through the secondary air flow path 52 may be hated before it exits the outlet port 56. It will be appreciated that, in the second mode of operation, the first suction motor and fan assembly may be de-energized as it is not required to draw air through screen 50. Accordingly, the power provided to the first suction motor and fan assembly 38 in the first mode of operation may be provided to the second suction motor and fan assembly 38 in the second mode of operation such that propeller 44 may operate at a higher rate of rotation.

Optionally, an insulating member or heat shield 57 may be provided between heating element 70 and motor 40 and/or heating element 70 and body 12. The heat shield will assist in limiting heat transfer from the heating element 70 to the motor and the body.

Optionally, as exemplified in FIG. 120, in the first mode of operation both suction motor and fan assemblies 38 may be operated. In such a case, the suction motor 40 of the second suction motor and fan assembly 38 may operate in reverse such that air moving member 44 (e.g., a propeller) drives air from outlet port 56 to inlet port 54 so as to provide blowing air 52R for assistance in the suction mode of operation. Optionally, the motor 40 driving fan blade 44 may be run at partial power compared to the second mode of operation. For example, in the first mode of operation, motor 40 may be operated at 10-20 Watts (as compared to 60-80 Watts in the second mode of operation) such that propeller 44 operates at a slower rate in reverse. Optionally, heater(s) 70 may also be energized. Accordingly, heated air (e.g., 60-75° C.) may be blown out of air inlet 54 at, e.g., 10-20 CFM during the first mode of operation.

Water Sequestration

In accordance with this aspect, water collected by hair dryer 10 is sequestered from the air flow path 31 regardless of the orientation of the hair dryer 10. This aspect may be used by itself or in combination with one or more of the other aspects set out herein.

As exemplified in FIG. 4, hair dryer 10 may withdraw water from an air flow using, e.g., a water separator 60. Water held in the water separator 60 may leave the water separator 60 if the air flow velocity through the hair dryer is rapidly accelerated and/or the hair dryer is held at an orientation other than an upright orientation. For example, water held in a tray on a bottom end 20 of hair dryer 10 may fall out of the tray if the hair dryer 10 is held upside down. In another example, water held in a foam member may leave the foam member if the foam member is rapidly accelerated, such as if the hair dryer 10 is swung about or dropped.

Figure 54:
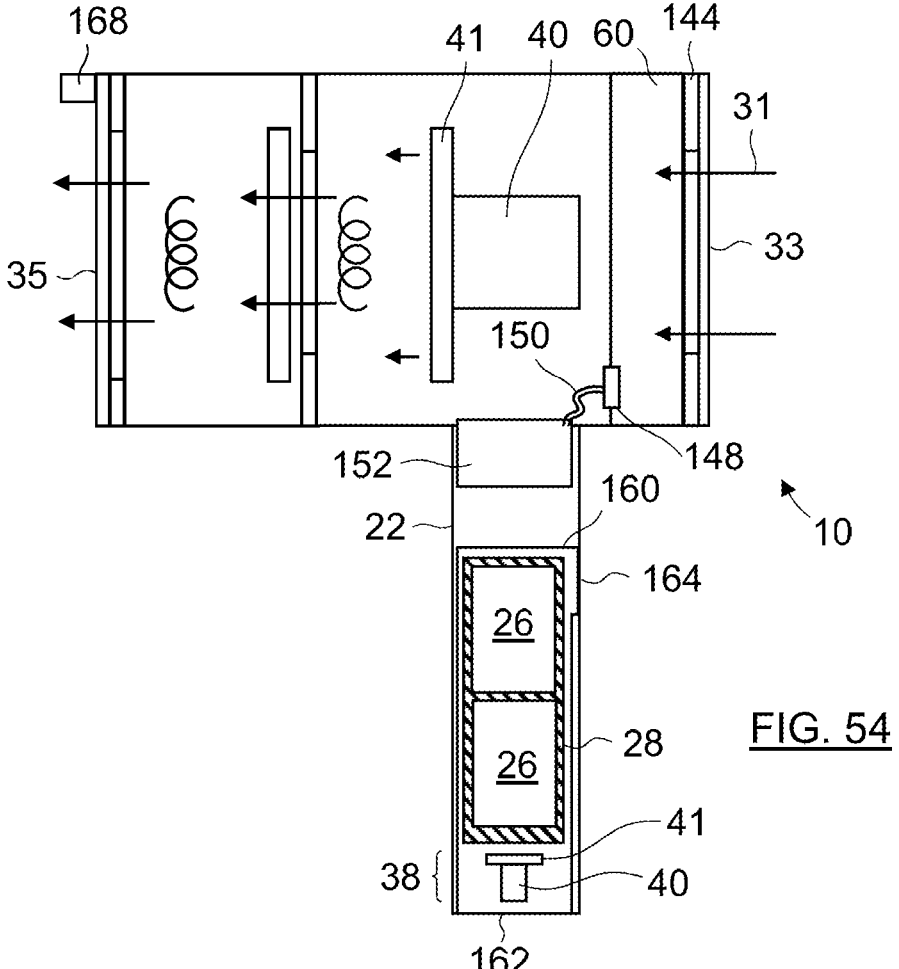
FIG. 54 is a cross-sectional view of a further alternate embodiment of the hair dryer having a pump for sequestering water.

As exemplified in FIGS. 28 and 54, water removed by water separator 60 may be sequestered from the air flow path 31 regardless of the orientation of the hair dryer 10. For example, the water may be pumped by pump 148 via a line 150 to a tank 152 isolated from the air flow path 31. Alternately, water may flow through line 150 due to gravity. Line 150 may have an optional valve 149 to close the line 150. For example, the valve may be a one way valve or a valve that is actuated when the hair dryer is oriented such that water may travel by gravity through the line 150 from tank 152 to the water separator 60 (e.g., a float valve). The tank may have an openable port for draining the tank and/or the tank may be removably mounted for emptying, by itself or concurrently with the water separator 60.

The tank 152 may be of any shape and provided at any location. As exemplified in FIGS. 28 and 54, the tank 152 is located at a lower end of the hair dryer, such as inside handle 22. Alternately, for example, the tank may partially or fully surround an operating component of the hair dryer. Accordingly, part of all of the portion 60d of the water separator of FIG. 122 may be the water tank 152.

An advantage of this aspect is that if the hair dryer 10 is rapidly accelerated and/or held upside down or sideways the water may be prevented from entering the air flow path 31 where it may damage the hair dryer 10.

Vibrating Teeth

In accordance with this aspect, a hair dryer 10 includes teeth that may be attachable to the hair dryer, e.g., of a brush or comb member, or may be non-removably provided thereon, that vibrate. This aspect may be used by itself or in combination with one or more of the other aspects set out herein.

An advantage of this aspect is that the movement of the teeth may cause movement of the hair of a user if the hair is in contact with the teeth. Movement of the hair may facilitate water removal from the hair. This aspect may be used for example in conjunction with using suction to dry the hair.

The hair dryer 10 may include a vibration subsystem, such as a vibration motor 380 coupled to a set of teeth 382 that are secured to the body 12 adjacent the outlet 35, as in the example of FIGS. 48 and 49. The vibration motor 380 may be operable to vibrate the teeth 382. The vibration motor 380 may be coupled to the power supply of the hair dryer 10 to receive power therefrom. Accordingly, a user may activate the vibration motor 380 to vibrate the teeth 382 when operating the hair dryer 10 in a blowing mode to cause movement of hair held against the outlet 35. Alternatively, or additionally, teeth 382 and/or a vibration subsystem may be secured to the hair dryer 10 adjacent the inlet 33, such as for use in a suction mode.

The vibration motor may have an axle or rod that is moveable upwardly and downwardly (in the orientation of FIG. 48) so as to raise and lower the teeth. Alternately, the motor 380 may have a horizontally extending drive axle that is non-rotatably connected to an eccentrically mounted gear that is drivingly connected by, e.g., a rod, to raise and lower the teeth. It will be appreciated that other electromechanically controlled members may be used to raise and lower the teeth, translate the teeth side to side or sequentially rotate the teeth (e.g., 5-10°) clockwise and then counter clockwise.

Optionally, vibrating brush teeth are provided on an accessory tool that may be mounted to the hair dryer 10. For example, the vibration subassembly may be secured to a diffuser or concentrator accessory tool, and the accessory tool may include a power source (e.g., a battery) or may be automatically coupled to the power supply of the hair dryer 10 when the accessory tool is mounted to the hair dryer.

Retractable Teeth

In accordance with this aspect, a hair dryer 10 and/or accessory tool may have retractable teeth that may be attachable to the hair dryer or an accessory tool, e.g., of a brush or comb member, or may be non-removably provided thereto. This aspect may be used by itself or in combination with one or more of the other aspects set out herein.

An advantage of this aspect is that the teeth may be available for use in holding hair when needed. The teeth may be used to direct jets of air at the hair being dried in a first mode of operation and/or during the second mode of operation.

The teeth may also be repositionable between two or more positions. For example, the teeth 382 may be repositionable between a fully extended position (FIG. 48), a partially extended position, and a retracted position (FIG. 49).

Retractable teeth 382 may be moveable, e.g., drawn back into the hair dryer 10, e.g., manually using a slider 384 to draw back a plate 386 to which the teeth are attached or by a motor, e.g., upon a user pressing a button or by the hair dryer being actuated in a mode of operation in which the teeth are used.

Selective Directional Airflow

In accordance with this aspect, the hair dryer 10 may include a diverting member to selectively limit the direction in which air can be blown out of the hair dryer outlet 35. This aspect may be used by itself or in combination with one or more of the other aspects set out herein.

An advantage of this aspect is that air may be blown only through the side of the hair dryer 10 that is used to engage or dry the hair. Accordingly, energy used to heat and/or move air is not wasted on air that is not directed towards the hair.

FIGS. 41-45 exemplify an embodiment wherein the hair dryer includes a brush member. In the exemplified embodiment, the brush member is an integral part of the hair dryer. In other embodiments, the brush member may be an attachment that a user may attach to the air outlet side of the hair dryer when desired.

Figures 41, 42, 43:
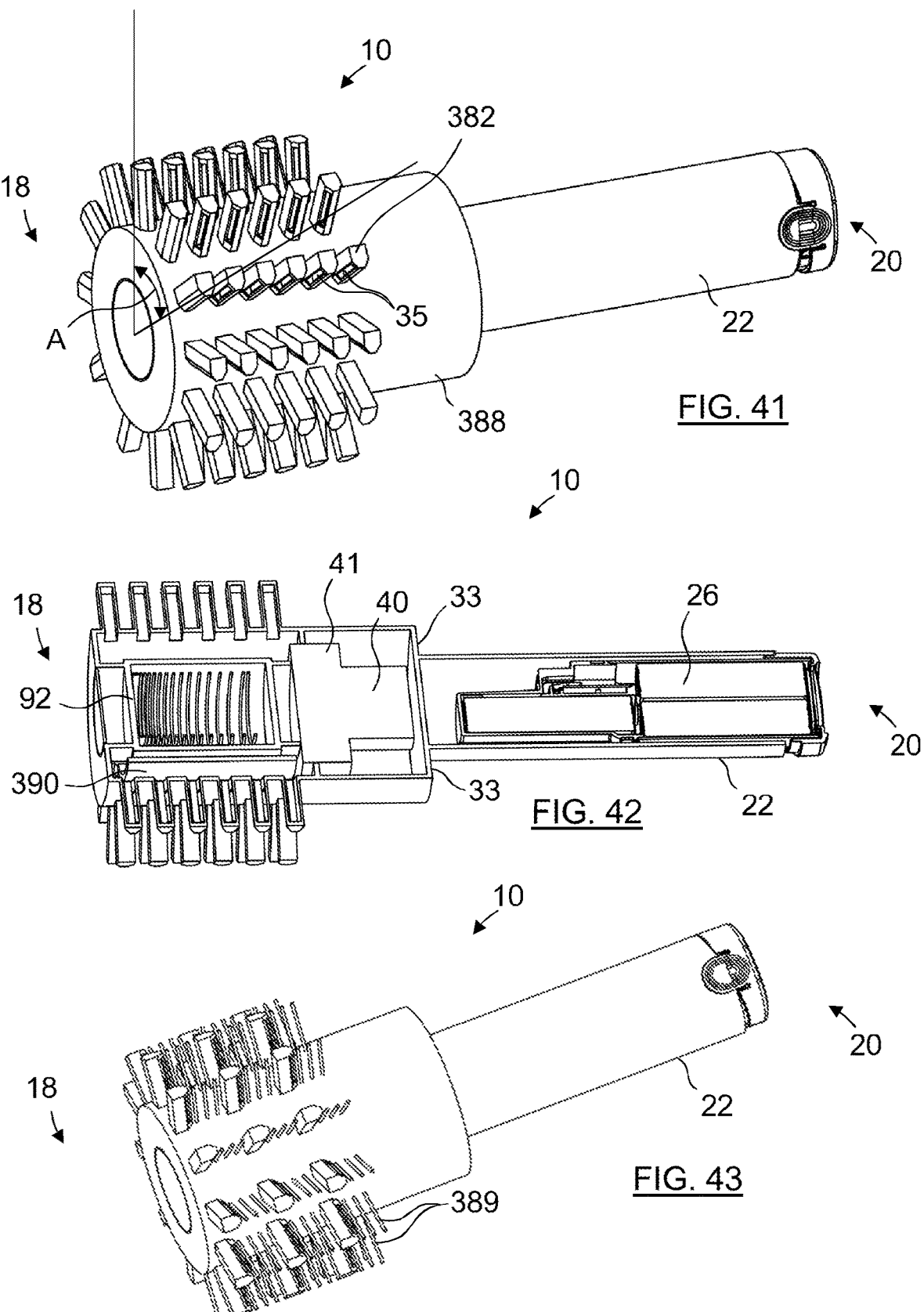
FIG. 41 is a perspective view of an alternate embodiment of the hair dryer.
FIG. 42 is a cross sectional view of the hair dryer of FIG. 41.
FIG. 43 is a perspective view of an alternate embodiment of the hair dryer.

As exemplified in FIGS. 41 and 42, the hair dryer 10 is a curler brush dryer with outlets angularly spaced around the radially outer surface of a cylindrical head 388. The curler brush hair dryer 10 is operable to direct air flow out of all or a subset of the outlets 35. Air outlets 35 comprise hollow teeth that extend around all or a portion of the perimeter of cylindrical head 388. Therefore, the air outlets are directed in a plurality of directions. A diverting member 390 is provided to select the direction or directions in which air is blown out. The diverting member 390 may be selectively positionable between the motor and fan assembly 38 and the outlets 35 to block some air outlets 35 while enabling air to exit other outlets 35. For example, the diverting member 390 may close some of the outlets 35, thereby limiting the sector of the outer surface (the radial extent A, see FIG. 41) through which air exits outlets 35 to a radial extent between 90° and 360°, between 90° and 150°, or between 15° and 100°. Accordingly, air may be directed only through the outlets 35 of the teeth 382 which contact the hair.

As exemplified, diverting member 390 may be a cylindrical or partially cylindrical member interior of cylindrical head 388 that is rotatable to selectively cover some of the outlets 35 in the teeth 382.

Figures 44, 45:
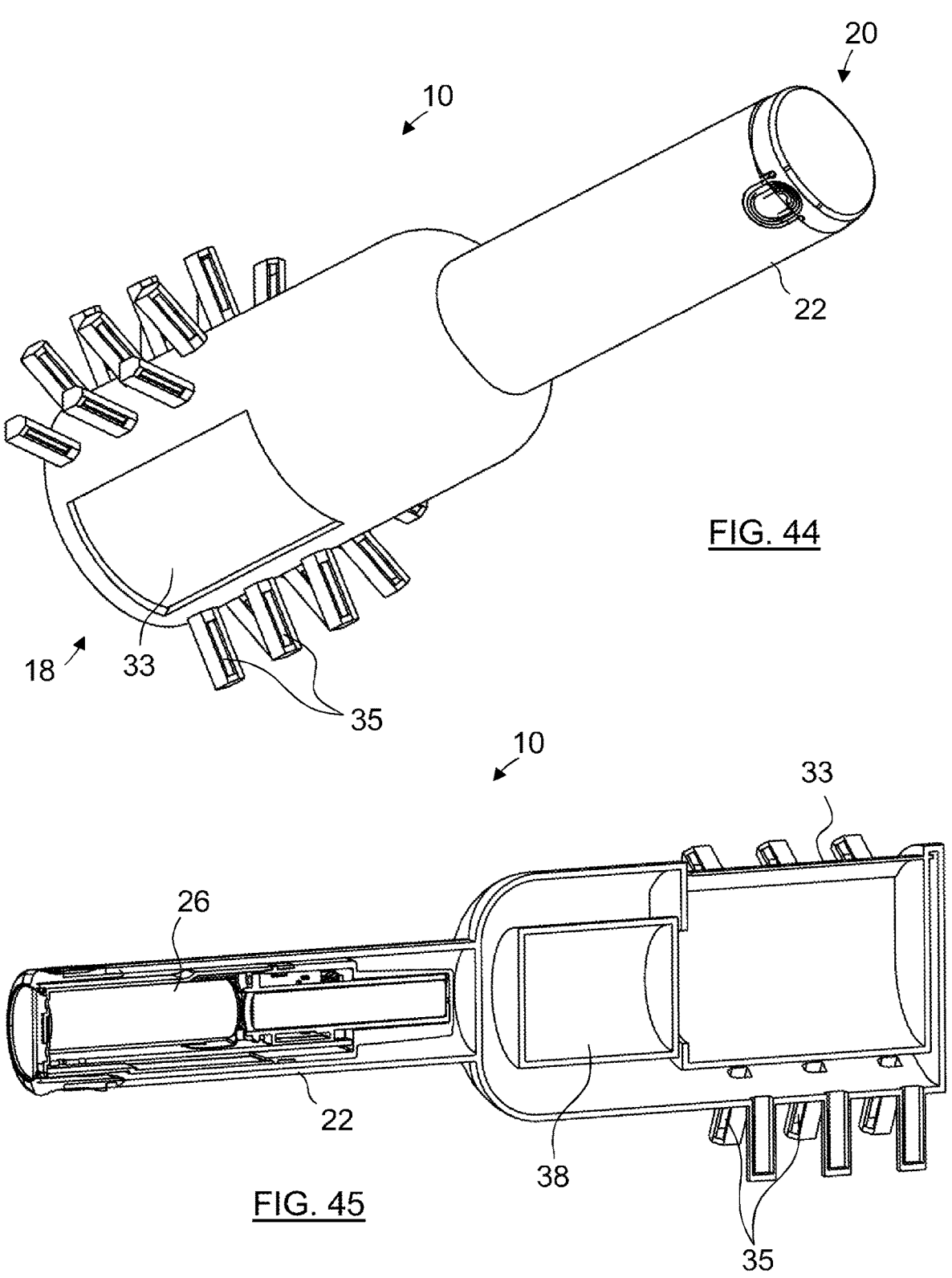
FIG. 44 is a perspective view of an alternate embodiment of the hair dryer.
FIG. 45 is a cross sectional view of the hair dryer of FIG. 44.

Optionally, in the example is shown in FIGS. 44 and 45 the air inlet 33 is angularly or radially spaced around the outer surface of cylindrical head 388 from the air outlets 35. Accordingly, in a first mode of operation, air may be drawn towards inlet 33. Subsequently, the user may rotate the brush to use teeth 382 in the second mode of operation.

Optionally, the air flow may be kept between 40° C. and 90° C., between 50° C. and 80° C., or between 40° C. and 60° C.

Optionally, an infrared heater 92 is positioned to heat the air flow and/or adjacent hair.

Optionally, bristles 389 may be added to assist in keeping hair adjacent outlets 35, as in the example of FIG. 43.

Balancing Suction and Blowing

In accordance with this aspect, a hair dryer 10 has an air outlet adjacent an air inlet. The air outlet may assist in keeping hair retained on or adjacent an air inlet when the hair dryer is used in a suction mode of operation. This aspect may be used by itself or in combination with one or more of the other aspects set out herein.

For example, in the embodiment of FIG. 8, air may exit the hair dryer via outlets 56 while air is being drawn into the hair dryer via inlet 34. Air outlets 56 may direct air laterally with respect to the direction of air flow into the air inlet 34 or inwardly towards air inlet 34. Accordingly, the air exiting outlets 56 may assist in maintaining the hair on air inlet 34.

Similarly, in the embodiment of FIGS. 120 and 121, the motor 40 is run in reverse so that during the first mode of operation, air exits inlet 54 of the secondary air flow path 52. The air flow velocity exiting inlet 54 may be relatively low as discussed subsequently so as to not to drive hair away from the inlet 34. Alternately, or in addition, the air exiting inlet 54 may direct air laterally with respect to the direction of air flow into the air inlet 34 or inwardly towards air inlet 34.

Figures 46, 47:
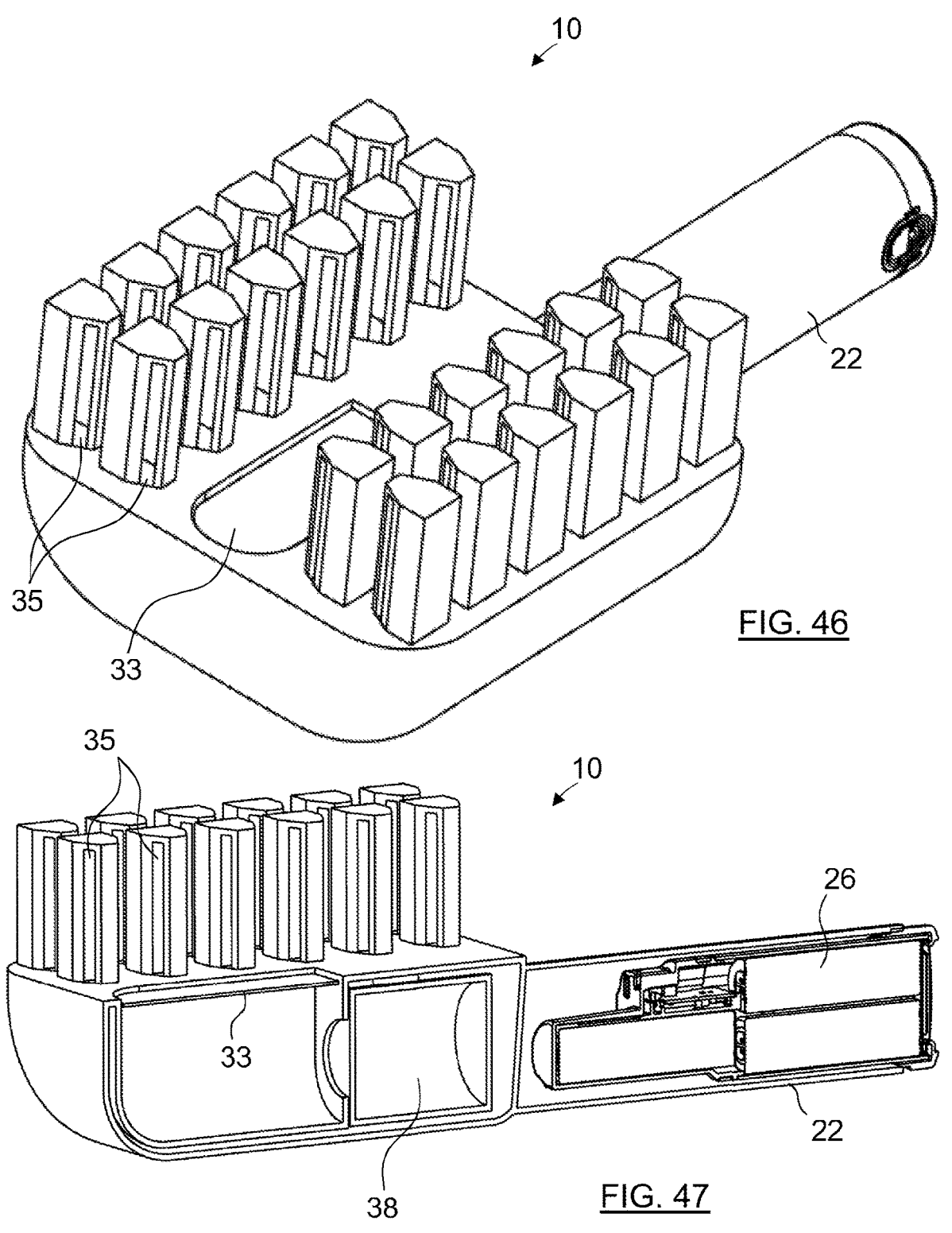
FIG. 46 is a perspective view of an alternate embodiment of the hair dryer.
FIG. 47 is a cross sectional view of the hair dryer of FIG. 46.

Similarly, FIGS. 46 and 47 exemplify an alternate embodiment in the shape of a flat brush hair dryer 10 wherein the air inlet 33 is laterally spaced from the air outlets 35.

The force drawing hair towards the air inlet 33 and the force blowing hair from the air outlet 35 may be balanced to keep hair from being blown away by the force of air coming from the air outlet 35.

Handle Reconfiguration

In accordance with this aspect, reconfiguring the handle of the hair dryer may convert or partially convert the hair dryer from one operating mode to the other when a condition is detected. Accordingly, the user may reconfigure the handle 22 of the hair dryer 10 between a first position which may be used for a first mode of operation of the hair dryer 10 and a second position, which may be used for a second mode of operation. This aspect may be used by itself or in combination with one or more of the other aspects set out herein.

An advantage of this aspect is that reconfiguring the handle 22 of the hair dryer 10 between modes of use may facilitate ease of use in each mode. For example, if the handle is a pistol grip handle and the hair dryer is a dual sided hair dryer, the handle may be oriented upwardly and forwardly as exemplified in FIGS. 8 and 16 in the first mode of operation. In the second mode of operation, the handle may be rotated to a second position so as to extend upwardly and rearwardly (towards the air outlet for the second mode of operation). Therefore, in the second mode of operation, the handle may be ergonomically positioned (similar to the position shown in FIG. 17), Reconfiguration may facilitate, e.g., flipping a dual sided hair dryer 10 around between modes of use (i.e., in the embodiment of FIGS. 120, 121 changing from an orientation in which inlet 34 faces the hair to be dried to an orientation in which outlet 56 faces that hair to be dried). For example, if the user flips a dual sided hair dryer around between modes of use, a handle configuration that was comfortable for the first mode of use may not be comfortable for the second mode of use. Accordingly, the handle 22 may be reconfigurable, and may be repositionable continuously or between a set of discreet positions.

Optionally, reconfiguring the hair dryer 10 between modes of use may also or alternatively adjust an operational parameter of the hair dryer 10, such as to transition the hair dryer 10 into the new mode of use. Accordingly, as exemplified in FIGS. 16 and 17, reconfiguring the handle may change the air flow path from one used in the first mode of operation to one used in the second mode of operation. Alternately, or in addition, reconfiguring the handle may also actuate one or more heaters for the second mode of operation and/or open or close one or more air inlets and air outlets, e.g., operate by pass valve 140, as the hair dryer is adjusted for the second mode of operation. In the embodiment of FIGS. 120, 121, reconfiguring the handle may change motor 40 between driving air moving member 44 in reverse when handle 44 is oriented upwardly and towards inlet 34 and driving air moving member 44 forwardly when handle 44 is oriented upwardly and towards outlet 56.

The handle 22 may be attached to the body 12 of the hair dryer 10 at an attachment point 330 and may be repositionable about the attachment point 330. As in the example of FIGS. 16 and 17, handle 22 may pivot about a pivot axis through the attachment point 330, such as between at least one rearward position angled back towards the rear end 16 (FIG. 16) and at least one forward position angled forward towards the front end 14 (FIG. 17). Accordingly, altering the position of the hair dryer handle between a rearward position and a forward position may change the volume of air per unit of time flowing through the hair dryer 10 and/or the direction of air flowing through the hair dryer 10. As exemplified in FIGS. 16 and 17, reconfiguring the handle adjusts the redirecting member 62. Therefore, in the first forward position, the hair dryer is used in the first mode of operation and the redirecting member 62 permits air to exit the rear of the hair dryer. In the rearward position shown in FIG. 17, the handle has pivoted to extend upwardly and rearwardly and the redirecting member 62 has closed the rear air outlet 36 to cause the air to enter the air flow path 52 and exit the hair dryer in a forward direction. Concurrently, the fan blade 42 has been moved rearwardly to provide more air flow in the second mode of operation.

Figures 55, 56:
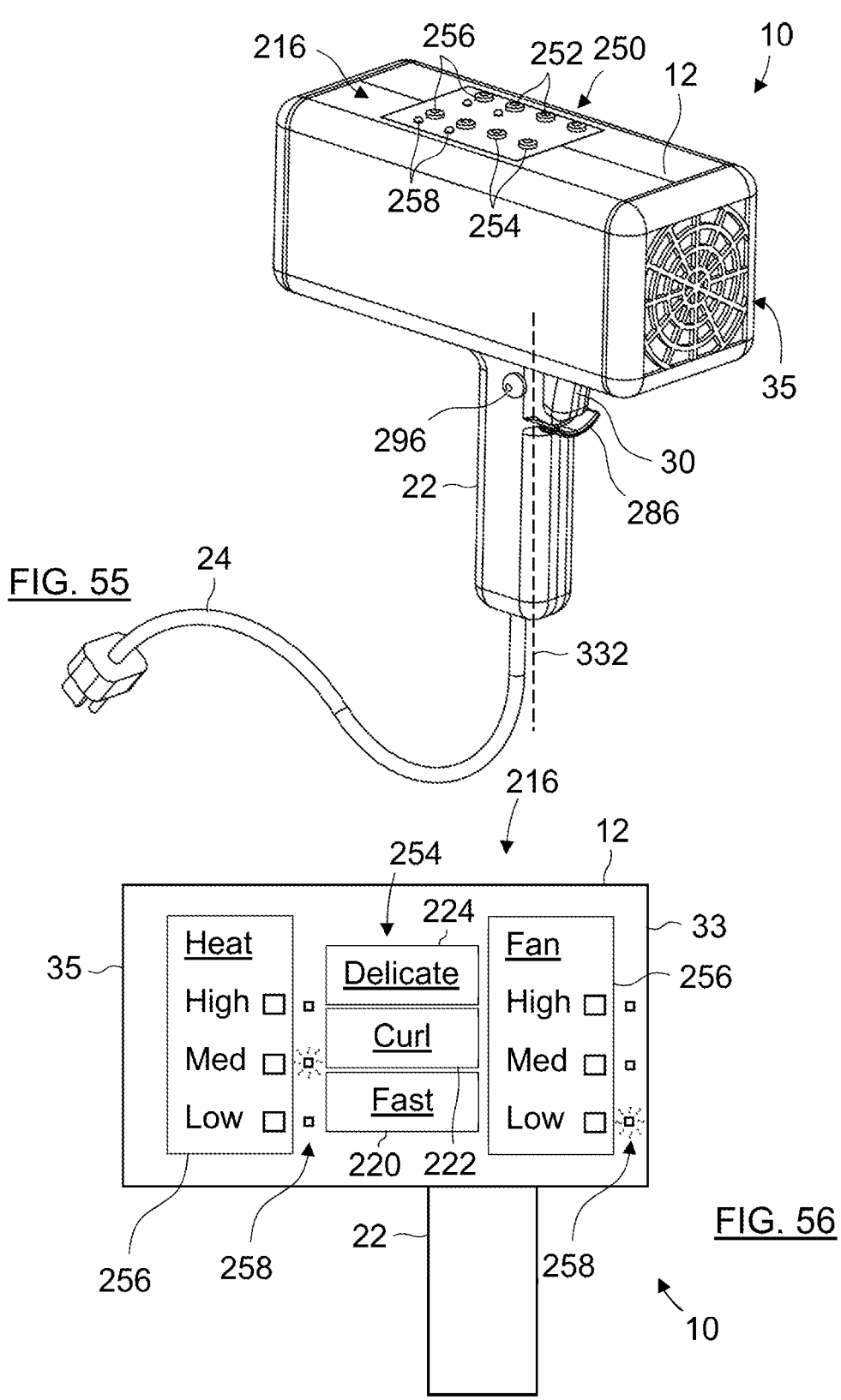
FIG. 55 is a rear perspective view of a further alternate embodiment of the hair dryer having a set of manual toggles.
FIG. 56 is a cross-sectional view of a further alternate embodiment of the hair dryer having the set of manual toggles; and, FIG. 57 is a rear perspective view of a further alternate embodiment of the hair dryer having a touchscreen.

In another example, the handle may rotate about a longitudinal axis 332 of the handle 22 (FIG. 55). For example, the handle 22 may rotate 180° about the longitudinal axis so that a user holding the handle 22 can turn the body 12 by 180° without changing their grip on the handle. Optionally, as in the illustrated example of FIG. 55, the handle 22 may be a vertical handle, and the longitudinal axis 332 may be a generally vertical axis. Accordingly, rotating the handle 22 about the longitudinal axis 332 may not change an angle of the longitudinal axis 332 relative to an underside surface of the body 12 of the hair dryer 10.

It will be appreciated that any one or more components of the hair dryer which is required to be activated or configured for a particular operating mode, or to be deactivated or configured for a particular operating mode, may be controlled by reconfiguring the handle.

Mode Sensor

In accordance with this aspect, alternately or in addition to the handle adjusting the operating mode of the hair dryer, the hair dryer 10 may include a mode sensor that converts or partially converts the hair dryer from one operating mode to the other when a condition is detected. This aspect may be used by itself or in combination with one or more of the other aspects set out herein.

For example, the mode sensor may automatically energize a heating element when the hair dryer is used to blow dry hair (e.g., when hair dryer 10 is used in the second drying mode of operation).

An advantage of this aspect is that less power may be used to dry hair as one or more heating elements may only be powered (e.g., resistively heated) when the hair dryer is used for blow drying with heated air. Alternately, if air is directed towards the hair in the first mode of operation as exemplified in FIG. 120, one or more heating elements may only be powered at a lower power level. Accordingly, a cordless hair dryer may require a reduced amount of on board power (e.g., fewer batteries).

In accordance with this aspect, a sensor may be provided to detect when hair dryer 10 is not being used in the first drying mode. Such an embodiment may particularly be used in embodiments that comprise a dual sided hair dryer or in a single sided hair dryer that uses suction in the first mode of operation. For example, a distance sensor such as a small Lidar or ultrasonic sensor may optionally be used to determine or detect the distance of, e.g., front end 14 of hair dryer 10 to the hair of the user. When the sensor detects that hair (a person's head) is not within a particular predetermined distance (and optionally the motor 40 is energized by a user, e.g., actuating power button 30), then sensor may send a signal (e.g., by a wire) to a control system (e.g., a controller) to actuate a heating element 70 (see for example FIGS. 18 and 14).

Alternately, or in addition, a pressure sensor and/or a flow sensor may be used. For example, a pressure and/or a flow sensor may be provided in primary air flow path 32 (e.g., upstream of motor and fan blade assembly 38). Once the pressure sensor measures a particular pressure, or an increase in pressure, which is indicative of hair being withdrawn from in front of screen 50, then sensor 74 may send a signal (e.g., by a wire) to a control system (e.g., a controller) to actuate a heating element 70 (see for example FIGS. 18 and 19). Similarly, once the flow sensor measures a particular flow, or an increase in flow, which is indicative of hair being withdrawn from in front of screen 50, then sensor 74 may send a signal (e.g., by a wire) to a control system (e.g., a controller) to actuate a heating element 70 (see for example FIGS. 18 and 19).

As with reconfiguring the handle, it will be appreciated that any one or more components of the hair dryer which is required to be activated or configured for a particular operating more, or to be deactivated or configured for a particular operating mode, may be controlled by a signal issued by a mode sensor.

Changing Modes using a Toggle

In accordance with this aspect, a user can switch between operating modes using a toggle. A toggle may be, e.g., a manual toggle on the hair dryer 10, a soft toggle on a touchscreen of the hair dryer 10, or a toggle presented by a mobile application running on a mobile device communicatively coupled to the hair dryer 10. This aspect may be used by itself or in combination with one or more of the other aspects set out herein.

An advantage of this aspect is that a user may choose when to change modes using an accessible toggle. The user may not need to reconfigure the hair dryer 10 or change how they are holding the hair dryer 10. A toggle may also or alternatively reduce the need for a sensor or a reconfigurable aspect of the hair dryer 10.

Hair dryer 10 may include a button or slider forming a manual toggle for switching between modes. The toggle may reconfigure the hair dryer 10. A handle or slider toggle (e.g., such as handle 116 of FIGS. 29 to 34) may be arranged to affect the configuration of a motor and fan assembly 38. For example, a slider may be mechanically connected to one or both of the fan blade 42, 44 and cowling 72 to adjust the spacing between the fan blade 42, 44 and the housing or cowling 72 of the fan to change the air flow, as described further elsewhere herein. Alternately, or in addition, one or more inlet and outlet ports may be opened or closed.

It will be appreciated that any one or more components of the hair dryer which is required to be activated or configured for a particular operating more, or to be deactivated or configured for a particular operating mode, may be controlled by one or more toggles.

Changing Modes by Adding or Removing an Accessory Tool

In accordance with this aspect, a user can switch between operating modes by adding and/or removing an accessory tool. This aspect may be used by itself or in combination with one or more of the other aspects set out herein.

Adding an accessory tool, e.g., a diffuser or a concentrator, to the hair dryer 10 may change the operating mode of the hair dryer 10 from the first mode to the second mode. For example, adding any accessory tool may change the hair dryer 10 into a second mode of operation. Accordingly, when a diffuser or concentrator accessory tool is attached to the hair dryer 10, the hair dryer 10 may be in the second mode.

In some embodiments, there may be an accessory tool that causes the hair dryer 10 to operate in the first mode when the accessory tool is attached. For example, when one of the accessory tools 104 that is shaped to form a jet of high-velocity air is attached the hair dryer 10 is in the first mode, and when the tool is removed the hair dryer 10 is in the second mode. Similarly, when a suction accessory is attached to the hair dryer 10, the hair dryer 10 may be in the first mode, and when the suction accessory is detached the hair dryer 10 may be in the second mode.

The attachment or removal of an accessory tool may move a manual toggle, which then adjusts the hair dryer. Alternately, or in addition, the hair dryer may have a sensor that detects the presence of an accessory tool and, when the tool is detected as being attached to the hair dryer, the hair dryer may be adjusted. For example, the sensor may be a reed switch, a button that is depressed when a tool is attached, the tool may have a conductive member that closes a circuit when attached to the hair dryer or the like.

The hair dryer 10 may have an alternative way of switching between modes that is overridden by attaching an accessory tool that is associated with one or the other of the first mode or the second mode.

It will be appreciated that any one or more components of the hair dryer which is required to be activated or configured for a particular operating more, or to be deactivated or configured for a particular operating mode, may be controlled by the attachment or removal of an accessory tool.

Changing Modes by Adding or Removing the Water Separator

In accordance with this aspect, a user can switch between operating modes by adding and/or removing the water separator 60 and/or tank 152. This aspect may be used by itself or in combination with one or more of the other aspects set out herein.

An advantage of this aspect is that the user may remove the water separator 60 when finished with the first mode and so may not need to otherwise change the hair dryer 10 to enter the second mode. Further, removing the water separator 60 and/or tank 152 may enable the hair dryer to be used in the second mode of operation without concern that water in the separator 60 and/or tank 152 may damage the motor 40.

Removing the water separator 60 may include, e.g., removing a container from the hair dryer 10 or removing a foam member from the hair dryer 10. The mode of the hair dryer 10 may optionally change back to the first mode when the water separator 60 is added back into the hair dryer 10.

it will be appreciated that any one or more components of the hair dryer which is required to be activated or configured for a particular operating mode, or to be deactivated or configured for a particular operating mode, may be controlled by adding or removing the water separator 60 and/or a tank 152.

For example, in the exemplary embodiments of FIGS. 120-122 and 123-125, the water separator 60 may be an end module that is removable and the hair dryer may be operable in the second mode of operation without the rear module attached. Accordingly, the hair dryer may be operated as a blow dry hair dryer with the end module containing the water separator and/or tank removed. When the end module is removed, the hair dryer may automatically shut off if it is being operated in the first mode of operation. Alternately, or in addition, the motor and fan assembly 38 for the primary air flow path may not be actuatable when the separator 60 and/or tank 152 (e.g., the end module is removed). It will be appreciated that the removable end module may comprise or consist of the water separator 60 together with the inlet 34. Alternately, the motor and fan assembly 38 providing the suction may be removable subsequently to or concurrently with the water separator 60.

Bypassing the Water Collection Member

In accordance with this aspect, the air flow path 31 partially or completely selectively bypasses the water separator 60, such as in the second mode of operation. This aspect may be used by itself or in combination with one or more of the other aspects set out herein.

An advantage of this aspect is that the backpressure of the hair dryer 10 may be reduced when the water collection member 60 is bypassed. Accordingly, the volume of air per unit time that the hair dryer 10 can move may be increased if the water separator 60 is bypassed. This may be useful, e.g., in a blow drying mode of operation when a greater volume of air per unit of time may increase the drying rate of hair by carrying away more moisture.

The water separator 60 may be, e.g., foam or a cyclone or a series of baffles or a tortuous path, that will result in backpressure. A bypass inlet 354 (e.g., a supplementary inlet 354) may be provided at a location downstream of the water separator 60, as in the example of FIGS. 21 and 22A.

Optionally, the water separator 60 may be fluidly separated from the motor and fan assembly 38 and/or motor 40 when the bypass inlet 354 is opened to bypass the water collection member 60. Fluidly separating the water separator 60 from the motor and fan assembly 38 and/or motor 40 may prevent water from damaging the motor and fan assembly 38 and/or motor 40. Fluidly separating the water separator 60 from the motor and fan assembly 38 and/or motor 40 may prevent air from passing through the water separator 60 and past the motor 40 and/or other components of the hair dryer 10, since this air may re-entrain water in the water separator 60 and/or tank 152 when passing through the water separator 60.

Optionally, a bypass valve 140 is selectively positionable between a first position closing the bypass inlet 354 (FIG. 21) and a second (open) position fluidly separating the water collection member 60 from the motor and fan assembly 42 (FIG. 22A). As in the illustrated example, the bypass valve 140 may pivot about a bypass valve axis 364 to move between the first and second positions. It will be appreciated that any valve may be used. Further, optionally, two valves may be used, a first valve to open bypass inlet 354 and a second to close the air outlet of the water separator 60.

The bypass valve 140 may automatically continuously or frequently adjust to stabilize and/or limit air flow volume per unit time through the water separator 60, as discussed elsewhere herein. Any mode sensor may be used.

For example, the bypass valve 140 may respond to a difference in sensed pressure and/or flow, such as only allowing air to flow through the water separator 60 when there is a high level of suction of a low level of flow (e.g., hair is obstructing the inlet 33 enough to reduce air flow volume). In some examples, when the water separator and/or tank 152 is full (e.g., a sensor senses that tank 152 is full) the bypass valve 140 may automatically open the bypass inlet 354 so that air flows through the bypass path 285 and concurrently fluidly separate the motor 40 and the water collection member 60.

The bypass valve 140 may also or alternatively respond to a sensed proximity of a user. For example, as the user's head is spaced from the hair dryer 10, the bypass valve 140 may open to decrease the air flow volume per unit time through the water separator 60. Opening the bypass inlet 354 may also fluidly separate the water separator 60 from the motor 40 or begin to inhibit air flow therebetween.

In some examples, the bypass valve 140 may be manually opened. Opening the bypass valve 140 to open the bypass path 285 may also uncover the controls for the second mode of operation and/or active the controls for the second mode of operation and/or result in an automatic adjustment in fan speed.

Alternately or additionally, the water separator 60 may be bypassed by being removed. A user may remove the water separator 60 when the user has completed operations in the first mode. The hair dryer 10 may then automatically operate in the second mode and/or may be operated in the second mode. For example, the water separator 60 may be a baffle chamber, and the entire chamber may be removable.

Air Multiplier

In accordance with this aspect, hair dryer 10 may include an air multiplier. This aspect may be used by itself or in combination with one or more of the other aspects set out herein.

An advantage of this aspect is that enhanced air flow, e.g., during the second mode of operation, may be produced.

The air flow multiplier may be any design that induces air to flow along a surface or through a channel, and may employ the Coanda effect and/or may use an air foil.

Figure 23:
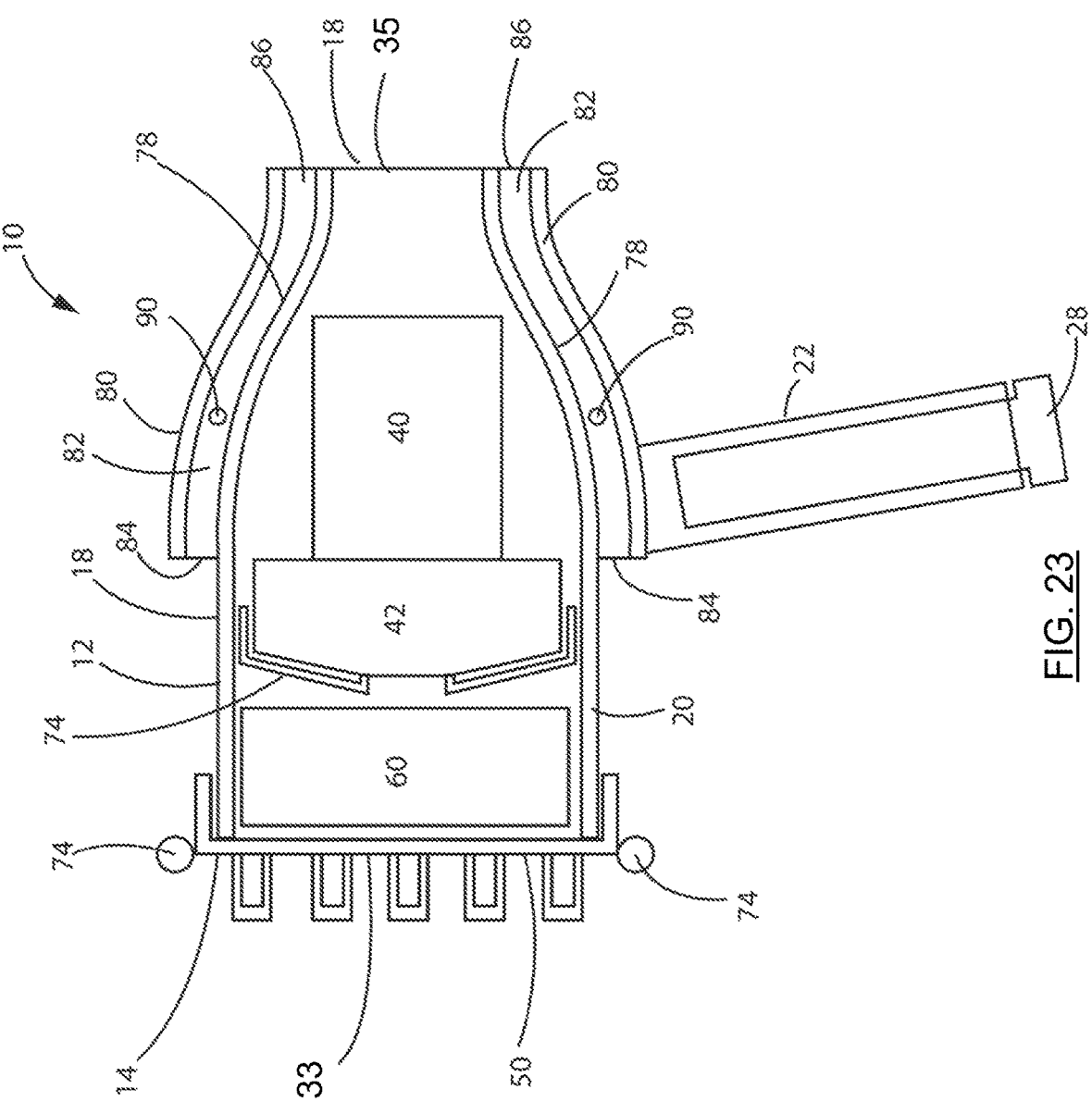
FIG. 23 is a cross-sectional view of a further alternate embodiment of the hair dryer having an exterior air foil at the second, rearward end of the hair dryer.

As exemplified in FIG. 23 the outer surface of rear end 16 of main body 12 is shaped like an air foil. Accordingly, as air exits the air flow path 31 via outlet port 35, air is induced to flow along outer surface 78. The induced air flow merges with air exiting outlet port 35 so as to increase the volume of air that is available for blow drying.

Optionally, an outer wall 80 may be provided outward of outer surface 78 so as to define a channel 82 through which the induced air flow travels. Channel 82 has an inlet 84 and an outlet 86. As exemplified, outlet 86 is preferably adjacent outlet port 35.

Optionally, outer wall 80 may surround rear end 16 of main body 12 such that channel 82 is annular. It will be appreciated that channel 82 may surround part or all of rear end 16 and may comprise a single continuous annular or semi annular channel or it may comprise a plurality of partially annular channels which, in totality, may surround most or all of rear end 16.

Figure 24:
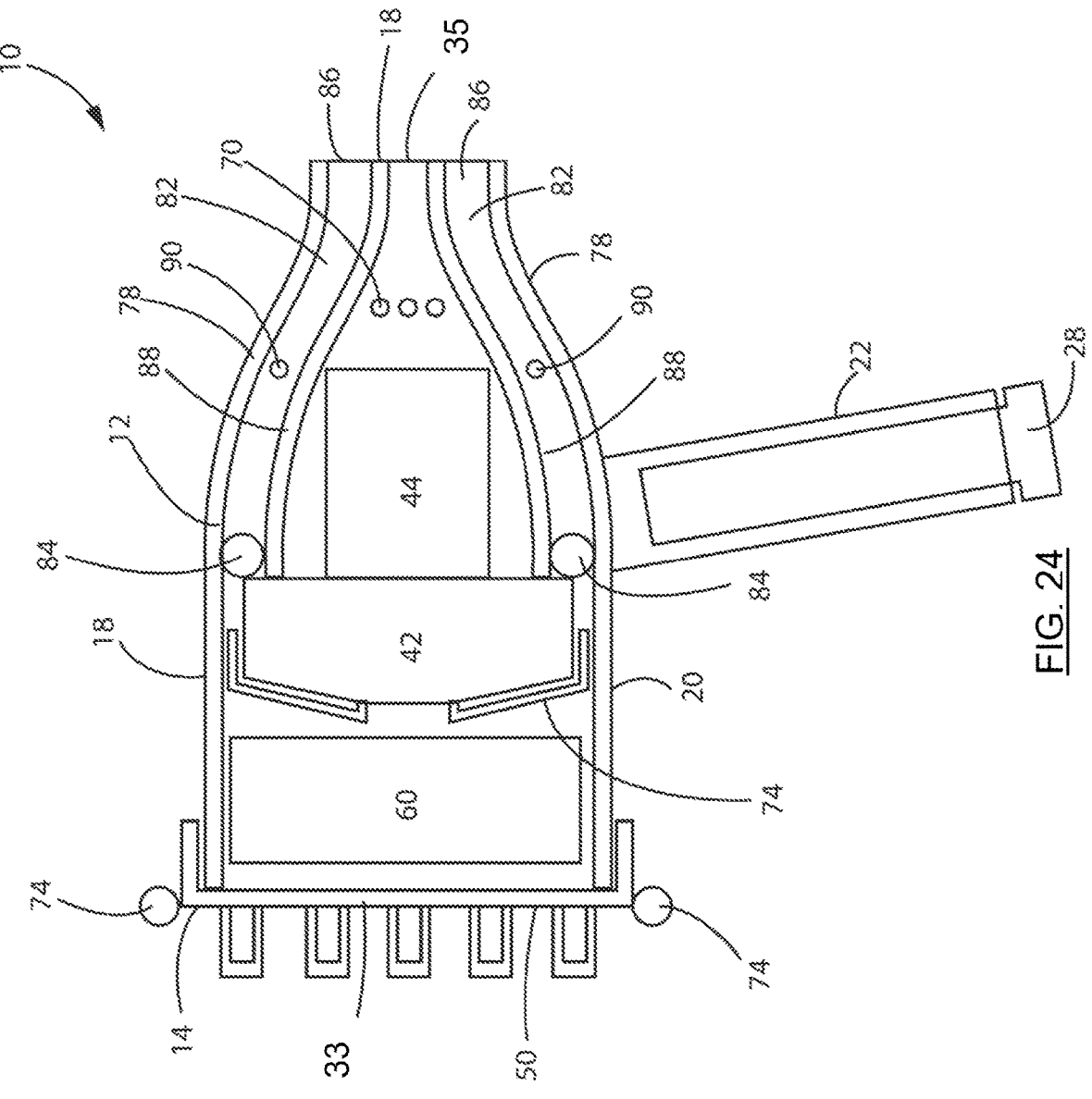
FIG. 24 is a cross-sectional view of a further alternate embodiment of the hair dryer having an interior air foil at the second, rearward end of the hair dryer.
Figure 25:
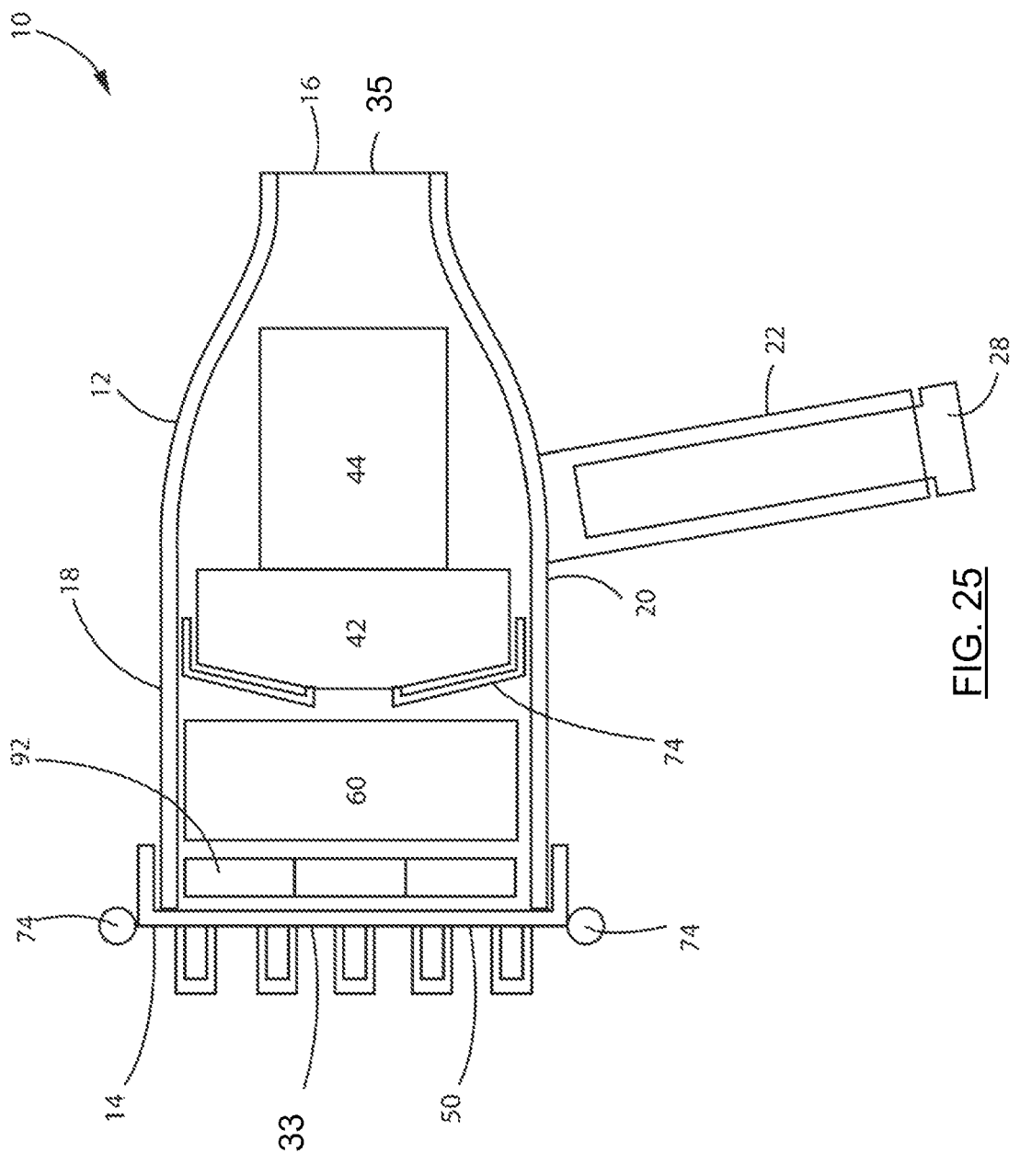
FIG. 25 is a cross-sectional view of a further alternate embodiment of the hair dryer having an infrared heating element at the first, frontward end of the hair dryer.

Alternately, channel 82 may be provided internal of main body 12 by providing inner wall 88 positioned inward from outer surface 78 of rear end 16 (see for example FIG. 24). In such an embodiment, inlet 84 may be a port on outer surface 78.

It will be appreciated that both an internal channel 82 and an external channel 82 may be provided, each of which may comprise one or more channels extending part or all of the way around primary air flow passage 32.

Optionally, the increased air flow may be heated by a heating element. For example, one or more heating elements 90 may be provided in one or more channels 82. It will be appreciated that heating element 90 may be any heating element discussed herein and may be a resistively heated heating element.

It will be appreciated that a sensor to inhibit or prevent overheating of the hair being dried may be provided on rear end 16.

Recommendation System

In accordance with this aspect, the hair dryer 10 or a hair dryer system that includes the hair dryer 10 includes an advice or recommendation system that recommends one or more settings of the hair dryer based on user information.

This aspect may be used by itself or in combination with one or more of the other aspects set out herein.

An advantage of this aspect is that the user may be provided with information regarding the settings of the hair dryer that are considered optimal based on characteristics of the user's hair, without removing control from the user. Therefore, the recommendations may be provided to the user without adjusting the settings of the hair dryer 10 directly or requiring control circuitry between the recommendation system and the settings control system. The user may adjust the settings of the hair dryer 10 to the recommended settings or to other settings to provide a more effective or more desirable hair dryer experience.

A recommendation system 216 (FIGS. 55 to 58) may be communicatively coupled to the hair dryer 10 whereby a user is able to provide at least one personal item of hair information. The user may also be able to receive, based on the at least one personal item of hair information, at least one hair dryer setting recommendation of a plurality of hair dryer setting recommendations, and to input at least one setting selection of the plurality of hair dryer setting recommendations to the hair dryer to adjust an operating parameter of the hair dryer. The setting selection may be the at least one hair dryer setting recommendation, or may be or include user-selected alternatives.

The recommendation system 216 may generate a recommendation based on the at least one personal item of user information. The at least one personal item of user information may include a hair fragility level (e.g., durable, moderately durable, or fragile). Alternatively, or additionally, the at least one personal information may include substitute hair characteristics, such as a hair type (e.g., straight, wavy, curly, or kinky), a hair color (e.g., light blonde, medium blonde, dark blonde, red, light brown, medium brown, dark brown, or black), a hair coloring status (e.g., naturally or artificially colored), and/or another treatment status (e.g., permed, etc.). Substitute hair characteristics may be used as an alternative to the hair fragility levels, such as if a user does not know the fragility level of their hair. The fragility level may inform the choice of settings of the hair dryer and the operational parameters of the hair dryer. For example, more fragile hair may be less able to tolerate heat, and, accordingly, may be dried using lower temperatures. The substitute hair characteristics may be used by the recommendation system 216 to determine an estimated fragility level of the user's hair.

The recommendation system 216 may be mounted on the hair dryer 10 and/or may be remotely located (e.g., a remote control for the hair dryer and/or on a user's mobile device such as a smart phone via, e.g., Bluetooth communication). For example, the recommendation system 216 may include one or more sensors and the user may provide the at least one personal item of hair information by bringing the one or more sensors and the hair into proximity (e.g., so that the sensors may sense the hair type and/or hair color). In another example, the recommendation system 216 may include one or more input members mounted on the hair dryer 10, such as one or more touchscreens, one or more manual toggles (e.g., buttons), and/or one or more microphones to receive audible cues.

Alternatively, or additionally, the recommendation system 216 may include a mobile device, such as a smartphone or headset. The mobile device may be operable to receive the at least one personal item of hair information (e.g., through a touchscreen of the mobile device or a microphone of a headset). The mobile device may also be operable to provide the at least one hair dryer setting recommendation (e.g., by displaying the recommendation or generating an audible cue). The user may also be able to provide a setting selection via the mobile device (e.g., through the touchscreen of the mobile device or the microphone of a headset).

At least one processor 270 and at least one data storage device 272 may be used to assess which setting(s) are recommended based on the at least one personal item of hair information. As in the illustrated example of FIG. 76, the at least one processor 270 and at least one data storage device 272 may be onboard the hair dryer 10. Alternatively, or additionally, at least one processor 270 and at least one data storage device 272 may be remote, such as in remote servers (e.g., cloud servers) or mobile devices (e.g., the user's mobile device), and, optionally, communicatively coupled to the hair dryer 10.

It will be appreciated that the recommendation system 216 may include a memory to remember information about one or more users. Accordingly, a first user may input data about their hair type. Similarly, a second user may input data about their hair type. Information from a user may be saved, such as in a profile or as a profile associated with the user. Therefore, when the hair dryer is to be used to dry the hair of the user, the user may indicate their profile instead of inputting hair information. For example, the first user may select a toggle (e.g., a first memory button) to adjust the operating parameters of the hair dryer 10 in accordance with the first user's profile, and the second user may select another toggle (e.g., a second memory button) to adjust the operating parameters of the hair dryer 10 in accordance with the second user's profile. Optionally, the user may indicate their profile by bringing a personal device into proximity with the hair dryer 10, such as by bringing their mobile device (e.g., a smartphone or tablet) into proximity. The presence of the personal device may be sensed (e.g., via a radio transceiver) and used to inform the selection of a profile.

The at least one personal item of hair information may inform or define the temperature and/or air flow of the hair dryer 10 in one or each operating mode. For example, temperature and airflow may be varied to provide optimal drying without overheating (e.g., maintaining the hair temperature at a temperature that is about 5° or 10° or 15° less than the temperature at which the user's hair may be damaged). The recommendation system 216 may advise a user of the recommended settings of the hair dryer (e.g., temperature setting, fan speed, inlets/outlets to open or close, etc.) based on the at least one personal item of hair information.

In some operating modes, the recommendation system 216 may operate to provide user settings such that the air flow through the hair dryer is adjusted such that the temperature of the air at a particular location (e.g., at the air outlet of the hair dryer) is maintained in a desired range (e.g., at a temperature that is about 5° or 10° or 15° less than the temperature at which the user's hair may be damaged). In accordance with such an embodiment, the power provided to a heating element may not need to be varied.

Instead, a user may need to only adjust the fan speed and/or open and/or close certain inlets and/or outlets so as to adjust the velocity of air as it travels over the heating element and/or add bypass dilution air.

In other operating modes, the recommendation system 216 may operate to provide user settings such that the fan speed need not be adjusted. In accordance with such an embodiment, the power provided to a motor and fan assembly 38 may not need to be varied. The user may adjust the temperature of a heating element(s) and or open and/or close certain inlets and/or outlets.

For example, the hair dryer may be in physical contact with the hair and/or scalp of the user, up to 6 inches away, up to 4 inches away, or up to 2 inches away. Optionally, an internal air flow sensor may automatically adjust the temperature (e.g., by actuating any component discussed herein) based upon the actual airflow which is created, e.g., by the use of attachments, proximity of the hair, or a combination thereof.

The following table provides experimental results showing the hair temperature of hair of three example fragility levels over a range of air flow rates and hair dryer outlet temperatures at the air outlet of the air flow path:

| | Hair Definition as Defined by User | | | | | |
| | Durable | | Moderately Durable | | Fragile | |
| Hair Dryer Air Flow Rate (cfm) | Hair Dryer Air Temp. (°C.) | After 3 minutes Dry Hair Temp. (°C.) | Hair Dryer Air Temp. (°C.) | After 3 minutes Dry Hair Temp. (°C.) | Hair Dryer Air Temp. (°C.) | After 3 minutes Dry Hair Temp. (°C.) |
|---|---|---|---|---|---|---|
| 20 | 65 | 55 | 60 | 51 | 50 | 43 |
| 25 | 65 | 54 | 60 | 50 | 50 | 44 |
| 30 | 70 | 57 | 65 | 52 | 55 | 45 |
| 35 | 70 | 56 | 70 | 53 | 55 | 44 |
| 40 | 75 | 57 | 70 | 52 | 60 | 46 |
| 45 | 75 | 56 | 70 | 52 | 60 | 46 |
| 50 | 78 | 57 | 75 | 54 | 60 | 45 |

It may be desirable to keep durable hair at a temperature below 75° C., below 70° C., below 60° C., or below 50° C. It may be desirable to keep moderately durable hair at a temperature below 65° C., below 55° C., or below 45° C. It may be desirable to keep fragile hair at a temperature below 60° C., below 50° C., or below 40° C. As indicated in the table above, higher temperatures may be used with higher air flow rates without overheating the hair.

Based on the forgoing, it will be appreciated that the outlet temperature of air exiting the outlet port and/or the air flow rate may be selected based on the hair fragility level.

In some examples, the range of airflow rates of the hair dryer 10 made available to the user may be varied based upon the fragility level of the hair. For example, the hair dryer 10 may be operable to produce 20 cfm to 50 cfm for durable hair, limit the range to 20 cfm to 40 cfm for moderately durable hair, and limit the range to 20 cfm to 35 cfm for fragile hair.

In some examples, the range of airflow rates of the hair dryer 10 made available to the user may be varied based on the type of accessory attachment used with the hair dryer 10. For example, if the user attaches an accessory attachment with a constricted air flow outlet, such as a concentrator, the range of air flow rates available may be restricted to air flow rates up to 20%, up to 40%, up to 60%, up to 80%, or up to 100% of the maximum airflow rates otherwise available. This air flow rate reduction may be cumulative with an air flow rate reduction based on the fragility level of the hair.

It will be appreciated that the recommendation system 216 may have any type of recommendation system interface. Optional interfaces are discussed next.

Manual Toggles

In accordance with this aspect, the recommendation system 216 may include manual toggles to receive information from the user. This aspect may be used by itself or in combination with one or more of the other aspects set out herein.

An advantage of this aspect is that the user may easily locate and actuate the toggles to provide information. Manual toggles may provide a simple and/or cost effective way for the user to provide information.

The hair dryer 10 may include a set of manual toggles 250 on the hair dryer 10. As in the illustrated example of FIG. 55, the set of manual toggles 250 may be or include buttons 252.

The manual toggles 250 may include a set of information toggles 254. Each information toggle 254 may correspond to an item of hair information, such as a hair color or hair type. The user may be able to indicate the at least one personal item of hair information by actuating one or more of the information toggles 254. Labels such as words or pictures may be provided to assist the user in determining which toggle to press.

The manual toggles 250 may also include a set of setting toggles 256. Each setting toggle 256 may correspond to a hair dryer setting of the plurality of hair dryer settings. The user may be able to indicate the setting selection by actuating one or more of the setting toggles 256. Again, labels such as words or pictures may be provided to assist the user in determining which toggle to press.

The recommendation system 216 may also include a plurality of markers 258. Each marker 258 may be associated with a setting toggle 256. The setting toggle(s) 256 recommended by the recommendation system 216 may be indicated by the associated marker 258.

As in the illustrated example of FIG. 55, the markers 258 may be lights, such as LED lights, the markers 258 may be each arranged adjacent the associated setting toggle 256, as in the example of FIG. 55. Alternatively, or additionally, the markers 258 may be arranged to illuminate the setting toggles 256 or to illuminate a light (e.g., LED) that illuminates a toggle. For example, a marker 258 may be arranged to shine on a setting toggle 256 to indicate that the illuminated setting toggle 256 corresponds to the recommended setting.

As in the example of FIG. 56, the setting toggles 256 may be arranged by function. For example, setting toggles 256 associated with the heat settings of the hair dryer 10 (e.g., high, medium, and/or low) may be arranged adjacent one another and setting toggles 256 associated with the fan speed settings of the hair dryer 10 (e.g., high, medium, and/or low) may be arranged adjacent one another (e.g., in a row or column).

As in the exemplary embodiment of FIG. 56, a first button 220 may be used to indicate that the user wishes to dry their hair quickly, a second button 222 may be used to indicate that the user wishes to curl their hair, and/or a third button 224 may be used to indicate that the user has delicate hair. Each button of the information toggle 254 may have a series of entries (e.g., slow, medium and fast for button 220) and the user may have pressed button 220 repeatedly to cycle through to "fast". It will be appreciated that additional buttons may be provided to provide further information about a user's hair type or the user's goal. Accordingly, for example, button 220 may compromise the buttons, one for each of slow, medium and fast.

In the exemplary embodiment of FIG. 56, the recommendation is a medium heat setting and a low fan setting, and the light adjacent the middle button of the temperature setting buttons is illuminated and the light adjacent the bottom button of the fan setting buttons is illuminated. The user may start with the recommended settings and may then change the settings if the recommended settings are not providing the desired result.

It will be appreciated that recommendation system 216 may retain in memory any settings that the user uses (changes from the recommended settings). For example, the recommendation system 216 may automatically retain the settings for that particular user (e.g., user 1) or the user may set the recommendation system 216 to retain those settings. The recommendation system 216 may then use those changed settings as the recommended settings the next time the same user enters any user identification information (e.g., by pressing a "user 1" button).

Touchscreen

In accordance with this aspect, the recommendation system 216 may include a touchscreen to receive information from the user. This aspect may be used by itself or in combination with one or more of the other aspects set out herein.

An advantage of this aspect is that a variety of picture and word cues can be provided to the user via the touchscreen. As the display of the touchscreen may be changed, more information may be provided than may be available via manual toggles and permanent pictures. For example, the user interface may have a number of menu items (e.g., heat, fan speed, hair type) and pressing a menu item may bring up a sub menu (e.g., for hair type, natural, coloured, permed, etc.). Accordingly, a touchscreen may be able to walk a user through an initial set up process to gather the at least one personal item of hair information and receive the setting selection and/or enable a user to quickly indicate a saved profile (e.g., user 1) to avoid being presented with the set up process in the future.

A touchscreen may permit, for example, the recommendation system 216 to provide the option of a menu allowing the user to choose a previous personalized preset (e.g., a profile for user 1), which may be named or numbered, or set up a new user or guest user.

The user may provide the at least one personal item of hair information via the touchscreen 260. The touchscreen 260 may also provide the user with at least one hair dryer setting recommendation and receive a setting selection from the user.

Figures 57, 58:
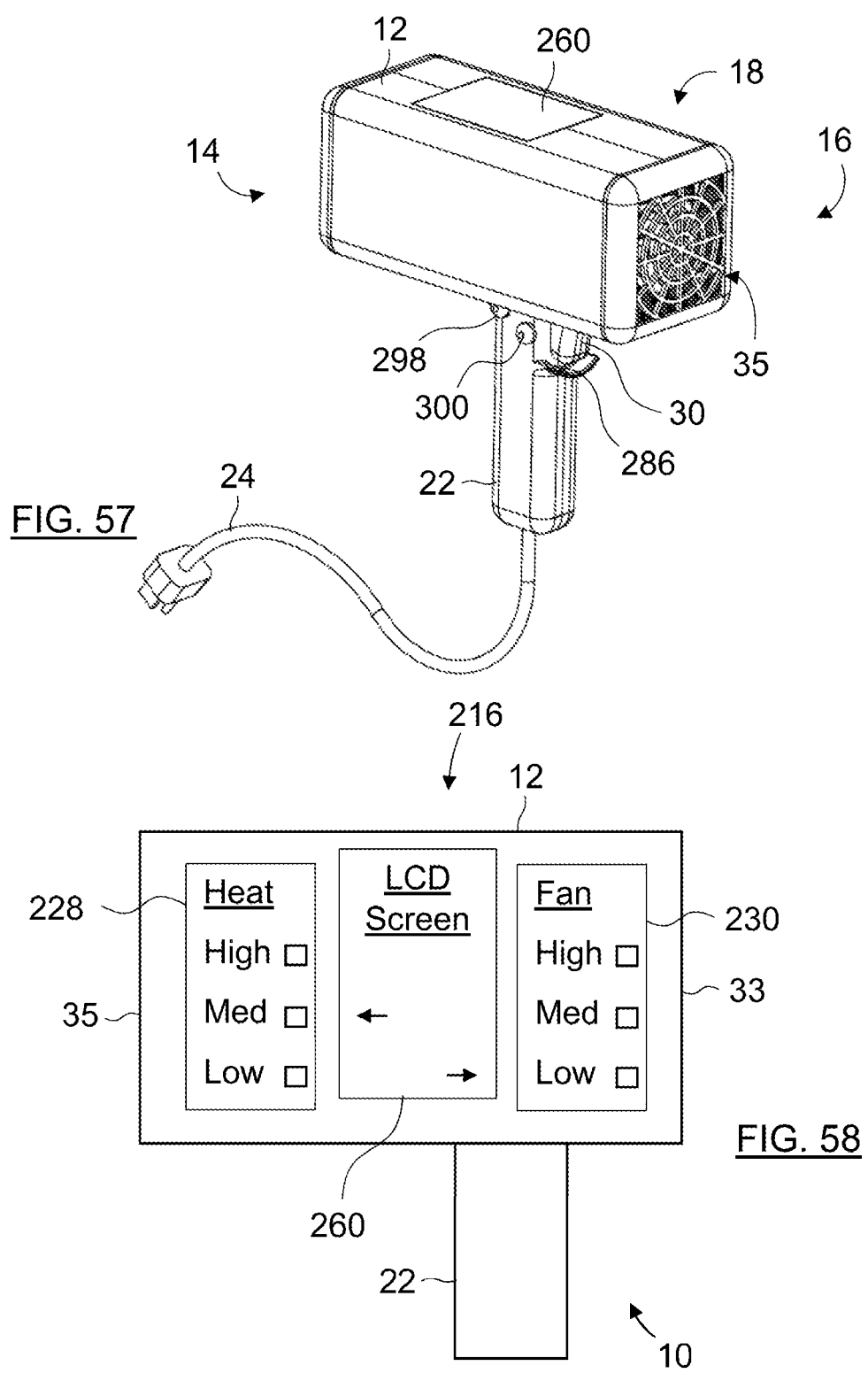
FIG. 58 is a view showing an optional touchscreen.

As in the illustrated example of FIG. 57, the touchscreen 260 may be provided on a top end 18 of the main body 12 of the hair dryer 10. A touchscreen on the top end 18 may facility use of the touchscreen 260 since the user may not need to remember which side of the hair dryer the touchscreen is on or flip the hair dryer over to view the bottom side. The display of the touchscreen 260 may or may not be adjustable. For example, the display of the touchscreen 260 may be arranged to be viewed from the front end 14 in one mode of operation and then to be flipped to be read from the rear end 16 in another mode of operation.

As in the example of FIG. 58, a touchscreen 260 may be used in connection with manual toggles. For example, the touchscreen 260 may recommend settings by, e.g., displaying arrows or other markings directing the user's attention to the button corresponding to the recommended setting. In the illustrated example, the recommendation is a medium heat setting and a low fan setting, and the touchscreen is displaying arrows directed to the middle button of the temperature setting buttons 228 and an air directed to the bottom button of the fan setting buttons 230.

Once the recommendation system 216 has provided a recommendation, the user may then decide whether or not to accept the recommendation.

It will be appreciated that the recommendation system 216 may enable a user to enter the type of settings that they use. Alternately, the recommendation system may update a user's profile when the user overrides the recommended settings. Accordingly, when the first user uses the hair dryer subsequently, the recommendation system 216 may indicate the settings employed the last time the hair dryer was used and the first memory button was pressed.

It will be appreciated that the recommendation system 216 may operate in the same way whether the system uses only manual toggles, a touch screen which permits a user to change settings or a combination of a touch screen read out display and manual toggles.

It will further be appreciated that, regardless of the form of the recommendation system interface, selection of a setting (e.g., the temperature of the air exiting the hair dryer) may cause the hair dryer to adjust the operation of any one or more components as discussed herein such that the exit temperature of the air is as set.

A Heater on an Accessory

In accordance with this aspect, a heating element 70, such as an infrared heating element 92, is positioned on an accessory tool. This aspect may be used by itself or in combination with one or more of the other aspects set out herein.

An advantage of this aspect is an accessory tool 104 may be provided with a heating element 70 to provide an amount of radiation and/or a pattern of radiation that complements the type of accessory tool. For example, if the accessory tool is a diffuser, one or more infrared heating elements may be shaped to direct infrared radiation over a large area. Alternately, if the accessory tool is a concentrator, then a heating element or elements may be shaped to provide a column of radiation having a narrow width. Accordingly, for air exiting an accessory tool in a particular flow direction (which may be referred to as a forward flow direction), the cross-sectional area of infrared radiation emitted by an infrared heating element in a plane transverse to the forward flow direction may be the same or essentially the same as the cross-sectional flow area of the air emitted by the accessory tool in the forward flow direction.

The hair dryer 10 to which the accessory tool 104 is to be mounted may not include a heating element 70 and/or may include a simplified heating element 70, such as a heating element 70 that is not adjustable. Alternatively, any heating element 70 included in the hair dryer 10 to which the accessory tool is to be mounted may be deactivated when the accessory tool is mounted to the hair dryer 10. Alternately, the heating element 70 may be adjustable to focus IR radiation at a particular location as discussed as discussed previously.

Figure 67:
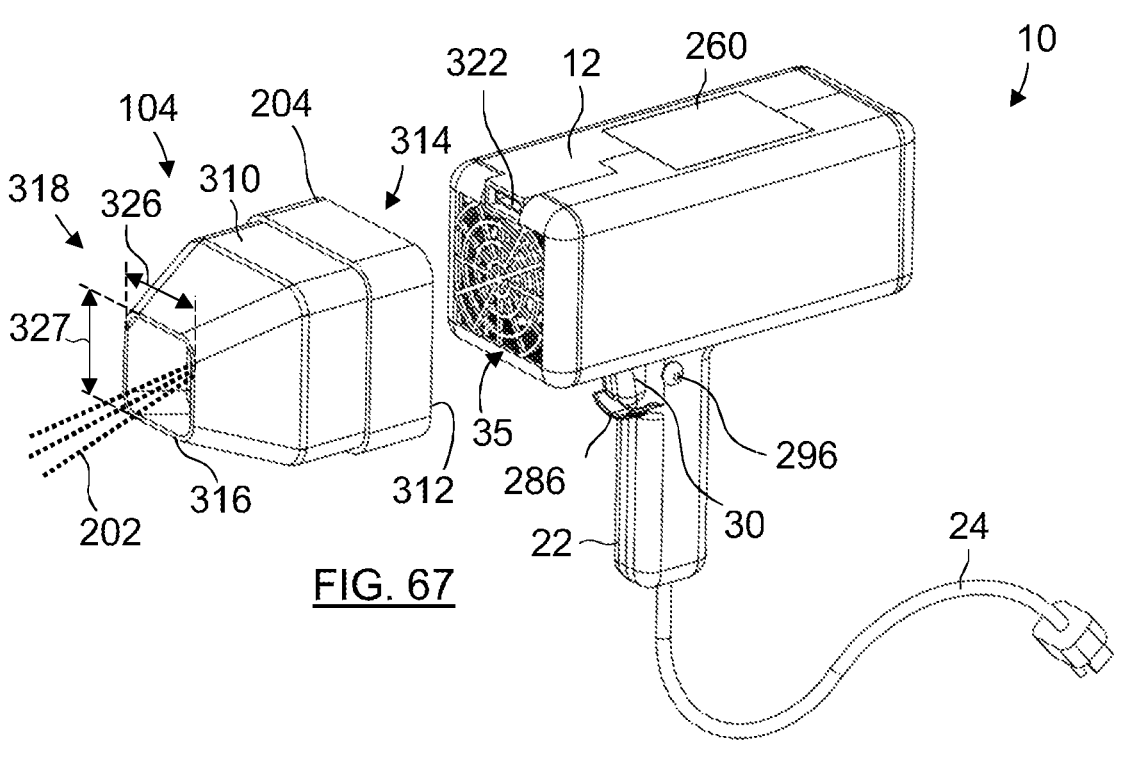
FIG. 67 is a rear perspective view of a further alternate embodiment of the hair dryer and a first concentrator accessory with an integrated heating element.
Figure 68:
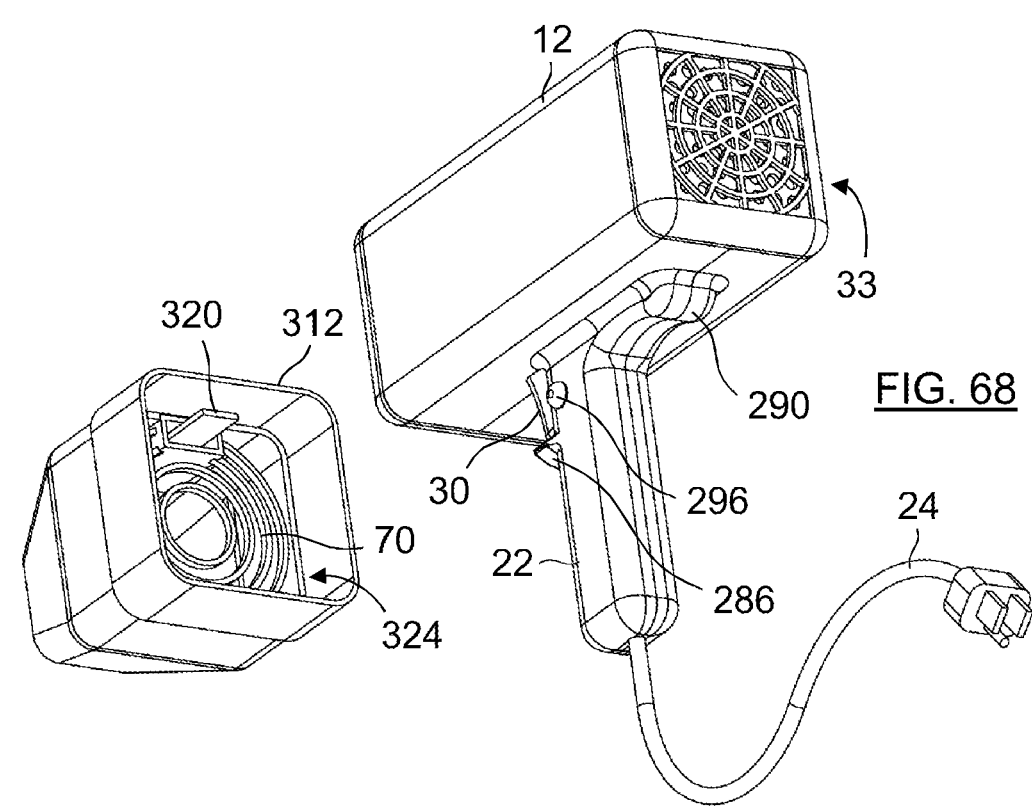
FIG. 68 is a front perspective view of the hair dryer and accessory of FIG. 67.

As in the example of FIGS. 67 to 68, the accessory tool 104 may have an air flow path extending through an accessory body 310 from an inlet port 312 provided on a first side 314 to at least one outlet port 316. The at least one outlet port 316 may be provided on a second side 318, which may be opposite the first side 314.

A heating element 70 may be secured to the accessory body 310 and operable to be electrically connected to a power supply of the hair dryer 10 when the accessory tool 104 is mounted to the hair dryer 10. For example, at least one accessory electrical contact 320 may be provided on the accessory tool 104 to mate with a hair dryer electrical contact 322 of the hair dryer 10. Mating the accessory electrical contact 320 with the hair dryer electrical contact 322 may automatically form an electrical connection from the heating element 70 to the power supply of the hair dryer 10 as the accessory tool 104 is mounted to the hair dryer 10. Mounting the accessory tool may automatically actuate the heating element 70 if electrical contact 322 is live.

The heating element 70 secured to the accessory body 310 may be provided in the air flow path 324 or thermally connected to the air flow path 324 that extends through the accessory body 310. For example, the heating element 70 may be operable to heat air flowing through the air flow path that extends through the accessory body 310 (e.g., the heating element 70 may be a resistively heatable element or an infrared heating element that heats a target 190 in the air flow path 324 or an infrared heating element positioned in or internal of the tool and surrounding part or all of the air flow path 324).

Alternatively, or additionally, one or more heating elements 70 may be secured to the accessory body 310 outside the air flow path 324. For example, the heating element 70 may be arranged adjacent a contact surface at the outlet port 316 or arranged to heat air as it exits the outlet port 316 or arranged to heat hair adjacent the outlet port 316.

The heating element 70 carried by the attachment 104 emits heat in a radiation pattern 202, which pattern may match the air flow pattern provided by the accessory 104.

For example, as exemplified in FIGS. 67 and 68, the accessory 104 may be a concentrator accessory 204 having a single outlet 316 with a concentrator width 326 and a concentrator height 327. The heating element 70 may have a narrow focus and is shaped to radiate only towards the outlet of the concentrator accessory 204. Accordingly, for example, the heating element 70 may be shaped to provide a column of radiation having a column width equal to or less than the concentrator width 326 and a column height equal to or less than the concentrator height 327. The heating element 70 may be an infrared heating element 92 received in the air flow path 324, and the column of radiation may be directed towards and/or out through the single outlet port 316.

Figure 69:
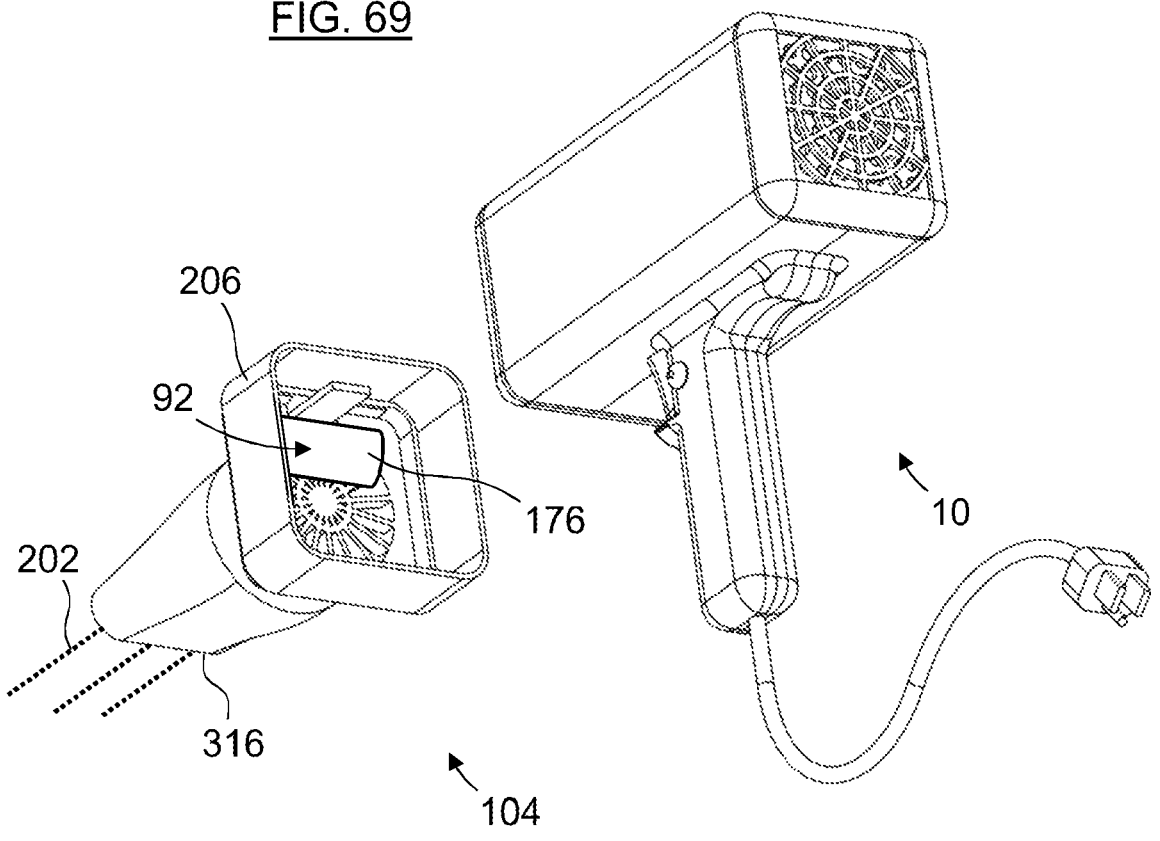
FIG. 69 is a front perspective view of the hair dryer of FIG. 67 and a second concentrator attachment accessory.

Alternately, as exemplified in FIG. 69, the attachment 104 may be a blade accessory 206 with a single slot-shaped outlet port 316 and may include an elongated heating element 70. The elongated heating element 70 on the slot-shaped accessory 206 may be shaped to radiate across the entire slot-shaped outlet 316 of the blade accessory 206.

Figures 70, 71:
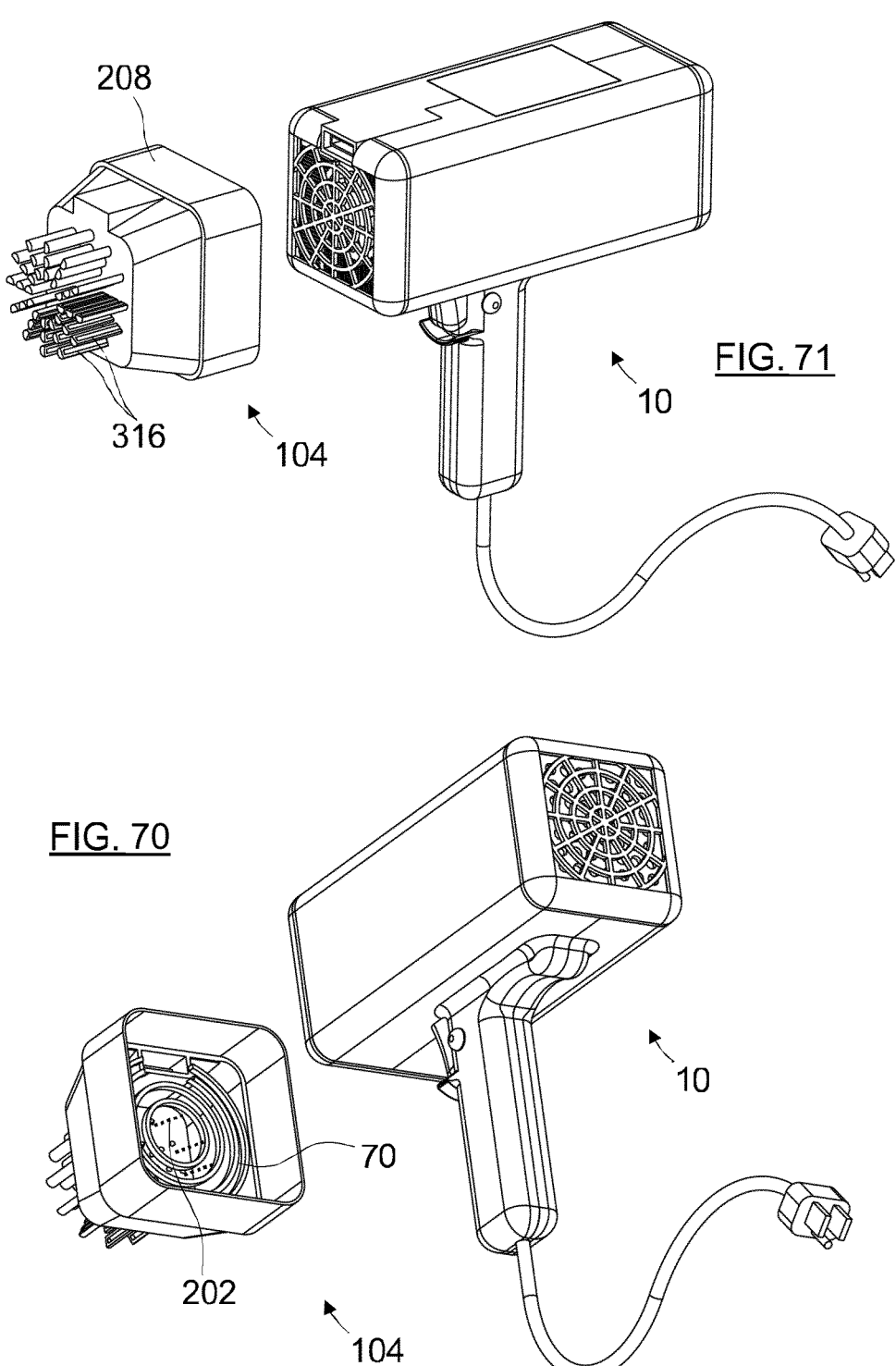
FIG. 70 is a rear perspective view of the hair dryer of FIG. 67 and a diffuser attachment accessory.
FIG. 71 is a front perspective view of the hair dryer and accessory of FIG. 70.

Alternately, as exemplified in FIGS. 70 and 71, the accessory 104 may be a diffuser accessory 208 and may include a large heating element 70. The diffuser accessory 208 may include a plurality of outlet ports 316 over a wide area. The large heating element 70 on the diffuser accessory 208 may have a wide focus and may be shaped to radiate across the plurality of outlet ports 316 of the diffuser accessory 208. In this embodiment, the diffuser ports may be transparent to infrared radiation. Alternately, the heating element may be exterior to outlet ports 316.

The heating element 70 may be an infrared heating element 92, and may optionally be arranged to direct infrared radiation or heat to a location that is exterior to the outlet of the hair dryer, such as adjacent the outlet port. The infrared heating element 92 may be provided outside the air flow path 324 or may be provided in the air flow path and may be operable to direct infrared heat through the outlet port 316 (which may be transparent to IR radiation). The infrared heating element 92 may be focusable on an off board surface such as a surface of hair held against or adjacent the accessory. A focusable heating element 70 may be used, e.g., to set a curl.

An accessory tool 104 may be removably secured to the hair dryer 10 in a variety of ways. Magnetic or mechanical members mounted on one or both of the hair dryer 10 and the accessory tool 104 may be used to removably secure the accessory tool 104 and hair dryer 10 together. For example, the hair dryer 10 may include at least one first magnetic member and the accessory tool 104 may also include at least one second magnetic member, and the first and second magnetic members may be arranged to be attracted to one another when the accessory tool 104 and the hair dryer 10 are in close proximity. Alternately, the accessory tool may be rotatable secured to the hair dryer (e.g., a bayonet mount) or a snap fit may be used.

Optionally, the accessory tool may have the only heating element that is used in the second mode of operation and, optionally, the hair dryer may not have a heating element. Therefore, each accessory tool may have a heating element that is designed to emit heat (optionally infrared radiation) only to the part of the hair that receives air emitted by the accessory tool. An advantage of this design is that all or essentially all of the infrared radiation may be directed at the part of the hair which is being dried by the emitted air.

Handle Projection

In accordance with this aspect, the hair dryer 10 includes at least one handle projection to facilitate gripping of the hair dryer. This aspect may be used by itself or in combination with one or more of the other aspects set out herein.

An advantage of this aspect is that the handle projection may facilitate a comfortable gripping position in one or more of the modes of operation of the hair dryer 10. The handle projection may also prevent accidental toggling of buttons or switches or other toggles.

Figures 72, 73:
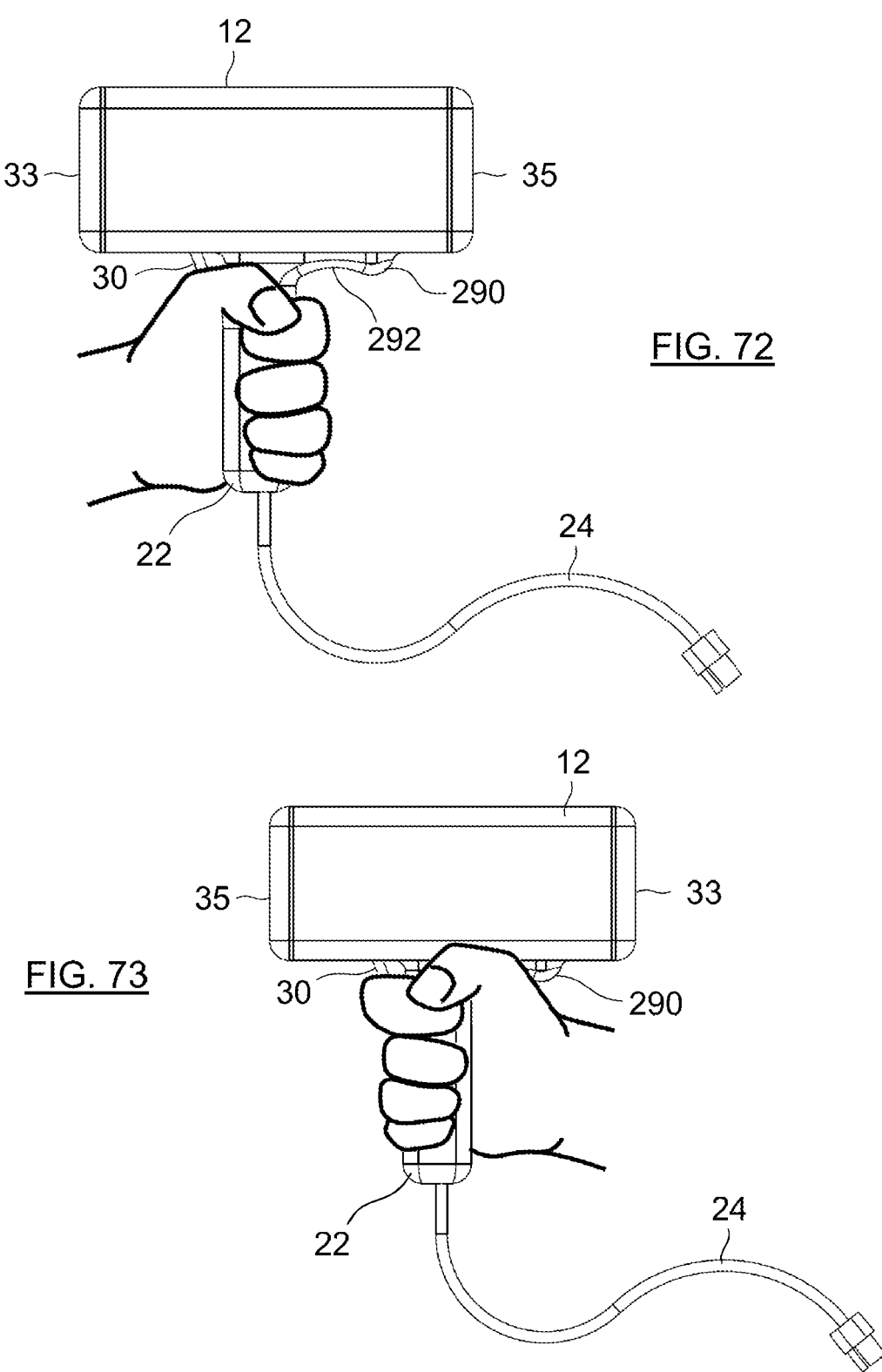
FIG. 72 is a side view of the hair dryer of FIG. 67 held by a user in a first mode of operation.
FIG. 73 is a side view of the hair dryer of FIG. 67 held by the user in a second mode of operation.
Figure 74:
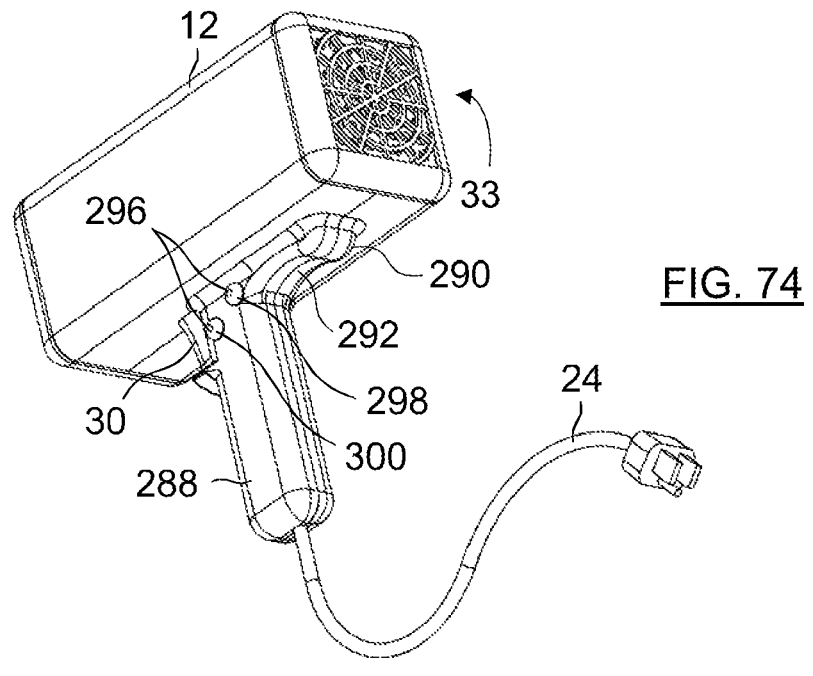
FIG. 74 is a front perspective view of the hair dryer of FIG. 67.
Figure 75:
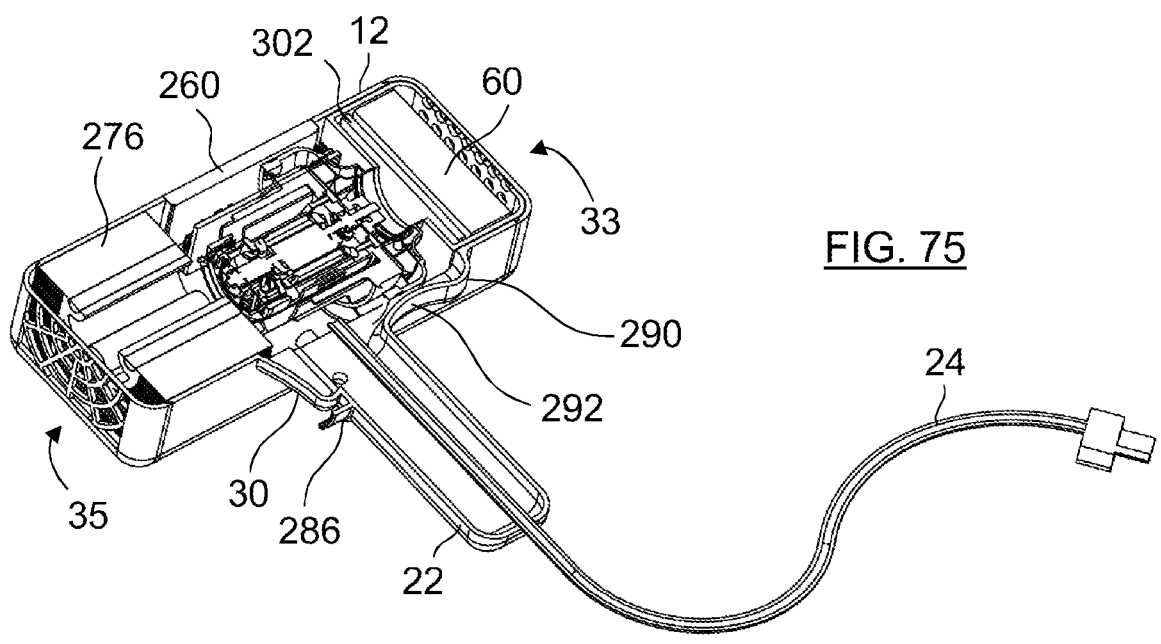
FIG. 75 is a cross sectional view of the hair dryer of FIG. 67.

As in the illustrated example of FIGS. 72 to 77, a hair dryer 10 may include a trigger guard projection 286 adjacent a trigger 30 of the hair dryer 10 (see for example FIG. 75). The trigger guard projection 286 may extend out from a main body 288 of the handle 22 adjacent the trigger 30 to inhibit the trigger 30 from being accidentally depressed or otherwise actuated by the hand of the user, particularly when the user is holding the handle 22 with the trigger 30 directed towards the wrist of the user (FIG. 72).

As in the illustrated example of FIGS. 72 to 77, the trigger 30 may be positioned at an upper end of the handle 22 and the trigger guard projection 286 may be positioned below the trigger 30. Accordingly, the user's hand may rest against an underside surface or seat provided on the trigger guard projection and/or may rest on an extended end of the trigger guard projection without actuating the trigger 30.

The hair dryer 10 may include an upper hand receiving projection 290 at an upper end of the handle 22 providing a downwardly directed concave surface 292 to receive a hand of the user. A hand receiving projection 290 with a concave surface 292 may improve the comfort of the user by providing a surface against which an upper portion of the user's hand may rest, rather than against the main body 12 of the hair dryer 10 directly.

One or more handle projections may also be a tang to facilitate joining the handle and the main body 12. For example, the upper hand receiving projection 290 may be a tang to facilitate joining the handle 22 and the main body 12.

Temperature Burst

In accordance with this aspect, a hair dryer 10 is operable to change the temperature generated by the hair dryer 10 for a short period of time (e.g., less than 1 second, or less than 2 seconds, or less than 5 seconds, or less than 10 seconds). For example, the hair dryer 10 may be operable to generate a short burst of heat to be directed at hair or a short burst of cool air. This aspect may be used by itself or in combination with one or more of the other aspects set out herein.

A short burst of heat or a short burst of cool air may be used to style hair. For example, a short burst of heat may be provided to apply sufficient heat to set a curl of hair.

A burst of heat may be provided via a burst of heated air. The hair dryer 10 may be operable to generate a short burst of air heated to more than, e.g., 60° C., more than 80° C., more than 100° C., or more than 120° C. For example, the hair dryer 10 may increase the amount of heat generated by a heating element 70 for a short period of time to heat the air flow by increasing the power provided to the heating element and/or adjusting the air flow being heated by the heating element. For example, the hair dryer may constrict the air flow path to decrease the volume of air passing through the air flow path per unit time and accordingly increase the temperature of the air as it passes though.

Alternately, or in addition, a burst of heat may be provided via a burst of infrared radiation. The hair dryer 10 may be operable to generate a short burst of infrared radiation to heat the hair to more than, e.g., 60° C., more than 80° C., or more than 100° C. For example, the hair dryer 10 may block air flow over an infrared heating element 92 to cause the infrared heating element 92 to increase in temperature and generate more infrared radiation that can be directed out from the hair dryer 10 to heat a targeted surface. Alternately, or in addition, the amount of power provided to an infrared heating element may be increased.

Alternatively, the hair dryer 10 may be operable to generate a short burst of cool air to facilitate rapidly cooling hair to reduce heat damage. A burst of cool air may reduce the amount of time the hair is at an elevated temperature, and may therefore reduce heat damage. For example, the hair dryer 10 may be operable to turn off or reduce the heat generated by a heating element 70 for a short period of time, or increase the volume of air flowing through the air flow path per unit time to decrease the temperature of the air flow.

Optionally, a short burst of cool air may be provided immediately following a short burst of heat. One or more of a burst of heat or a burst of cool air may also be provided independently.

A burst may be requested by the user via a variety of inputs. For example, an audible commands may be received by a microphone communicatively coupled to the hair dryer. In another example, a button on a touchscreen mounted to the hair dryer, or a hot or cool air burst button provided on the hair dryer or a touchscreen provided on a user's mobile device may be used to request a burst of heat or cold air.

In some examples, a manual toggle such as a button is provided on the hair dryer 10. A manual toggle may be readily accessible to a user while the user is operating the hair dryer 10. As in the illustrated example of FIG. 74 one or more burst buttons 296 may be provided on the hair dryer 10. A first burst button 298 may provide a burst of heat and/or a burst of heat followed immediately by a burst of cool air. A second button 300 may provide a burst of cool air independently.

It will be appreciated that, as discussed herein, any method of adjusting the air flow through the hair dryer as discussed herein may be used to provide a burst of heat or a burst of cool air.

Cartridge Heaters

In accordance with this aspect, the hair dryer 10 includes one or more waterproof cartridge heaters 280. This aspect may be used by itself or in combination with one or more of the other aspects set out herein. Further, the cartridge heater disclosed herein may be used in a hair dryer or any other appliance which may use a cartridge heater or in any other application wherein cartridge heaters are used.

The design of heating elements in hair dryers and portable heaters typically employ Nichrome or other high temperature wires which are typically wound into a spiral over which air is passed by means of a fan or air mover. In these designs, the wire is exposed to the ambient. Such resistively heatable elements (wires) would efficiently conduct electricity through water which might come into contact with the wire. Therefore, the use of convention heating elements that use a bare wire is unsafe in situations wherein the resistively heatable element may come into contact with water. An advantage of this aspect is that the heating element may be waterproof and may therefore be located in the air flow path through which air having entrained water may flow. Accordingly, the heating element may be in the air flow path drawn into the hair dryer during a suction mode of operation.

Figures 78, 79:
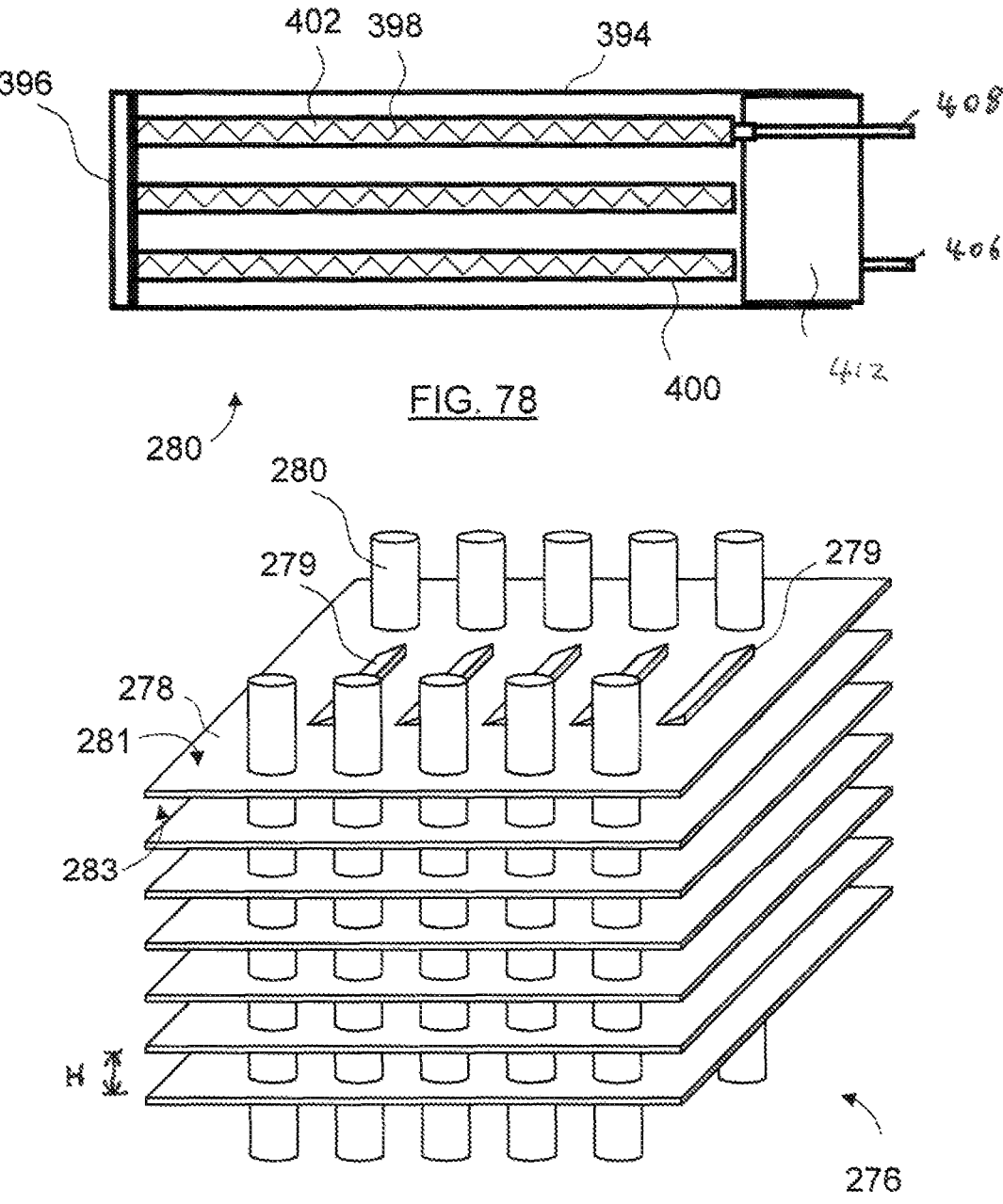
FIG. 78 is a cross sectional view of a cartridge heater.
FIG. 79 is a perspective view of a heat sink with louvres.

As exemplified in FIGS. 78 and 88, a cartridge heater 280 comprises one or more high resistivity wires 398 positioned internal of a water resistant or waterproof outer shell 394. Each cartridge heater 280 has power connections (e.g., wires) 406, 408 extending outwardly from one end thereof. As exemplified, power connections 406, 408 extend through an electrically insulated cap 410 and 412 to the electrically insulated power pins 414 and 416 which create an electrical circuit with the terminal ends of a resistively heatable element 398.

The high resistivity wire 398 may be made of a material resistant to oxidation corrosion at elevated temperatures, e.g., Nichrome or nickel.

The high resistivity wires 398 are electrically insulated from the outer shell 394 by being positioned internal of an electrical insulating material (e.g., a tube 400 made of an insulating material). Alternately, or in addition, an electrical insulating material 418 may be provided internal of the tube 400 or between tube 400 and outer shell 394. For example, a physically thin, e.g., 0.001 to 0.040", layer of electrical insulation 418 such as mica or woven or non-woven glass fiber wrap may be provided to separate the resistively heatable element 398 from the heating element tube 400. The tube 400 and/or insulating material 418 are thermally conducting materials.

Outer shell 394 may be made of a corrosion resistant metal, e.g., aluminum, anodized aluminum, stainless steel, nickel, copper, zinc, thermally conductive plastic which may optionally be metal filled or other thermally conductive metals. In some embodiments, the shell 394 is an aluminum shell made as a single part by impact extrusion.

Outer shell 394 may have a wall thickness which is 0.001 to 0.040" thick, 0.002 to 0.020" thick or 0.004 to 0.010" thick.

The outer shell 394 may be a single hollow tube that is integrally formed with one open end through which tube(s) 400 and wire(s) 398 are insertable. Alternately, as exemplified in FIG. 78, the outer shell 394 may be cylindrical and may have a distal end cap 396. The end cap 396 may be welded, swaged or chemically adhered to the outer shell 394.

The terminal end of the heating element may incorporate a cold region 420. In the cold region 420, a spirally wound resistance heating element 398 may terminate and a single wire may return to the end where the electrically insulated electrical connection 416 provides power.

As exemplified in FIGS. 96 and 97, the wiring in the cartridge heater may be configured as a U shape or a series of U shapes to minimize connections. Therefore, the electrical connections (the wires 406, 408) may extend out only the two terminal ends (power pins 414, 416) that are distal to the rounded "U" portion. Accordingly, a cold zone 420 may be created at the rounded "U" portion (i.e., the rounded "U" portion may not have any resistively heated wire therein or thermally connected thereto). Accordingly, the rounded "U" portion may be positioned proximate an operating component of the hair dryer without concern that the component may be overheated during use.

As exemplified in FIG. 96, the terminal end of the heating element incorporates a cold region 420 and a cap 396. In the cold region 420 the spirally wound resistance heating element 398*a* extends away from power connection 406 and wire 398*b* extends from the cold end 420 to the electrical connection 408 to provide power. An insulating layer is optionally provided between wires 398*a* and 398*b*.

In the embodiment of FIG. 97, the resistive wire has larger diameter windings so as to produce more heat.

As exemplified in FIG. 78, the high resistivity wire 398 may be positioned in a tube 400 made of an electrical insulating material (e.g., a ceramic tube or a tube made of PCV, Kapton, or a similar insulator) within the outer shell 394. A filler 402 may be packed into the tube 400 around the wire 398. For example, the filler 402 may be a thermally conductive material which thermally connects the high resistivity wire 398 to tube 400. For example, magnesium oxide filler may be provided in a ceramic tube 400 using, e.g., vibration to increase the amount of magnesium oxide packed therein.

If tubes 400 are spaced inwardly from the inner wall of outer shell 394, then a thermally conductive material that extends between the outer surface of tube(s) 400 and the inner surface of outer shell 394 may be provided to thermally connect the tube(s) 400 to outer shell 395.

Alternately an electrical insulating material 418 may be provided between wires 398 and outer shell 394, whether or not a tube 400 is provided.

The cartridge heater 280 may be made using welding and/or chemical bonding to secure at least one component to at least one other component, and may be made for low temperature operations (e.g., less than 250° C. or less than 200° C.). For example, the cap 396 may be welded to the outer shell 394. A seal 403 may be formed opposite the end cap 396.

The cartridge heater 280 may be connected to a power source via power connections (e.g., wires) 406, 408 extending through seal 403, which may be an electrically insulated cap 410 and 412. Wires 404 may be connected to a power source of the hair dryer 10, such as an on board power source or current controller. A current controller may be sealed to be watertight or leak resistant.

The outer shell 394 may be any shape, e.g., a circular cylinder or an elliptical cylinder.

Heat Sink

In accordance with this aspect, the hair dryer 10 includes a heat sink received in the air flow path to transfer heat to an air flow. This aspect may be used by itself or in combination with one or more of the other aspects set out herein. Further, the heat sink and the structure for mounting a heating element therein, such as a cartridge heater may be used in a hair dryer or any other appliance which may use a finned heating element or in any other application wherein finned heating elements are used.

The heat sink may transfer heat to an air flow from one or more components of the hair dryer 10. The heat sink may therefore also be referred to as a heat transfer member or heat exchange finned member. For example, the heat sink may be conductively coupled to a motor and/or a heating element 70 (e.g., one or more cartridge heaters 280). The heat sink may be sized and shaped to heat air flowing over the heat sink to between, e.g., 30° C. and 80° C. or to between 40° C. and 75° C. or other temperature range set out herein (e.g., with an air flow rate between, e.g., 15 cfm to 50 cfm).

In accordance with this aspect, a heating element 70 may include an internal electrically resistive element (e.g., wires 398), a layer of electrical insulation 418 separating the resistive element from the outer shell 394, and at least one cooling fin 278, that is optionally mechanically affixed thereto. Optionally, as exemplified herein, a plurality of fins 278 are mechanically affixed to a heating element (e.g., cartridge heater 280) or plurality of heating elements 280. Optionally, the fins 278 are spaced apart to maximize the heat transfer while minimize the volumetric flow restriction to the air being passed through the fins 78. In the following discussion, reference is made to cartridge heater 280 but it may apply to any heating element 70.

Standard wire heating elements may operate at very high temperatures and rely on the air flow to prevent them from overheating and melting. Accordingly, interruptions in air flow can cause damage to the resistive element or unwanted thermally induced oxidation which can shorten the life of the heating element.

In accordance with this aspect, a heater, which may be a cartridge heater 280, may be mechanically affixed to one or more cooling fins 278. The cooling fins 278 may be used to efficiently conduct heat from a Nichrome wire or other resistive heating member to the cooling fins 278. The use of cooling fins 278 may enable the heating element 70 to operate at a relatively low temperature, which extends its operating life and minimizes heat lost as infrared radiation.

Optionally, the heating element 280 may have an outer shell 394 that is rounded or oval (see for example FIG. 93) or pear shaped (see for example FIGS. 94 and 95) to provide a large thermal contact surface between the heating element and the cooling fin 278. Such shapes, in particular a pear shape, may reduce turbulence or eddy currents downstream of the heating element, thereby improving air flow through the flow path.

Figures 93, 94, 95:
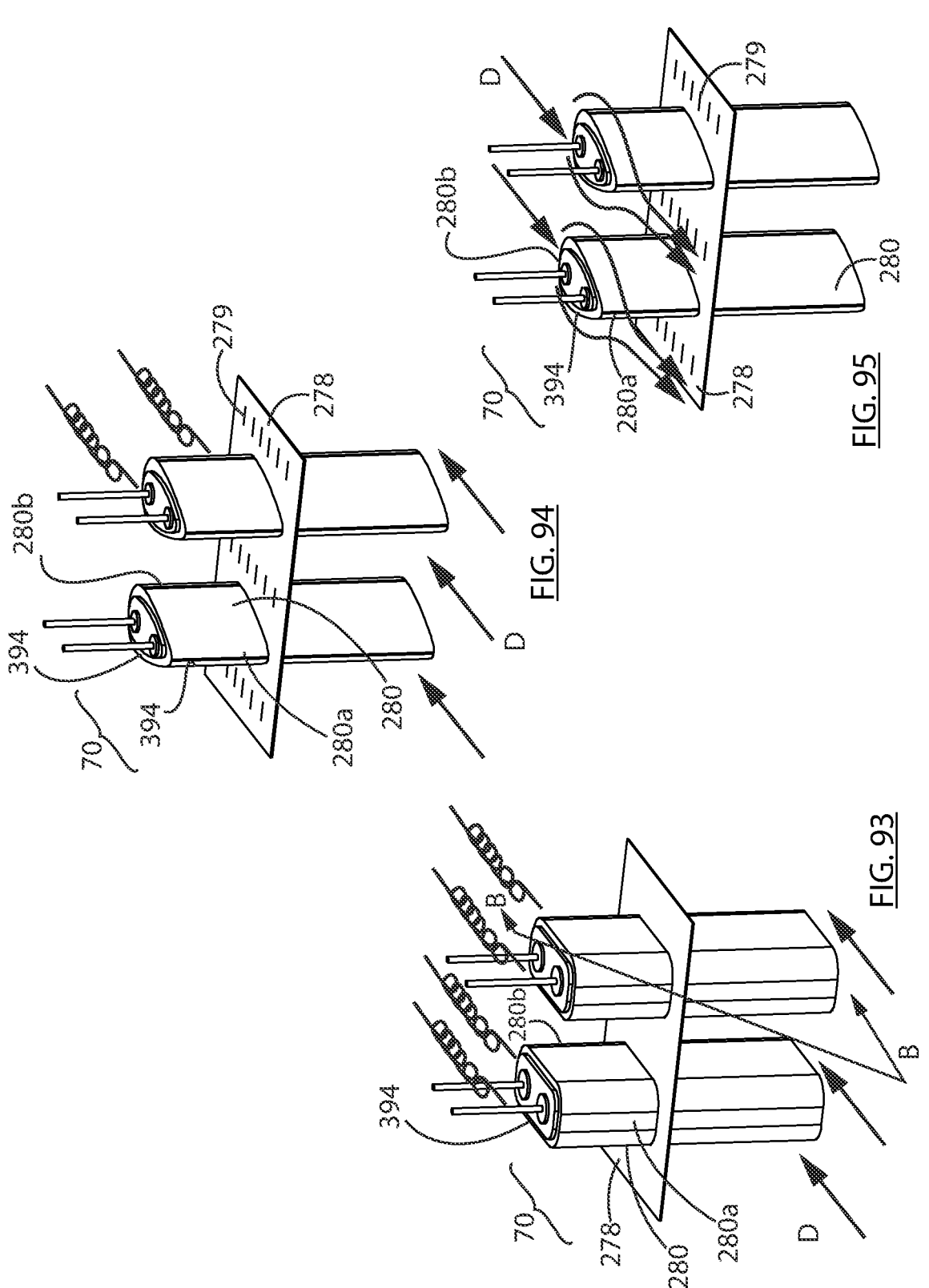
FIG. 93 is a top perspective view of a heating element incorporating an elongate oval cartridge heater.
FIG. 94 is a top perspective view of a heating element incorporating a pear-shaped cartridge heater with airflow impinging the narrow end.
FIG. 95 is a top perspective view of a heating element incorporating a pear-shaped cartridge heater with airflow impinging the wide end.

As exemplified in FIG. 93 the cartridge heater 280 is elongated in the direction of flow D with two radiused ends 280*a* and 280*b*. This arrangement enables a larger amount of resistively heatable element (e.g., wire 278) to be provided in the cartridge heater 280 and also creates a larger surface area in contact with the fin 278 for a single heating element while reducing the cross-sectional area perpendicular to the airflow direction D thereby reducing the associated airflow restriction.

As exemplified in FIG. 94 the cartridge heater 280 is elongated in the direction of flow D with two different radiused ends 280*a* and 280*b*. In this embodiment, the upstream radiused end 280*a* is narrower than the downstream radiused end 280*b*. This embodiment reduces the cross-sectional area of the upstream radiused end 280*a* perpendicular to the airflow direction D thereby reducing the associated airflow restriction. The wider downstream radiused end 280*b* induces turbulence to assist heat transfer but increases the restriction to airflow.

FIG. 95 exemplifies an embodiment wherein the wider radiused end 280*b* is the upstream end and the narrower radiused end 280*a* is the downstream end. This embodiment reduces turbulence which somewhat reduces heat transfer but also reduces the restriction to airflow.

It will be appreciated that if the ends 280*a*, 280*b* have different widths transverse to the direction of flow D, then the ends may have differing amounts of wires 398. For example, in the embodiment of FIG. 95, the upstream end 280*b* is wider and may have more resistively heatable element 398 so as to enhance the heat that is produced and therefore the amount of heat that may be transferred to the air flow.

An advantage of this aspect is that, due to the cooler operating temperatures, the cartridge heater 280 may be sealed with, e.g., silicone, to waterproof the cartridge heater.

A further advantage of this aspect is that fins 278 may provide a straightened airflow which minimizes turbulence and the resulting mechanical hair damage while creating a minimal restriction on the volumetric airflow and allowing the use of a less powerful motor and fan to achieve the desired airflow.

Figures 12, 13:
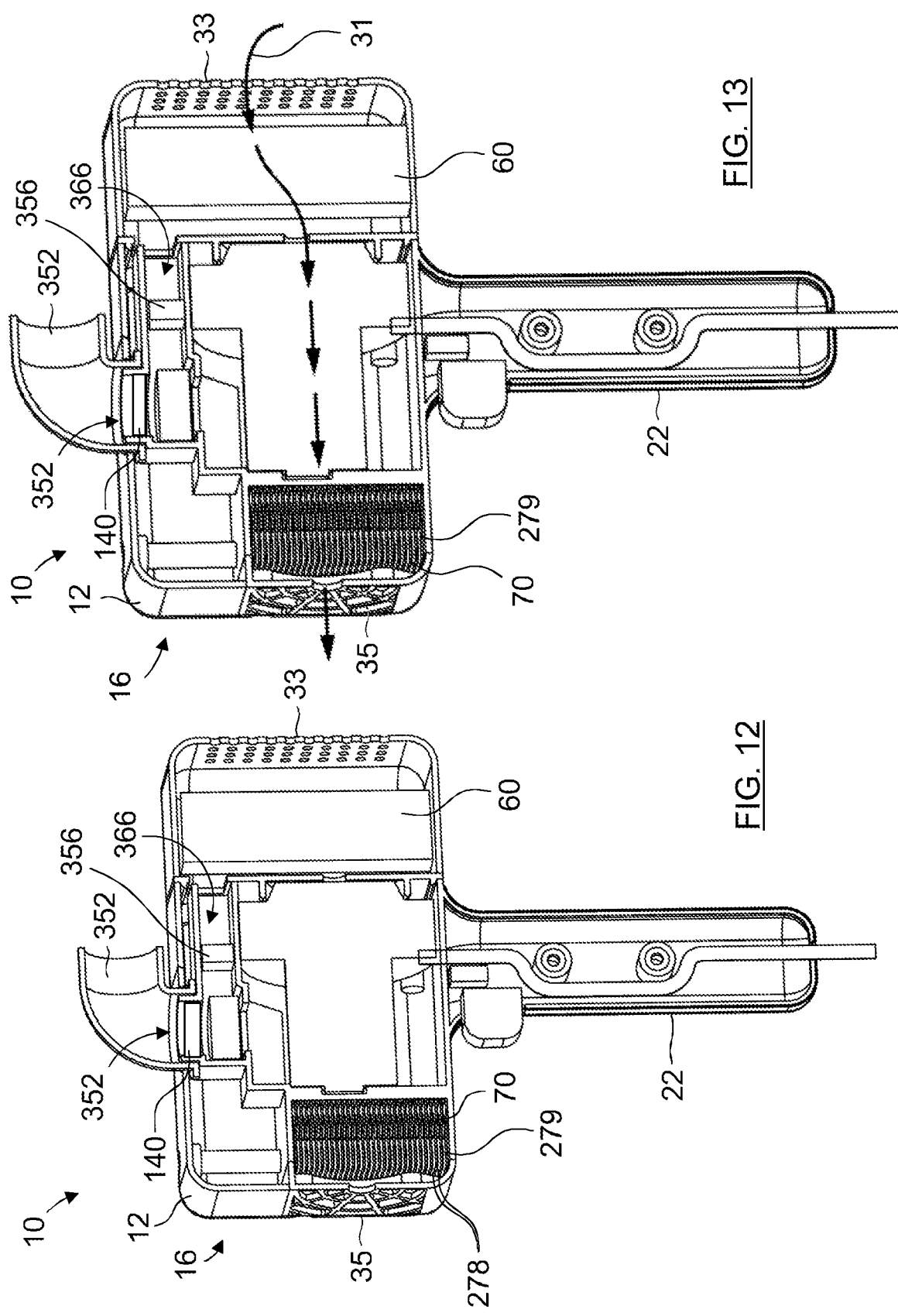
FIG. 12 is a cross sectional view of the hair dryer of FIG. 11.
FIG. 13 is a cross sectional view of the hair dryer of FIG. 11 showing a first air flow route.
Figures 76, 77:
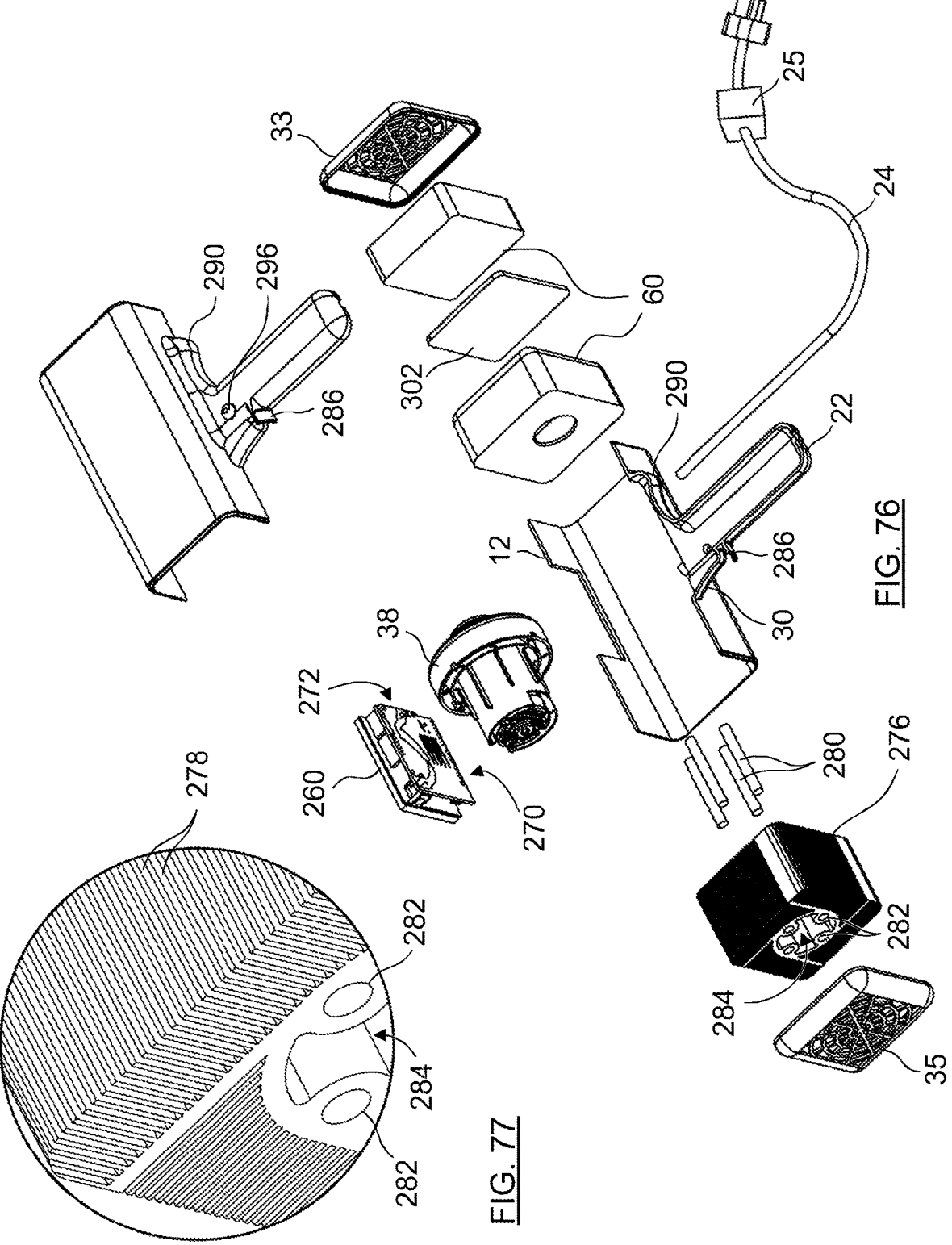
FIG. 76 is an exploded view of the hair dryer of FIG. 67.
FIG. 77 is an expanded view of a portion of a heat sink of the hair dryer of FIG. 76.

As in the illustrated example of FIGS. 75 to 77, the heat sink 276 may be a finned heat sink with a plurality of fins 278 (FIG. 77). Fins 278 may at least partially straighten air flow exiting the hair dryer 10. For example, the fins 278 of the example of FIG. 12 are parallel to one another to straighten or assist in straightening the air flow adjacent the outlet 35. The fins 278 are also perpendicular to the plane of the outlet 35 to direct the air flow perpendicular to the outlet 35.

An advantage of a finned heat sink is that the heat sink may have a low thermal mass. The low thermal mass enables the heat sink to rapidly heat up when, e.g., a cartridge heater 280 is energized. Similarly, when cartridge heater 280 is de-energized, the heat sink will rapidly cool down. To this end, fins 278 may be thin, e.g., 0.01 to 0.05, 0.01 to 0.03 or about 0.015 inches thick.

Optionally, the hair dryer 10 is operable to provide heat to the heat sink for a period of time (e.g., 0.5, 1, 2 or 5 seconds) prior to generating air flow over the heat sink and/or increasing the air flow volume per unit time slowly. This may provide the heat sink time to warm up such that the user immediately feels hot air exiting the hair dryer when the fan and motor assembly 38 are actuated.

A heat sink 276 may be an immersive heat sink that can be immersed in water without electrical shorting. For example, the heat sink 276 may be used with cartridge heaters 280, and the cartridge heaters 280 may be waterproof.

As in the illustrated example of FIGS. 75 and 76, the heat sink 276 may include one or more cartridge holders 282. Each cartridge holder 282 may be configured to hold a cartridge heater 280, such as a 200 W-450 W cartridge heater. For example, four 250 W cartridge heaters 280, each operating at between 500 W and 1500 W, may be received in four cartridge holders 282 of the heat sink 276. For example, the heat sink may be a member having a plurality of fins and an opening into which a cartridge heater 280 may be inserted.

Figures 86, 87:
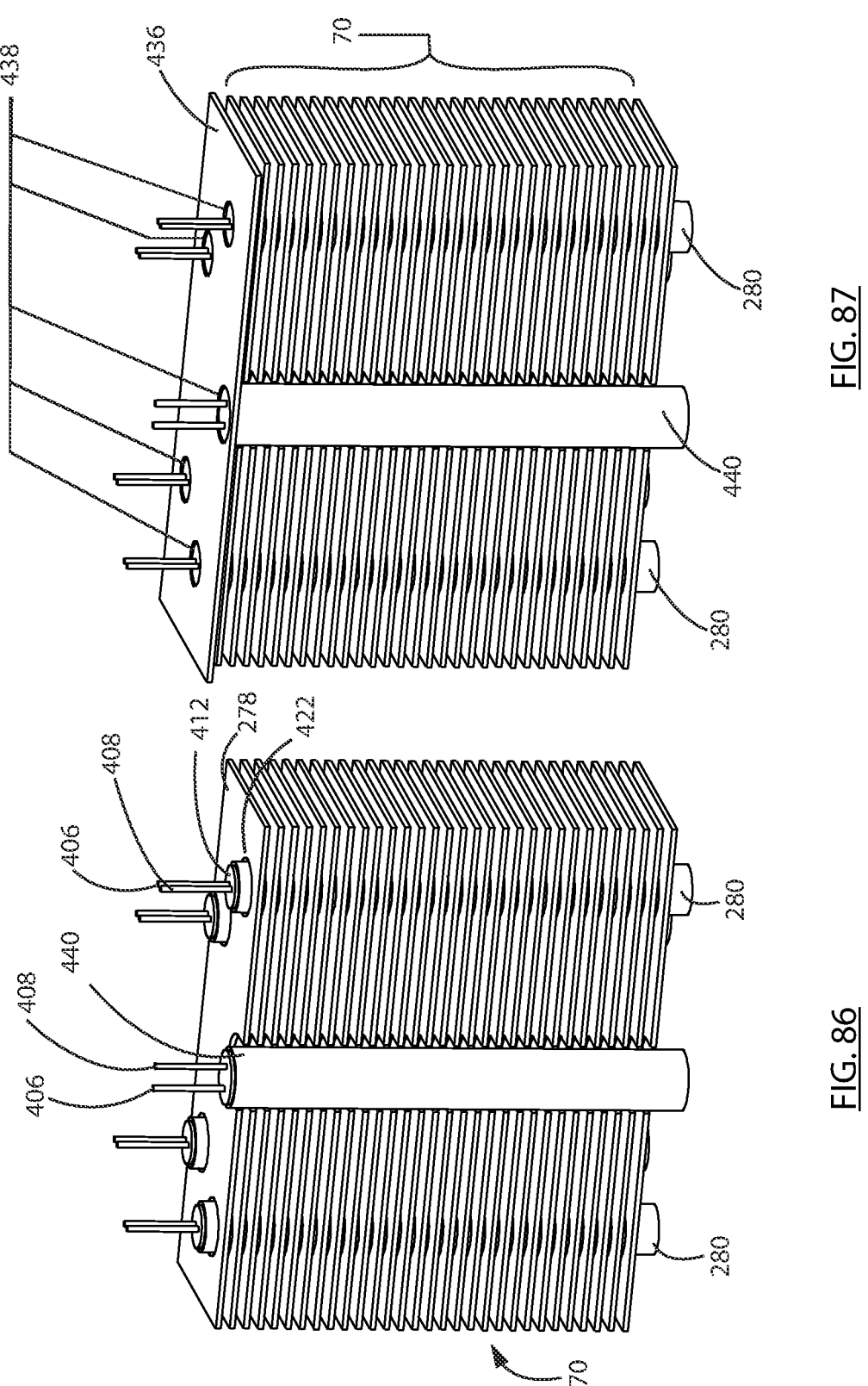
FIG. 86 is a perspective view of the heating element in accordance with another embodiment.
FIG. 87 is a perspective view of the heating element of FIG. 86 when installed into an appliance through a wall.

Alternately, the cooling fins may be directly attached to cartridge heater 280, or other heating member. As exemplified in FIGS. 79, 86 and 87, a plurality of fins 278 may be secured to a plurality of cartridge heaters 280. Accordingly, fins 278 may optionally mechanically join the cartridge heaters 280 and fins 278 together as a self-supporting heating element 70.

Optionally, as exemplified, the plurality of cartridge heaters 280 may be arranged in parallel in a spaced apart relation. The fins may extend transverse thereto and may be arranged generally parallel to each other and spaced apart from each other.

Fin 278 may be made of any heat conducting material and may be made of aluminum, copper, zinc or stainless steel, and is optionally made of aluminum.

Fin 278 may be thin. For example, in the direction of the longitudinal axis of cartridge heater 280 (which is vertical as exemplified in FIG. 79) fin 278 may have a wall thickness of, 0.003 to 0.010", 0.005 to 0.025", or 0.005 to 0.016".

Optionally, as discussed with respect to FIGS. 90 and 91, fins 278 may be mounted to a cartridge heater 280 by openings (e.g., collars 422) formed in fins 278 for reception of cartridge heater 280 therein. In accordance with this option, the cartridge heater 280 may be mechanically forced through the collars 422 such that the collar 422 is further mechanically formed and/or stretched around the cartridge heater 280 thereby creating a physical mechanical joint which is strong and which creates an elongated interface section between the cartridge heater 280 and the fin 278, which increases the mechanical strength of the joint and reduces thermal resistance between the cartridge heater 280 and the fin 278, thereby increasing the heat transfer between the cartridge heater 280 and the fin 278.

The geometry and size of the collar 422 that is formed in a fin 287 is selected relative to the diameter or shape of the cartridge heater 280 such that when the cartridge heater 280 is inserted into collar 422, the collar 422 is deformed from its initially formed shape to its installed shape (and may therefore be referred to as a deformable portion) so as to provide a good metal-to-metal fit around each cartridge heater 280, thereby enhancing the heat transfer from the cartridge heater 280 to the fins 278 through the fin collars 422.

The initially formed fin collar 422 may also have a height that is selected to provide a mechanical stop between the fins 278 thereby assisting in maintaining controlled fin spacing between adjacent fins when the heating members 280 are inserted into the collars 422. For example, referring to FIG. 79, the height of the collar 422 in the vertical direction results in a minimum fin spacing of H. It will be appreciated that the spacing H may optionally vary between the central area of the heating element 280 and the outside to create a more uniform flow based upon the pressure field characteristics of the air moving source which causes the airflow through the heating element 280.

FIG. 90 exemplifies a sectional view of the fin 278 prior to the insertion of the cartridge heater 280 into the collar 422. The collar 422 may initially be formed by piercing the metal of fin 278 with, e.g., a punch and die to create a straight section 424 and a radiused section 426. The length of the straight section 424 may be 0.001" to 0.150", 0.005 to 0.090", or 0.030" to 0.075".

Optionally, the collar (one or both of the radiused section and the straight section) may have a thickness in a direction transverse to the section that is from 2 to 10 times the thickness of the planar portion of the fin from which the collar 422 extends.

Straight section 424 may narrow from the end nearest the fin 278 (root end 424*b*) to the end of the straight section furthest from fin 278 (terminal end 424*a*). The diameter of the terminal end 424*a* of the straight section 424 may be 0.001 to 0.060" smaller than the root end 424*b* of the straight section 424. The radial difference in these diameters is shown as 427 in FIG. 90. An angle 428 is formed between the plane of the fin 278 and the straight section 424.

The diameter of the root end 424*b* may be the same diameter as the outer diameter of the cartridge heater 280 or up to 0.005" larger to enable easy installation. The force of inserting the cartridge heater 280 into the collar 422 causes a drawing deformation of the region straight section 424 and may cause a slight elongation of straight section 424 to become straight section 424' in FIG. 91 and will tend to slightly change the radius of radiused section 426 to become radiused section 426' shown in FIG. 91.

The straight section 424 creates a strong thermal and mechanical joint with the outside of the cartridge heater 280 and the radiused section 426 will compensate for minor thermal expansion and mechanical vibration and impact to maintain the strength and integrity of the thermal and mechanical joint in straight section 424.

In the final thermal and mechanical joint shown FIG. 91, the straight section 424 is essentially parallel to the walls of the cartridge heater 280. If the outer walls of the cartridge heater 280 are not parallel, the joint will still follow the angle formed by the outside wall of the cartridge heater 280.

In some examples, the surface temperature of the heat sink 267 is kept below 250° C. or below 200° C. or below 140° C. In some examples, the hair dryer 10 includes a thermal switch to shut off or reduce the heat generated by a heating element if the heating element (e.g., the heat sink 267) reaches 160° C., and optionally the hair dryer includes a fuse to protect from a short circuit. A thermal fuse may be set for, e.g., 175° C. Keeping the surface temperature below a predetermined maximum may assist in preserving the waterproofing of one or more components, such as the waterproofing of the cartridge heaters 280. For example, a silicone seal may degrade at temperatures above 200° C. or at temperatures above 260° C.

In some examples, the surface temperature of the heat sink 276 is kept at and/or below about, e.g., 175° C. For example, a heat capacity (i.e., thermal mass) of the heat sink 276, a volume of air per unit time flowing over the heat sink 276 (e.g., an air flow volume between 15 cfm and 50 cfm), and the amount of heat introduced to the heat sink by components of the hair dryer 10 (e.g., by the cartridge heaters 280) may be balanced to keep the heat sink 276 surface temperature at or below a desired temperature.

In some examples, the temperature difference between the heat sink 276 and the air flow thereover may be between 10° C. and 40° C., or between 15° C. and 30° C.

As in the illustrated example of FIGS. 75 and 76, the heating elements 70 may be infrared heating elements 92 included in cartridge heaters 280. The heat sink 276 may have an opening (e.g., open centre 284) for an infrared heating element 92, whereby infrared radiation (e.g., heat) radiates out from the infrared heating element 92 through the opening of the heat sink 276.

The heating element 70 may be mounted to a wall 436 of an appliance, such as a hair dryer. The wall 436 may be made of a thermal insulating material 57 (see for example FIG. 120) so as to inhibit heat transfer from the heating element 70 to another component of the appliance.

Optionally, the wall 436 may be a header. The cartridge heater 280 may optionally be press fitted through openings 438 in header 436. Wall 436 serves to physically separate the airflow from the region in which wires 406, 408 are electrically connected to a source of power in the appliance.

It will be appreciated that, alternately, fins 278 may be provided as a flow straightener in an appliance, such as a hair dryer. Fins 278 may be in contact with any source of heat and need not have a cartridge heater 280 extend therethrough (see for example FIGS. 115 and 116)

Alternately or in addition, one or more infrared heating elements may be positioned adjacent to or extending through fins 278. Fins may have a substantially open flow volume. Therefore, infrared radiation produced by an infrared heating element may be able to pass substantially unimpeded through the open flow volume of fins 278. An advantage of this design is that the fins 278, if made of a material opaque to infrared radiation, such as aluminum, may reduce the dispersion of the infrared radiation to where it is not required and may assist in directing the infrared radiation towards the hair to be dried. For example, one or more of heating elements 280 in FIGS. 86 and 87 may be replaced by an infrared heating element. Alternately, an infrared heating element, such as infrared heating element 440, may be provided at one side, optionally the downstream side, of heating element 70. Accordingly, the fins 278 may optionally incorporate a feature to allow for the mounting of another infra-red heating element 440. The infrared heating element 440 may be used to primarily heat the hair of the user directly rather than heating the air. Accordingly, infra-red heating element may be provided on the downstream side of heating element 440 and face the outlet of the hair dryer.

Heating element(s) 70 may be provided in any convenient form for heating. For example, the heating element 70 may be a cubically shaped assembly positioned adjacent an outlet 56 of a secondary air flow path. Alternatively, or additionally, the heating element 70 may be an annular heating element, e.g., encircling a motor and fan assembly 38 and/or motor 40 (FIGS. 113 to 116). As exemplified in FIGS. 113 and 114, the heating elements may be oriented so as to extend radially with respect to the motor 40. As exemplified in FIGS. 115 and 116, the heating elements may be oriented so as to extend generally axially (generally parallel and spaced radially outwardly from) the motor 40.

The arrangement of the heat sink 278 may determine the compactness of the design and whether the heat sink 278 can be arranged adjacent an element that can be expected emit heat. For example, arranging the heat sink 278 as an annular heating member around the motor 40 may reduce the size of the hair dryer 10 (e.g., the length of the hair dryer 10 from inlet to outlet) and/or promote transfer of heat from the motor to the heat sink 278.

Louvres on Fins

In accordance with this aspect, the fins 278 include at least one louvre or other turbulence localized members. This aspect may be used by itself or in combination with one or more of the other aspects set out herein.

In accordance with this aspect, any portion of a fin 278, such as the edges of the fins 278, may optionally include turbulence localized members such as small indentations, dimples or cuts along their edges or throughout the fins 278 to enhance heat transfer by inducing localized turbulence. For example, as exemplified in FIG. 92, the fins 278 may incorporate louvers 279 to as to induce controlled localized turbulence to enhance the rate of heat transfer between the fins 278 and the air.

A louvre may increase the thermal transfer of heat from the fin 278 to the air flow. A fin 278 may include one or more louvres 279, as in the illustrated example of FIG. 79. The louvres 279 may be formed in the fin, each opening through the fin 278 from a common first side 281 to a common second side 283. Louvres may increase the heat transfer rate by at least 5%, at least 15% or at least 25%. Louvres may provide negligible change in mass to the heat sink while increasing the heat transfer rate.

As exemplified, the louvers 279 are one or more louvre openings formed into the fins 278 wherein the louvre openings are elongated slot-like shapes. The louvre openings may be parallel to each other, but other geometric arrangements are possible. The louvre openings may be spaced apart and may be formed in small groups.

Figure 92:
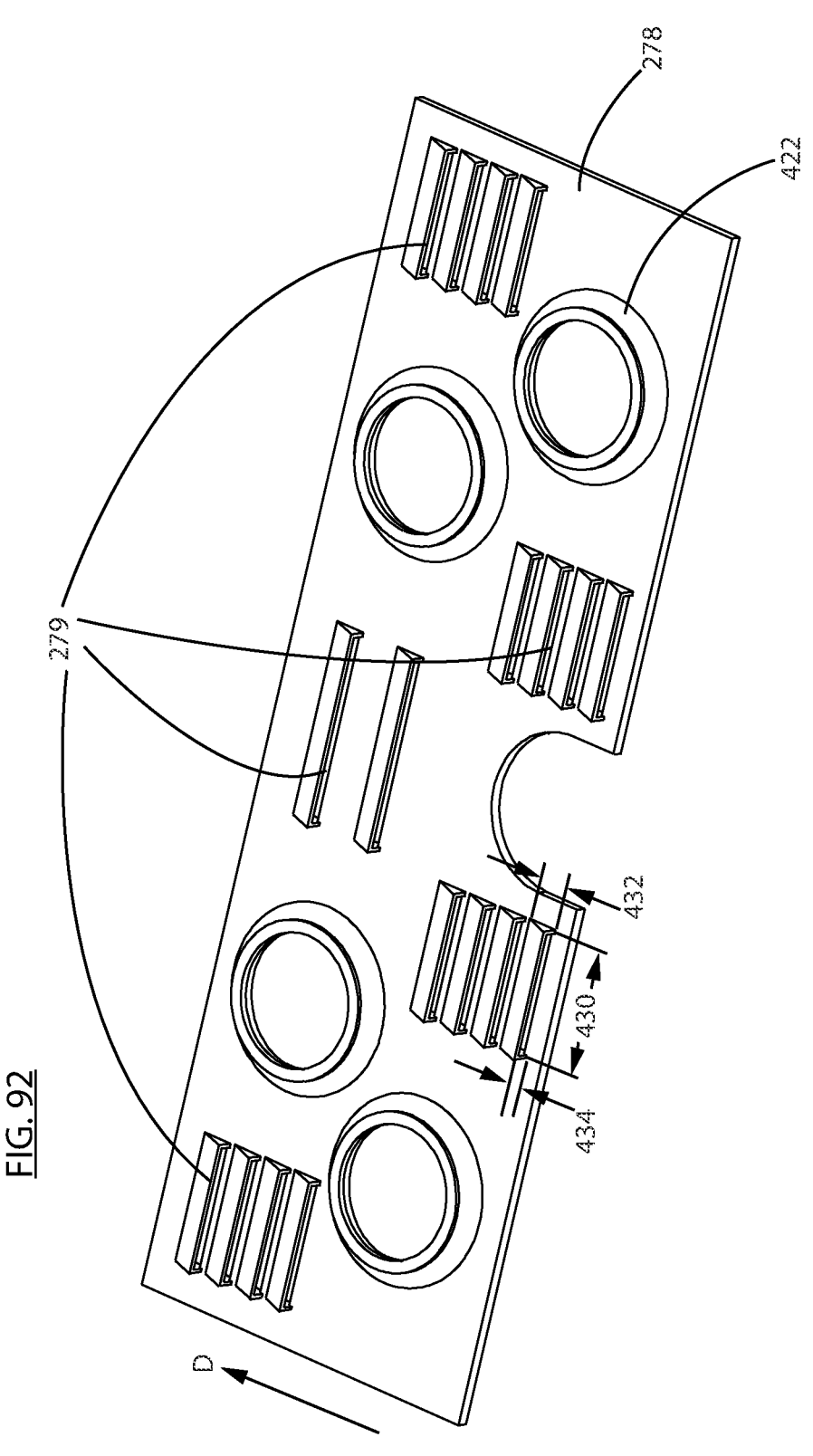
FIG. 92 is a top perspective view of a collared fin shown in FIG. 89 wherein the fin has louvers.

FIG. 92 exemplifies a fin 278 having louvers 279 and collars 422. As exemplified therein, the length 430 of the louvers 279 in a direction transverse to a direction of flow D therethrough may be 0.050" to 2.000", 0.100" to 0.5", or 0.150" to 0.375". The width 432 of the louvers 278 in the direction of flow D therethrough may be 0.020" to 0.5", 0.040" to 0.250", or 0.060" to 0.175". The height 434 to which the louvers 279 may be formed 279 may be 0.002" to 0.5", 0.010" to 0.250", or 0.005" to 0.060".

Filter

In accordance with this aspect, the hair dryer 10 includes at least one filter in the air flow path. This aspect may be used by itself or in combination with one or more of the other aspects set out herein.

An advantage of this aspect is that air flowing through the hair dryer 10 may be filtered. Filtered air may be better for the motor and fan assembly 38 and/or the user. A filter media (e.g., a HEPA filter) may be received in the air flow path to filter air flowing through the air flow path, and may be received upstream of the motor and fan assembly 38 (e.g., at the air inlet 33) or downstream of the motor and fan assembly 38 (e.g., at the air outlet 35).

As in the illustrated example of FIGS. 75 and 76 a filter 302 that is provided in the air flow path 31 may be adjacent the water collection member 60. The filter 302 may be upstream of the water collection member 60 (e.g., to filter fluid prior to the fluid entering at the water collection member 60). Alternatively, or additionally, the filter 302 may be downstream of the water collection member 60 and upstream of the motor and fan assembly 38 (e.g., to filter air prior to passing over the motor 40) or downstream of the motor 40 to filter air prior to exiting the hair dryer.

In some examples, a plurality of filters 302 may be provided in the air flow path 31. For example, a filter 302 may be provided upstream of the water collection member 60 and another filter 302 may be provided downstream of the water collection member 60 but upstream of the motor 40 and another filter 302 may be provided downstream of the motor 40.

Filters 302 may be of different types. For example, a filter upstream of the water collection member 60 may be a course filter to remove course debris from a fluid containing air, such as to remove debris drawn into the hair dryer 10 along with damp air drawn from the user's hair. A filter downstream of the water collection member 60 may be a fine filter to remove fine debris from air, such as a HEPA filter.

Energy Storage Members

In accordance with this aspect, one or more energy storage members (e.g., batteries and/or capacitors) 26 and/or energy storage packs (e.g., battery packs) 28 are provided and, optionally, some of or all of the energy storage members may be located in a handle of the hair dryer 10. This aspect may be used by itself or in combination with one or more of the other aspects set out herein.

The use of energy storage members 26 may enable a cordless hair dryer. The energy storage members 26 may be in an energy storage pack (e.g., a battery pack) 28 wherein the energy storage members 26 and/or the energy storage pack 28 may be removable. For example, the battery pack may be removed through a first end 154 of the handle 22 (which may be a bottom end of a pistol grip handle 22, wherein the handle 22 is secured to the hair dryer body 12 at the opposite top end of the handle 22 as exemplified in FIGS. 80 and 81). Accordingly, the energy storage members 26 may be arranged in a linear or substantially linear pattern to facilitate removal of an energy storage pack 28.

An advantage of using removable energy storage member(s) 26 and/or energy storage pack(s) 28 is that the energy storage member(s) 26 and/or energy storage pack(s) 28 may be removed for recharging. Alternately it may be recharged while mounted in the hair dryer 10. If the energy storage member 26 and/or energy storage pack 28 is removable, then a user may have two or more energy storage members 26 and/or energy storage packs 28. Accordingly, when one energy storage member 26 and/or energy storage pack 28 requires recharging, it may be removed and an alternate energy storage member 26 and/or energy storage pack 28 inserted. Accordingly, generally continuous operation using on-board stored energy may be enabled.

If multiple energy storage members 26 and/or energy storage packs 28 are utilized, then each energy storage member 26 and/or energy storage pack 28 may be the same or different. For example, one energy storage member 26 and/or energy storage pack 28 may have more power available (e.g., more amp hours by having more batteries). Such an energy storage member 26 and/or energy storage pack 28 may be selected for a person having, e.g., longer hair so as to provide a longer run time and/or to style (e.g., curl) the hair of a person so as to enable the use of more heat (e.g., a higher temperature of the air exiting the hair dryer and/or the amount of heat directed at the hair from an infrared heating element) while not reducing the run time and/or extending the run time.

Energy storage members 26 may be a heavier or the heaviest component of hair dryer 10. Accordingly, some or all of the energy storage members 26 may optionally be provided in the handle 22 of the hair dryer 10. An advantage of this design is that a substantial amount of the weight of the hair dryer 10 may be located at or close to the hand of a user when the user is holding the hair dryer. Accordingly, the moment arm between the center of gravity of the hair dryer and the wrist of a user may be reduced thereby improving the ergonomics of the hair dryer.

Another advantage of providing at least some of the energy storage members 26 in the handle is that the hair dryer 10 may have a more compact design without sacrificing energy storage capacity.

Optionally, the energy storage members 26 and/or energy storage packs 28 may be cooled by air flow passing through the energy storage members 26 or across the energy storage pack 28.

Figures 80, 81:
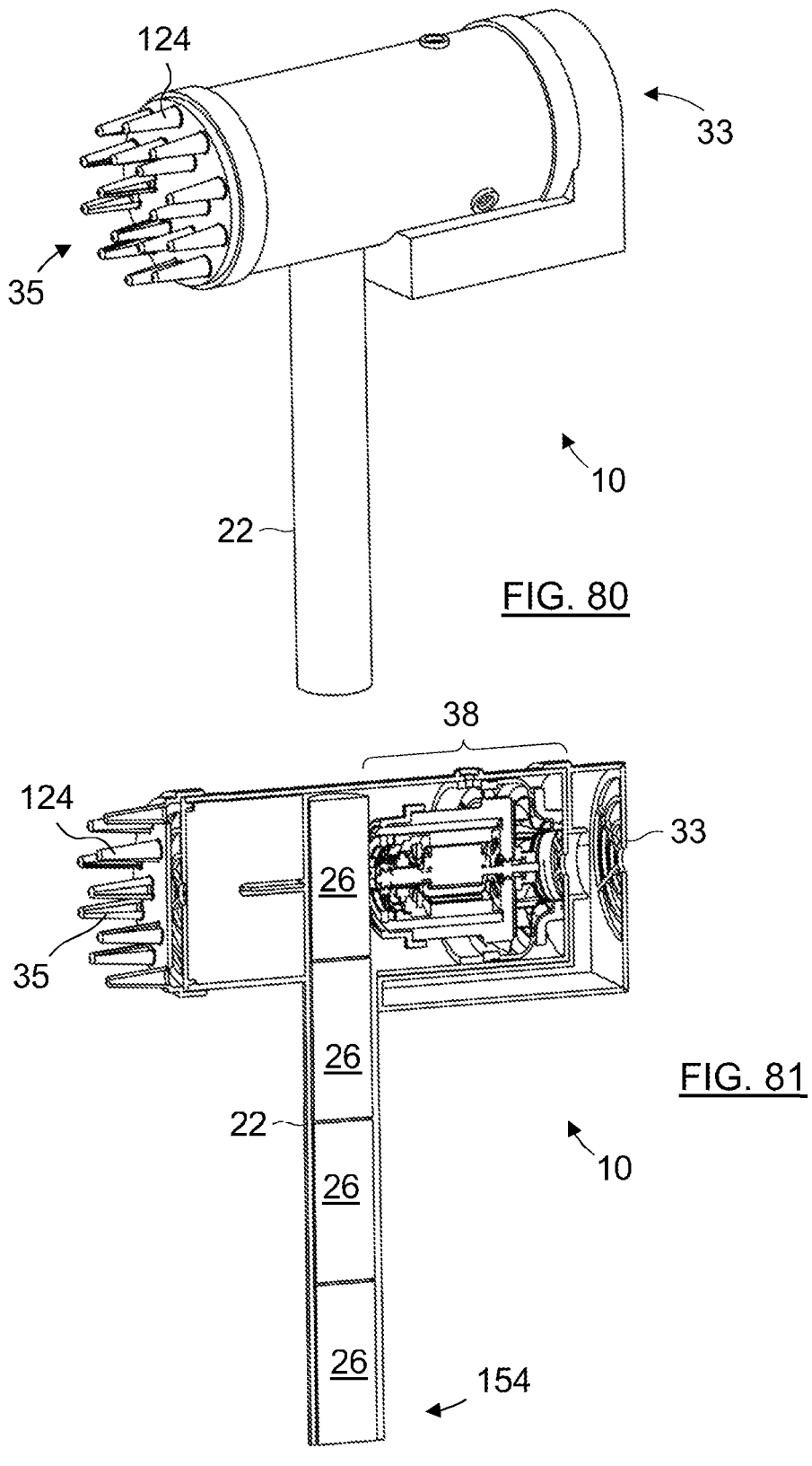
FIG. 80 is a perspective view of a further alternate embodiment of the hair dryer having batteries inserted into the housing.
FIG. 81 is a cross-sectional view of the hair dryer of FIG. 80.
Figures 82, 83:
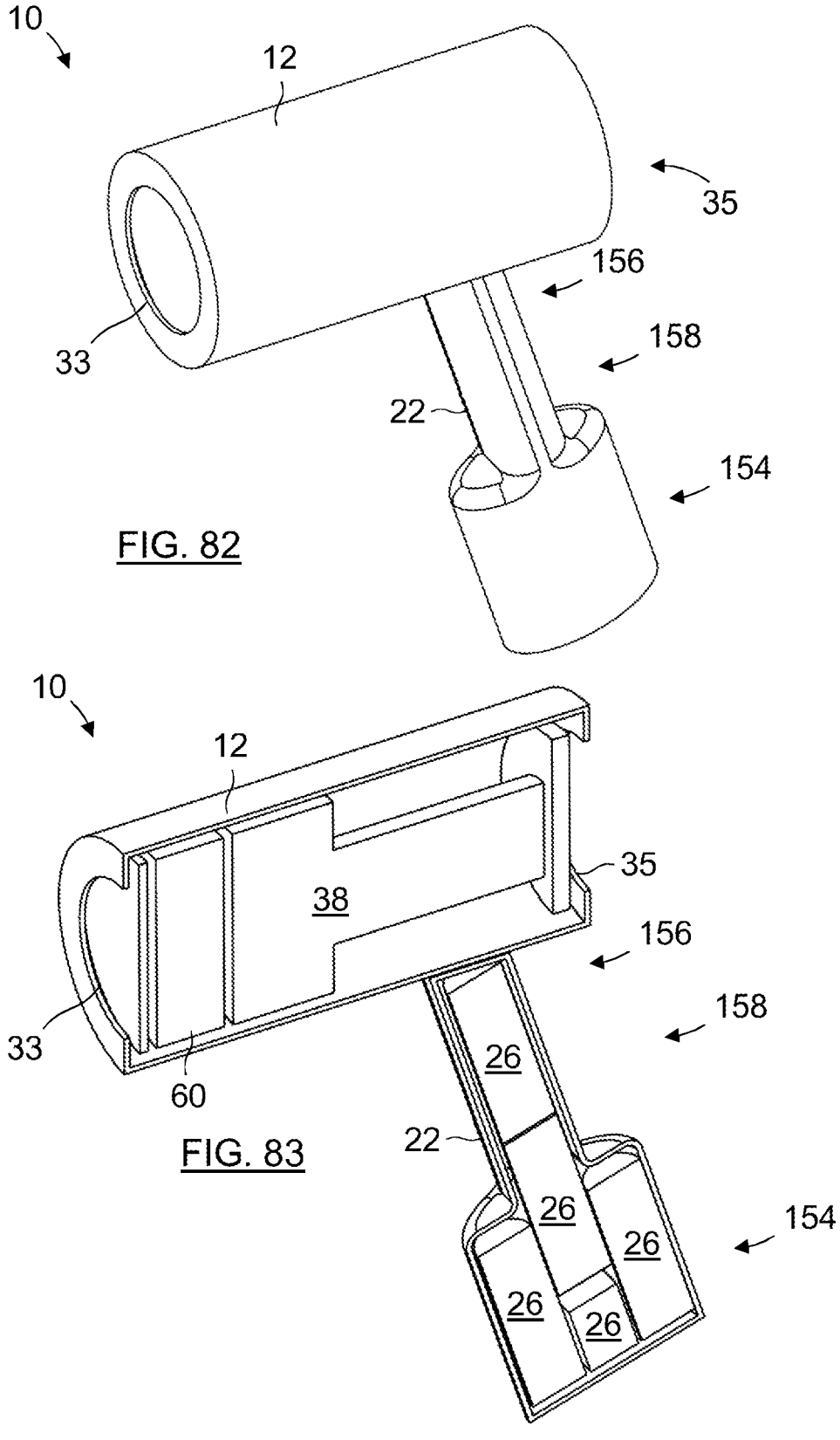
FIG. 82 is a perspective view of a further alternate embodiment of the hair dryer having a handle with extra weight at the base.
FIG. 83 is a perspective cross-sectional view of the hair dryer of FIG. 82.
Figures 84, 85:
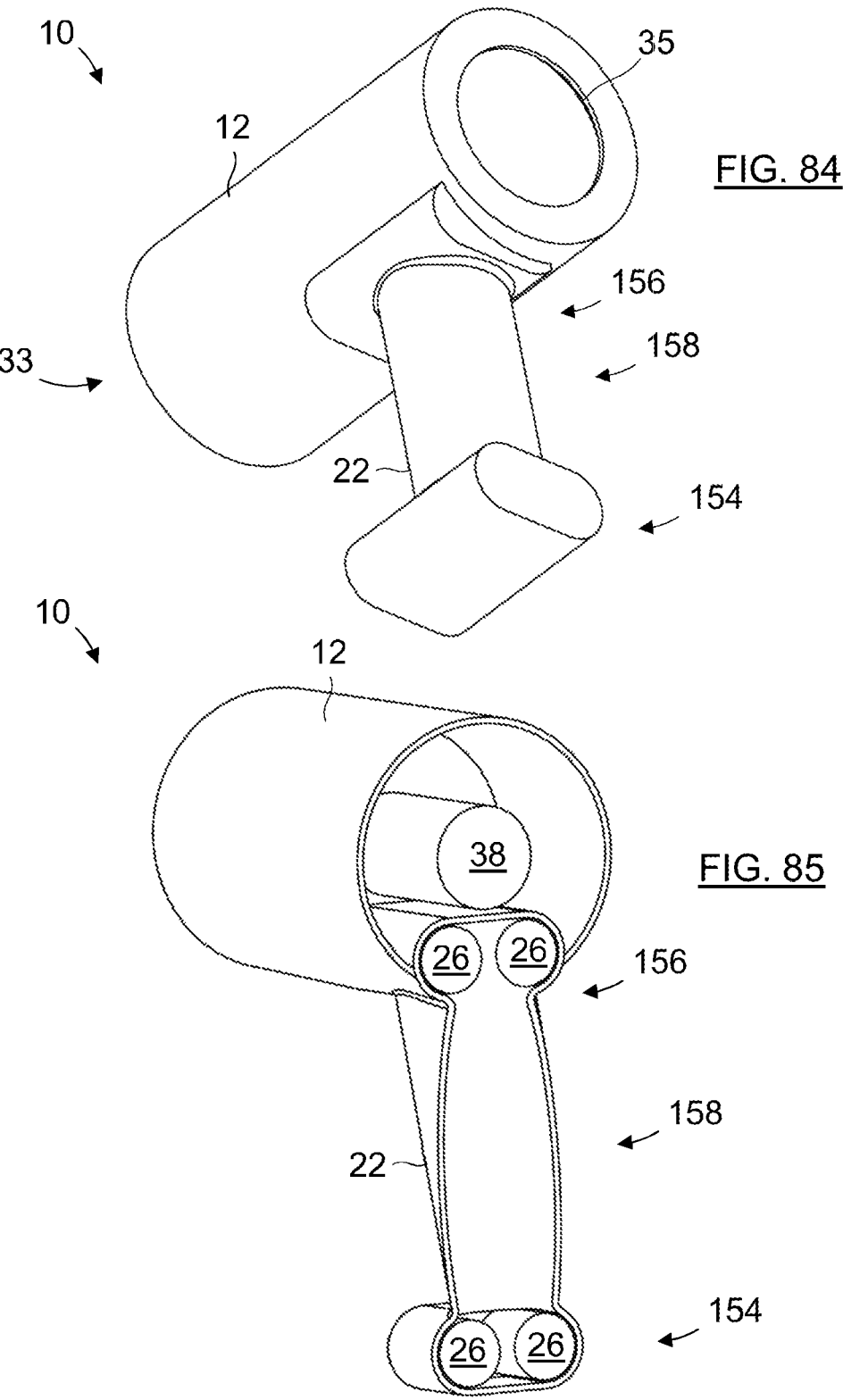
FIG. 84 is a perspective view of a further alternate embodiment of the hair dryer having a handle with extra weight at the base and the top.
FIG. 85 is a perspective cross-sectional view of the hair dryer of FIG. 84.

Optionally, as exemplified in FIGS. 80 and 81, one or more energy storage members 26 and/or energy storage packs 28 may be inserted at least part of the way into the main body 12. In such an embodiment, the air flow path 31 may be arranged to pass around an energy storage member 26 and/or energy storage pack 28 extending into the main body 12, as illustrated. Air passing around the energy storage pack 28 and/or energy storage member 26 may facilitate cooling thereof and/or allow for a more compact or functional design. Alternatively, or additionally, the air flow path 31 may be arranged to pass above and/or to one side of the energy storage member 26 and/or energy storage pack 28.

The one or more energy storage members 26 and/or energy storage packs 28 may be inserted at any or multiple points along the air flow path 31. As exemplified in FIGS. 80 and 81, one or more energy storage members 26 and/or energy storage packs 28 may be inserted at least part of the way into the main body 12 downstream of a motor and fan assembly 38. Alternatively, or additionally, an energy storage member 26 and/or energy storage pack 28 may be inserted upstream of the motor and fan assembly 38. In such an embodiment, some or all of the energy storage members may be cooled by air entering the air flow path prior to the air being heated by the motor 40.

Optionally, one or more energy storage members 26 and/or energy storage packs 28 may be arranged to provide extra weight at the base and/or top of the handle 22.

As exemplified in FIGS. 82 to 85, the handle 22 may include a greater density of energy storage members 26 per unit length at the first end 154 and/or at the second end 156 than in the middle portion 158. It will be appreciated that, as exemplified in FIGS. 84 and 85, the grip portion of the handle 22 may not include any energy storage members 26. Alternately, as exemplified in FIGS. 82 and 83, handle 22 may optionally include one or more energy storage members 26 extending through the handle 22, including through the middle portion 158 as well as at the first end 154 and/or the second end 156.

Where the handle 22 is a pistol grip handle, the first end 154 may be a base or bottom end, and the second end 156 may be a top end. In some examples, the second end 156 is inserted part of the way into the housing body 12.

Arranging extra weight at the base and/or top ends may allow for a more comfortable (narrower) middle portion 158. The middle portion 158 may be a gripping portion of the handle 22, and may have a reduced diameter to more easily receive a hand of a user.

Arranging extra weight at the first end 154 and second end 156 of the handle 22 may reduce the length of the handle 22 without reducing the number and/or capacity of energy storage members 26 and/or energy storage packs 28. In addition, such an embodiment may position the energy storage members 26 closer to the wrist of a user thereby reducing the torque experienced by a person when moving the hair dryer 10.

Energy Storage Cooling Air Flow Path

In accordance with this aspect, one or more energy storage members 26 and/or energy storage packs 28 are cooled by a dedicated energy storage cooling air flow path. This aspect may be used by itself or in combination with one or more of the other aspects set out herein.

As exemplified in FIG. 54, a dedicated energy storage cooling air flow path 160 may be isolated from the air flow path 31. An advantage of this aspect is that the energy storage members 26 may be kept cool using an air flow, and the air flow path may be designed without regard to directing an inlet and/or outlet for application to hair.

The dedicated energy storage cooling air flow path 160 may have a dedicated energy storage cooling path inlet 162 and a dedicated energy storage cooling path outlet 164, and may optionally have an air moving member, such as a motor and fan assembly 38, provided in the dedicated energy storage cooling air flow path 160 to draw air into and/or through the dedicated energy storage cooling air flow path 160. Alternately, air exiting the energy storage cooling air flow path 160 may be introduced into the air flow path 31.

Illumination

In accordance with this aspect, hair dryer 10 may include one or more illumination members. The illumination member or members may convey information as to whether, or which, heating elements are actuated and/or may convey information as to which drying mode is in operation. This aspect may be used by itself or in combination with one or more of the other aspects set out herein.

An advantage of this aspect is that one or more illumination members (e.g., LEDs) may be used to convey information about the operating mode to a person using the hair dryer 10.

For example, a LED that emits a first color light (e.g., blue) may be actuated when a motor 40 is actuated but no heat is being produced. The LED may be deactivated when the hair dryer is off.

If a heating element is actuated, then the color of light that is emitted may be adjusted or a second color light (e.g., red) may be concurrently emitted. For example, if a heating element 70 is energized to heat air flowing towards the hair being dried, then a second color of light may be emitted. Accordingly, blue and red light may be emitted, or only red light may be emitted.

Alternately, if an infrared heating element or other heating element to heat screen 50 is provided, then when the heating element is actuated, the color of light that is emitted may be adjusted or a second color light (e.g., red) may be concurrently emitted. For example, if a heating element 92 is energized, then a second color of light may be emitted. Accordingly, blue and red light may be emitted, or only red light may be emitted.

If a heating element 70 and a heating element 92 are each provided, then, for example, when the heating element 92 is actuated, a third color light (e.g., orange) may be concurrently emitted. For example, if a heating element 92 is energized, then blue and orange light may be emitted or only orange light may be emitted. For example, if a heating element 70 and a heating element 92 are each energized, then blue, red and orange light may be emitted or only, e.g., red and orange light may be emitted.

In embodiments which use a dual sided hair dryer 10, a light may be emitted (an LED actuated) to indicate the side of the hair dryer that is in use. For example, when a dual sided hair dryer is used in a first drying mode of operation, a light may be emitted, e.g., when power button 30 is actuated, illuminating a forward portion of the hair dryer 10, such as front end 14. Similarly, when a dual sided hair dryer is used in the second drying mode of operation, a light may be emitted, e.g., by actuating an alternate power button, illuminating a rearward portion of the hair dryer 10, such as rear end 16.

External Power Supply

In accordance with this aspect, a power source 25 may be provided exterior to the hair dryer, such as in power cord 24 (e.g., in the power cord as exemplified in FIG. 77 or as part of a plug that connects to the mains of a house). This aspect may be used by itself or in combination with one or more of the other aspects set out herein.

Positioning the power supply exterior to the hair dryer is advantageous as the power supply is less likely to be exposed to water. Accordingly, for example, the power supply may be located four, six or eight feet down a power cord 24 from the hair dryer 10, and may be sealed to be watertight or leak resistant. Sealing and/or removing the current controller may facilitate safe operation of the hair dryer 10.

Controllers

In accordance with this aspect, the operations of one or more components of the hair dryer 10 are directed by electrical, mechanical, hydraulic, and/or thermomechanical communicative connections. This aspect may be used by itself or in combination with one or more of the other aspects set out herein.

An advantage of this aspect is that a variety of communicative connections may be made to a component of the hair dryer 10 to control the operations of the component. For example, a valve may be opened and/or closed by an electrical signal (e.g., a solenoid valve closing in response to an electrical signal). In another example, a mechanical connection may be used (e.g., a valve may be closed by a user moving a slider handle, as discussed further subsequently).

A thermomechanical member may be used to control, e.g., a valve. For example, a metal strip (e.g., a bimetal strip such as a Nichrome strip) may be secured at one end to a valve and may selectively open or close the valve when current is applied to or removed from the metal strip and the temperature of the bimetal strip is accordingly increased or decreased, respectively. Optionally, a hydraulic or muscle wire connection may be used to control a component, e.g., a valve.

Handle as Part of the Air Flow Path

In accordance with this aspect, the handle may provide a portion of the air flow path. This aspect may be used by itself or in combination with one or more of the other aspects set out herein.

Figures 117, 118, 119:
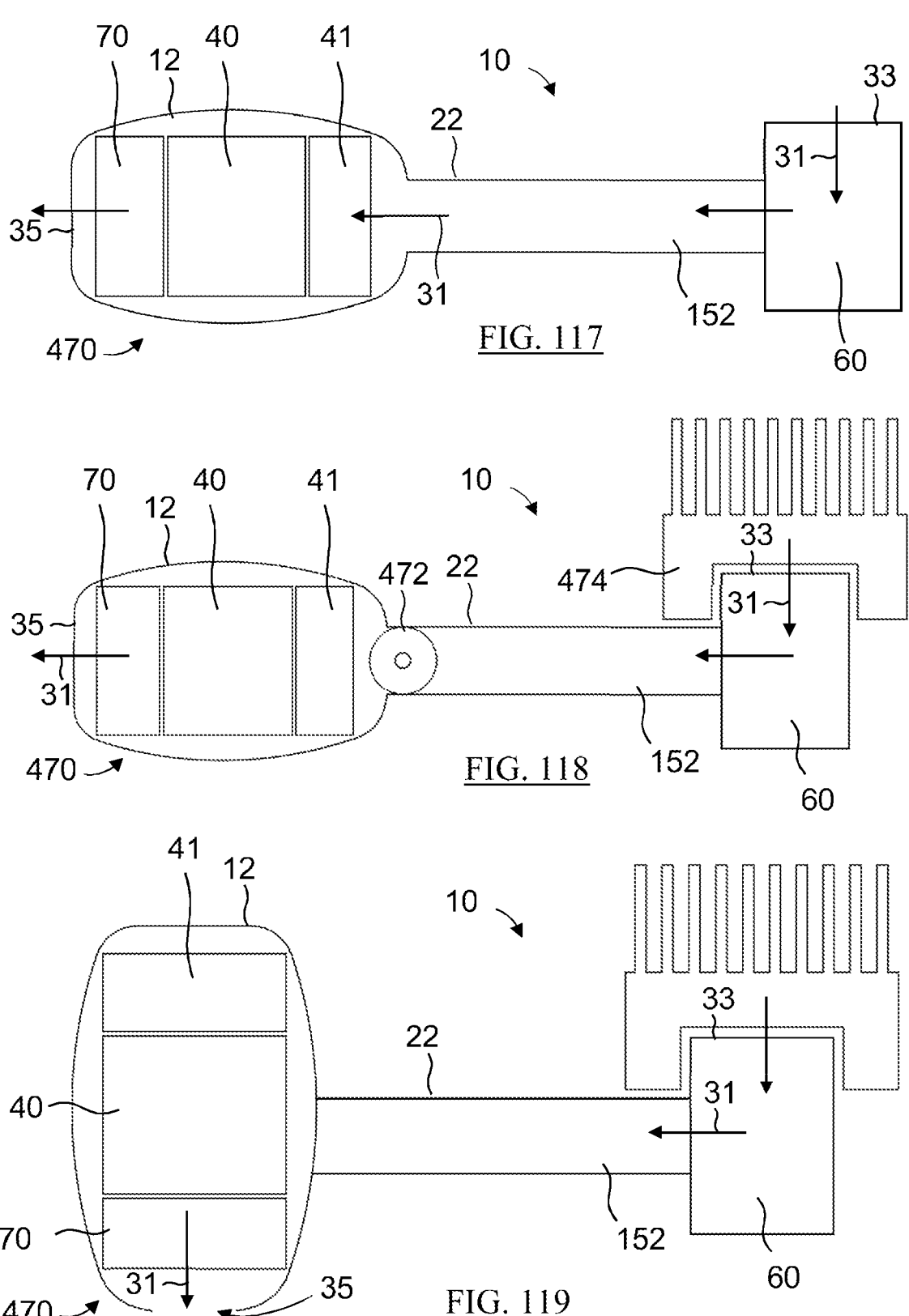
FIG. 117 is a cross sectional view of a further alternate embodiment of the hair dryer.
FIG. 118 is a cross sectional view of a further alternate embodiment of the hair dryer.

As exemplified in FIGS. 117 to 119, the body 12 of the hair dryer may comprise a head 470, which is exemplified as being generally oval, which contains a heating element 70, motor 40 and fan 42, 44. The water separator 60 and water collection member 152 are provided in the body 12 at an opposite end of handle 22 from the head 470. As exemplified, the water collection member 152 may also be provided in the handle 22. Or at the water separator end of the handle 22.

Optionally, the handle 22 may be secured to the head 470 via a swivel joint 472 to allow the hair dryer 10 to be folded into a compact form and/or to allow the dryer head 470 to be angled into different positions relative to the handle 22. One or more tools 474 for suction styling (e.g., a comb) may be secured over the inlet 33 of the air flow path 31 for use in styling hair during a suction mode.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A hair treatment appliance comprising:
   (a) a body having a hair treatment appliance electrical contact;
   (b) a first accessory tool removably mountable to the body, the first accessory tool having an accessory electrical contact;
   (c) an air flow path extending from a hair treatment appliance air inlet to a hair treatment appliance air outlet that is provided on the first accessory tool;
   (d) a motor and fan assembly provided in the air flow path; and,
   (e) a first electrically operable heating element provided in the first accessory tool, whereby, when the first accessory tool is mounted to the body and the hair treatment appliance actuated, the first electrically operable heating element is energized using power provided by the hair treatment appliance electrical contact, wherein the body is provided with a second electrically operated heating element.

2. The hair treatment appliance of claim 1 wherein the first electrically operable heating element is a resistive heating element.

3. The hair treatment appliance of claim 1 wherein the first electrically operable heating element is an infrared heating element.

4. The hair treatment appliance of claim 3 wherein the first accessory tool further comprises an infrared-absorbing target.

5. The hair treatment appliance of claim 3 wherein the infrared heating element is focused on the infrared-absorbing target.

6. The hair treatment appliance of claim 3 wherein air exits the first accessory tool in a flow direction, the air exiting the first accessory tool has a cross-sectional flow area, and the infrared heating element emits infrared radiation having an emitted radiation cross-sectional area in a plane transverse to the flow direction that is essentially the same as the cross-sectional flow area.

7. The hair treatment appliance of claim 3 wherein the infrared heating element emits heat in a radiation pattern, which pattern matches an air flow pattern provided by air exiting the first accessory tool.

8. The hair treatment appliance of claim 3 wherein radiation emitted through the infrared heating element is directed towards the hair treatment appliance air outlet.

9. The hair treatment appliance of claim 3 wherein the infrared heating element emits radiation across the entire hair treatment appliance air outlet.

10. The hair treatment appliance of claim 3 wherein the hair treatment appliance air outlet comprises a plurality of outlet ports and the infrared heating element emits radiation across the plurality of outlet ports.

11. The hair treatment appliance of claim 1 wherein the first electrically operable heating element is provided in the air flow path.

12. The hair treatment appliance of claim 1 wherein the first electrically operable heating element is thermally connected to the air flow path.

13. The hair treatment appliance of claim 12 wherein the first electrically operable heating element is arranged adjacent a contact surface at the hair treatment appliance air outlet.

14. The hair treatment appliance of claim 12 wherein the first electrically operable heating element is arranged to heat hair adjacent the hair treatment appliance air outlet.

15. The hair treatment appliance of claim 1 wherein an infrared heating element is arranged to direct infrared radiation to a location that is exterior to the first accessory tool.

16. The hair treatment appliance of claim 1 wherein an infrared heating element is arranged to direct infrared radiation at hair held adjacent the first accessory tool.

17. The hair treatment appliance of claim 1 wherein the motor and fan assembly is provided in the first accessory tool.

18. The hair treatment appliance of claim 1 further comprising a second accessory tool having a second electrical heating element, and air exiting the second accessory tool has a cross-sectional flow area in a direction transverse to a direction of air flow exiting the second accessory tool that is different to a cross-sectional flow area of air exiting the first accessory tool in a direction transverse to a direction of air exiting the first accessory tool.

19. The hair treatment appliance of claim 1 further comprising a second accessory tool which has an absence of a heating element.

\* \* \* \* \*